(12) United States Patent
Hirakata et al.

(10) Patent No.: US 7,982,826 B2
(45) Date of Patent: Jul. 19, 2011

(54) POLARIZING PLATE AND LIQUID CRYSTAL DISPLAY

(75) Inventors: Junichi Hirakata, Minami-Ashigara (JP); Minoru Wada, Minami-Ashigara (JP); Yukito Saitoh, Minami-Ashigara (JP); Yusuke Ohashi, Minami-Ashigara (JP); Katsufumi Ohmuro, Minami-Ashigara (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 404 days.

(21) Appl. No.: 12/280,224

(22) PCT Filed: Feb. 28, 2007

(86) PCT No.: PCT/JP2007/054368
§ 371 (c)(1),
(2), (4) Date: Aug. 21, 2008

(87) PCT Pub. No.: WO2007/100143
PCT Pub. Date: Sep. 7, 2007

(65) Prior Publication Data
US 2010/0231830 A1 Sep. 16, 2010

(30) Foreign Application Priority Data

| Feb. 28, 2006 | (JP) | 2006-052473 |
| Mar. 15, 2006 | (JP) | 2006-071427 |
| Mar. 20, 2006 | (JP) | 2006-076164 |
| Mar. 23, 2006 | (JP) | 2006-080397 |
| Mar. 24, 2006 | (JP) | 2006-081977 |
| Mar. 28, 2006 | (JP) | 2006-088235 |
| Nov. 27, 2006 | (JP) | 2006-318486 |

(51) Int. Cl.
*G02F 1/1333* (2006.01)
*G02F 1/1335* (2006.01)
(52) U.S. Cl. .......................... 349/85; 349/112; 349/114
(58) Field of Classification Search .................... 349/85, 349/112, 114
See application file for complete search history.

(56) References Cited

U.S. PATENT DOCUMENTS

| 6,268,961 B1 * | 7/2001 | Nevitt et al. ................. 359/488 |
| 7,079,214 B2 * | 7/2006 | Shimoshikiryo ............. 349/144 |
| 7,800,726 B2 * | 9/2010 | Kim ............................. 349/137 |
| 2003/0227429 A1 * | 12/2003 | Shimoshikiryo ............. 345/90 |

FOREIGN PATENT DOCUMENTS

EP 0 911 656 B1 1/2005

(Continued)

OTHER PUBLICATIONS

* Form PCT/ISA/210 International Search Reiort dated Jun. 12, 2007.

(Continued)

*Primary Examiner* — Rhonda S Peace
(74) *Attorney, Agent, or Firm* — Buchanan Ingersoll & Rooney PC

(57) ABSTRACT

A polarizing plate for a liquid crystal display is provided and includes a first protective film, a polarizer, a second protective film and a light diffusion layer in order. The light diffusion layer is a layer including a translucent resin and translucent particles having a refractive index different from a refractive index of the translucent resin. The internal haze of the light diffusion layer is 45% to 80%.

6 Claims, 24 Drawing Sheets

FOREIGN PATENT DOCUMENTS

| | | |
|---|---|---|
| JP | 6-214116 A | 8/1994 |
| JP | 7-191217 A | 7/1995 |
| JP | 8-050206 A | 2/1996 |
| JP | 2001-264538 A | 9/2001 |
| JP | 2001-272542 A | 10/2001 |
| JP | 2002-122739 A | 4/2002 |
| JP | 2002-174813 A | 6/2002 |
| JP | 2002-192656 A | 7/2002 |
| JP | 3342417 B2 | 11/2002 |
| JP | 2003-057415 A | 2/2003 |
| JP | 2003-186017 | 7/2003 |
| JP | 2004-062146 A | 2/2004 |
| JP | 3499268 B2 | 2/2004 |
| JP | 2004-516359 A | 6/2004 |
| JP | 2005-010509 A | 1/2005 |
| JP | 2005-037938 A | 2/2005 |
| JP | 2005-077860 | 3/2005 |
| JP | 2006-235580 A | 9/2006 |
| WO | WO 02/50209 A1 | 6/2002 |

OTHER PUBLICATIONS

* Form PCT/ISA/237 (Written Opinion of the International Searching Authority) dated Jun. 12, 2007.

Notification from Japanese Patent Office in corresponding Japanese Patent Application 2006/318486 issued on Feb. 22, 2011 with English Translation.

Information Offer Form submitted on Jan. 28, 2011 in corresponding Japanese Patent Application 2006/318486 with English Translation.

* cited by examiner

OFF DISPLAY          ON DISPLAY

OFF DISPLAY          ON DISPLAY

EQUAL CONTRAST RATIO CONTOUR

EQUAL CONTRAST RATIO CONTOUR

POLARIZING PLATE AND LIQUID CRYSTAL DISPLAY

TECHNICAL FIELD

The present invention relates to a polarizing plate comprising a polarizer interposed between protective layers, and a liquid crystal display using the same.

BACKGROUND ART

A display apparatus using a liquid crystal display (also called a liquid crystal display panel), an electroluminescence device (classified into an organic electroluminescence device and an inorganic electroluminescence device depending on a fluorescent material used), field emission device (FED), an electrophoresis device, etc. can display an image without providing a space (vacuum basket-like body) where an electron beam is scanned in a two-dimension behind a display screen, like a cathode ray tube (CRT). Accordingly, such a display apparatus has an advantage of thinness, light weight, low power consumption, etc. over the CRT. This display apparatus is also called a flat panel display from its feature.

The display apparatus using the liquid crystal display, the EL device or the FED device has spread to replace the CRT in various fields including OA equipments such as notebook PCs, monitors for PC and so on, mobile terminals, televisions, etc. because of the advantage over the CRT. The replacement of the CRT with the flat panel display is based on technological innovation in improvement of image quality such as spread of viewing angle or spread of an area of display color reproducibility of the liquid crystal display or the EL device. In addition, in recent years, display quality of moving pictures has been improved as multimedia and Internet have widely spread. In addition, there appear new fields including electronic paper or large scaled information display for public interests or advertisement, which can not be realized by the CRT.

A liquid crystal display comprises a liquid crystal cell, a driving circuit that applies a display signal voltage to the liquid crystal cell, a backlight (a back light source), and a signal control system that transmits an input image signal to the driving circuit, which are also collectively called a liquid crystal module.

The liquid crystal cell includes liquid crystal molecules, two substrates that seal and hold the liquid crystal molecules, and electrode layers that apply a voltage to the liquid crystal molecules. A polarizing plate is disposed in the outside of the liquid crystal cell. The polarizing plate comprises a protective layer and a polarizer made of a polyvinyl alcohol film. Specifically, the polarizing plate is obtained by dyeing the polarizer with iodine, expands the dyed polarizer, and stacking the protective layer on both sides of the expanded polarizer. In case of a transmission type liquid crystal display, this polarizing plate is attached to both sides of the liquid crystal cell, and one or more optical compensation sheets may be further provided. In addition, in case of a reflection type liquid crystal display, a reflecting plate, a liquid crystal cell, one or more optical compensation sheets, and a polarizing plate are typically arranged in order.

The liquid crystal cell performs ON/OFF display according to alignment conditions of the liquid crystal molecules. For the liquid crystal cell, there have been proposed display modes such as TN (Twisted Nematic), IPS (In-Plane Switching), OCB (Optically Compensatory Bend), VA (Vertically Aligned), and ECB (Electrically Controller Birefringence) modes, which can be applied to both of the transmission type liquid crystal display and the reflection type liquid crystal display.

An optical compensation film is used to alleviate image coloring or extend a viewing angle in liquid crystal displays. An expansible birefringent polymer film has been used as the optical compensation film. Alternatively, in addition to the optical compensation film comprising the expansible birefringent polymer film, there has been proposed to use an optical compensation film having an optical compensation layer formed of low molecule or high molecule liquid crystals on a transparent support. Since the liquid crystal molecules have various forms of alignment, use of the liquid crystal molecules allows realization of optical properties which can not be obtained by the conventional expansible birefringent polymer film. In addition, there has been proposed a structure that has both of functions of a protective layer and an optical compensation film by adding birefringence to the protective layer of a polarizing plate.

An optical property of an optical compensation film depends on an optical property of a liquid crystal cell, specifically, a display mode. Use of liquid crystal molecules allow manufacture of optical compensation films having various optical properties corresponding to different display modes of the liquid crystal cell. There have been already proposed optical compensation films using liquid crystal molecules corresponding to various display modes.

For example, an optical compensation film for the TN type liquid crystal cell improves a viewing angle characteristic of contrast by prevention of light leakage in an inclined direction in black color display by making an optical compensation of a tilted alignment state for a substrate while restoring a twisted structure of liquid crystal molecules by application of a voltage (see JP-A-6-214116 and JP-A-8-50206). An optical compensation film for parallel alignment makes an optical compensation of liquid crystal molecules aligned in parallel to a substrate and improves a viewing angle characteristic of perpendicular transmittance of a polarizing plate in black color display under application of no voltage (see Japanese Patent No 3342417).

However, even when an optical compensation film made by hybrid-aligning discotic liquid crystal compounds uniformly is used, it is very difficult to fully compensate a liquid crystal cell optically. For example, when the TN type liquid crystal cell is observed from an inclined direction, there occurs a gray scale inversion effect that transmittance in each gray scale is inverted. As one of methods for preventing the gray scale inversion effect, there has been known a method for limiting a range of a tilt angle of liquid crystal molecules in a liquid crystal cell (see "Technical Report of IEICE", EID 2001-108, p. 47-52).

In addition, under progress of improvement of display quality of liquid crystal displays, as one of problems of viewing angle characteristics, a problem of a difference between a γ characteristic in front viewing and a γ characteristic in oblique viewing, that is, a problem of dependency of a γ characteristic on a viewing angle, has issued at present Here, the γ characteristic refers to dependency of display luminance on a gray scale. Since the difference between the γ characteristic in front viewing and the γ characteristic in oblique viewing means that the gray scale depends on a viewing direction, there may occur a particular problem in case of display of photographs and the like or TV broadcasting. There has been proposed various liquid crystal displays with an improved viewing angle characteristic of the γ characteristic. For example, Patent Document 4 discloses a liquid crystal display of a normally black mode with improved dependency of a γ characteristic on a viewing angle. In addition, in an ECB mode with high transmittance and high response speed, there is a need to improve a viewing angle characteristic by lessening dependency of a γ characteristic on a viewing angle.

On the other hand, although the above-mentioned methods improve the viewing angle characteristic, there occurs a problem of contraction of a polarizing plate and light leakage at a circumference of the polarizing plate under severe use environments, for example, high temperature or high humidity environments.

In order to overcome the problem related to durability of the polarizing plate, JP-A-7-191217 and EP 911656 disclose a technique in which an optical compensation sheet made by applying an optically anisotropic layer made of a discotic (disk-like) compound on a transparent support is directly used as a polarizing plate protection film without increasing thickness of a liquid crystal display.

On the other hand, there has been proposed a technique for overcoming the light leakage problem by properly selecting an adhesive material of the polarizing plate (see JP-A-2004-216359).

In addition, in order to overcome the durability problem, JP-A-2001-264538 discloses a technique in which the product of an photoelastic coefficient of an optical compensation sheet and an elasticity coefficient of an adhesive layer is set to be less than $1.2 \times 10^{-5}$, JP-A-2001-272542 discloses a technique in which an elasticity coefficient of an adhesive layer is set to be less than 0.06 MPa, JP-A-2002-122739 discloses a technique in which the product of a linear expansion coefficient of a polarizing plate protection layer and an elasticity coefficient of an adhesive layer is set to be less than $1.0 \times 10^{-5}$ (°C.$^{-1}$·MPa), and Patent Document 11 discloses a technique in which the product of an photoelastic coefficient of a polarizing plate protection layer and an elasticity coefficient of an adhesive layer is set to be less than $8.0 \times 10^{-12}$ (m$^2$/N·MPa).

DISCLOSURE OF THE INVENTION

An object of an illustrative, non-limiting embodiment of the present invention is to provide a liquid crystal display having highly improved gray scale inversion by improving a viewing angle characteristic with a simple configuration, particularly, an ECB type or IPS type liquid crystal display of a parallel alignment type without a twisted structure of a liquid crystal layer and a TN type liquid crystal display with a twisted structure of a liquid crystal layer.

Another object of an illustrative, non-limiting embodiment of the present invention is to provide a liquid crystal display with improved reliability under severe environments.

The above-mentioned objects can be achieved by the following means.

(1) A polarizing plate comprising: a first protective film; a polarizer; a second protective film; and a light diffusion layer in this order, wherein the light diffusion layer comprises a translucent resin and translucent particles having a refractive index different from that of the translucent resin, and the light diffusion layer has an internal haze of 45 to 80%, (2) The polarizing plate according to (1), further comprising an optical compensation layer, (3) The polarizing plate according to (1) or (2), wherein the light diffusion layer has such a scattering light profile measured by a goniophotometer that a intensity of scattering light having an emission angel of 30° with respect to scattering light having an emission angle of 0° falls within a range of 0.05 to 0.3%.

(4) The polarizing plate according to any one of (1) to (3), which has an absorption axis parallel or perpendicular to one side of the polarizing plate.

(5) The polarizing plate according to any one of (1) to (3), which has an absorption axis having an angle of 5 to 40° with one side of the polarizing plate.

(6) A liquid crystal display comprising:
a liquid crystal cell comprising a pair of substrates disposed opposite to each other, one of the pair of substrates having an electrode on one side thereof, and a liquid crystal layer between the pair of substrates; and
a polarizing plate disposed on at least one outer side of the liquid crystal cell, the polarizing plate comprising a first protective film; a polarizer, a second protective film, and a light diffusion layer in this order, wherein the light diffusion layer comprises a translucent resin and translucent particles having a refractive index different from that of the translucent resin, and the light diffusion layer has an internal haze of 45 to 80%, (7) The liquid crystal display according to (6), wherein the liquid crystal layer includes a nematic liquid crystal material aligned substantially parallel to surfaces of the pair of substrates under application of no voltage.

(8) The liquid crystal display according to (6) or (7), wherein the polarizing plate further comprises an optical compensation layer.

(9) The liquid crystal display according to any one of (6) to (8), wherein the polarizer has an absorption axis parallel or perpendicular to a horizontal direction of a screen of the liquid crystal display,

(10) A liquid crystal display comprising:
a pair of substrates disposed opposite to each other, one of the pair of substrates having an electrode on one side thereof;
a liquid crystal layer between the pair of substrates, the liquid crystal layer including liquid crystal molecules alighted by alignment axes of opposite surfaces of the pair of substrates; and
a pair of polarizing plates, each comprising an adhesive layer, an optical compensation sheet, a polarizer and a protective layer in this order, the liquid crystal cell being between the pair of polarizing plates, wherein at least one of the pair of polarizing plates has an absorption axis having an angle of 5° and 40° with respect to one of a horizontal direction and a vertical direction of a screen of the liquid crystal display.

(11) The liquid crystal display according to (10), wherein at least one of the polarizing plates further comprises a light diffusion layer, the light diffusion layer comprises a translucent resin and translucent particles having a refractive index different from that of the translucent resin, and the light diffusion layer has an internal haze of 45 to 80%.

(12) A liquid crystal display comprising:
a pair of first and second substrate disposed opposite to each other, one of the pair of first and second substrates having a transparent electrode on one side thereof;
a liquid crystal layer between the pair of first and second substrates, the liquid crystal layer including liquid crystal molecules aligned substantially parallel to surfaces of the pair of first and second substrates under application of no voltage, the liquid crystal molecules having a twist angle of 45° or less between the first and second substrates; and
a plurality of pixels including a plurality of electrodes that apply a voltage to the liquid crystal layer, wherein
each of the pixels includes a first sub pixel and a second sub pixel which apply different voltages to the liquid crystal layer, each of the pixels is capable of representing a 0 to n gray scales, n being an integer of 1 or more and higher n representing a gray scale having higher luminance, each of the pixels satisfies formula $|V1(k(-V2(k)|>0$ when the each of the pixels represent at least k gray scale, wherein $V1(k)$ and $V2(k)$ represents effective voltages by Volt applied to the liquid crystal layer of the first and second sub pixels, respectively, and k satisfies $0<k\leq n-1$, and wherein the liquid crystal display displays an image in a normally white mode.

(13) The liquid crystal cell according to (12), further comprising a polarizing plate disposed on at least one outer side of the liquid crystal layer, the polarizing plate comprising a first protective film; a polarizer, a second protective film, and a light diffusion layer in this order, wherein the light diffusion layer comprises a translucent resin and translucent particles having a refractive index different from that of the translucent resin, and the light diffusion layer has an internal haze of 45 to 80%.

(14) A liquid crystal display comprising:

a pair of first and second substrate disposed opposite to each other, one of the pair of first and second substrates having a transparent electrode on one side thereof;

a liquid crystal layer between the pair of first and second substrates, the liquid crystal layer including liquid crystal molecules aligned substantially parallel to surfaces of the pair of first and second substrates under application of no voltage, the liquid crystal molecules having a twist angle of substantially 90° between the first and second substrates, and a plurality of pixels including a plurality of electrodes that apply a voltage to the liquid crystal layer, wherein each of the pixels includes a first sub pixel and a second sub pixel which apply different voltages to the liquid crystal layer, each of the pixels is capable of representing a 0 to n gray scales, n being an integer of 1 or more and higher n representing a gray scale having higher luminance, and each of the pixels satisfies formula $|V1(k)-V2(k)|>0$ when the each of the pixels represent at least k gray scale, wherein $V1(k)$ and $V2(k)$ represents effective voltages by Volt applied to the liquid crystal layer of the first and second sub pixels, respectively, and k satisfies $0<k\leq n-1$, and wherein the liquid crystal display displays an image in a normally white mode.

(15) The liquid crystal cell according to (14), further comprising a polarizing plate disposed on at least one outer side of the liquid crystal layer, the polarizing plate comprising a first protective film; a polarizer, a second protective film, and a light diffusion layer in this order, wherein the light diffusion layer comprises a translucent resin and translucent particles having a refractive index different from that of the translucent resin, and the light diffusion layer has an internal haze of 45 to 80%,

(16) A liquid crystal display comprising:

a pair of polarizing plates, each comprising a polarizer and a transparent layer, transmission axes of the pair of polarizing plates being perpendicular to each other; and a liquid crystal panel between the pair of polarizing plates, wherein the liquid crystal panel comprises a pair of substrates disposed opposite to each other, one of the pair of substrates having an electrode on one side thereof, a liquid crystal layer including liquid crystal molecules alighted by alignment axes of opposite surfaces of the pair of substrates, and a pair of optically anisotropic layers, the liquid crystal layer being between the pair of optically anisotropic layers wherein the liquid crystal panel has a double symmetrical axis with respect to a cubic structure defined by: upper and lower alignment control directions of the liquid crystal layer which are defined by the alignment axes of opposite surfaces of the pair of substrates; and alignment control directions of the pair of optically anisotropic layers, the double symmetrical axis being parallel to the surfaces of the pair of substrates, a transmission axis of one of the pair of polarizing plates is parallel to the double symmetrical axis, and a transmission axis of the other of the pair of polarizing plates is perpendicular to the double symmetrical axis, and wherein the transparent layer between the liquid crystal layer and the polarizer is a biaxial retardation layer, the biaxial retardation layer having: an in-plane retardation of 250 to 300 nm; an NZ value of 0.1 to 0.4; and an in-plane retardation axis perpendicular to an absorption axis of the polarizer closer to the biaxial retardation layer.

(17) The liquid crystal display according to (16), wherein at least one of the polarizing plates further comprises a light diffusion layer, wherein the light diffusion layer comprises a translucent resin and translucent particles having a refractive index different from that of the translucent resin, and the light diffusion layer has an internal haze of 45 to 80%.

(18) A liquid crystal display comprising:

a pair of first and second substrate disposed opposite to each other, one of the pair of first and second substrates having a transparent electrode on one side thereof;

a liquid crystal layer between the pair of first and second substrates, the liquid crystal layer including liquid crystal molecules aligned substantially parallel to surfaces of the first and second substrates under application of no voltage, the liquid crystal molecules having a twist angle of 45° or less between the first and second substrates;

a pair of first and second polarizing plates having absorption axes perpendicular to each other, the liquid crystal layer being between the pair of first and second polarizing plates;

at least one first retardation layer disposed at least one of between the at least one first polarizing plate and the liquid crystal layer and between the second polarizing plate and the liquid crystal layer; and a second retardation layer disposed between the first polarizing plate and the liquid crystal layer, the second retardation layer including a compound having a discotic structural unit, wherein the at least one first retardation layer satisfies formulae:

$$0\ nm<Re(550)<70\ nm$$

$$0\ nm<Rth(550)<330\ nm$$

wherein Re(550) represents a summation of in-plane retardations of the at least first retardation layer at the wavelength of 550 nm, and Rth(550) represents a summation of thickness-direction retardations of the at least first retardation layer at the wavelength of 550 nm.

(19) The liquid crystal display according to (18), wherein at least one of the first and second polarizing plates further comprises a light diffusion layer, wherein the light diffusion layer comprises a translucent resin and translucent particles having a refractive index different from that of the translucent resin, and the light diffusion layer has an internal haze of 45 to 80%.

(20) The liquid crystal display according to (18), further comprising a retardation layer disposed between the second polarizing plate and the liquid crystal layer, the retardation layer including a compound having a discotic structural unit, wherein the at least one first retardation layer satisfies formula: $0\ nm<Rth(550)<200\ nm$.

(21) The liquid crystal display according to (19), wherein at least one of the first and second polarizing plates further comprises a light diffusion layer, wherein the light diffusion layer comprises a translucent resin and translucent particles having a refractive index different from that of the translucent resin, and the light diffusion layer has an internal haze of 45 to 80%.

(22) A liquid crystal display comprising:
a pair of substrates disposed opposite to each other, one of the pair of substrates having an electrode on one side thereof;
a liquid crystal layer between the pair of substrates, the liquid crystal layer including liquid crystal molecules alighted by alignment axes of opposite surfaces of the pair of substrates;
a pair of polarizing plates, each comprising a polarizer and a protective film, the liquid crystal layer being between the pair of polarizing plates; and
an optically anisotropic layer between the liquid crystal layer and at least one of the pair of polarizing plates, the optically an isotropic layer including a liquid crystal compound aligned by an alignment axis and fixed,
wherein an absorption axis of the polarizer is parallel or perpendicular to a horizontal direction of a screen of the liquid crystal display, at least one of the alignment axes of surfaces of the pair of substrates intersects an alignment control direction of the optically anisotropic layer by 10 to 35°, and the protective film satisfies formula:

$$Re + 2 \times Rth \leq 280$$

wherein Re represents an in-plane retardation, and Rth represents a thickness-direction retardation,

(23) The liquid crystal display according to (22), wherein at least one of the polarizing plates further comprises a light diffusion layer, wherein the light diffusion layer comprises a translucent resin and translucent particles having a refractive index different from that of the translucent resin, and the light diffusion layer has an internal haze of 45 to 80%,

(24) The liquid crystal display according to any one of (6) to (9), which is an ECB liquid crystal display.
(25) The liquid crystal display according to any one of (6) to (9), which is a TN liquid crystal display.
(26) The liquid crystal display according to any one of (6) to (9), which is an IPS liquid crystal display.

REFERENCE SIGNS AND NUMERALS ARE SET FORTH BELOW

Figure 1:
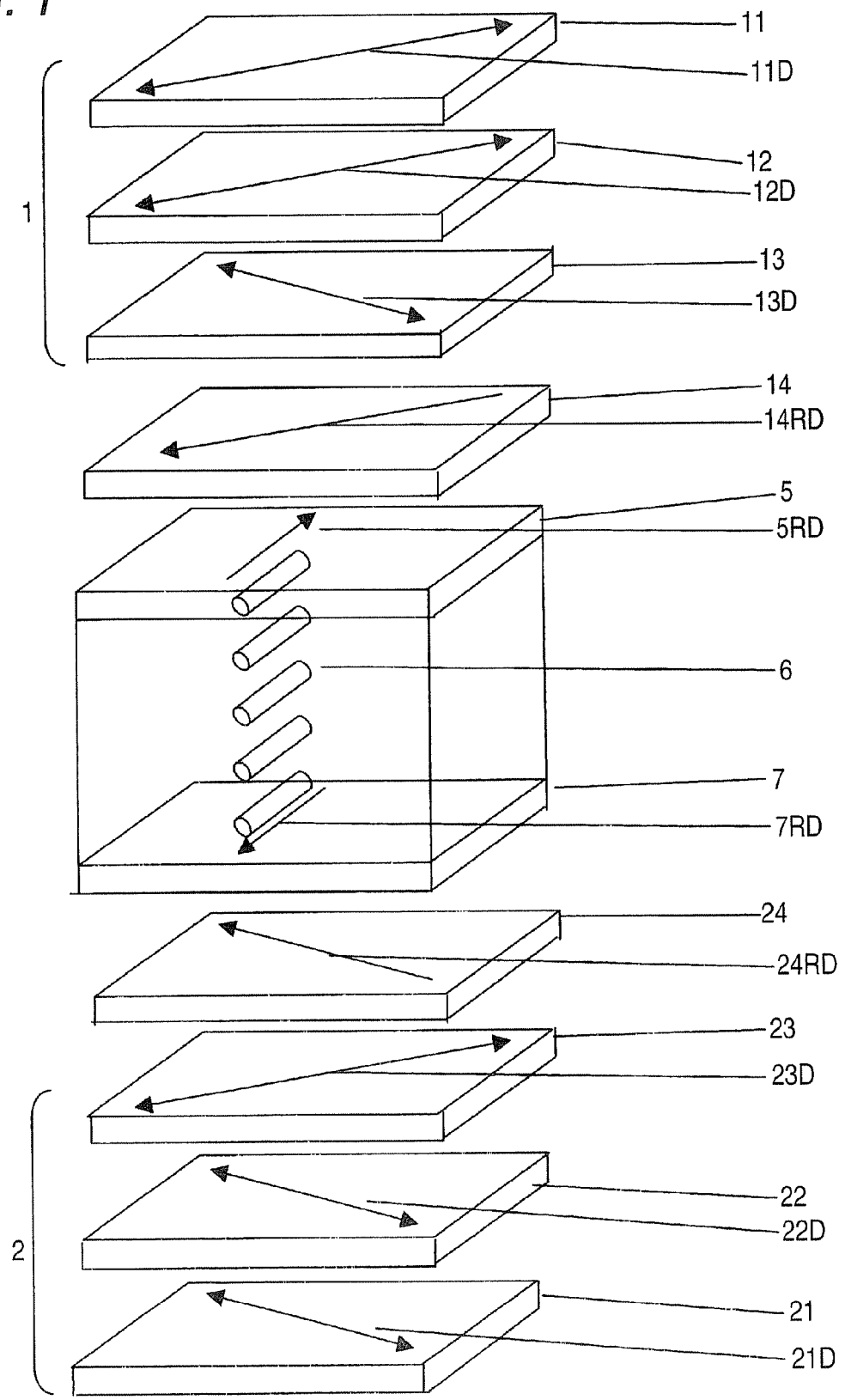
FIG. 1 is a schematic view showing an example of an ECB type liquid crystal display according to an exemplary embodiment of the invention.

1: upper polarizing plate
11: protective film for upper polarizing plate
11D: retardation axis of protective film for upper polarizing plate
12: polarizer of upper polarizing plate
12D: absorption axis of polarizer of upper polarizing plate
13: protective film for upper polarizing plate
13D: retardation axis of protective film for upper polarizing plate
14: upper optical compensation film
14RD: alignment direction of upper optical compensation film
5: upper substrate of liquid crystal cell
5RD: rubbing direction of upper substrate for liquid crystal alignment
6: liquid crystal molecule, liquid crystal layer
7: lower substrate of liquid crystal cell
7RD: rubbing direction of lower substrate for liquid crystal alignment
24: lower optical compensation film
24RD: alignment direction of lower optical compensation film
2: lower polarizing plate
23: protective film for lower polarizing plate
23D: retardation axis of protective film for lower polarizing plate
22: polarizer of lower polarizing plate
22D: absorption axis of polarizer of lower polarizing plate
21: protective film for lower polarizing plate
21D: retardation axis of protective film for lower polarizing plate
9D: electric field direction
91: linear electrode
93: Insulating film
92: electrode
80: light source
TN1: upper polarizing plate
TN2: absorption axis direction of upper polarizing plate
TN3: upper optically anisotropic layer
TN4: alignment control direction of upper optically anisotropic layer
TN5: upper electrode substrate of liquid crystal cell
TN6: alignment control direction of upper substrate
TN7: liquid crystal layer
TN8: lower electrode substrate of liquid crystal cell
TN9: alignment control direction of lower substrate
TN10: lower optically anisotropic layer
TN11: alignment control direction of lower optically anisotropic layer
TN12: lower polarizing plate
TN13: absorption axis direction of lower polarizing plate
301: upper protective film for upper polarizing plate
302: retardation axis of upper protective film
303: upper polarizer
304: absorption axis of upper polarizer
305: lower protective film for upper polarizing plate
306: retardation axis of lower protective film
307: upper optical compensation film
308: alignment control direction (rubbing direction) of upper optical compensation film
309: upper substrate of liquid crystal cell
310: alignment control direction (rubbing direction) of upper substrate for liquid crystal alignment
311: liquid crystal molecule
312: lower substrate of liquid crystal cell
313: alignment control direction (rubbing direction) of lower substrate for liquid crystal alignment
314: lower optical compensation film
315: alignment control direction (rubbing direction) of lower optical compensation film
316: upper protective film for lower polarizing plate
317: retardation axis of upper protective film
318: lower polarizing plate
319; absorption axis of lower polarizing plate
320: lower protective film for lower polarizing plate
321: retardation axis of lower protective film
350, 350': pixel
350a, 350b: sub pixel
352: scan line
345a, 345b, 354': signal line
356a, 356b, 356': TFT
358a, 358b: sub pixel electrode
358': pixel electrode
100, 100': liquid crystal display
401: polarizer of upper polarizing plate
402: transmission axis of polarizer of upper polarizing plate
403: transparent layer of upper polarizing plate
404: retardation axis of transparent layer of upper polarizing plate
405a: upper first optically anisotropic layer
406a: alignment average direction (alignment control direction) of molecule symmetrical axis of liquid crystal compound of upper first optically anisotropic layer
405b; upper second optically anisotropic layer
406b: alignment average direction (alignment control direction) of molecule symmetrical axis of liquid crystal compound of upper second optically anisotropic layer
407: upper substrate of liquid crystal cell
408: rubbing direction (alignment axis) of upper substrate for liquid crystal alignment
409: liquid crystal molecule (liquid crystal layer)
410: lower substrate of liquid crystal cell 411: rubbing direction (alignment axis) of lower substrate for liquid crystal alignment
412a: lower first optically anisotropic layer
413a: alignment average direction (alignment control direction) of molecule symmetrical axis of liquid crystal compound of lower first optically anisotropic layer
412b: lower second optically anisotropic layer
413b: alignment average direction (alignment control direction) of molecule symmetrical axis of liquid crystal compound of lower second optically anisotropic layer
414: transparent layer of lower polarizing plate
415: retardation axis of transparent layer of lower polarizing plate
416: polarizer of lower polarizing plate
417: transmission axis of polarizer of lower polarizing plate
451: polarizer of upper polarizing plate
452: absorption axis of polarizer of upper polarizing plate
453: transparent layer of upper polarizing plate
454: retardation axis of transparent layer of upper polarizing plate
455: upper optically anisotropic layer
456: alignment average direction (alignment control direction) of molecule symmetrical axis of liquid crystal compound of upper optically anisotropic layer
457: upper substrate of liquid crystal cell
458: rubbing direction (alignment axis) of upper substrate for liquid crystal alignment
459: liquid crystal molecule (liquid crystal layer)
460: lower substrate of liquid crystal cell
461: rubbing direction (alignment axis) of lower substrate for liquid crystal alignment
462: lower optically anisotropic layer
463: alignment average direction (alignment control direction) of molecule symmetrical axis of liquid crystal compound of lower optically anisotropic layer
464: transparent layer of lower polarizing plate
465: retardation axis of transparent layer of lower polarizing plate
466: polarizer of lower polarizing plate
467: absorption axis of polarizer of lower polarizing plate
510, 512: transparent substrate
514: liquid crystal layer
516, 518: polarizer (first and second polarizers)
520, 522: retardation plate (first retardation layer) and protective layer for polarizing plate
523: transparent support for polarizing plate protective layer and optical compensation film
524, 526: optical compensation film (second retardation layer) including discotic structural unit
601: outer protective film for upper polarizing plate
602: retardation axis of outer protective film for upper polarizing plate
603: polarizer of upper polarizing plate
604: absorption axis of polarizer of upper polarizing plate
605: protective film on liquid crystal cell side of upper polarizing plate (support)
606: retardation axis of protective film on liquid crystal cell side of upper polarizing plate (support)
607: upper optically anisotropic layer
608: rubbing direction (alignment control direction) at support side of upper optically anisotropic layer for liquid crystal alignment
609: upper substrate of liquid crystal cell
610: rubbing direction (alignment control direction) of upper substrate for liquid crystal alignment
611: liquid crystal molecule (liquid crystal layer)
612: rubbing direction (alignment control direction) of lower substrate for liquid crystal alignment
613: lower substrate of liquid crystal cell
614: lower optically anisotropic layer
615: rubbing direction (alignment control direction) at support side of lower optically anisotropic layer for liquid crystal alignment
616: protective film on liquid crystal cell side of lower polarizing plate (support)
617: retardation axis of protective film on liquid crystal cell side of lower polarizing plate (support)
618: polarizer for lower polarizing plate
619: absorption axis of polarizer for lower polarizing plate
620: outer protective film for lower polarizing plate
621: retardation axis of outer protective film for lower polarizing plate
θ: intersection angel between alignment control direction of liquid crystal layer and alignment control direction of optically anisotropic layer
φ: angle between alignment control direction of pair of upper and lower optically anisotropic layers

BEST MODE FOR CARRYING OUT THE INVENTION

According to an exemplary embodiment of the invention, a polarizing plate having a function of optically compensating a liquid crystal cell with the same configuration as the liquid crystal display in the background art can be provided by controlling material of a polarizing plate protective film, a light diffusion layer, a surface film and a liquid crystal cell and a manufacturing method thereof. In addition, when the manufacture polarizing plate is attached to ECB type, IPS type and TN type liquid crystal cells, a viewing angle as well as display quality can be remarkably improved. In addition, since there is no need for processes of stacking one or more retardation films and polarizing plates while controlling their angles, it is possible to manufacture the polarizing plate in a roll-to-roll manner. In addition, according to an exemplary embodiment of the invention, there can be provided a polarizing plate which is capable of not only providing a polarization function but also extending an viewing angle of a liquid crystal display, reducing gray scale inversion, preventing imprint of external light, and being simply manufactured.

According to an aspect of the invention, there is provided a liquid crystal display with high display quality without light leakage which occurs when the liquid crystal display is heated.

In addition, according to another aspect of the invention, there is provided a normally white mode liquid crystal display with an excellent viewing angle characteristic with reduced dependency of γ characteristic on a viewing angle. Particularly, according to still another aspect of the invention, there is provided a normally white mode liquid crystal display with high viewing angle contrast with reduced light leakage in an inclined direction in black display as well as with an excellent viewing angle characteristic reduced dependency of γ characteristic on a viewing angle.

Terms used in the specification will be first described,
(Description of Terms)
(Retardation, Re, Rth)

In the specification, $Re(\lambda)$ and $Rth(\lambda)$ represent retardation in plane and retardation in thickness for a wavelength λ, respectively. $Re(\lambda)$ is measured when light having a wavelength of λ nm is incident in a normal direction of a film in "KOBRA 21ADH" or "KOBRA 21WR" {available from Oji Scientific Instruments. Co., Ltd.}.

If a measured film is represented by a one or two-axis refractive index ellipsoid, Rth(λ) is calculated according to the following method.

When Re(λ) is measured at 6 points when a wavelength of λ nm is incident in a direction inclined by 10° step from a normal direction of a film up to 50° in one side, with a retardation axis in plane (determined by "KOBRA 21ADH" or "KOBRA 21WR") as an inclined axis (rotation axis) (with any direction in a film plane as a rotation axis if there is no retardation axis), Rth(λ) is calculated by "KOBRA 21ADH" or "KOBRA 21WR," based on the measured retardation values, a presumed value of an average refractive index and an inputted film thickness value.

In the above, if the film has a direction in which the retardation value is zero at an inclined angle from the normal direction, with the retardation axis in plane as the rotation axis, after signs of retardation values are changed to be negative at an angle larger than the inclined angle, Rth(λ) is calculated by "KOBRA 21ADH" or "KOBRA 21WR."

In addition, when retardation values are measured in any two directions, with the retardation axis as the inclined axis (rotation axis) (with any direction in the film plane as the rotation axis if there is no retardation axis), Rth(λ) may be calculated, based on the measured retardation values, a presumed value of an average refractive index and an inputted film thickness value, according to the following equations (1) and (2).

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equation (1)

In the above equation (1), Re(θ) represents a retardation value in a direction inclined by a θ angle from a normal direction, nx represents a refractive index in a retardation axis direction in plane, ny represents a refractive index in a direction perpendicular to nx in plane, nz represents a refractive index in a direction perpendicular to nx and ny, and d represents a film thickness.

$$Rth = ((nx+ny)/2 - nz) \times d$$

Equation (2)

If a measured film can not be represented by a one or two-axis refractive index ellipsoid, that is, if the measured film is a film having no optic axis, Rth(λ) is calculated according to the following method.

When Re(λ) is measured at 11 points when a wavelength of λ nm is incident in a direction inclined by 10° step from a film normal direction up to +50°, with a retardation axis in plane (determined by "KOBRA 21ADH" or "KOBRA 21WR") as an inclined axis (rotation axis), Rth(λ) is calculated by "KOBRA 21ADH" or "KOBRA 21WR," based on the measured retardation values, a presumed value of an average refractive index and an inputted film thickness value.

In the above measurement, the presumed value of the average refractive index may use values listed in "Polymer Handbook" (JOHN WILEY&SONS, INC) and catalogs of various optical films. If the average refractive index is not known, it may be measured using An Abbe refractometer. Average refractive indexes of main optical films are exemplified as follows:

Celluloseacylate (1.48), cycloolefin polymer (1.52), polycarbonate (1.59), polymethylmethacrylate (1.49), polystyrene (1.59)

(Molecule Alignment Axis)

A molecule alignment axis is calculated by an auto birefractometer {"KOBRA 21ADH" available from Oji Scientific Instruments. Co., Ltd.} using a phase difference obtained when a sample of 70 mm×100 mm is controlled with its humidity for two hours at 25° C. and 65% RH.

(Transmittance)

A transmittance of visible light (615 nm) for a sample of 20 mm×70 mm is measured at 25° C. and 60% RH by a transparency meter ("AKA phototube colorimeter" available from KOTAKI Co., Ltd.).

(Spectral Property)

A transmittance of light having a wavelength of 300 to 450 nm for a sample of 13 mm×40 mm is measured at 25° C. and 60% RH by a spectrophotometer ("U-3210" available from HITACHI Co., Ltd.). An inclination width is obtained using a wavelength of 72% to 5%. A threshold wavelength is indicated by a wavelength of {(inclination width/2)+5%}. An absorption edge is indicated by a wavelength of a transmittance of 0.4%. Based on these factors, a transmittance of light having a wavelength of 380 nm and 350 nm is evaluated.

In the specification, in an angle, "+" means a counterclockwise direction and "−" means a clockwise direction. An absolute value 0° direction in an angle direction means a 3 o'clock direction (right direction of a screen) when upward and downward directions of a liquid crystal display are taken as 12 and 6 o'clock directions. In addition, "retardation axis" means a direction giving the maximum refractive index. "Visible light region" means a range of wavelength of 380 nm to 780 nm. In addition, a measurement wavelength of a refractive index refers to a value at λ=550 nm in the visible light region if not mentioned otherwise.

For an angle between axes or between direction, "parallel" "perpendicular", "45°", etc. means "substantially parallel" "substantially perpendicular", "substantially 45°", etc., but not in the strict sense. That is, slight deviation within a range in which a purpose can be achieved is permitted. For example, "parallel" means that an intersection angle is substantially 0°, for example, −10° to 10° preferably, −5° to 5°, more preferably, −3° to 3°. "perpendicular" means that an intersection angle is substantially 90°, for example, 80° to 100°, preferably, 85° to 95°, more preferably, 87° to 93°. "45°" means that an intersection angle is substantially 45°, for example, −35° to 55°, preferably, 20° to 50°, more preferably, 42° to 48°.

In the specification, "polarizing plate" is intended to include both of a long polarizing plate and a polarizing plate cut with a size suitable for a liquid crystal display (in the specification, "cut" is intended to include "punching", "trimming", etc.) if not mentioned otherwise. In the specification, although "polarizer" and "polarizing plate" are distinguishably used, "polarizing plate" means a stacked structure in which a protective film to protect "polarizer" is stacked on at least one side of "polarizer". In case where the polarizing plate includes an optical compensation film, the protective film may be used as the optical compensation film. In case where the optical compensation film comprises an optically anisotropic layer having liquid crystal molecules stacked in a support, the protective film may be used as the support of the optical compensation film. In addition, the polarizing plate of the invention may include a support. In addition, in some cases, "optical compensation film" may have the same meaning as the optically anisotropic layer.

Hereinafter, exemplary embodiments of the invention will be described.

<Liquid Crystal Display>
(Configuration of Liquid Crystal Display)

A liquid crystal display according to one aspect of the invention includes a pair of substrates disposed opposite to each other, one of which has an electrode, a liquid crystal cell that is interposed between the pair of substrates and comprises a liquid crystal layer including a nematic liquid crystal material aligned substantially parallel to surfaces of the pair of substrates under application of no voltage, and a polarizing plate arranged on at least one outer side of the liquid crystal cell. In the liquid crystal display, the polarizing plate includes a first protective film, a second protective film and a light diffusion layer in order. The light diffusion layer is a layer containing translucent resin and translucent particles having a refractive index different from a refractive index of the translucent resin. In addition, internal haze of the light diffusion layer is 45% to 80%.

It is preferable that a TN type liquid crystal display, an ECB type liquid crystal display or an IPS type liquid crystal display is used as the liquid crystal display of the invention.

The ECB type liquid crystal display has a normally white display mode where a white image is displayed under application of no voltage, and a transmittance is decreased and a black image is displayed accordingly under application of a high voltage. The black image is displayed when a Re value of an optical compensation film becomes equal to a retardation value of a liquid crystal layer under application of a voltage. With this configuration, an image of high contrast can be obtained over a wide range, and there occurs no gray scale inversion in a halftone display region.

In addition, in case where the ECB type liquid crystal display is used as the liquid crystal display of the invention, an intersection angle between an absorption axis of the polarizer and an alignment treatment direction of the liquid crystal layer falls within a range of, preferably, 40 to 50°, more preferably, 45°.

The TN type liquid crystal display has a normally white display mode where a white image is displayed under application of no voltage, and a transmittance is decreased and a black image is displayed accordingly under application of a high voltage. The black image is displayed when a Re value of an optical compensation film becomes equal to a retardation value of a liquid crystal layer under application of a voltage. With this configuration, an image of high contrast can be obtained over a wide range. In case where an absorption axis of a polarizer is inclined by 45° or −45° with respect to a horizontal direction of a screen, an intersection angle between the absorption axis of the polarizer and an alignment treatment direction of the liquid crystal layer falls within a range of, preferably, −10 to 10°, more preferably, 0°. In addition, in case where the polarizer is in parallel to or is inclined by 90° with respect to the horizontal direction of the screen, an intersection angle between the absorption axis of the polarizer and an alignment treatment direction of the liquid crystal layer falls within a range of, preferably, 20 to 70°.

In addition, the IPS type liquid crystal display has a normally black display mode where a black image is displayed under application of no voltage, and a transmittance is increased and a white and black image is displayed accordingly under application of a high voltage. A viewing angle of the black image can be extended by optimizing Re and Rth values of an optical compensation film. With this configuration, in a polarizing plate at a observer side from the liquid crystal cell, an intersection angle between the absorption axis of the polarizer and an initial alignment treatment direction of the liquid crystal layer falls within a range of, preferably, 80 to 100°, more preferably, 90°. In a polarizing plate far away from a observer side with the liquid crystal cell interposed therebetween, an intersection angle between the absorption axis of the polarizer and an initial alignment treatment direction of the liquid crystal layer falls within a range of, preferably, −10 to 10°, more preferably, 0°.

A light diffusion layer is stacked on the second protective film. This light diffusion layer has an effect of widening a contrast viewing angle, making change of a color viewing angle small, decreasing gray scale inversion and reducing display spots.

In addition, in the liquid crystal display of the invention, it is preferable that at least one optical compensation film is interposed between the polarizing plate and the liquid crystal layer.

The optical compensation film is not particularly limited, but may have any configuration as long as it has an optical compensation function. For example, the optical compensation film may be a birefringent polymer film or a stacked structure including a transparent support and an optical compensation layer comprising liquid crystal molecules formed on the transparent support. In the latter, a transparent protective film closer to the liquid crystal layer of the polarizing plate may be used as a support of the optical compensation film. That is, the polarizing plate may have the optical compensation layer.

It is preferable that the optical compensation film for the TN and ECB type liquid crystal display is an optical compensation film having a discotic structural unit. In the invention, it is preferable that an alignment control direction of the optical compensation film having the discotic structural unit is in substantial parallel to the absorption axis of the polarizer of the polarizing plate.

In the liquid crystal display of the invention, it is preferable that a disk plane of the discotic structural unit is inclined with respect to the polarizer (or transparent support plane) and an angle between the disk plane of the discotic structural unit and the polarizer (or transparent support plane) is changed in a direction perpendicular to a film plane of the optical compensation film (that is, thickness direction). In this liquid crystal display, it is possible to obtain an image without the contrast viewing angle and gray scale inversion.

The optical compensation film used in the invention may be an optical compensation film comprising an expansible film, in addition to an optical compensation film comprising a compound having an aligned transparent support and a discotic structural unit formed on the support. The optical compensation film has an effect of reducing light leakage in an inclined direction of black color display for a liquid crystal display in which the liquid crystal cell of the normally black display mode where the black image is displayed under application of no voltage has two or more picture element regions, and each of the picture element regions has two or more regions having different initial alignment states of molecules of the nematic liquid crystal material, or two or more different regions where an alignment direction of molecules of the nematic liquid crystal material is continuously changed under application of a voltage.

In addition, in the liquid crystal display of the invention, it may be configured that one pixel of the liquid crystal cell has two or more picture element regions, and the picture element regions have different initial alignment states of liquid crystal molecules or different alignment directions of liquid crystal molecules that are continuously changed under application of a voltage.

Such a configuration is particularly effective for the ECB type liquid crystal display in which the liquid crystal molecules are inclined with respect to a substrate normal by the application of voltage. In addition, since the liquid crystal molecules are inclined in one direction, by dividing one pixel into two or more (preferably, 2 or 4 or more) picture element regions having different initial alignment states and averaging the picture element regions, luminance and color tune can be suppressed from being biased.

In addition, the invention relates to a liquid crystal display in which an absorption axis of a polarizer is in parallel or perpendicular to a horizontal direction of a screen of the liquid crystal display (hereinafter, this aspect is sometimes referred to as a preferred aspect (I)).

In conventional liquid crystal displays, a polarizing plate is contracted under severe environments. Particularly, the polarizing plate shows the maximal contraction in a direction in parallel to long and short side of a screen. When an elastic force such as contraction or expansion is applied to a film used in such a polarizing plate, retardation is changed. In a configuration where an absorption axis of the polarizing plate intersects a generation direction of the retardation by 45°, light transmission becomes maximal, which is observed as light leakage.

In conventional ECB type liquid crystal displays or TN type liquid crystal displays, an absorption axis of a polarizing plate intersects a horizontal direction of a screen, that is, a long side direction of an end portion of the polarizing plate, by 45°. Since a contraction direction of the polarizing plate is in parallel to the long and short side directions of the end portion of the polarizing plate, light leakage becomes maximal in this arrangement. Accordingly, by making the absorption axis of the polarizing plate in parallel or perpendicular to the horizontal direction of the screen, that is, the long side direction of the end portion of the polarizing plate, it has been found that light leakage can be suppressed in, particularly, ECB type liquid crystal displays or TN type liquid crystal displays. An example of such ECB type liquid crystal displays will be described later with reference to FIG. 2.

A TN type liquid crystal display employs a TFT driving method to display a high quality image having high contrast with high precision. For the TFT driving, gate wiring lines and signal (or source) wiring lines are arranged in horizontal and vertical directions of a screen. Since a contraction direction of a polarizing plate is in parallel or perpendicular to these wiring lines, even if an absorption axis of the polarizing plate is arranged in parallel or perpendicular to these wiring lines, the absorption axis is arranged in substantial parallel or perpendicular to the maximal contraction direction of the polarizing plate, that is, long and short side directions of an end portion of the polarizing plate, thereby suppressing light leakage. An example of such TN type liquid crystal displays will be described later with reference to FIG. 3.

On the other hand, in the above conventional liquid crystal displays, with the configuration that the absorption axis of the polarizing plate is in parallel or perpendicular to the horizontal direction of the screen, there is a case where bilateral symmetry of color change is deteriorated when the screen is viewed in an angle range of more than contrast of 10° from the front of the screen or in a direction inclined from the front of the screen. However, in the liquid crystal display of the invention that includes a light diffusion layer having a particular characteristic, it is confirmed that the bilateral symmetry is improved.

In addition, the configuration of the liquid crystal display of the invention can be applied to an IPS type liquid crystal display. When the configuration of the liquid crystal display of the invention is applied to the IPS type liquid crystal display, it has been found that coloring of light leaked out in the inclined direction when the black image is displayed in the conventional IPS type liquid crystal display is averaged, thereby tuning into anchromatic color. An example of such an IPS type liquid crystal display will be described later with reference to FIG. 4.

Embodiments of Liquid Crystal Display of the Invention

Hereinafter, exemplary embodiments of the liquid crystal display of the invention will be described with reference to the accompanying drawings, (ECB Type Liquid Crystal Display)

FIG. 1 is a schematic view showing an example of a liquid crystal display, particularly, an ECB type liquid crystal display according to an exemplary embodiment of the invention.

Referring to FIG. 1, a liquid crystal display includes a liquid crystal cell 5 to 7 and a pair of polarizing plates 1 and 2 arranged at both sides of the liquid crystal cell 5 to 7. Each of the polarizing plates 1 and 2 includes a polarizer and a pair of protective films. Light diffusion layers (not shown) are disposed at an outer side of a polarizer 12 of an upper protective film 11 of an upper polarizing plate 1 and an outer side of a polarizer 22 of a lower protective film 21 of a lower polarizing plate 2, respectively. The protective films 11 and 21 are also used as supports of the light diffusion layers. In addition, an upper optical compensation film 14 and a lower optical compensation film 24, each having an optical compensation function, are arranged between the liquid crystal cell and the pair of polarizing plates, respectively. The lower protective film 13 of the upper polarizing plate 1 may be also used as the support of the upper optical compensation film 14. The upper polarizing plate is a stacked structure including the light diffusion layer, the members 11 to 13, and, preferably, the member 14, and is assembled into the liquid crystal display. On the other hand, the upper protective film 23 of the lower polarizing plate 2 may be also used as the support of the lower optical compensation film 24. The lower polarizing plate is a stacked structure including the light diffusion layer, the members 21 to 23, and, preferably, the member 24, and is assembled into the liquid crystal display.

In addition, in the invention, at least one of the polarizing plates 1 and 2 may be a stacked structure including the light diffusion layer, the polarizer, and, preferably, the optical compensation film (for example, the upper polarizing plate may be the stacked structure including the light diffusion layer, the members 11 to 13, and, preferably, the member 14), and both of the polarizing plates 1 and 2 need not have the above stacked structure as shown in FIG. 1. That is, the liquid crystal display has only to a stacked structure including the light diffusion layer, the polarizer, and, preferably, the optical compensation film. Accordingly, the configuration shown in FIG. 1 has no limitation.

In the liquid crystal display of the invention, since the support of the light diffusion layer may be also used as the protective film of one of the polarizers, and preferably, the transparent support of the optical compensation film may be also used as the protective film of the other of the polarizers, a polarizing plate having the stacked structure including the light diffusion layer, the protective film (also used as the support), the polarizer, the protective film (preferably also used as the transparent support), and, preferably, the optical compensation film in order may be used. This polarizing plate has not only a polarization function but also an effect of widening a viewing angle, particularly a contrast viewing angle, making change of a color viewing angle small, decreasing gray scale inversion and reducing display spots. In addition, this polarizing plate includes, preferably, the optical compensation film having the optical compensation function to optically compensate the liquid crystal display precisely with a simple configuration. In the liquid crystal display, it is preferable that the light diffusion layer, the protective film, the polarizer, the transparent support, and preferably, the optical compensation film are stacked in order from the outer side of the device (from a side far away from the liquid crystal cells).

Absorption axes 12D and 22D of the polarizers 12 and 22, alignment directions of the optical compensation films 14 and 24, and an alignment direction of liquid crystal molecules 6 can be adjusted to have an optimal range depending on material used for the above members, a display mode, a stacked structure of the members, etc. In order to obtain high contrast, the absorption axes 12D and 22D of the polarizers 12 and 22 are arranged to be substantially perpendicular to each other. However, the liquid crystal display of the invention is not limited to this configuration.

Next, the configuration and operation of the liquid crystal display shown in FIG. 1 will be described in more detail.

A rubbing direction 5RD of an upper substrate 5 and a rubbing direction 7RD of a lower substrate 7 of the liquid crystal cell 5 to 7 are set to be in parallel to each other, and the liquid crystal layer is in a parallel alignment without having a twisted structure. The upper substrate 5 and the lower substrate 7 have an alignment film (not shown) and an electrode layer (not shown), respectively. The alignment film has a function of aligning the liquid crystal molecules 6. The electrode layer has a function of applying a voltage to the liquid crystal molecules 6. For example, transparent indium-tin-oxide (ITO) may be used for the electrode layer. In a mode of parallel alignment, liquid crystals of $\Delta n$=0.0854 (589 nm, 20° C.) and $\Delta \in$=+8.5 (for example, "MLC-9100" available from Merck, Co. Ltd.) may be provided between the upper and lower substrates.

Here, the brightness of white image display is varied depending on the product ($\Delta n \cdot d$) of thickness d and anisotropic refractive index $\Delta n$. In order to obtain the maximal brightness, it is preferable that the product ($\Delta n \cdot d$) is set to fall within a range of 0.2 to 0.4 µm. At least one polarizer absorption axis interests the liquid crystal cell alignment direction (rubbing direction RD) adjacent to the axis by about 45°, and an intersection angle between the upper and lower polarizer absorption axes 12D and 22D is about 90°, which represents a cross Nicol.

In a non-driving state where a driving voltage is not applied to transparent electrodes (not shown) of the liquid crystal cell substrates 5 and 7, the liquid crystal molecules 6 in the liquid crystal layer are aligned in substantial parallel to planes of the substrates 5 and 7, and, as a result, light having polarization changed by a birefringence effect of the liquid crystal molecules 6 passes through the polarizer 12. At this time, the product ($\Delta n \cdot d$) of the liquid crystal layer is set such that transmitting light has maximal intensity. On the other hand, in a driving state where a driving voltage is applied to the transparent electrodes (not shown), the liquid crystal molecules 6 tend to be aligned perpendicularly to the planes of the substrates 5 and 7 depending on the magnitude of the applied voltage. However, since the liquid crystal molecules 6 are aligned in an inclined direction with respect to the substrate planes near borders of the substrates although the liquid crystal molecules 6 are aligned substantially perpendicularly to the substrate planes near centers in a thickness direction of the liquid crystal layer between the substrates, the liquid crystal molecules 6 are continuously obliquely aligned toward the centers in the thickness direction of the liquid crystal layer. Under such a state, it is difficult to obtain a full black image display. Simultaneously, average alignment of the liquid crystal molecules inclined near the borders of the substrates is changed depending on an observation angle and has a viewing angle dependency that transmittance and brightness are varied depending on a viewing angle.

In order to overcome this problem, it is preferable that an optical compensation film to compensate a remaining phase difference of the liquid crystal layer near the borders of the substrates is first disposed, thereby obtaining a full black image display and hence improving a front contrast ratio. In addition, as described in the above Patent Document 1, it is preferable that an optical film to compensate the continuously obliquely aligned liquid crystal layer is disposed, thereby improving a viewing angle characteristic. In addition, since the liquid crystal molecules 6 are inclined in a halftone display, there occurs a difference in luminance or color tone due to a difference in birefringence between the liquid crystal molecules 6 when viewed from the inclination in the inclined direction and an opposite direction. When the liquid crystal display employs a multi domain structure in which one pixel of the liquid crystal display is divided into a plurality of regions, the viewing angle characteristic of luminance or color tone is averaged and hence improved.

Specifically, by dividing one pixel into two or more (preferably, 4 or 8) regions having different initial alignment states of the liquid crystal molecules and averaging these regions, luminance and color tune depending on the viewing angle can be suppressed from being biased. In addition, the same effect is obtained even when one pixel is divided into two or more different regions where the alignment direction of the liquid crystal molecules is continuously changed under application of a voltage.

Figure 2:
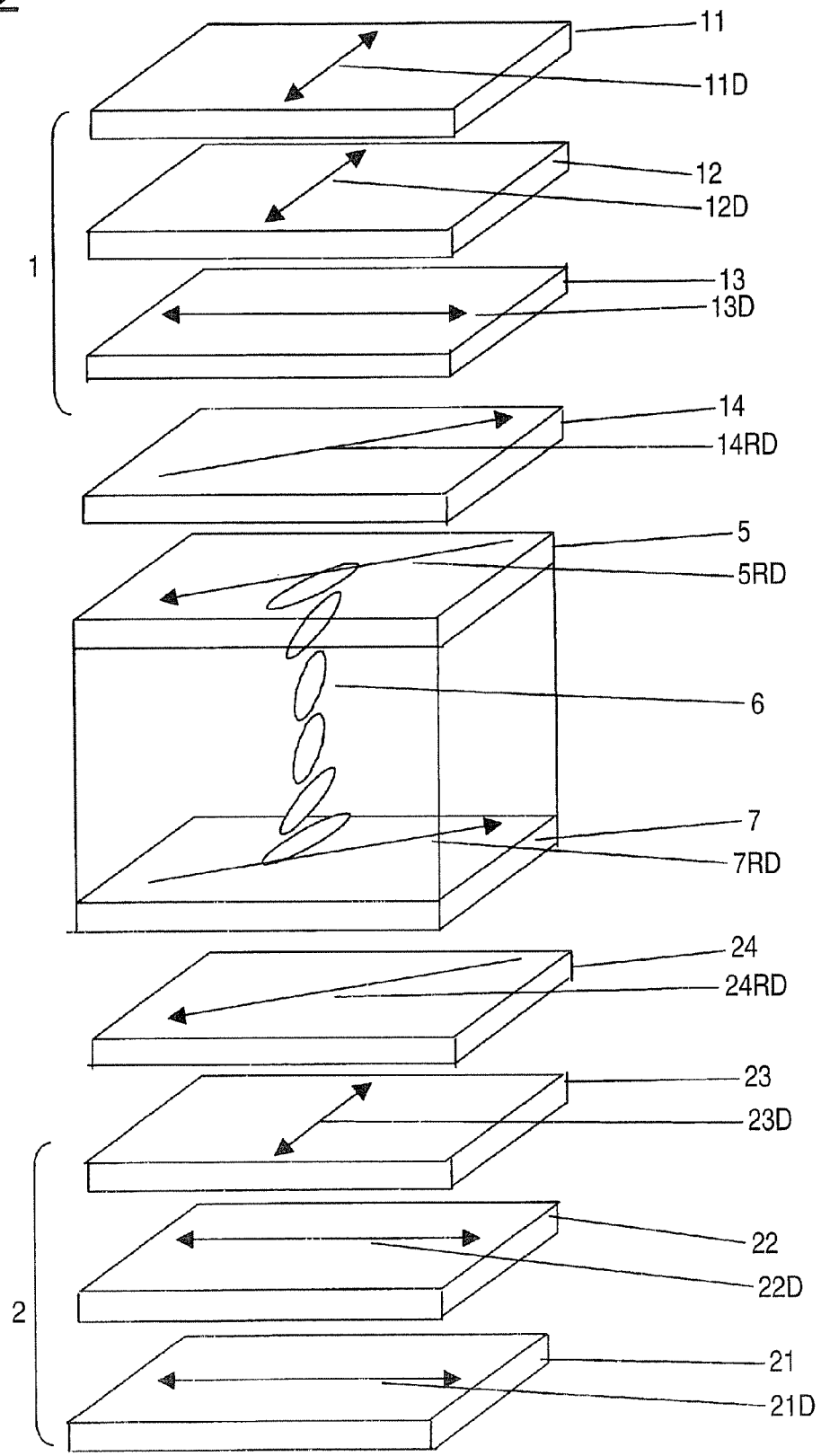
FIG. 2 is a schematic view showing an example of an ECB type liquid crystal display according to an exemplary embodiment of the invention.

As described above, according to one of preferred aspects of the invention, the invention provides a liquid crystal display in which an absorption axis of a polarizer is in parallel or perpendicular to a horizontal direction of a screen of the liquid crystal display. FIG. 2 shows that the absorption axis of the polarizer is in parallel or perpendicular to the horizontal direction of the screen in the ECB type liquid crystal display.

In addition, in the aspect shown in FIG. 2, the alignment control direction of the optical compensation film including a discotic structural unit intersects the absorption axis of the polarizer by, preferably, a range of 40 to 50°, more preferably 45°. In addition, the alignment control direction of the optical compensation film including the discotic structural unit intersects the alignment treatment direction of the liquid crystal layer by, preferably, a range of −20 to 20°.

(TN Type Liquid Crystal Display)

Figure 3:
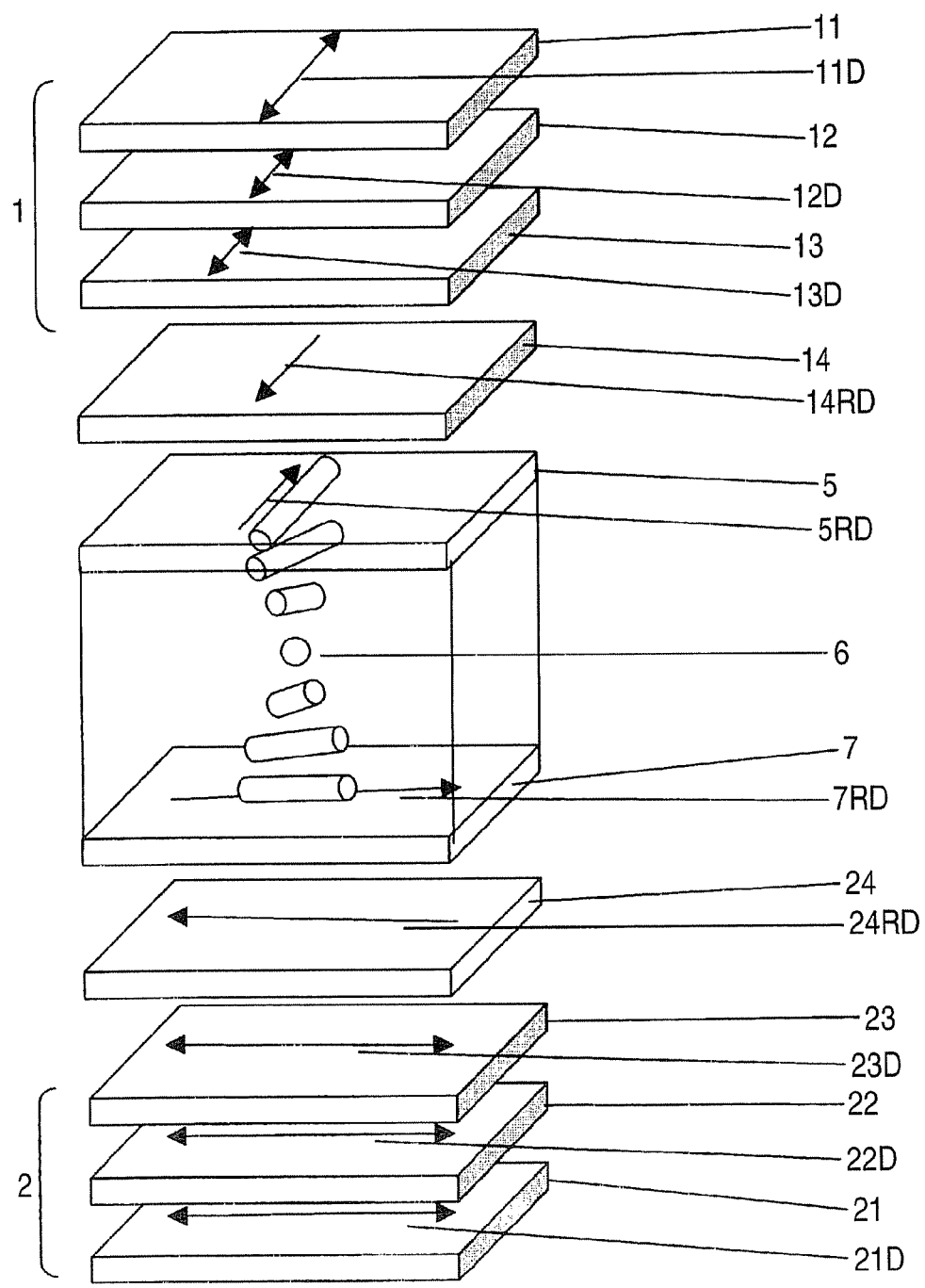
FIG. 3 is a schematic view showing an example of a TN type liquid crystal display according to an exemplary embodiment of the invention.

Next, an exemplary embodiment where the invention is applied to a TN type liquid crystal display will be described in detail with reference to FIG. 3. FIG. 3 also shows that an absorption axis of a polarizer is in parallel or perpendicular to a horizontal direction of a screen in the TN type liquid crystal display. Here, using nematic liquid crystals having positive dielectric anisotropy as field effect liquid crystals, a TFT (active) driving will be described by way of an example.

A liquid crystal cell 5 to 7 comprises an upper substrate 5, a lower substrate 7, and a liquid crystal layer having liquid crystal molecules 6 interposed between these substrates 5 and 7. Alignment films (not shown) are formed on surfaces of the substrates 5 and 7 contacting the liquid crystal molecules 6 (hereinafter, these surfaces are sometimes referred to as "inner surfaces"), and alignment of the liquid crystal molecules 6 under application of no voltage or application of a low voltage is controlled by a rubbing treatment to which the alignment films are subjected. In addition, transparent electrodes (not shown) that apply a voltage to the liquid crystal layer having the liquid crystal molecules 6 are formed on the inner surfaces of the substrates 5 and 7.

In the TN type liquid crystal display, under a non-driving state where a driving voltage is not applied to the electrodes, the liquid crystal molecules 6 in the liquid crystal cell are aligned in substantial parallel to substrate planes and alignment direction is twisted by 90° between the upper and lower substrates. In case of a transmission type display device, light emitted from a backlight unit has linear polarization after passing through a lower polarizing plate 2. The linearly polarized light propagates along the twisted structure of the liquid crystal layer, rotates a polarizing plane by 90°, and then passes through the upper polarizing plate 1. Accordingly, the display device displays a white image.

On the other hand, when an application voltage is increased, the liquid crystal molecules 6 get stand perpendicularly to the substrate planes while being untwisted. In the TN type liquid crystal display under application of an ideal high voltage, the liquid crystal molecules 6 are nearly completely untwisted, and, accordingly, have a state of alignment nearly perpendicular to the substrate planes. At this time, since there is no twisted structure in the liquid crystal layer, the linearly polarized light that passed through the lower polarizing plate 2 propagates without rotating the polarizing plane and is perpendicularly incident into an absorption axis of the upper polarizing plate 1. Accordingly, the light is shielded and the display device displays a black image.

In this manner, the TN type liquid crystal display achieves a function as a display device by shielding or transmitting the polarized light. In general, a contrast ratio as a numerical value to indicate display quality is defined by a ratio of white display luminance to black display luminance. A higher contrast ratio gives a higher quality display device. In order to increase a contrast ratio, it is important to maintain a polarization state in a liquid crystal display.

Hereinafter, an example of a configuration of the TN mode liquid crystal cell is described. A liquid crystal cell is manufactured by rubbing and aligning the liquid crystals having positive dielectric anisotropy, anisotropic refractive index, $\Delta n=0.0854$ (589 nm, 20° C.) and $\Delta \in =+8.5$, and is disposed between the upper and lower substrates 5 and 7. The alignment of the liquid crystal layer is controlled by the alignment film and the rubbing treatment. A director, a so-called tilt angle, indicating the alignment direction of the liquid crystal molecules is set to falls within a range of, preferably, about 0.1° to 10°. In this embodiment, the director is set to be 3°. The rubbing treatment is performed in a direction perpendicular to the upper and lower substrates, and the size of the tilt angle can be controlled by rubbing strength and number. The alignment films are formed by applying and firing a polyimide film. The size of a twist angle of the liquid crystal layer is defined by an intersection angle in a rubbing direction between the upper and lower substrates and a chiral agent added to liquid crystal material. In this embodiment, a chiral agent having a pitch of 60 μm or so is added so that the twist angle is about 90°. The thickness d of the liquid crystal layer is set to be 5 μm.

In addition, liquid crystal material LC is not particularly limited as long as it is nematic liquid crystal. As dielectric anisotropy $\Delta \in$ increases, the driving voltage can be further reduced. As refractive index anisotropy $\Delta n$ decreases, the thickness (gap) of the liquid crystal layer can be further thickened, thereby shortening time taken to inject and seal liquid crystals and reducing unbalance of the gap. In addition, as $\Delta n$ increases, a cell gap can be further decreased, thereby allowing a higher speed response. In general, $\Delta n$ is set to fall within a range of 0.04 to 0.28, the cell gap is set to fall within a range of 1 to 10 μm, and the product of $\Delta n$ and d is set to fall within a range of 0.25 to 0.55 μm.

The absorption axis 12D of the upper polarizer 12 and the absorption axis 22D of the lower polarizer 22 are stacked substantially perpendicularly to each other, the absorption axis 12D of the upper polarizer 12 and the rubbing direction (alignment axis) 5RD of the upper substrate 5 of the liquid crystal cell are stacked in substantial parallel to each other, and the absorption axis 22D of the lower polarizer 22 and the rubbing direction (alignment axis) 7RD of the lower substrate 7 of the liquid crystal cell are stacked in substantial parallel to each other. Although the transparent electrodes (not shown) are formed at the inner sides of the alignment films of the upper and lower substrates 5 and 7, the liquid crystal molecules 6 in the liquid crystal cell are aligned in substantial parallel to the substrate planes under a non-driving state where the driving voltage is not applied to the electrodes, and as a result, the polarized light that passes through the liquid crystal panel propagates along the twist structure of the liquid crystal molecules 6 and rotates the polarizing plane by 90°. That is, the liquid crystal display realizes the white image display under the non-driving state. On the other hand, the liquid crystal molecules 6 are aligned in a direction inclined by an angle with respect to the substrate planes under a driving state, and the light that passed through the lower polarizing plate 2 has no retardation in the liquid crystal layer by the optical compensation layers 14 and 24, passes through the liquid crystal layer 6 with its polarization state unchanged, and then is shielded by the polarizer 12. In other words, the liquid crystal display realizes the ideal black image display under the driving state.

A light diffusion layer (not shown) is disposed in the outside of the polarizer 12 of an upper (viewing side) protective film 11 of the upper polarizing plate 1 or in the outside of the polarizer 22 of a lower protective film 21 of the lower polarizing plate 2. The protective films 11 and 21 are also used as supports of the light diffusion layer. In addition, protective films 23 and 13 near the liquid crystal cell of the upper and lower polarizing plates may be also used as supports of optically anisotropic layers 14 and 24, and the upper and lower polarizing plates 1 and 2 may be integrally stacked with optically anisotropic layers 14 and 24, and the stacked structure thereof may be assembled into the liquid crystal display.

In the liquid crystal display of the invention, the support of the light diffusion layer may be also used as a protective film of one of the polarizers. Preferably, a transparent support of an optical compensation sheet may be also used as a protective film of the other of the polarizers. That is, an integrated elliptical polarizing plate including the light diffusion layer, the transparent protective film (also used as the support), the polarizer, the transparent protective film (preferably also used as the transparent support), and preferably, the optically anisotropic layer in order may be used. This integrated elliptical polarizing plate has an effect of widening a contrast viewing angle, making change of a color viewing angle small, decreasing gray scale inversion and reducing display spots. In addition, it is preferable that this integrated elliptical polarizing plate has the optically anisotropic layer having an optical compensation function. When the integrated elliptical polarizing plate is used, it is possible to compensate the liquid crystal display precisely with a simple configuration. In the liquid crystal display, it is preferable that the light diffusion layer, the transparent protective film, the polarizer, the transparent support, and preferably, the optically anisotropic layer are stacked in order from the outside of the device (side far away from the liquid crystal cell).

In addition, when the liquid crystal display employs a multi domain structure in which one pixel is divided into a plurality of regions, vertical and horizontal viewing angle characteristics are averaged, thereby improving display quality.

(IPS Type Liquid Crystal Display)

Next, an embodiment where the invention is applied to an IPS type liquid crystal display will be described in detail with reference to FIG. 4.

Figure 4:
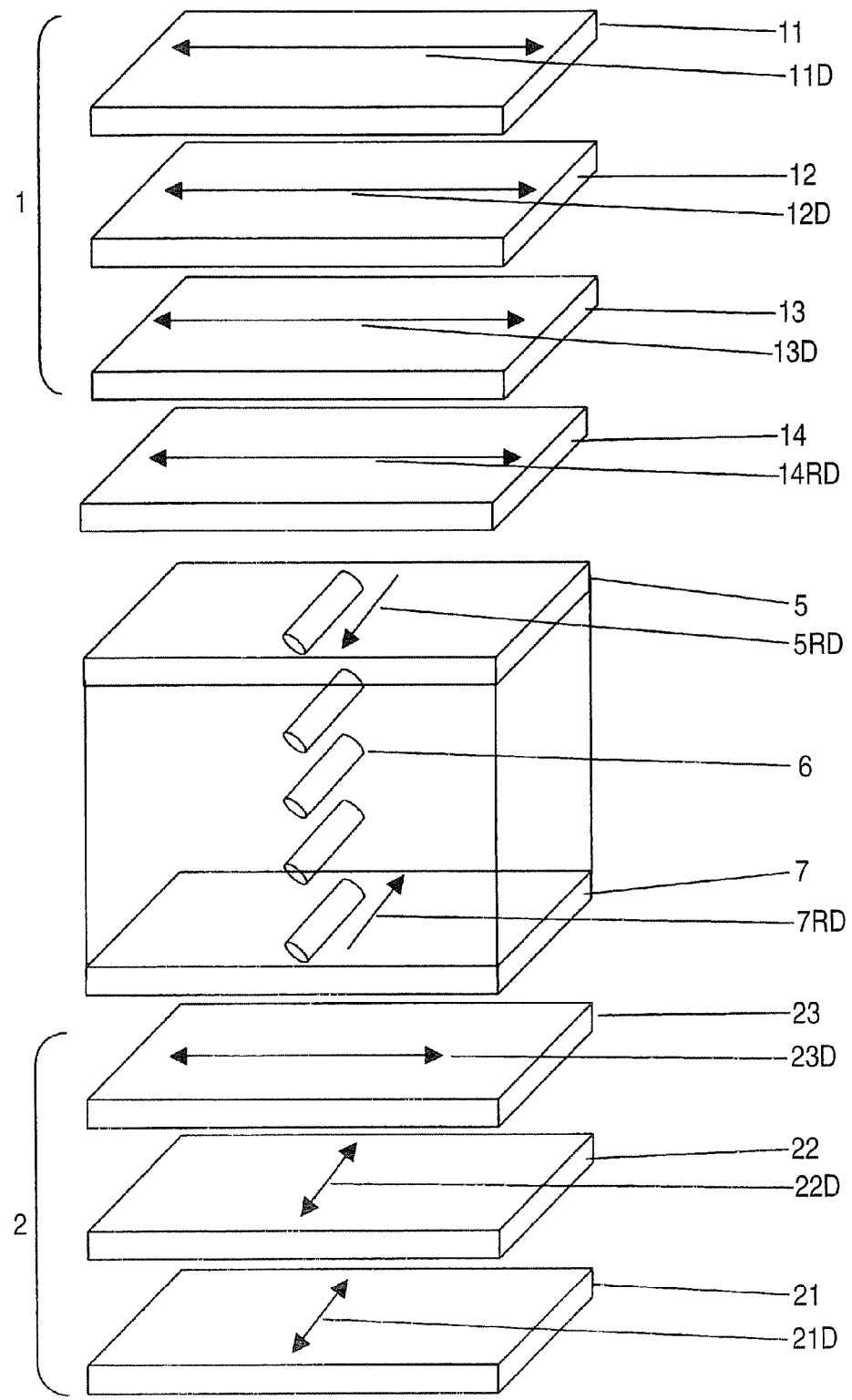
FIG. 4 is a schematic view showing an example of an IPS type liquid crystal display according to an exemplary embodiment of the invention.

A liquid crystal display shown in FIG. 4 includes a liquid crystal cell 5 to 7, and upper and lower polarizing plates 1 and 2 with the liquid crystal cell interposed therebetween. The liquid crystal cell 5 to 7 comprises a liquid crystal cell upper substrate 5, a liquid crystal cell lower substrate 7, and a liquid crystal layer 6 interposed therebetween. Alignment direction of the liquid crystal layer 6 is controlled by directions 5RD and 7RD of rubbing treatment to which opposite planes of the substrates 5 and 7 are subjected.

The upper polarizing plate comprises a pair of transparent protective films 11 and 13 and a polarizer 12 interposed therebetween (the transparent protective film 13 being disposed at a side closer to the liquid crystal cell). It is preferable that an absorption axis 12D of the polarizer 12 is in substantial parallel to roll moving directions (MD directions) 11D and 13D of the transparent protective films 11 and 13. When the absorption axis 12D of the polarizer 12 is in substantial parallel to MD directions 11D and 13D, effects of improvement of mechanical stability and uniformity of optical performance can be obtained. In addition, when the absorption axis 12D of the polarizer 12 is in substantial parallel to the MD direction 11D disposed at a side far away from the liquid crystal cell, mechanical reliability such as prevention of dimension change or curl of the polarizing plate is improved. The same effect is obtained even when the absorption axis 12D is perpendicular to the MD direction 13D In addition, if the thickness or strength of the transparent protective films 11 and 13 is sufficient, the same effect is obtained even when the absorption axis 12D intersects the MD directions 11D and 13D of the protective films by different angles.

It is preferable that the lower polarizing plate has the same configuration as the upper polarizing plate as shown in FIG. 4. In addition, it is preferable that a polarizer 22 is in substantial parallel or perpendicular to an MD direction 23D of a protective film 23 at a side closer to the liquid crystal cell of the polarizer 22. When the MD directions 23D and 21D of the transparent protective films 23 and 21 are perpendicular to each other, birefringences of the protective films are cancelled each other, thereby reducing deterioration of optical characteristics of light perpendicularly incident into the liquid crystal display. In addition, when the MD directions 23D and 21D are in parallel to each other, retardation which may remain in the liquid crystal layer may be compensated by the birefringences of the protective films.

Figure 5:
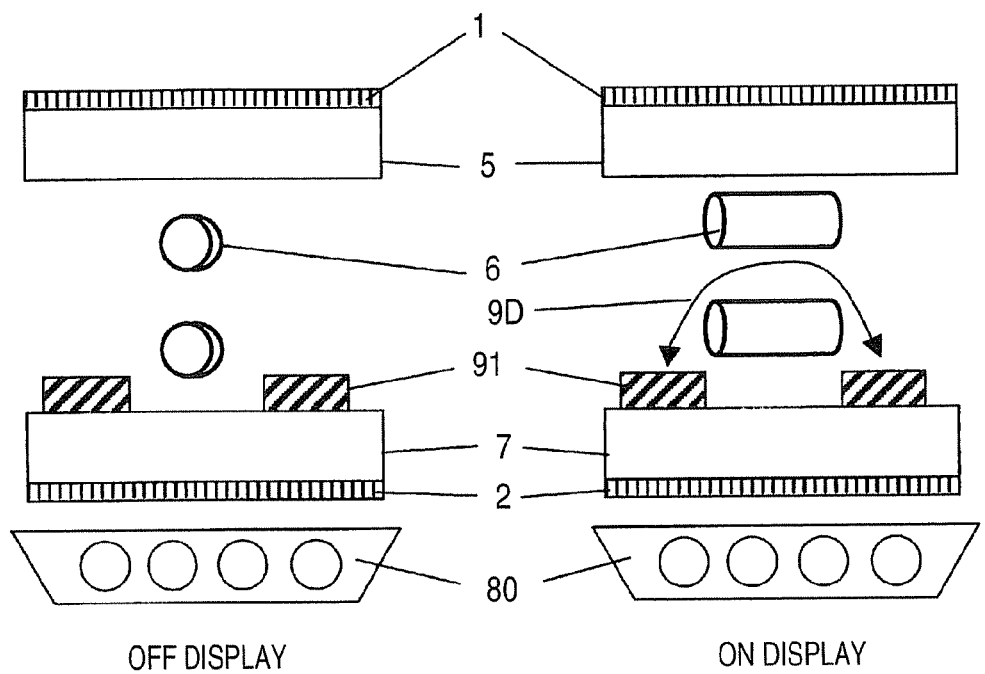
FIG. 5 is a schematic sectional view showing an example of an IPS type liquid crystal display according to an exemplary embodiment of the invention.

FIG. 5 is a schematic side sectional view showing an IPS mode liquid crystal cell. FIG. 5 shows a portion of one pixel of the IPS mode liquid crystal cell although the cell typically has a plurality of pixels by electrodes in the form of a matrix. Linear electrodes 91 are formed at inner sides of a pair of transparent substrates 5 and 7, and an alignment control film (not shown) is formed on the electrodes 91. Bar-like liquid crystal molecules 6 interposed between the substrates 5 and 7 are aligned to form a slight angle with respect to a longitudinal direction of the linear electrodes 91 under application of no voltage. In addition, in this case, dielectric anisotropy is assumed to be positive. When an electric field 9D is applied, the direction of the liquid crystal molecules 6 is changed in an electric application direction. It is possible to change light transmittance by arranging the polarizing plates 1 and 2 at a predetermined angle. In addition, an angle between the surface of the substrate 7 and the electric field application direction 9D is less than, preferably, 20°, more preferably, 10°. That is, it is preferable that the surface of the substrate 7 is in substantial parallel to the electric field application direction 9D. Hereinafter, in the invention, an electric field forming an angle of less than 20° with the surface of the substrate 7 is generally referred to as a parallel electric field. In addition, the same effect is obtained irrespective of whether the electrodes 91 are formed on both or one of the upper and lower substrates.

In this manner, the IPS mode liquid crystal cell is aligned in parallel to the substrate surface under application of no voltage or under application of a low voltage. The alignment is generally controlled by applying and rubbing the alignment film. However, alignment spots are apt to occur in this alignment treatment. As described above, since the IPS mode liquid crystal cell is aligned in parallel to the substrate surface, this alignment spots cause a big retardation, particularly leading to unbalanced luminance spots of light leakage in the black image display. On the other hand, in VA, TN and OCB modes, since the liquid crystal molecules are aligned perpendicularly to the substrate surface in the black image display, the luminance spots are small since the retardation is small although the alignment spots are large.

Figure 6:
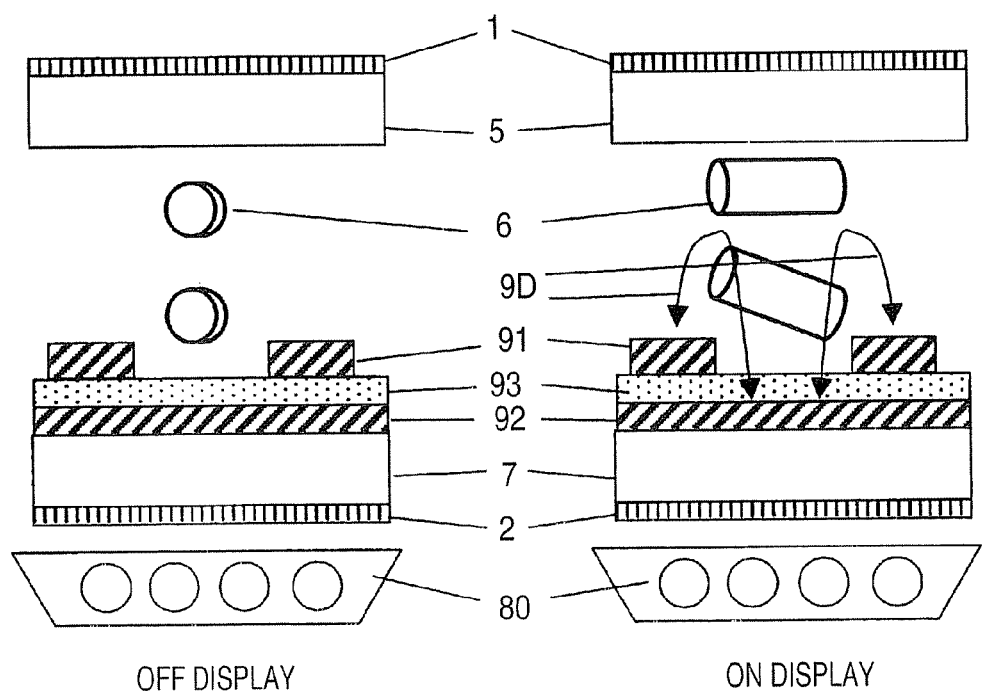
FIG. 6 is a schematic sectional view showing an example of an IPS type liquid crystal display according to an exemplary embodiment of the invention.

FIG. 6 is a schematic sectional view showing an IPS mode liquid crystal cell with higher speed response and higher transmittance. Unlike FIG. 5, FIG. 6 shows a double-layered structure in which an insulating layer 93 is interposed between two electrodes. A lower electrode may be an electrode not patterned or a linear electrode. An upper electrode is preferably a linear electrode, but may have any shape such as a net knot-like shape, a spiral shape, a dot shape and the like as long as it has a shape to allow an electric field from the lower electrode 92 to pass. In addition, a floating electrode having a neutral potential may be added. In addition, the insulating layer 93 may be made of any of inorganic material such as SiO or nitride oxide and organic material such as acryl or epoxy.

In the IPS mode, since a contrast ratio is increased by high transmittance, luminance spots due to in-plane alignment spots in the black image display are apt to be observed. In addition, since the intensity of electric field is high, luminance spots are also apt to occur under application of a low voltage.

Nematic liquid crystal having positive dielectric anisotropy $\Delta\epsilon$ is used as liquid crystal material LC. The thickness (gap) of the liquid crystal layer is more than 2.8 μm and less than 4.5 μm. In this manner, when the retardation ($\Delta n \cdot d$) is more than 0.25 μm and less than 0.32 μm, since the transmittance has little wavelength dependency in a range of visible light wavelength, a transmittance characteristic can be more easily obtained. By combination of the alignment film and the polarizing plate, which will be described later, the maximal transmittance can be obtained when the liquid crystal molecules are rotated by 45° in the electric field application direction from the rubbing direction. In addition, the thickness (gap) of the liquid crystal layer is controlled by polymer beads. Of course, the same gap can be obtained in glass beads, glass fiber, and a pillar-like spacer made of resin. In addition, the liquid crystal material LC is not particularly limited as long as it is nematic liquid crystal. As dielectric anisotropy $\Delta\epsilon$ increases, the driving voltage can be further reduced. As refractive index anisotropy $\Delta n$ decreases, the thickness (gap) of the liquid crystal layer can be further thickened, thereby shortening time taken to inject and seal liquid crystals and reducing unbalance of the gap.

Also in the IPS mode, the polarizing plate of the invention may be applied to the liquid crystal display of the invention. As described above, the support of the light diffusion layer may be also used as a protective film of one of the polarizers. Preferably, since a transparent support of an optical compensation film may be also used as a protective film of the other of the polarizer, an integrated elliptical polarizing plate including the light diffusion layer, the protective film (also used as the support), the polarizer, the protective film (preferably also used as the transparent support), and preferably, the optical compensation film in order may be used. This integrated elliptical polarizing plate has not only the polarizing function but also an effect of widening a viewing angle, particularly a contrast viewing angle, making change of a color viewing angle small, decreasing gray scale inversion and reducing display spots. In addition, it is preferable that this integrated elliptical polarizing plate has the optical compensation film having an optical compensation function. When the integrated elliptical polarizing plate is used, it is possible to compensate the liquid crystal display precisely with a simple configuration. In the liquid crystal display, it is preferable that the light diffusion layer, the protective film, the polarizer, the transparent support, and preferably, the optical compensation film are stacked in order from the outside of the device (side far away from the liquid crystal cell).

The liquid crystal display used in the invention is effective for an OCB mode, a VA mode, a HAN mode, and a STN mode in addition to the above-described display mode.

The liquid crystal display of the invention is not limited to the above-described configuration, but may include other members. For example, a color filter may be interposed between the liquid crystal cell and the polarizer. In addition, a separate optical compensation film may be interposed between the liquid crystal cell and the polarizing plate. In addition, in case of a transmission type liquid crystal display, a backlight unit having a light source such as a cold cathode or hot cathode fluorescent tube, a light emitting diode, a field emission device, or an electroluminescence device may be disposed behind the liquid crystal cell. In addition, the liquid crystal display of the invention may be of a reflection type. In this case, only one polarizing plate may be disposed at an observation side, and a reflecting film is disposed behind the liquid crystal cell or at an inner side of the lower substrate of the liquid crystal cell. Of course, a front light unit using the light source may be provided at a liquid crystal cell observation side.

The liquid crystal display of the invention includes image direct-view type, image projection type and light modulation type display devices. The invention is particularly effective for an active matrix liquid crystal display using three or two terminal semiconductor devices such as TFT or MIM. Of course, the invention is also effective for a passive matrix liquid crystal display represented by a STN type which is called a time division driving.

The liquid crystal display of the invention has an effect of widening a contrast viewing angle, making change of a color viewing angle small, decreasing gray scale inversion, and reducing display spots such as luminance spots and color spots by the polarizing plate having a particular light diffusion layer. Further, by setting a particular relationship between the retardation axis of the protective film of the polarizing plate and the absorption axis of the polarizing plate, the viewing angle of the liquid crystal display can be improved. Furthermore, when the optical compensation film is interposed between the polarizing plate and the liquid crystal cell, the viewing angle can be further improved.

According to another aspect, the invention provides a liquid crystal display comprising a pair of substrates disposed opposite to each other, at least one of which has an electrode, a liquid crystal layer containing liquid crystal molecules controlled to be aligned by an alignment axis of each of opposite planes of the pair of substrates, and a pair of polarizing plates that is formed by stacking an adhesive layer, an optical compensation sheet, a polarizer, and a protective layer in order, with the liquid crystal layer interposed therebetween, wherein an absorption axis direction of the polarizing plates forms an angle of more than 5° and less than 40° with a horizontal direction or a vertical direction of a screen of the display device (hereinafter, this aspect is sometimes referred to as a preferred aspect (II)).

The present inventors have found that, when a liquid crystal panel is heated (that is, when it is put into and then drawn out of a dryer of high temperature as a condition where light leakage due to thermal distortion is remarkably observed), the light leakage due to the thermal distortion occurring in a circumference or corner of the liquid crystal panel is decreased in a liquid crystal display using a polarizing plate punched with an angle at which an absorption axis direction of the polarizing plate is deviated from 45°, that is, an intersection angle of 40° or less between the absorption axis direction of the polarizing plate and an end line of the polarizing plate, as compared to a liquid crystal display using a polarizing plate punched to form an angle of 45° between an end line of a polarizing plate and an absorption axis direction of the polarizing plate, as in a conventional TN mode liquid crystal display.

The reason for this decrease of the light leakage is that most of a retardation axis of a phase difference occurring in portions of an optical compensation sheet due to the thermal distortion is in substantial parallel or perpendicular to the end line of the polarizing plate, and, when the polarizing plate punched to form an angle of 45° between the end line of the polarizing plate and the absorption axis direction of the polarizing plate is used, an intersection angle between the retardation axis of the phase difference occurring in portions of the optical compensation sheet due to the thermal distortion and the absorption axis direction of the polarizing plate becomes 45°, and accordingly, the light leakage becomes maximal.

On the other hand, when the polarizing plate punched with the angle at which the absorption axis direction of the polarizing plate is deviated from 45° with respect to the end line of the polarizing plate, the intersection angle between the retardation axis of the phase difference occurring in portions of the optical compensation sheet due to the thermal distortion and the absorption axis direction of the polarizing plate is deviated from 45°, and accordingly, the light leakage doe not become maximal. Accordingly, it has been found that light leaked out due to the phase difference occurring in the portions of the optical compensation sheet is decreased.

Further, the present inventors has been found that it is preferable to form in an angle of more than 5° between the absorption axis direction of the polarizing plate and sides of the polarizing plate from a standpoint of improvement of bilateral symmetry of image brightness, color or the like, which is provided as the preferred aspect (II).

Figure 7:
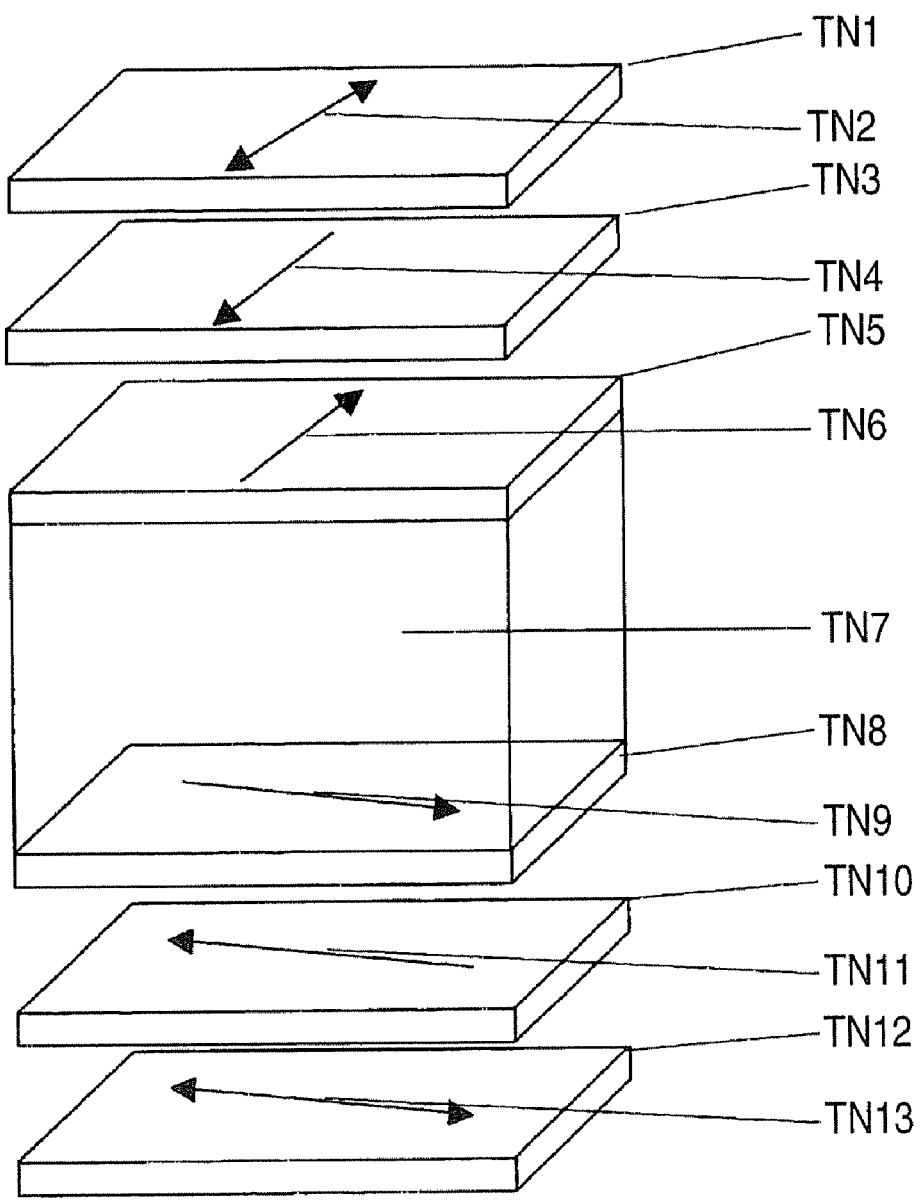
FIG. 7 is a schematic view showing a TN type liquid crystal display using a polarizing plate according to an exemplary embodiment of the invention.
Figure 8A:
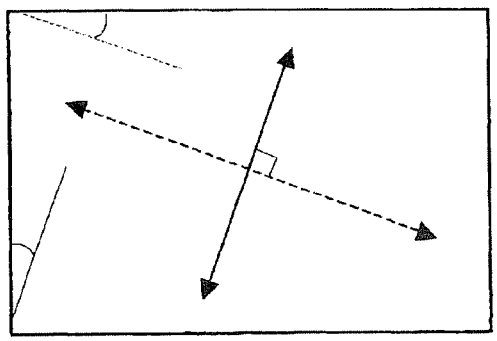
FIG. 8A is a view showing a relationship between an absorption axis direction and sides of upper and lower polarizing plates in a liquid crystal display according to an exemplary embodiment of the invention.
Figure 8B:
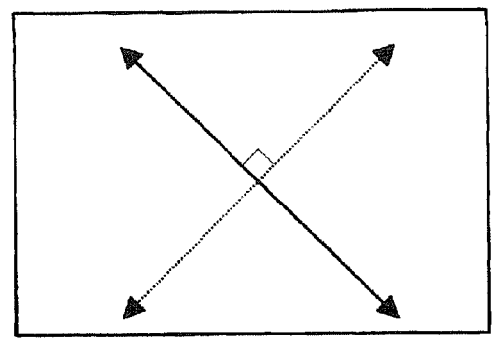
FIG. 8B is a view showing a relationship therebetween in a liquid crystal display in the background art.
Figure 9:
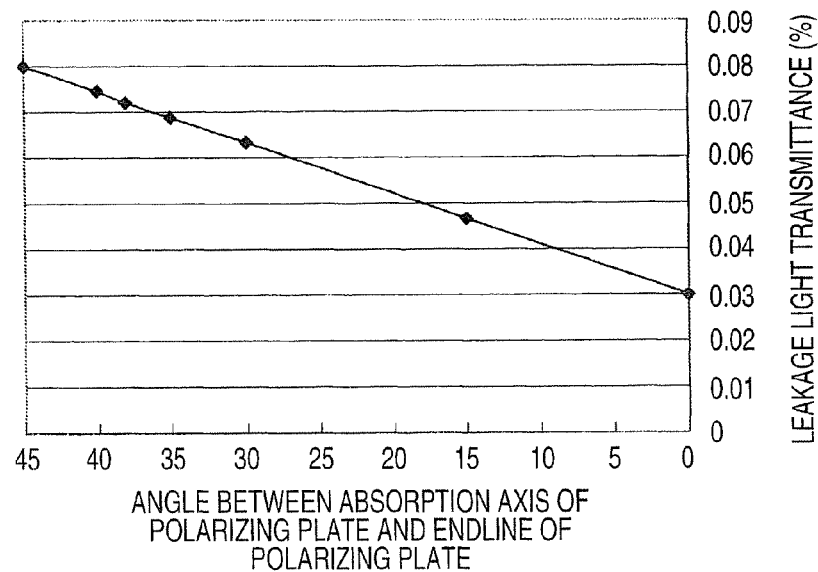
FIG. 9 is a graph that plots transmittance (%) of leakage light with respect to an angle between absorption axis of a polarizing plate and an end line of the polarizing plate.

When the invention is used in a TN mode transmission type liquid crystal display, like a TN mode transmission type liquid crystal display used typically, an absorption axis direction TN2 of a polarizing plate at an observer side and an absorption axis direction TN13 of a polarizing plate at a backlight side are stacked to be perpendicular to each other (cross Nicol arrangement), the absorption axis direction TN2 of the polarizing plate at the observer side and a rubbing direction (alignment control direction) TN6 of an electrode substrate at the observer side of a liquid crystal cell are stacked to be in parallel to each other, and the absorption axis direction TN13 of the polarizing plate at the backlight side and a rubbing direction (alignment control direction) TN9 of a substrate at the backlight side of the liquid crystal cell are stacked to be in parallel to each other (FIG. 7). In the TN mode transmission type liquid crystal display, unlike the typical TN mode transmission type liquid crystal display where the absorption axis direction of the polarizing plate or the rubbing direction of the liquid crystal cell has an inclined angle of 45° (FIG. 8B), since an intersection angle between the absorption axis direction TN2 and TN13 of the polarizing plate and the end line of the polarizing plate is deviated from 45° (FIG. 8A), an intersection angle between the rubbing direction TN6 and TN9 of the liquid crystal cell and the end line of the polarizing plate or the liquid crystal cell is also deviated from 45°.

In addition, the polarizing plate of the invention may be also advantageously used in liquid crystal displays employing an OCB (Optically Compensatory Bend) mode, a VA (Vertically Aligned) mode, an IPS (hi-Plane Switching) mode, etc., in addition to the TN mode and ECB mode liquid crystal cells.

That is, the liquid crystal display of the invention can be applied to TN, ECB, OCB, VA, IPS modes and the like.

According to still another aspect (III-1), the invention provides a liquid crystal display comprising: a pair of first and second opposite substrates, at least one of which has a transparent electrode; a liquid crystal layer interposed between the pair of first and second opposite substrates, wherein liquid crystal molecules are aligned in substantial parallel to surfaces of the first and second opposite substrates under application of no voltage and a twist angle between the first and second opposite substrates is 45° or less; a plurality of pixels including a plurality of electrodes that applies a voltage to the liquid crystal layer, wherein the liquid crystal display displays an image in a normally white mode, wherein each of the plurality of pixels has a first sub pixel and a second sub pixel that apply different voltages to the liquid crystal layer, and wherein the liquid crystal display is adapted to represent 0 to n gray scales (n being an integer number of 1 or more, higher n representing a gray scale having higher luminance), and effective voltages $V1(k)$ and $V2(k)$ applied to the liquid crystal layer of the first and second sub pixels satisfy the following relationship when the liquid crystal display represents at least k gray scale ($0 < k \leq n-1$).

$$|V1(k)-V2(k)|>0 \text{ (Volt)}$$

According to still another aspect (III-2), the invention provides a liquid crystal display comprising: a liquid crystal layer interposed between a pair of first and second opposite substrates, at least one of which has a transparent electrode, wherein liquid crystal molecules are aligned in substantial parallel to surfaces of the first and second opposite substrates under application of no voltage and a twist angle between the first and second opposite substrates is about 90°; and a plurality of pixels including a plurality of electrodes that applies a voltage to the liquid crystal layer, wherein the liquid crystal display displays an image in a normally white mode, wherein each of the plurality of pixels has a first sub pixel and a second sub pixel that apply different voltages to the liquid crystal layer, and wherein the liquid crystal display is adapted to represent 0 to n gray scales (n being an integer number of 1 or more, higher n representing a gray scale having higher luminance), and effective voltages $V1(k)$ and $V2(k)$ applied to the liquid crystal layer of the first and second sub pixels satisfy the following relationship when the liquid crystal display represents at least k gray scale ($0 < k \leq n-1$).

$$|V1(k)-V2(k)|>0 \text{ (Volt)}$$

According to the above aspects, a liquid crystal display of a normally white mode having a good viewing angle characteristic and a reduced viewing angle dependency of γ characteristic can be provided. In addition, according to one aspect of the invention, a liquid crystal display of a normally white mode having a reduced viewing angle dependency of γ characteristic, a reduced light leakage in an inclined direction in black image display, a good viewing angle characteristic, and a good viewing contrast can be provided.

Figure 10:
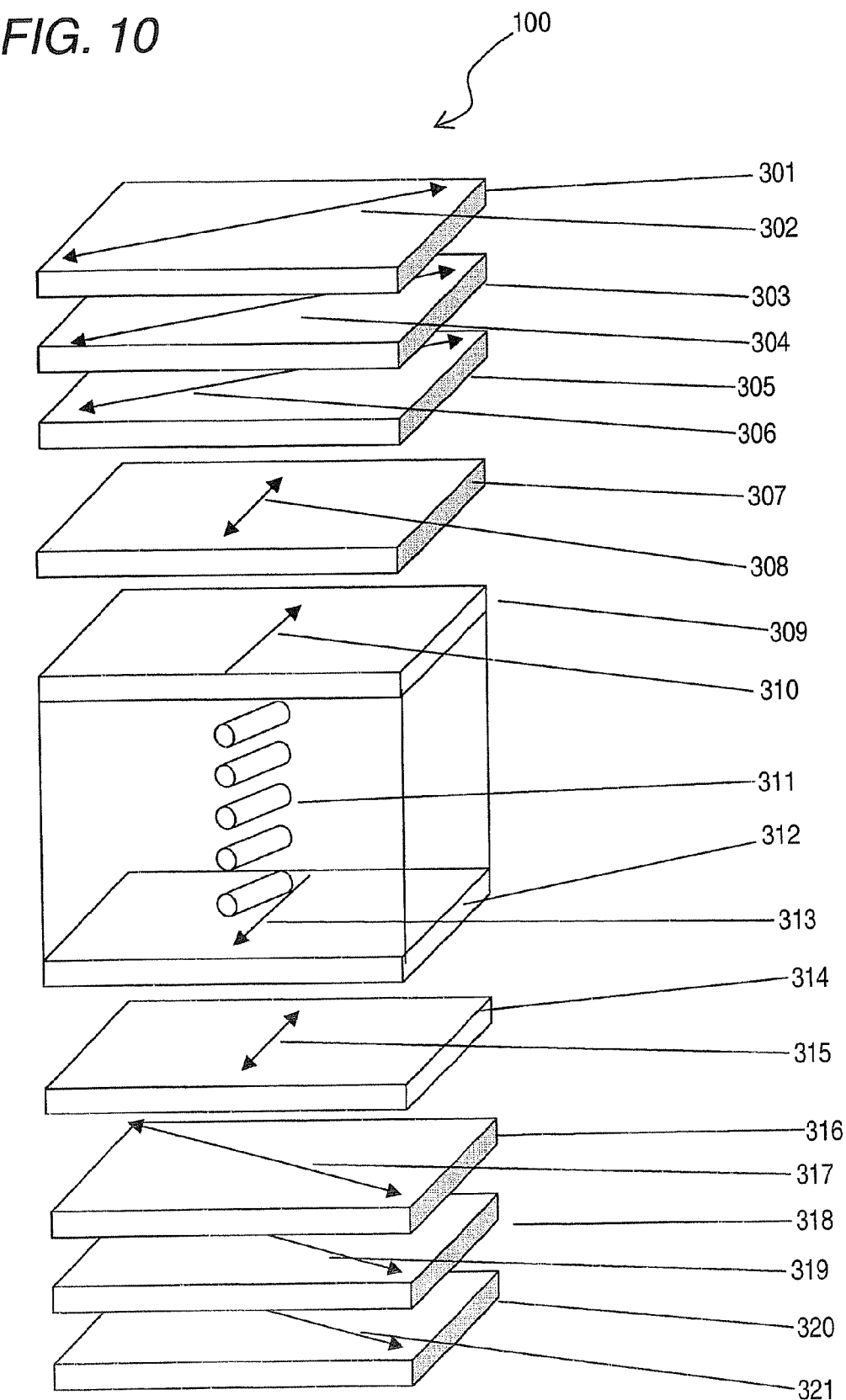
FIG. 10 is a schematic view showing a configuration of a liquid crystal display 100 according to an exemplary embodiment of the invention.

Now, a configuration of a liquid crystal display according to an embodiment of the invention will be described with reference to FIG. 10. In FIG. 10, an upper side indicates a display plane of the device and a lower side indicates a rear side of the device.

FIG. 10 is a schematic view showing an embodiment in which the invention is applied to an ECB type liquid crystal display. A liquid crystal display 100 shown in FIG. 10 comprises an ECB mode liquid crystal cell 309 to 313, a pair of polarizing plates arranged at both sides of the liquid crystal cell, an upper polarizing plate 301 to 306, and a lower polarizing plate 316 to 321. An upper optical compensation film 307 and a lower optical compensation film 314 are interposed between the upper polarizing plate and the liquid crystal call and between the lower polarizing plate and the liquid crystal cell, respectively.

The upper polarizing plate comprises an upper polarizer 303 and a pair of protective films 301 and 305 with the upper polarizer 303 therebetween, and the lower polarizing plate comprises a lower polarizer 318 and a pair of protective films 316 and 320 with the lower polarizer 318 therebetween. An upper optical compensation film 307 and a lower optical compensation film 314 may be integrally stacked with the upper polarizing plate and the lower polarizing plate, respectively, and the stacked structure thereof may be assembled into the liquid crystal display. For example, if the optical compensation films 307 and 314 are an optically anisotropic layer formed of a liquid crystal composition, the lower protective film 305 of the upper polarizing plate may be also used as a support of the optically anisotropic layer as the upper optical compensation film 307, and the upper protective film 316 of the lower polarizing plate may be also used as a support of the optically anisotropic layer as the lower optical compensation film 314.

An alignment film (not shown) and an electrode layer (not shown) are formed at inner sides of an upper substrate 309 and a lower substrate 312 of the liquid crystal cell 309 to 313, respectively. An inner surface of the alignment film is beforehand subjected to a rubbing treatment, and alignment control directions 310 and 313 are defined by a rubbing axis. The alignment control directions (for example, rubbing directions) 310 and 313 of the upper substrate 309 and the lower substrate 312 are set to be in parallel to each other and the liquid crystal layer is aligned in parallel without having a twist structure. The alignment film has a function to align liquid crystal molecules 311. In the parallel mode, nematic liquid crystal material having positive dielectric anisotropy $\Delta \in$ is filled between the upper and lower substrates. Assuming that the thickness of the liquid crystal layer is d and refractive index anisotropy of the nematic liquid crystal material is $\Delta n$, the product $\Delta n \cdot d$ has an effect on brightness in white image display. In order to obtain the maximal brightness, it is preferable that the liquid crystal cell is designed such that the product $\Delta n \cdot d$ falls within a range of 0.2 to 0.4 μm.

In the liquid crystal display 100 of this embodiment, the upper polarizer 303 and the lower polarizer 318 are arranged such that an absorption axis 304 of the upper polarizer 303 is perpendicular to an absorption axis 319 of the lower polarizer 318 to thereby display an image in a normally white mode. Specifically, in a non-driving state where a driving voltage is not applied to transparent electrodes (not shown) of the liquid crystal cell substrates 309 and 312, the liquid crystal molecules 311 in the liquid crystal layer are aligned in substantial parallel to planes of the substrates 309 and 312 by less than 45°, and, as a result, light that passed through the lower polarizer 318 and has polarization changed by a birefringence effect of the liquid crystal molecules 311 passes through the polarizer 303. At this time, the product (Δn·d) of the liquid crystal layer is set such that transmitting light has maximal intensity to display a white image. On the other hand, in a driving state where a driving voltage is applied to the transparent electrodes (not shown), the liquid crystal molecules 311 are aligned perpendicularly to the surfaces of the substrates 309 and 312 depending on the magnitude of the applied voltage, and the polarized light that passed through the lower polarizer 318 is absorbed by the upper polarizer 303 to display an black image, with its polarization state unchanged. By changing a voltage applied to the liquid crystal layer, birefringence of the liquid crystal molecules 311 is controlled, the transmittance is changed, and gray scales 0 to n (n is an integer number of more than 1. A larger n indicates a gray scale having higher luminance) can be represented.

Figure 11:
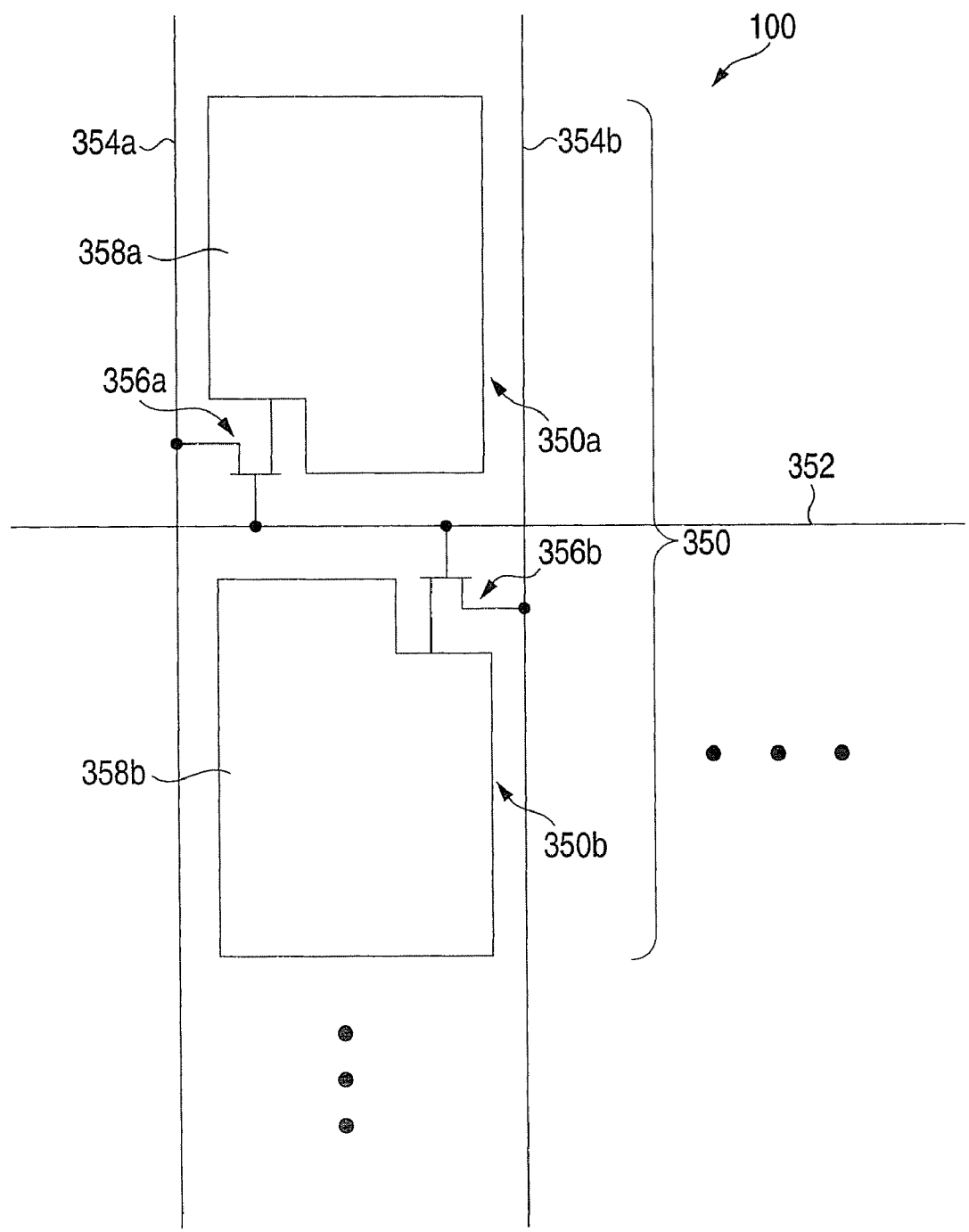
FIG. 11 is a schematic plan view showing an exemplary configuration of one pixel 350 of a liquid crystal display 100.

In the liquid crystal display 100 of this embodiment, the liquid crystal cell comprises a plurality of pixel including a plurality of electrodes that applies a voltage to the liquid crystal layer. FIG. 11 shows an exemplary configuration of one pixel of the liquid crystal display 100. For reference, FIG. 12 shows an exemplary configuration of one pixel of a conventional liquid crystal display 100'.

The liquid crystal display 100 of the invention comprises a plurality of pixels 350 arranged in the form of a matrix. Each of the plurality of pixel 350 comprises two pixel electrode 358a and 358b and a counter electrode (not shown) as shown in FIG. 11. The counter electrode is typically constituted by one common electrode for all the pixels 350. Although the conventional liquid crystal display 100' shown in FIG. 12 includes only one pixel electrode 358', the liquid crystal display 100 of this embodiment includes two sub pixels 358a and 358b in one pixel 350 so that different voltages can be applied to respective liquid crystal layer.

Figure 12:
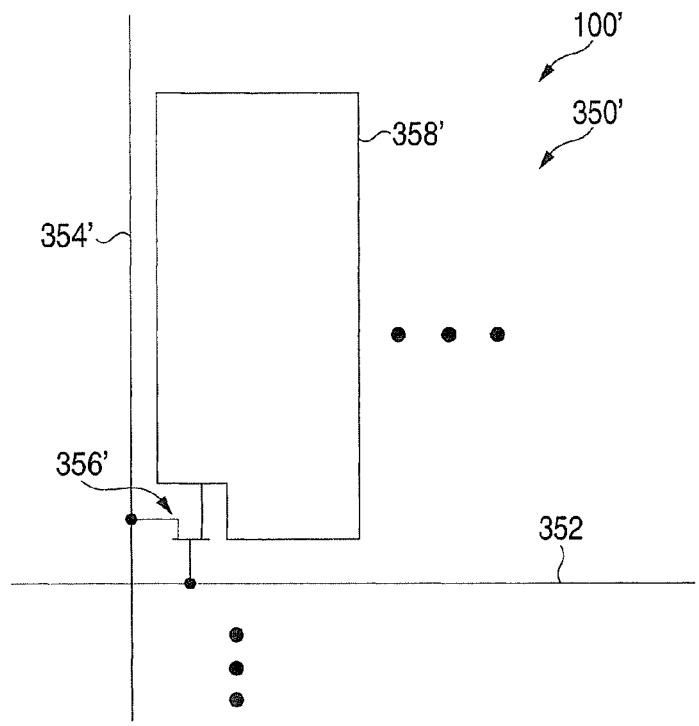
FIG. 12 is a schematic plan view showing an exemplary configuration of an electrode structure of a pixel 350' of a liquid crystal display 100' in the background art.
Figure 13:
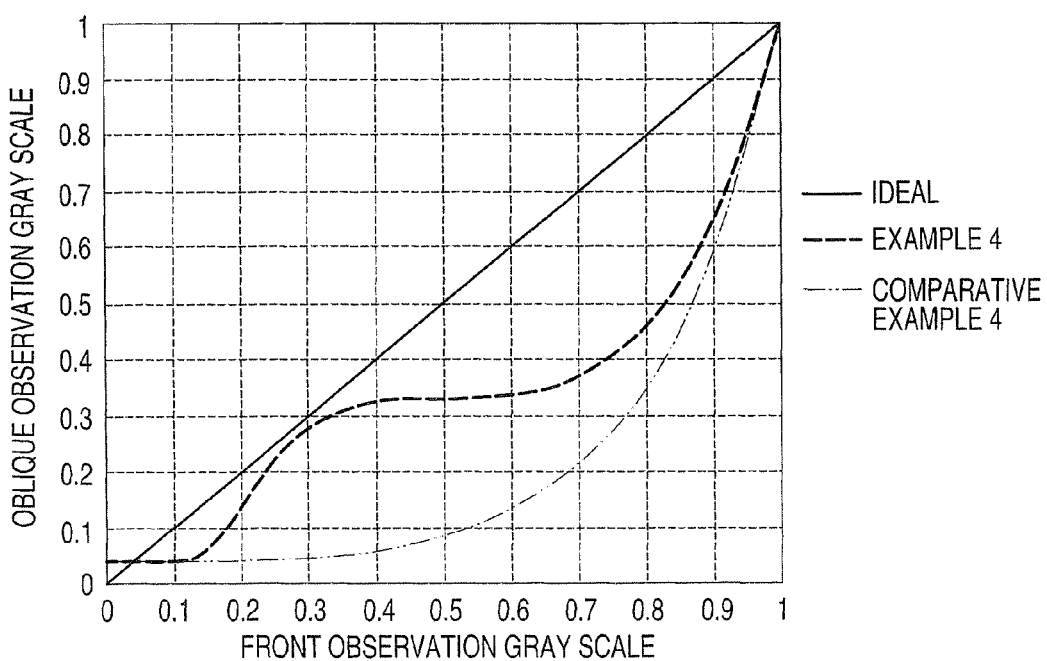
FIG. 13 is a graph showing a relationship between gray scales in front and inclined directions of liquid crystal displays according to Example 4 and Comparative example 4.

For a conventional ECB mode liquid crystal display having the electrode structure of the liquid crystal display 100' shown in FIG. 12, when transmittance for an application voltage is plotted, a curve indicated by transmittance measured in front observation is not coincident with a curve indicated by transmittance measured in side observation. Such discrepancy indicates that a γ characteristic of display in the front observation is different from a γ characteristic of display in the side observation. An ideal gray scale characteristic of a liquid crystal display indicates that a gray scale in the side observation (value in a vertical axis) is in direct proportion to a gray scale in the front observation (value in a horizontal axis), as shown in FIG. 13. On the other hand, a viewing angle gray scale characteristic in the side observation indicates a curve. Deviation from a straight line indicating a front characteristic of the curve indicates a quantitative deviation (difference) of γ characteristics in respective viewing angles, that is, a quantitative deviation (difference) of gray scales in the front observation and respective viewing angle observations.

One of objects of the invention is to reduce this deviation in a normally white mode liquid crystal display. It is ideally preferable that curves L3 and LU3 indicating gray scale characteristics at a right 60° viewing angle and a right and upper 60° viewing angle is changed to a straight line coincident with a straight line indicating a front gray scale characteristic N3.

To achieve this object of the invention, in the liquid crystal display 100 of this embodiment, each of the plurality of pixels 350 has a first sub pixel 350a and a second sub pixel 350b that apply different voltage, as shown in FIG. 11. In addition, when each of the plurality of pixels 350 displays an image with a gray scale of at least k ($0<k\leq n-1$), effective voltages $V1(k)$ and $V2(k)$ respectively applied to liquid crystal layers of the first and second sub pixels 350a and 350b satisfy an equation of $|V1(k)-V2(k)|>0$. In this manner, when each pixel is divided into a plurality of sub pixels and different voltages are applied to liquid crystal layers of the plurality of sub pixels, a mixture of different γ characteristic s is observed, thereby improving a viewing angle dependency of a halftone γ characteristic in a normally white mode.

In addition, by using an optically anisotropic layer formed of a composition containing a disk-like liquid crystal compound, which will be described later, as the upper and lower optical compensation films 307 and 314, a liquid crystal display with reduced light leakage in an inclined direction in black image display and good viewing angle contrast can be obtained. Here, it is important to make an effective voltage $V1(0)$ substantially equal to an effective voltage $V2(0)$ in the black image display, that is, in a gray scale of 0, Then, the first sub pixel and the second sub pixel have the same liquid crystal display state in the black image display, and light leakage is reduced in the black image display when the optical compensation film 307 or 314 is arranged, thereby improving a contrast ratio.

In addition, for a difference $\Delta V(n)(=|V1(n)-V2(n)|)$ between effective voltages applied to the liquid crystal layers of the first and second sub pixels 350a and 350b between gray scales, it is preferable but not necessary that a difference $\Delta V(k)$ between effective voltages V1 and V2 in k ($0<k\leq n-1$) gray scale representation and a difference $\Delta V(k+1)$ between effective voltages V1 and V2 in k+1 gray scale representation satisfy a relationship of $\Delta V(k+1)\leq \Delta V(k)$.

In order to apply the effective voltages satisfying the above relationship to the liquid crystal layers of the sub pixels 350a and 350b, the liquid crystal display 100 of this embodiment has the configuration shown in FIG. 11. As described above, although the conventional liquid crystal display 100' shown in FIG. 12 includes only one pixel electrode 358' connected to a signal line 354' via a TFT electrode 356' in one pixel 350', the liquid crystal device 100 of this embodiment includes two sub pixel electrode 358a and 358b connected to different signal lines 354a and 354b via TFT electrodes 356a and 356b, respectively, in one pixel 350. The sub pixels 350a and 350b compose one pixel 350, and gates of the TFT electrodes 356a and 356b are connected to a common scan line (gate bus line) 352 and are turned on/off by the same scan signal. A signal voltage (gray scale voltage) is applied to the signal lines (source bus line) 354a and 354b to satisfy the above relationship. In addition, it is preferable that the gates of the TFT electrodes 356a and 356b are in common use.

In the configuration shown in FIG. 11, it is preferable that an interval of a center line in parallel to the common scan line 352 in each of the sub pixels 350a and 350b is equal to about ½ of an arrangement pitch of the scan line 352. In addition, it is preferable that an area of the sub pixel 350a is equal to or smaller than an area of the sub pixel 350b.

In addition, if each of the plurality of pixels has 3 or more sub pixels, it is preferable that an area of a sub pixel to which the highest effective voltage is applied is not larger than areas of other sub pixels.

In addition, the configuration where the effective voltage satisfying the above relationship is applied to the liquid crystal layers of the plurality of sub pixels is not limited to the configuration shown in FIG. 11. For example, in a configuration where each of the first and second sub pixels has a storage capacitor including a storage capacitor electrode electrically connected to a sub pixel electrode, an insulating layer, and a storage capacitor counter electrode facing the storage capacitor electrode via the insulating layer, an effective voltage applied to a liquid crystal layer of the first sub pixel may be different from an effective voltage applied to a liquid crystal layer of the second sub pixel by constructing the storage capacitor counter electrode in an electrically independent manner for each of the first and second sub pixels and dividing capacitance of the storage capacitor by varying a voltage applied to the storage capacitor counter electrode (also being referred to as a storage capacitor counter voltage). By adjusting the size of capacitance of the storage capacitor and the magnitude of the voltage applied to the storage capacitor counter electrode, the magnitude of the effective voltage applied to the liquid crystal layer of each sub pixel can be controlled.

With the above configuration, since different signal voltages need not be applied to the sub pixel electrodes (358a and 358b in FIG. 11), the TFT electrode layers (356a and 356b in FIG. 11) may be connected to the common signal line and the same signal voltage may be applied to the TFT electrode layers. Accordingly, the number of signal lines is the same as in the conventional liquid crystal display 100' shown in FIG. 12 and a signal line driving circuit may have the same configuration as in the conventional liquid crystal display 100'. Of course, since the TFT electrode layers (356a and 356b in FIG. 11) are connected to the same scan line, it is preferable to employ a configuration using gates of the TFT electrode layers in common, as described above.

As described above, in the liquid crystal display 100 shown in FIG. 10, in a driving state where a driving voltage is applied to the transparent electrodes (not shown), the liquid crystal molecules 311 are aligned perpendicularly to the surfaces of the substrates 309 and 312 to display an black image depending on the magnitude of the applied voltage. However, although the liquid crystal molecules 311 are aligned substantially perpendicular to the substrate planes near centers in a thickness direction between the substrates, the liquid crystal molecules 311 are aligned in parallel to the substrate planes near borders of the substrates and are continuously obliquely aligned toward the centers in the thickness direction. Under such a state, it is difficult to obtain a full black image display. In the liquid crystal display 100 of this embodiment, in order to compensate a remaining phase difference of the liquid crystal layer, the optical compensation film 307 or 314 is disposed to reduce light leakage in the black image display, thereby improving a contrast ratio. It is preferable that the upper and lower optical compensation films 307 and 314 are an optically anisotropic layer formed of a liquid crystal composition containing a disk-like compound. It is preferable that the disk-like compound is a liquid crystal compound. For example, the optically anisotropic layer may be formed by controlling alignment of molecules of the disk-like compound by respective alignment control directions (rubbing axis directions if an alignment film having a rubbing treatment surface is used) 308 and 315 and fixing the alignment state. It is particularly preferable that an optically anisotropic layer formed by hybrid-aligning molecules of the disk-like compound and fixing the alignment state is used as the optical compensation films 307 and 314. It is preferable that the alignment control directions 308 and 315 of the upper and lower optical compensation films 307 and 314 are 0 to 10° with respect to the alignment control directions (generally rubbing axis directions) 310 and 313 of the liquid crystal molecules 311. In addition, the alignment control directions 308 and 315 of the upper and lower optical compensation films 307 and 314 intersect the absorption axis of the polarizing plate arranged at a position closer than the films 307 and 314 by, preferably, ±20 to 70°, more preferably, ±35 to 55°.

In addition, the configuration of the liquid crystal display of the invention is not limited to the above described configuration. For example, the absorption axes 304 and 319 of the upper and lower polarizers 303 and 318, the alignment directions of the optical compensation films 307 and 314, and the alignment directions of the liquid crystal molecules 311 may be adjusted to fall within an optimal range depending on material used for each member, a display mode, a stacked structure of the members, etc. In order to a high contrast, it is preferable that the absorption axis 304 of the upper polarizer 303 is in substantially perpendicular to the absorption axis 319 of the upper polarizer 318 and the absorption axes 304 and 319 intersect the alignment axes 310 and 313 of the liquid crystal molecules 311 by about 45°, respectively. The alignment control directions 310 and 313 of the liquid crystal molecules 311 are alignment axes to control alignment of the liquid crystal molecules 311 having alignment films (not shown) formed at inner surfaces of the upper and lower substrates 309 and 312. For example, if the alignment films have rubbing treatment surfaces, the alignment films, the alignment control directions 310 and 313 are coincident with rubbing axes.

When the protective films 305 and 316, which are arranged at the liquid crystal cell, of the protective films of the polarizers have optically refractive index anisotropy for visible light (a preferred range of Re and Rth of the protective films will be described later), and an optical axis of the optical compensation film (an average alignment direction of a molecule long axis) is arranged in parallel to the substrate surface in a direction in which a phase difference of the liquid crystal layer is removed, viewing angle performance in the black image display and halftone image display is further improved, a range of high contrast is further widened, and a region of gray scale inversion is significantly reduced.

It is preferable that the liquid crystal display of the invention is applied to a liquid crystal display using an ECB or TN liquid crystal layer containing nematic liquid crystal material having positive dielectric anisotropy. In addition, it is preferable that the liquid crystal layer included in each of the sub pixels has ECB and TN modes of a multi-domain including two to four domains having different azimuth angles at which the liquid crystal molecules are inclined under application of a voltage. Details of modes of the multi-domain are disclosed in JP-A-9-160042.

The liquid crystal display of the invention is effective for an OCB mode, a VA mode, a HAN mode, and a STN mode in addition to the above-described display mode.

The liquid crystal display of the invention is not limited to the configuration shown in FIG. 10, but may include other members. For example, a color filter may be interposed between the liquid crystal cell and the polarizer. In addition, a separate optical compensation film may be interposed between the liquid crystal cell and the polarizing plate, which will be described later. In addition, in case of a transmission type liquid crystal display, a backlight unit having a light source such as a cold cathode or hot cathode fluorescent tube, a light emitting diode, a field emission device, or an electroluminescence device may be disposed behind the liquid crystal cell. In addition, the liquid crystal display of the invention may be of a reflection type. In this case, only one polarizing plate may be disposed at an observation side, and a reflecting film is disposed behind the liquid crystal cell or at an inner side of the lower substrate of the liquid crystal cell. Of course, a front light unit using the light source may be provided at a liquid crystal cell observation side.

The liquid crystal display of the invention includes image direct-view type, image projection type and light modulation type display devices. In addition, although the liquid crystal display employing TFT devices has been illustrated in the above, other switching devices (for example, MIM devices) may be employed. The invention is particularly effective for an active matrix liquid crystal display using three or two terminal semiconductor devices such as TFT or MIM. Of course, the invention is also effective for a passive matrix liquid crystal display represented by a STN type which is called a time division driving.

In addition, an optical compensation film having an optically anisotropic layer formed using a hybrid alignment of disk-like liquid crystal molecules usable in the invention is disclosed in JP-A-2000-304930 (paragraphs (0014) to (0141)) and may be applied to the liquid crystal display of the invention.

According to still another aspect (IV), the invention provides a liquid crystal display comprising a pair of polarizing plates, each including a polarizer and a transparent layer, transmission axes of the polarizer and the transparent layer being perpendicular to each other, and a liquid crystal panel interposed between the pair of polarizing plates, wherein the liquid crystal panel includes a pair of opposite substrates, at least one of which has an electrode, a liquid crystal layer including liquid crystal molecules aligned by alignment axes of opposite surfaces of the pair of opposite substrates, and at least one pair of optically anisotropic layers with the liquid crystal layer interposed between the at least one pair of optically anisotropic layers, wherein the liquid crystal panel has a double symmetrical axis with regard to a cubic structure formed in upper and lower alignment control directions of the liquid crystal layer which are defined by the alignment axes of opposite surfaces of the pair of opposite substrates and alignment control directions of the pair of optically anisotropic layers, the double symmetrical axis being in parallel to the surfaces of the substrates, a transmission axis of one of the pair of polarizing plates is in parallel to the double symmetrical axis, and a transmission axis of the other of the pair of polarizing plates is perpendicular to the double symmetrical axis, and wherein a transparent layer, which is interposed between the liquid crystal layer and the polarizer, of the transparent layers included in the pair of polarizing plates is a biaxial retardation layer, in-plane retardation of the retardation layer is 250 to 300 nm, an NZ value of the retardation layer is 0.1 to 0.4, and an in-plane retardation axis of the retardation layer is perpendicular to an absorption axis of the polarizer closer to the retardation layer.

According to still another aspect, the invention provides a liquid crystal display comprising a pair of polarizing plates, each including a polarizer and a transparent layer, transmission axes of the polarizer and the transparent layer being perpendicular to each other, and a liquid crystal panel interposed between the pair of polarizing plates, wherein the liquid crystal panel includes a pair of opposite substrates, at least one of which has an electrode, a liquid crystal layer including liquid crystal molecules aligned by alignment axes of opposite surfaces of the pair of opposite substrates, and at least one pair of optically anisotropic layers with the liquid crystal layer interposed between the at least one pair of optically anisotropic layers, wherein the liquid crystal panel has a double symmetrical axis with regard to a cubic structure formed in upper and lower alignment control directions of the liquid crystal layer which are defined by the alignment axes of opposite surfaces of the pair of opposite substrates and alignment control directions of the pair of optically anisotropic layers, the double symmetrical axis being in parallel to the surfaces of the substrates, a transmission axis of one of the pair of polarizing plates is in parallel to the double symmetrical axis, and a transmission axis of the other of the pair of polarizing plates is perpendicular to the double symmetrical axis, and wherein a transparent layer, which is interposed between the liquid crystal layer and the polarizer, of the transparent layers included in the pair of polarizing plates is a biaxial retardation layer, in-plane retardation of the retardation layer is 250 to 300 nm, an NZ value of the retardation layer is 0.6 to 1.1, and an in-plane retardation axis of the retardation layer is in parallel to an absorption axis of the polarizer closer to the retardation layer, or a liquid crystal display comprising a pair of polarizing plates, each including a polarizer and a transparent layer, transmission axes of the polarizer and the transparent layer being perpendicular to each other, and a liquid crystal panel interposed between the pair of polarizing plates, wherein the liquid crystal panel includes a pair of opposite substrates, at least one of which has an electrode, a liquid crystal layer including liquid crystal molecules aligned by alignment axes of opposite surfaces of the pair of opposite substrates, and at least one pair of optically anisotropic layers with the liquid crystal layer interposed between the at least one pair of optically anisotropic layers, wherein the liquid crystal panel has a double symmetrical axis with regard to a cubic structure formed in upper and lower alignment control directions of the liquid crystal layer which are defined by the alignment axes of opposite surfaces of the pair of opposite substrates and alignment control directions of the pair of optically anisotropic layers, the double symmetrical axis being in parallel to the surfaces of the substrates, a transmission axis of one of the pair of polarizing plates is in parallel to the double symmetrical axis, and a transmission axis of the other of the pair of polarizing plates is perpendicular to the double symmetrical axis, and wherein a transparent layer, which is interposed between the liquid crystal layer and the polarizer, of the transparent layers included in the pair of polarizing plates has a biaxial retardation function, and an in-plane retardation axis of the transparent layer is in parallel to a transmission axis of the polarizer closer to the retardation layer.

In addition, according to still another preferred aspect, the invention provides a liquid crystal display comprising a pair of polarizing plates, each including a polarizer and a transparent layer, transmission axes of the polarizer and the transparent layer being perpendicular to each other, and a liquid crystal panel interposed between the pair of polarizing plates, wherein the liquid crystal panel includes a pair of opposite substrates, at least one of which has an electrode, a liquid crystal layer including liquid crystal molecules aligned by alignment axes of opposite surfaces of the pair of opposite substrates, and at least one pair of optically anisotropic layers with the liquid crystal layer interposed between the at least one pair of optically anisotropic layers, wherein the liquid crystal panel has a double symmetrical axis with regard to a cubic structure formed in upper and lower alignment control directions of the liquid crystal layer which are defined by the alignment axes of opposite surfaces of the pair of opposite substrates and alignment control directions of the pair of optically anisotropic layers, the double symmetrical axis being in parallel to the surfaces of the substrates, a transmission axis of one of the pair of polarizing plates is in parallel to the double symmetrical axis, and a transmission axis of the other of the pair of polarizing plates is perpendicular to the double symmetrical axis, and wherein a transparent layer, which is interposed between the liquid crystal layer and the polarizer, of the transparent layers included in the pair of polarizing plates has an in-plane retardation axis in parallel to a transmission axis of the polarizer closer to the retardation layer, and assuming that in-plane retardation of the transparent layer is Re and thickness direction retardation of the transparent layer is Rth, Rth of the transparent layer for a wavelength of 550 nm is 70 to 400 nm, Re of the transparent layer for the same wavelength is 20-80 nm, a ratio of Re to Rth (Re/Rth) for a wavelength of 450 nm is 0.4 to 0.95 times a ratio of Re to Rth (Re/Rth) for a wavelength of 550 nm, and Re/Rth for a wavelength of 650 nm is 1.05 to 1.9 times Re/Rth for a wavelength of 550 nm.

According to the above aspects, by adjusting an arrangement angle relationship between the polarizing plate absorption axis (or transmission axis), the alignment control direction of the liquid crystal layer, and the alignment control direction of the optically anisotropic layer having the optical compensation performance and interposing a transparent layer having an optical characteristic between the polarizing plate and the liquid crystal panel, there can be provided a liquid crystal display, particularly a TN mode liquid crystal display, with high reliability and good display quality in vertical and horizontal viewing angles even under severe use environments, with the same configuration as the conventional liquid crystal display.

Hereinafter, the above aspect (IV) of the invention will be described in detail.

In the invention, for a liquid crystal display having a pair of polarizing plates and a liquid crystal cell interposed between the pair of polarizing plates, by making absorption axes of polarizers included in the pair of polarizing plates substantially parallel or perpendicular to a maximal contraction direction of the polarizing plates, that is, long and short side directions (or horizontal direction of a screen of the display device) of an end portion of the polarizing plates, light is no or little leaked out of circumferences of the polarizing plates even under severe use environments (high temperature and high humidity), for example, even under use environments of temperature of 40° C. and humidity of 90% or temperature of 65° C. and humidity of 80%. In addition, deterioration of a viewing angle characteristic, which may occur due to such arrangement, can be avoided by adjusting an arrangement angle relationship between the alignment control direction of the liquid crystal layer and the alignment control direction of the optically anisotropic layer, thereby satisfying a required wide viewing angle characteristic.

The prevent inventors have discovered that light leakage out of circumferences of polarizing plates in conventional TN mode liquid crystal displays is caused by retardation Re and Rth generated in polarizing plate protective films due to a photoelastic effect by contraction of the polarizing plates. Based on this discover, the present inventor have also discovered that the light leakage can be decreased by adjusting an arrangement angle relationship between the alignment control direction of the liquid crystal layer, the alignment control direction of the optically anisotropic layer for optical compensation, and the absorption of the polarizing plates.

The polarizing plates are contracted under severe environments. Particularly, contraction in a direction in parallel to long and short sides of a screen becomes maximal. When an elastic force such as contraction or expansion is applied to a film used in the polarizing plates, retardation is changed. In a configuration where an absorption axis of the polarizing plate intersects a generation direction of the retardation by 45°, light transmission becomes maximal, which is observed as light leakage. In the invention, with the above described arrangement, observed light leakage is reduced.

The invention is remarkably effective for a TN mode liquid crystal layer. In a conventional TN mode liquid crystal layer, an absorption plate absorption axis intersects a horizontal direction of a screen, that is, a long side direction of an end portion of a polarizing plate by 45°. Since a contraction direction of the polarizing plate is in parallel to long and short directions of the end portion of the polarizing plate, such a conventional arrangement gives the maximal light leakage. Accordingly, in the invention, by making a pair of polarizing plate absorption axes parallel or perpendicular to the horizontal direction of the screen, that is, the long side direction of the end portion of the polarizing plate, light leakage can be decreased in the TN mode.

The TN mode liquid crystal display employs a TFT driving in order to display a high quality image having high contrast high precision. For the TFT driving, gate wiring lines and signal (or source) wiring lines are arranged in horizontal and vertical directions of a screen. Since a contraction direction of a polarizing plate is in parallel or perpendicular to these wiring lines, even if a polarizing plate absorption axis is arranged in parallel or perpendicular to these wiring lines, the absorption axis is arranged in substantial parallel or perpendicular to the maximal contraction direction of the polarizing plate, that is, long and short side directions of an end portion of the polarizing plate, thereby decreasing light leakage.

In addition, the TN mode liquid crystal display, in order to obtain a wide viewing angle characteristic, it is preferable that the absorption axis of at least one of the pair of polarizing plates intersects the alignment axis formed at a plane opposite to the liquid crystal cell substrate arranged at a side of at least one of the polarizing plates by about 45°.

Light leakage out of circumferences of the polarizing plate can be decreased by making the polarizing plate absorption axis parallel or perpendicular to the long side direction of the end portion of the polarizing plate. At this time, by inclining an alignment control direction of the TN mode liquid crystal display, that is, an alignment axis formed at an opposite side of a substrate of a liquid crystal cell, by 45° with respect to the horizontal direction of the screen, a substantially bilateral symmetrical viewing angle characteristic can be obtained. In the conventional TN mode, the alignment control direction of the liquid crystal cell is inclined by 45° with respect to the horizontal direction of the screen, and a vertical viewing angle characteristic is asymmetrical while the horizontal viewing angle characteristic is symmetrical. However, since the polarizing plate absorption axis and a retardation axis of a protective film of the polarizing plate are also inclined by 45° with respect to the horizontal direction of the screen, light is leaked out of the circumference of the polarizing plate under severe use environments.

Prior to description of the invention, an operation of a liquid crystal display in the background art, shown in FIG. 15, will be described by way of example of a general TN mode. Here, using nematic liquid crystals having positive dielectric anisotropy as field effect liquid crystals, a TFT (active) driving will be described by way of an example. A liquid crystal display in the background art comprises a liquid crystal cell having an upper substrate 457, a lower substrate 460, and a liquid crystal layer having liquid crystal molecules 459 interposed between these substrates. Alignment films (not shown) are formed on surfaces of the substrates 457 and 460 contacting the liquid crystal molecules 459 (hereinafter, these surfaces are sometimes referred to as "inner surfaces"), and alignment of the liquid crystal molecules 459 under application of no voltage or application of a low voltage is controlled by a rubbing treatment to which the alignment films are subjected. In addition, transparent electrodes (not shown) that apply a voltage to the liquid crystal layer having the liquid crystal molecules 459 are formed on the inner surfaces of the substrates 457 and 460.

An upper polarizing plate comprises an upper polarizer 451 and a protective film 453 for protecting the upper polarizer 451, and a lower polarizing plate comprises a lower polarizer 466 and a protective film 464 for protecting the lower polarizer 466. These polarizing plates generally have another protective film in the outside thereof, although it is not shown in FIG. 15. As shown in FIG. 15, in the conventional liquid crystal display, an absorption axis 452 of the upper polarizer 451 is substantially perpendicular to an absorption axis 467 of the lower polarizer 466 in a 45° direction with respect to a horizontal direction of a screen (direction a in the figure). In addition, the absorption axis 452 of the upper polarizing plate is substantially perpendicular to a rubbing direction (alignment axis) 458 of the upper substrate 457, and the absorption axis 467 of the lower polarizing plate is substantially perpendicular to a rubbing direction (alignment axis) 461 of the lower substrate 460. In addition, in order to remove retardation by the liquid crystal molecules 459, optically anisotropic layers 455 and 462 are interposed between the upper and lower polarizing plates and the liquid crystal cell, respectively. The optically anisotropic layers 455 and 462 are formed of a liquid crystal composition containing, for example, a discotic liquid crystal compound, and, average alignment directions 456 and 463 of discotic molecules fixed in the optically anisotropic layers 455 and 462 are in substantial parallel to the rubbing axes 458 and 461 of the liquid crystal cell substrates 457 and 460 located closer than the optically anisotropic layers 455 and 462, respectively.

In the TN type liquid crystal display, under a non-driving state where a driving voltage is not applied to the electrodes, the liquid crystal molecules 459 in the liquid crystal cell are aligned in substantial parallel to substrate planes and alignment direction is twisted by 90° between the upper and lower substrates 457 and 460. In case of a transmission type display device, light emitted from a backlight unit has linear polarization after passing through the lower polarizer 466. The linearly polarized light propagates along the twisted structure of the liquid crystal layer, rotates a polarizing plane by 90°, and then passes through the upper polarizer 451. Accordingly, the display device displays a white image.

On the other hand, when an application voltage is increased, the liquid crystal molecules 457 get stand perpendicularly to the substrate planes while being untwisted. In the TN type liquid crystal display under application of an ideal high voltage, the liquid crystal molecules 457 are nearly completely untwisted, and, accordingly, have a state of alignment nearly perpendicular to the substrate planes. At this time, since there is no twisted structure in the liquid crystal layer, the linearly polarized light that passed through the lower polarizer 466 propagates without rotating the polarizing plane and is perpendicularly incident into the absorption axis 452 of the upper polarizer 451. Accordingly, the light is shielded and the display device displays a black image. However, in a driving state, since the liquid crystal molecules 457 are aligned by an angle with respect to the substrate surface, retardation occurs. This retardation is alleviated by the optical compensation layers 455 and 462, thereby obtaining an ideal black image display in the driving state.

In this manner, the TN type liquid crystal display achieves a function as a display device by shielding or transmitting the polarized light. In general, a contrast ratio as a numerical value to indicate display quality is defined by a ratio of white display luminance to black display luminance. A higher contrast ratio gives a higher quality display device. In order to increase a contrast ratio, it is important to maintain a polarization state in a liquid crystal display.

However, as described above, when the conventional liquid crystal display is used under severe environments such as high temperature and high humidity, there arises a problem in that the polarizing plate is contracted, and accordingly, light is leaked out of a circumference of the polarizing plate. The present inventors have paid attention to symmetry of a cubic structure formed in upper and lower alignment control directions of a liquid crystal layer defined by an alignment axis of opposite planes of a pair of substrates for a liquid crystal cell and alignment control directions of a pair of upper and lower optically anisotropic layers and have found that the above problem can be overcome based on the fact that the cubic structure has a double symmetrical axis in a plane in parallel to a substrate surface, and absorption axes of a pair of upper and lower polarizing plates have a relationship with the double symmetrical axis.

To begin with, the concept of the double symmetrical axis and the cubic structure that is formed in the upper and lower alignment control directions of the liquid crystal layer forming a liquid crystal panel and the alignment control directions of the upper and lower optically anisotropic layers and has the double symmetrical axis will be described by way of an example. FIG. 16 shows a liquid crystal alignment direction of the liquid crystal layer forming the liquid crystal panel of the conventional TN type liquid crystal display shown in FIG. 15 and absorption axis directions of the polarizing plates with the liquid crystal layer interposed therebetween. In FIG. 16, in the liquid crystal layer, although a director in the liquid crystal layer is changed such that the liquid crystal molecules are aligned to be untwisted along an electric field direction depending on an applied voltage, the alignment control directions defined by the alignment axis (for example, rubbing axis) of the opposite plane of the upper and lower substrates fixing the alignment (in the specification, sometimes referred to as "upper and lower alignment control directions of the liquid crystal layer") are fixed with a pretilt angle (for example, 4° or so) tilted from the substrate surface, and a difference between the upper and lower alignment control directions of the liquid crystal layer. As shown in FIG. 16, when a structure of "liquid crystal+polarizing plate" is rotated by 180° with a C2 axis, which is indicated by an arrow, as a rotation axis, this structure is completely the same as a structure before rotation. This is referred to that the cubic structure has a double rotation axis (double symmetrical axis). It is here noted that the cubic structure considers only a factor used to actively relate the structure to a switching by birefringence of light, which is the principle of a liquid crystal display. The factor may include, for example, the liquid crystal layer, the polarizing plate, a retardation plate, etc. For example, it is not considered whether or not members having small birefringence, such as a color filter, an anti-reflection film, a scattering layer and the like, used for a different purpose are completely the same after and before rotation.

When the cubic structure has such a double symmetrical axis, the liquid crystal panel has a bilateral symmetry in a C2 axis direction. The reason for this is as follows. In the left figure of FIG. 17, light that transmits from the right front side to the left inner side has the same transmittance as light that transmits from the left inner side to the right front side. Similarly, light that transmits from the right upper front side to the left lower inner side has the same transmittance as light that transmits from the left lower inner side to the right upper front side. When the liquid crystal panel is rotated by 180° around the C2 axis, the cubic structure before rotation is the same as the cubic structure after rotation since the liquid crystal panel has the double symmetrical axis. In addition, the right front side just before moves to the left inner side, the left inner side moves the right front side, the right upper front side moves the left upper inner side, and the left lower inner side moves the right lower front side. As can be seen from the figures before and after rotation, the transmittance in the right direction becomes equal to the transmittance in the left direction, and the transmittance in the right upper direction becomes equal to the transmittance in the left upper direction. That is, a bilateral symmetrical transmittance characteristic is obtained. This means that the cubic structure having the double symmetrical axis has a symmetry characteristic in the symmetrical axis direction. It is well known that a typical TN type liquid crystal display panel has a bilateral symmetry characteristic since the panel has a double symmetrical axis in left and right directions.

This relationship is also established when a voltage is applied to the liquid crystal layer. In addition, this relationship is also established for a liquid crystal display having a TN type liquid crystal panel including an optically anisotropic layer formed of a discotic compound conventionally used for optical compensation. In other words, the bilateral symmetry is a special feature of the conventional liquid crystal display. However, in the invention, the absorption axes of the polarizing plates are arranged in the vertical and horizontal directions of the screen. This configuration is schematically shown in FIG. 18.

Figure 17:
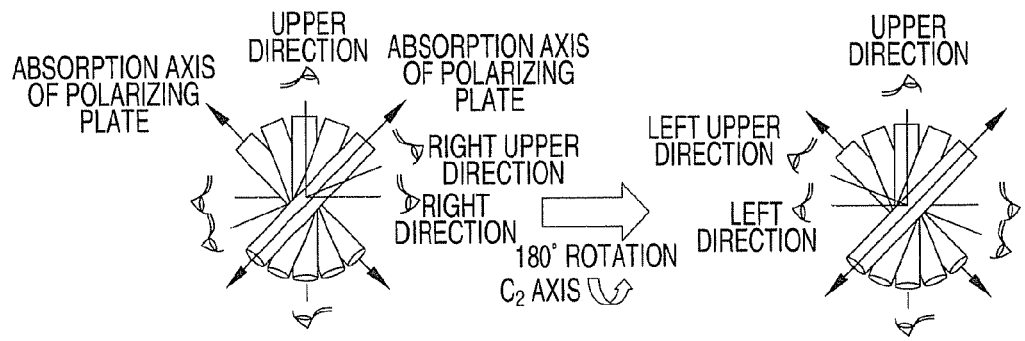
FIG. 17 is a schematic view used to explain double symmetry of a liquid crystal panel.
Figure 18:
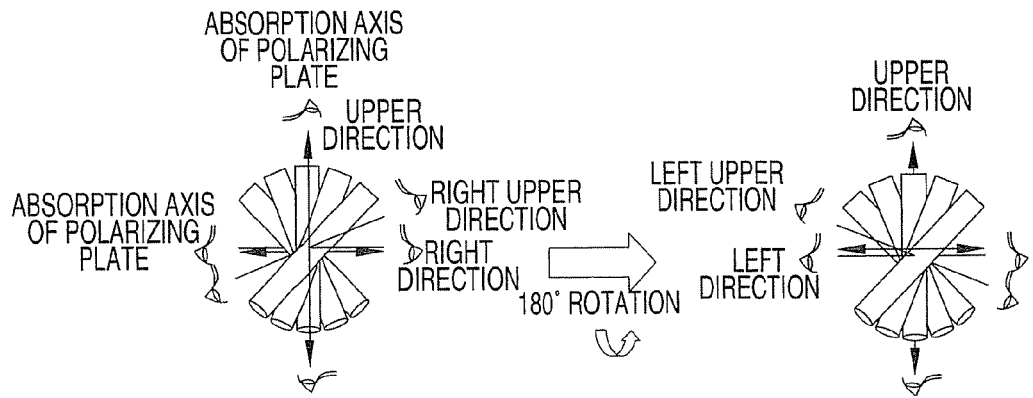
FIG. 18 is a schematic view used to explain double symmetry of a liquid crystal panel.

A TN liquid crystal panel of the invention shown in FIG. 18 is different in absorption axis directions of upper and lower polarizing plates from the conventional TN liquid crystal panel shown in FIG. 17. Accordingly, in the TN liquid crystal panel shown in FIG. 18, a cubic structure of liquid crystal+ polarizing plate" has no double rotation axis. This is because the upper and lower polarizing plates has no double symmetrical axis although the liquid crystal panel without the polarizing plates has the double symmetrical axis. Accordingly, this cubic structure can not obtain a bilateral symmetry characteristic. The invention is characterized in that the cubic structure has bilateral symmetry, for example, the right upper side having the same characteristic as the left upper side, the right lower side having the same characteristic as the left lower side. In other words, in a structure where a liquid crystal panel having a double symmetrical axis is interposed between perpendicular polarizing plates, when one absorption axis (or transmission axis) of the perpendicular polarizing plates is in parallel to the double symmetrical axis of the liquid crystal panel, a liquid crystal display having symmetrical transmittance in a plane perpendicular to a double symmetrical axis direction of the liquid crystal panel is attained. Specifically, in the invention, the above structure is attained by interposing a phase difference layer indicating a birefringence between the liquid crystal panel and the perpendicular polarizing plates, which will be described in detail below.

As shown in FIG. 18, the completely same characteristic is obtained in the left and right directions, that is, a 0° direction and a 180° direction. However, the same characteristic is not obtained in the right inclined upper direction, for example, a 30° direction, and the left inclined upper direction, for example, a 150° direction. That is, a bilateral symmetry is not obtained in the right inclined direction and the left inclined direction. The present inventors have deliberated how to apply the fact that the completely same characteristic is obtained in the left and right directions to the inclined upper direction or the inclined lower direction. The reason why the completely same characteristic is obtained in the left and right directions is that only the axis is changed between upper and lower directions, with the perpendicular relationship of the polarizing plates before and after rotation of the C2 symmetry unchanged in FIG. 18. The reason for such same characteristic may be described as follow.

First, a Jones matrix of an anisotronic medium can be expressed by the following equation.

$$M = \begin{pmatrix} a+ib & c+id \\ -c+id & a-id \end{pmatrix}$$

Where, a, b, c and d are real numbers, and $a^2+b^2+c^2+d^2=1$. Assuming that an x axis is a 0° direction and a y axis is a 90° direction, when the anisotropic medium is inserted between a lower polarizing plate having the x axis as a transmission axis and an upper polarizing plate having the y axis as a transmission axis, transmittance is expressed by the following equation.

$$T = \left| \begin{pmatrix} 0 & 1 \end{pmatrix} \begin{pmatrix} a+id & c+id \\ -c+id & a+ib \end{pmatrix} \begin{pmatrix} 1 \\ 0 \end{pmatrix} \right|^2 = c^2 + d^2$$

On the other hand, when the anisotropic medium is inserted between a lower polarizing plate having the y axis as a transmission axis and an upper polarizing plate having the x axis as a transmission axis, transmittance is expressed by the following equation.

$$T = \left| \begin{pmatrix} 0 & 1 \end{pmatrix} \begin{pmatrix} a+id & c+id \\ -c+id & a+ib \end{pmatrix} \begin{pmatrix} 1 \\ 0 \end{pmatrix} \right|^2 = c^2 + d^2$$

That is, Equations above have the same transmittance. In other words, changing only a polarizing direction between the upper and lower directions without collapsing the perpendicular relationship gives the same characteristic. This is the reason why the completely same characteristic is obtained in the left and right directions. The present inventors have deliberated how to apply the fact that the completely same characteristic is obtained in the left and right directions to the inclined directions and have found that the above asymmetry problem can be overcome by arranging a C2 symmetrical liquid crystal panel between a pair of polarizing plates with polarizing axes perpendicular to each other in an inclined direction.

Specifically, according to one aspect of the invention, a pair of polarizing plates includes a polarizer and a biaxial retardation layer. The biaxial retardation layer is interposed between a liquid crystal panel and the polarizer, in-plane retardation of the retardation layer is 250 to 300 nm, and an NZ value has a birefringence characteristic of 0.1 to 0.4. In this aspect, an in-plane retardation axis of the retardation layer is arranged perpendicular to an absorption axis of the polarizer arranged closer to the retardation layer.

In addition, according to another aspect of the invention, a pair of polarizing plates includes a polarizer and a biaxial retardation layer. In-plane retardation of the retardation layer is 250 to 300 nm, and an NZ value has a birefringence characteristic of 0.6 to 1.1. In this aspect, an in-plane retardation axis of the retardation layer is arranged perpendicular to an absorption axis of the polarizer arranged closer to the retardation layer.

Figure 19:
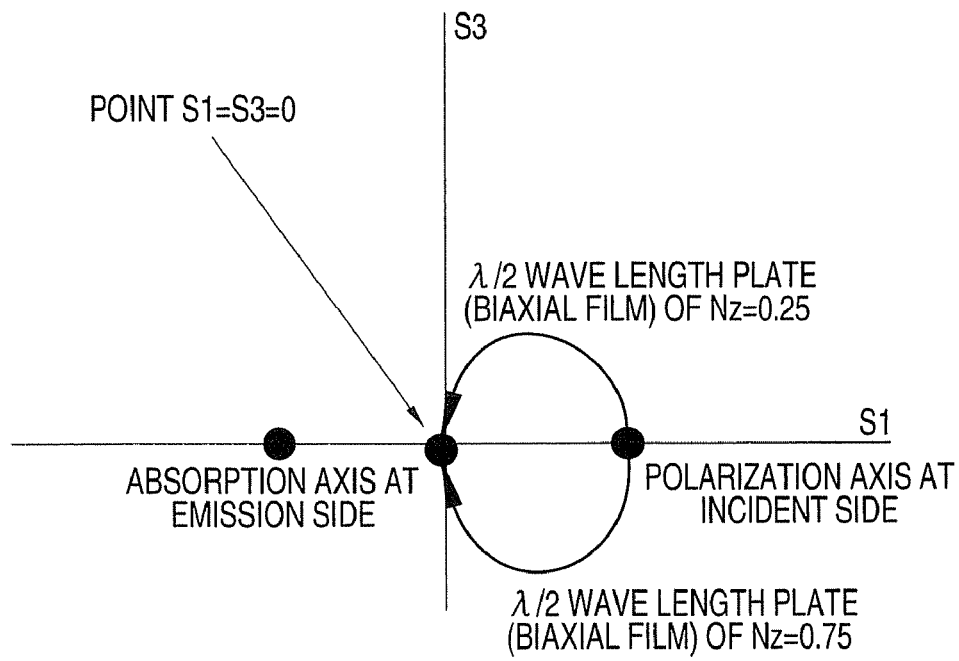
FIG. 19 is a view showing that a locus of a polarization state of light incident into a liquid crystal display is plotted on a Poincare sphere according to an exemplary embodiment of the invention.

The above two aspects will be described below using a Poincare sphere. A Poincare sphere shown in FIG. 19 is a diagram of an orthogonal projection of S1 and S3 having an azimuth angle of 45° and a polar angle of 60°. When linearly polarized light that passed a polarizer of one polarizing plate passes the retardation layer, a polarizing axis moves to a point of S1=S3=0. Since the other polarizing plate includes the retardation layer, the two polarizing plates remain perpendicular to each other in an inclined direction. Since only a vertical relationship is changed with the perpendicular relationship unchanged although the polarizing plates are rotated around the C2 symmetrical axis of the liquid crystal panel, it can be seen that this relationship is a condition of obtaining the symmetry characteristic as described above. Details of the biaxial retardation layer used in the above two aspects and change of polarizing state of incident light of the retardation layer are disclosed in JP-A-2001-350022, the disclosure of which is incorporated herein by reference.

Figure 20:
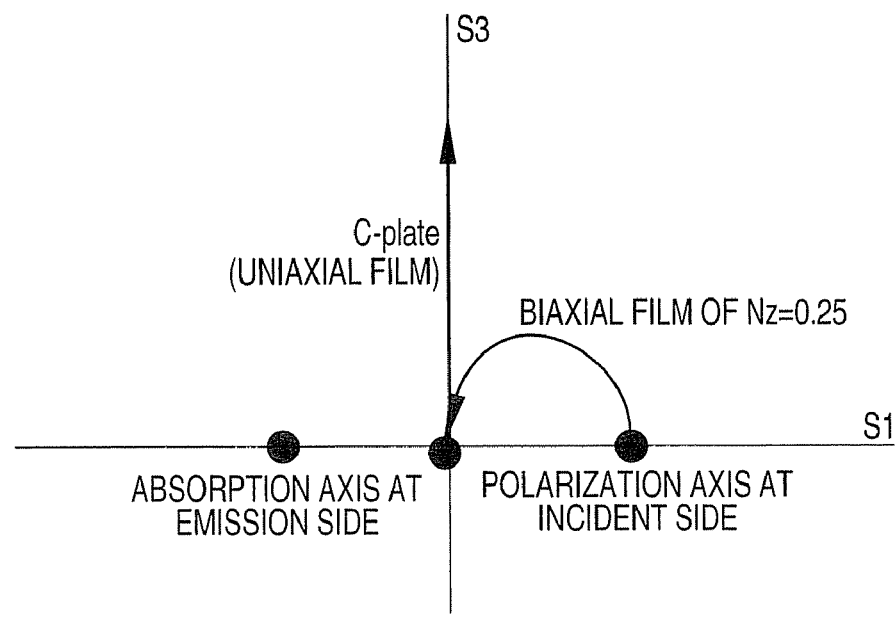
FIG. 20 is a view showing that a locus of a polarization state of light incident into a liquid crystal display is plotted on a Poincare sphere according to an exemplary embodiment of the invention.

In addition, in the above two aspects, a uniaxial retardation layer may be interposed between the retardation layer and the liquid crystal panel. The bilateral symmetry is also obtained in a configuration where an optical axis of the uniaxial retardation layer is disposed perpendicular to the layer. A locus of polarizing state on the Poincare sphere in this aspect is shown in FIG. 20. FIG. 20 shows a polarizing state when a λ/2 plate having an Nz value of 0.25 is used as the biaxial retardation layer and C-plates having the same optical characteristic are interposed between an upper polarizing plate and the liquid crystal panel and between a lower polarizing plate and the liquid crystal panel, respectively. As shown in the figure, in this aspect, the double symmetry of the liquid crystal panel is not collapsed. Accordingly, it is understood that the bilateral symmetry characteristic is obtained for the above described reason. The retardation of the used C-plate is random. The bilateral symmetry is obtained at any retardation values. In order to cancel the retardation of the liquid crystal layer, Rth is, preferably, 0 to 300 nm, more preferably, 0 to 200 nm, particularly preferably, 0 to 100 nm. Details of the C-plate used in this aspect are disclosed in JP-A-62-210423, the disclosure of which is incorporated herein by reference.

Figure 21:
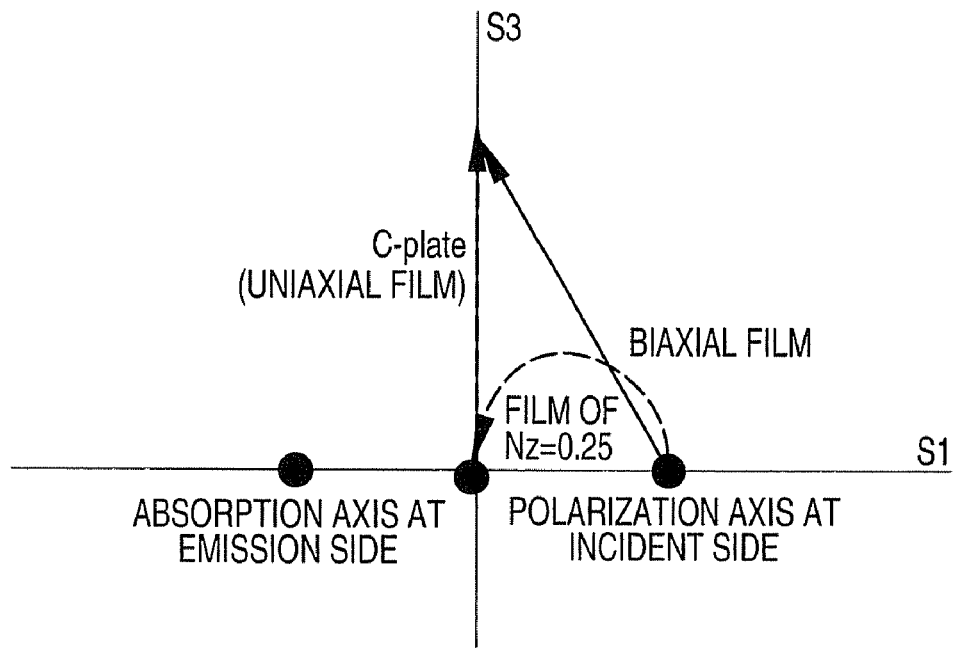
FIG. 21 is a view showing that a locus of a polarization state of light incident into a liquid crystal display is plotted on a Poincare sphere according to an exemplary embodiment of the invention.

According to still another aspect of the invention, there is provided a liquid crystal display in which a transparent layer, which is interposed at least between the liquid crystal layer and the polarizer, of transparent layers of the pair of polarizing plates has a biaxial retardation function, and an in-plane retardation axis of the transparent layer is in parallel to a transmission axis of the polarizer arranged closer to the retardation layer. A locus of polarizing state on the Poincare sphere in this aspect is shown in FIG. 21. In this aspect, by using a film having the biaxial retardation function (sometimes referred to as "biaxial film"), change of the polarizing state as shown in FIG. 21 is possible. More specifically, a biaxial film by which the polarizing state can be changed on a line of S1=0 in the figure is used. In this aspect, it is understood that the bilateral symmetry can be obtained. The in-plane retardation axis of the biaxial film is in parallel to the transmission axis of the adjacent polarizer. An example of the biaxial film may include, preferably, a film having thickness direction retardation of 70 to 400 nm and in-plane retardation of 20 to 80 nm, more preferably, a film having thickness direction retardation of 100 to 300 nm and in-plane retardation of 20 to 70 nm, particularly preferably, a film having thickness direction retardation of 110 to 280 nm and in-plane retardation of 30 to 70 nm, for a wavelength of 550 nm.

Figure 22:
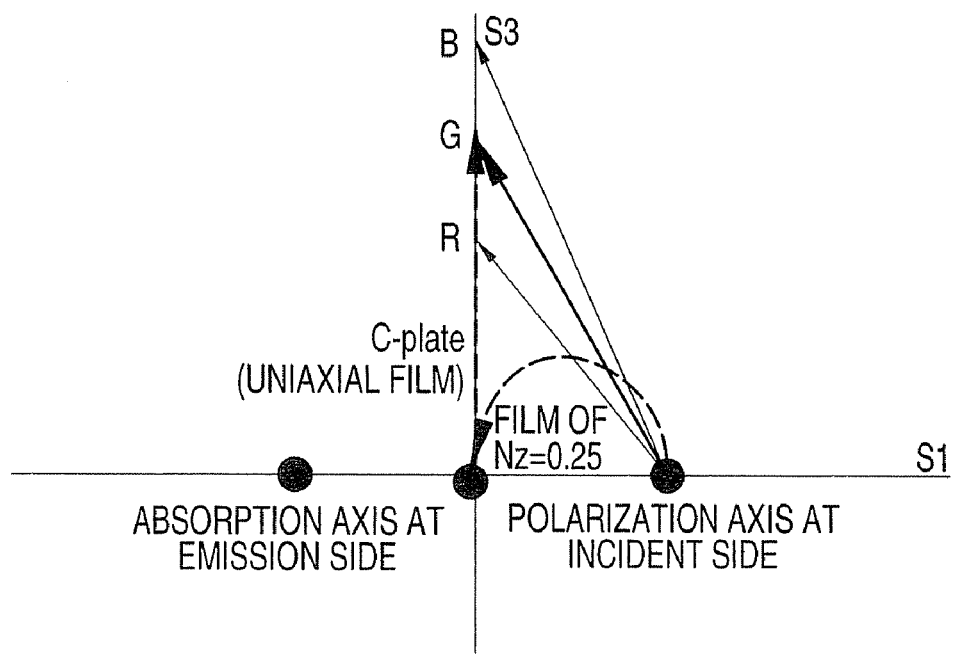
FIG. 22 is a view showing that a locus of a polarization state of light incident into a liquid crystal display is plotted on a Poincare sphere according to an exemplary embodiment of the invention.

According to still another aspect of the invention, a transparent layer, which is interposed at least between the liquid crystal layer and the polarizer, of transparent layers of the pair of polarizing plates has a wavelength dispersion characteristic. More specifically, assuming that the in-plane retardation of the transparent layer is Re and the thickness direction retardation is Rth, Re/Rth for a wavelength λ of 450 nm in a visible light region is 0.4 to 0.95 times Re/Rth for a wavelength λ of 550 nm, and Re/Rth for a wavelength λ of 650 nm is 1.05 to 1.9 tunes Re/Rth for a wavelength λ of 550 nm. FIG. 22 shows a locus of the polarizing state on the Poincare sphere in this aspect. As can be seen from the figure, the biaxial film used as the transparent layer has wavelength dispersion adjusted for any light of R, G and B wavelengths. That is, the polarizing state moves to the line of S1=0 for any light of R, G and B wavelengths. In this aspect, it is understood that the completely bilateral symmetry is obtained for any of R, G and B wavelengths in the visible light region.

In any of the above aspects, the liquid crystal panel includes the pair of optically anisotropic layers with the liquid crystal layer interposed therebetween. For example, if the liquid crystal layer has a TN mode, it is preferable that alignment of the pair of optically anisotropic layers of the liquid crystal panel is controlled by the alignment axis and the pair of optically anisotropic layers is a layer containing a liquid crystal compound with the alignment state fixed. In this aspect, it is preferable that an intersection angle between the alignment control direction of the optically anisotropic layers defined by the alignment axis such as a rubbing axis and at least one of alignment control directions of the liquid crystal layer falls within a range of 0° to 10°. Particularly, a TN mode liquid crystal layer can be optically effectively compensated within this range.

According to still another aspect of the invention, the liquid crystal panel includes the pair of optically anisotropic layers (a pair of first optically anisotropic layers) and a pair of second optically anisotropic layers. In this aspect, it is expected to obtain a preferred effect of suppressing color jump in a halftone, which may occur due to intersection of absorption axes of the pair of polarizing plates in a 0-90° direction. In this aspect, the liquid crystal layer is interposed between the pair of first optically anisotropic layers, and the pair of second optically anisotropic layers is arranged with the pair of first optically anisotropic layers interposed therebetween. It is preferable that alignment of the pairs of first and second optically anisotropic layers is controlled by the alignment axis such as the rubbing axis and the pairs of first and second optically anisotropic layers are a layer containing a liquid crystal compound with the alignment state fixed. In order to obtain the preferred effect of suppressing the color jump in the halftone, it is preferable that an intersection angle between the alignment control direction of the first optically anisotropic layers and at least one of alignment control directions of the liquid crystal layer falls within a range of 0° to 10° and an intersection angle between the alignment control direction of the second optically anisotropic layers and at least one of alignment control directions of the liquid crystal layer is about 45°.

Figure 14:
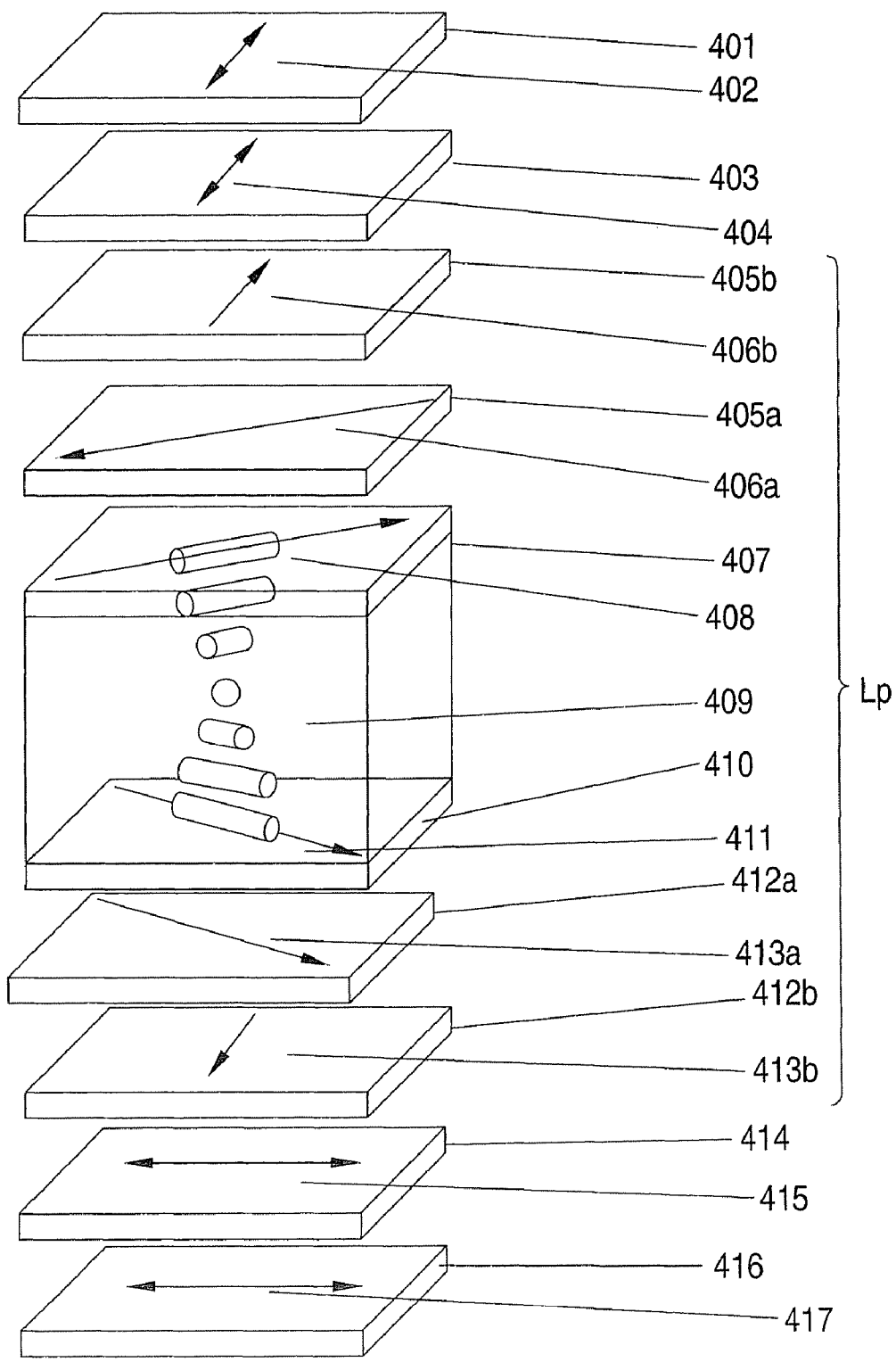
FIG. 14 is a schematic view showing an example of a liquid crystal display according to an exemplary embodiment of the invention.

FIG. 14 shows an example of a configuration of the liquid crystal display of the invention. This example is merely used to explain the effect of the invention, and the invention is not limited to this example. Here, using nematic liquid crystals having positive dielectric anisotropy as field effect liquid crystals, a TFT (active) driving will be described by way of an example.

The TN mode liquid crystal display shown in FIG. 14 comprises a liquid crystal cell having an upper substrate 407, a lower substrate 410, and a liquid crystal layer having liquid crystal molecules 409 interposed between these substrates. Alignment films (not shown) are formed on surfaces of the substrates 407 and 410 contacting the liquid crystal molecules 409 (hereinafter, these surfaces are sometimes referred to as "inner surfaces"), and alignment of the liquid crystal molecules 409 under application of no voltage or application of a low voltage is controlled by a rubbing treatment to which the alignment films are subjected. In addition, transparent electrodes (not shown) that apply a voltage to the liquid crystal layer having the liquid crystal molecules 409 are formed on the inner surfaces of the substrates 407 and 410. In addition, a pair of first upper and lower optically anisotropic layers 405a and 412a and a pair of second upper and lower optically anisotropic layers 405b and 412b are disposed with the liquid crystal cell interposed therebetween. In the liquid crystal display shown in FIG. 14, a liquid crystal panel Lp is constituted by the liquid crystal cell, the pair of first upper and lower optically anisotropic layers 405a and 412a and the pair of second upper and lower optically anisotropic layers 405b and 412b. In addition, a pair of upper and lower polarizers 401 and 416 is disposed with the liquid crystal panel Lp interposed therebetween. Absorption axes 402 and 417 of the polarizers 401 and 416 have 90° (perpendicular) and 0° (parallel) with respect to a horizontal direction of a screen, thereby reducing light leakage out of circumferences of the polarizers, which occurs due to contraction of the polarizers under severe use environments.

The first upper and lower optically anisotropic layers 405a and 412a and the second upper and lower optically anisotropic layers 405b and 412b included in the liquid crystal panel Lp are formed of a composition containing a liquid crystal compound, and molecules of the liquid crystal compound in the layers are fixedly aligned in the alignment control directions defined by the alignment axis such as the rubbing axis. An intersection angle between the alignment control directions 406a and 413a of the first optically anisotropic layers and at least one of the alignment control directions 408 and 411 of the liquid crystal layer falls within a range of 0° to 10° (preferably 0°) and an intersection angle between the alignment control directions 406b and 413b of the second optically anisotropic layers and one of the alignment control directions 408 and 411 of the liquid crystal layer is about 45°. It is preferable that an intersection angle between the alignment control direction s of the optically anisotropic layers and the alignment control directions defined by a plane opposite the substrate disposed closer to the optically anisotropic layers falls with the above range (for example, an intersection angle between alignment control directions of the optically anisotropic layers 405a and 405b and alignment control directions of the liquid crystal layer defined by the alignment axis 408 such as the rubbing axis formed on the plane opposite to the substrate 407 falls within the above range, and an intersection angle between alignment control directions of the optically anisotropic layers 412a and 412b and alignment control directions of the liquid crystal layer defined by the alignment axis 411 such as the rubbing axis formed on the plane opposite to the substrate 410 falls within the above range). An alignment control direction of an optically anisotropic layer refers to an average alignment direction of a molecule symmetrical axis of molecules in the optically anisotropic layer. In general, the alignment control direction is defined by a direction of rubbing treatment to which an alignment film used when the optically anisotropic layer is formed is subjected.

In addition, in the invention, it is preferable that the first optically anisotropic layer and the second optically anisotropic layer disposed as necessary are layers formed by fixing a liquid crystal composition containing a discotic liquid crystal compound in a hybrid alignment state.

It is here important that the liquid crystal panel Lp (interposed between the pair of second optically anisotropic layers in FIG. 14) has the double symmetrical axis in parallel to the surface of the substrate. One of the pair of polarizing plates with the liquid crystal panel Lp interposed therebetween is the upper polarizing plate including the polarizer 401 and the transparent layer 403, and the other is the polarizing plate including the polarizer 416 and the transparent layer 414. The absorption axes 402 and 417 of the polarizing plates are in parallel or perpendicular to the double symmetrical axis of the liquid crystal panel. With this configuration, the bilateral symmetry is obtained. In addition, in this aspect, by controlling the polarizing state of light incident from the outside of the upper and lower polarizing plates using optical characteristics of the transparent layers 403 and 414 according to the methods shown in FIGS. 19 to 22, a symmetry characteristic is also obtained in an inclined right upper 45° direction and an inclined left upper 45° direction. For example, polarization after polarized light incident from the outside in the inclined right upper 45° direction of the upper polarizing plate passes the transparent layer 403 and polarization of light incident in the upper front direction of the upper polarizing plate have the same elliptical polarizing state as in the long side direction of the polarization. Similarly, polarization after polarized light incident from the outside in the inclined left lower 45° direction of the lower polarizing plate passes the transparent layer 414 and polarization of light incident in the lower front direction of the lower polarizing plate have the same elliptical polarizing state as in the long side direction of the polarization. In this manner, the pair of polarizing plates is perpendicular to an elliptical polarizing axis in inclined upper and lower directions as well as the right and left directions, thereby obtaining symmetry in all of the inclined upper and lower directions and the right and left directions.

Figure 15:
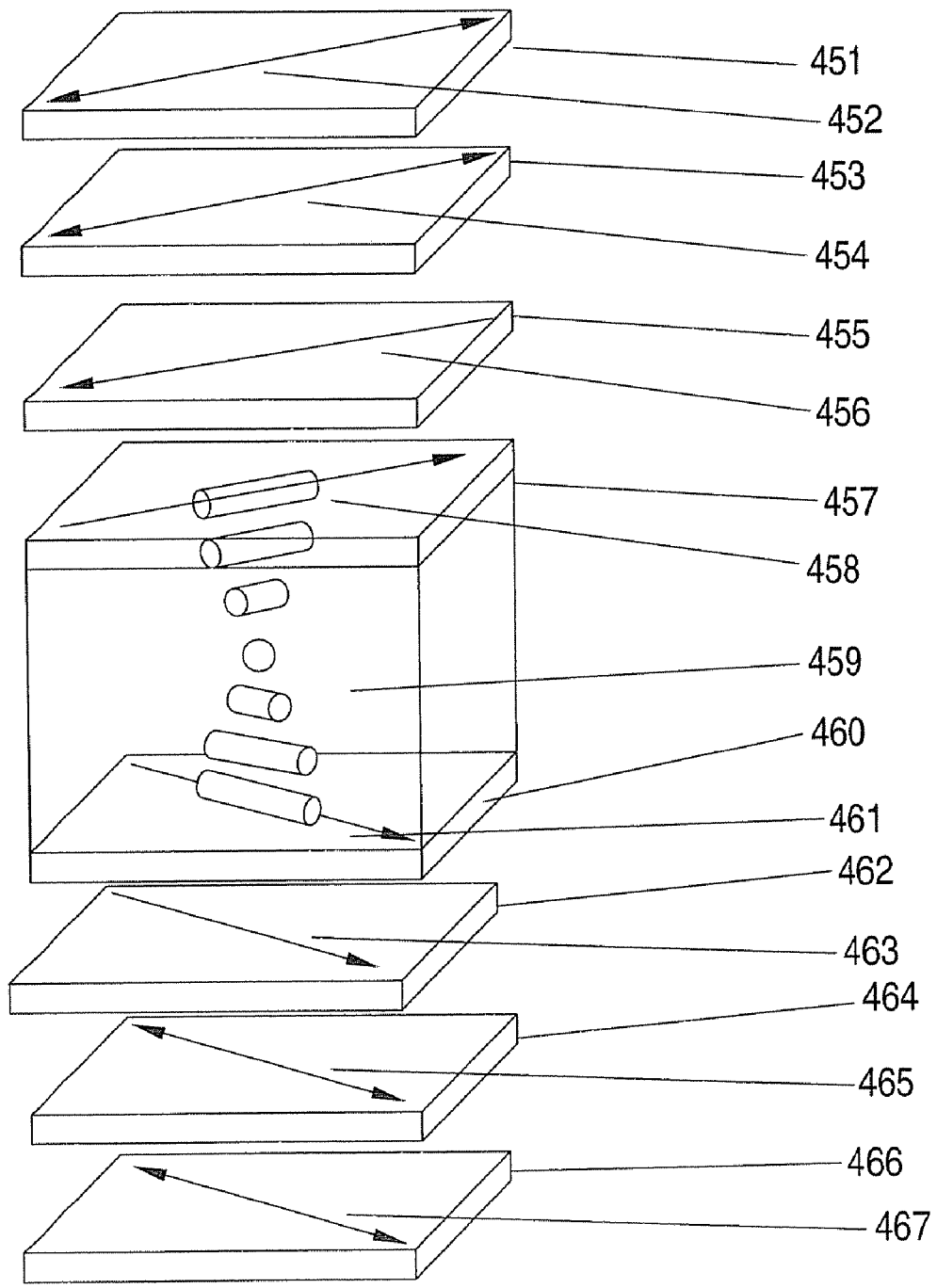
FIG. 15 is a schematic view showing an example of a liquid crystal display in the background art.
Figure 16:
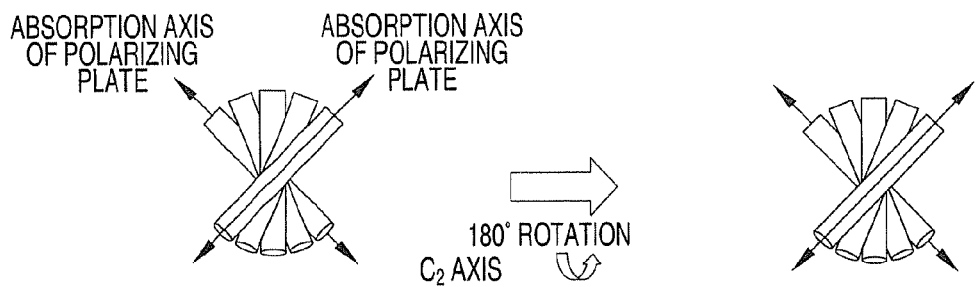
FIG. 16 is a schematic view used to explain double symmetry of a liquid crystal panel.

The TN mode liquid crystal display shown in FIG. 14 has the same operation principle as the conventional liquid crystal display shown in FIG. 15. Hereinafter, an example of a configuration of a TN mode liquid crystal cell usable for the liquid crystal display shown in FIG. 14 will be described. A liquid crystal cell is manufactured by rubbing and aligning liquid crystals having positive dielectric anisotropy, anisotropic refractive index $\Delta n=0.0854$ (589 nm, 20° C.), and $\Delta \in =+8.5$, and is disposed between the upper and lower substrates 407 and 410. The alignment of the liquid crystal layer is controlled by the alignment film and the rubbing treatment. A director, a so-called tilt angle, indicating the alignment direction of the liquid crystal molecules is set to falls within a range of, preferably, about 0.1° to 10°. In this embodiment, the director is set to be 3°. The rubbing treatment is performed in a direction perpendicular to the upper and lower substrates, and the size of the tilt angle can be controlled by rubbing strength and number. The alignment films are formed by applying and firing a polyimide film. The size of a twist angle of the liquid crystal layer is defined by an intersection angle in a rubbing direction between the upper and lower substrates and a chiral agent added to liquid crystal material. In this embodiment, a chiral agent having a pitch of 60 μm or so is added so that the twist angle is about 90°. The thickness d of the liquid crystal layer is set to be 5 μm.

In addition, liquid crystal material LC is not particularly limited as long as it is nematic liquid crystal. As dielectric anisotropy Δ∈ increases, the driving voltage can be further reduced. As refractive index anisotropy Δn decreases, the thickness (gap) of the liquid crystal layer can be further thickened, thereby shortening time taken to inject and seal liquid crystals and reducing unbalance of the gap. In addition, as Δn increases, a cell gap can be further decreased, thereby allowing a higher speed response. In general, Δn is set to fall within a range of 0.04 to 0.28, the cell gap is set to fall within a range of 1 to 10 μm, and the product of Δn and d is set to fall within a range of 0.25 to 0.55 μm.

In FIG. 14, the transparent layer 403 and 414 disposed closer to the liquid crystal cell of the upper and lower polarizing plates may be also used as protective films of the polarizers 401 and 416. Of course, films to protect the polarizers 401 and 416 may be interposed between the transparent layer 403 and 414. Although protective films are typically disposed on both of surfaces of the polarizers formed of polarizers such as polyvinylalcohol film or the like, an outer protective film is not shown in FIG. 14. In addition, the upper and lower polarizing plates may be integrally stacked with the second optically anisotropic layers 405b and 412b and with the first optically anisotropic layers 405a and 412a, and the stacked structure thereof may be assembled into the liquid crystal display. In this aspect, the transparent layers may be also used as supports of the protective layers of the polarizers and the optically anisotropic layers. In the liquid crystal display of the invention, the support of the first optically anisotropic layer (or the second optically anisotropic layer if any) may be also used as a protective film of one of the polarizers. That is, an integrated elliptical polarizing plate including the transparent protective film, the polarizer, the transparent protective film (used as a transparent layer having particular optical characteristic and a transparent support of the optically anisotropic layer), and the optically anisotropic layer in order may be used. Since this integrated elliptical polarizing plate has the optically anisotropic layer having an optical compensation function, when the integrated elliptical polarizing plate is used, it is possible to compensate the liquid crystal display precisely with a simple configuration.

Although the TN mode liquid crystal display is shown in FIG. 14, the liquid crystal display of the invention may be any of a VA mode, an IPS mode, an OCB mode and an ECB mode, in addition to the TN mode. In addition, when the liquid crystal display employs a multi domain structure in which one pixel is divided into a plurality of regions, vertical and horizontal viewing angle characteristics are averaged, thereby improving display quality.

The liquid crystal display of the invention is not limited to the configuration shown in FIG. 14, but may include other members. For example, a color filter may be interposed between the liquid crystal cell and the polarizer. In addition, in case of a transmission type liquid crystal display, a backlight unit having a light source such as a cold cathode or hot cathode fluorescent tube, a light emitting diode, a field emission device, or an electroluminescence device may be disposed behind the liquid crystal cell. In addition, the liquid crystal display of the invention may be of a reflection type. In this case, only one polarizing plate may be disposed at an observation side, and a reflecting film is disposed behind the liquid crystal cell or at an inner side of the lower substrate of the liquid crystal cell. Of course, a front light unit using the light source may be provided at a liquid crystal cell observation side. In addition, in order to make transmission and reflection mode of the liquid crystal display compatible with each other, the liquid crystal display may be of semi-transmission type including a reflection part and a transmission part in one pixel of the display device.

In addition, in order to increase emission efficiency of the backlight, a prism-shaped or lens-shaped condensation type luminance enhancement sheet (film) is stacked, or a polarization reflection type luminance enhancement sheet (film) to decrease light loss due to absorption by the polarizing plate may be stacked between the backlight and the liquid crystal cell. In addition, a diffusion sheet (film) to make light emitted from the backlight uniform may be stacked, or a sheet (film) formed by printing a reflection and diffusion pattern to obtain a uniform in-plane light distribution may be stacked.

The liquid crystal display of the invention includes image direct-view type, image projection type and light modulation type display devices. The invention is particularly effective for an active matrix liquid crystal display using three or two terminal semiconductor devices such as TFT or MIM. Of course, the invention is also effective for a passive matrix liquid crystal display represented by a STN type which is called a time division driving.

According to still another aspect (V-1), the invention provides a liquid crystal display comprising a pair of first and second substrates disposed opposite to each other, at least one of which has a transparent electrode; a liquid crystal layer interposed between the pair of first and second substrates, wherein liquid crystal molecules are aligned in substantial parallel to surfaces of the first and second opposite substrates under application of no voltage and a twist angle between the first and second opposite substrates is 45° or less; a pair of first and second polarizers having absorption axes perpendicular to each other, with the liquid crystal layer interposed between the pair of first and second polarizers; at least one first retardation layer interposed between the first polarizer and the liquid crystal layer and/or between the second polarizer and the liquid crystal layer; and a second retardation layer interposed between the first polarizer and the liquid crystal layer and including at least one kind of compound having a discotic structural unit, wherein the summation of in-plane retardation Re(550) of the at least one first retardation layer for a wavelength of 550 nm and the summation of thickness direction retardation Rth(550) for the same wavelength satisfy the following conditions.

$$0 \text{ nm} < Re(550) < 70 \text{ nm}$$

$$0 \text{ nm} < Rth(550) < 330 \text{ nm}.$$

According to still another aspect (V-2), the invention provides a liquid crystal display comprising a pair of first and second substrates disposed opposite to each other, at least one of which has a transparent electrode; a liquid crystal layer interposed between the pair of first and second substrates, wherein liquid crystal molecules are aligned in substantial parallel to surfaces of the first and second opposite substrates under application of no voltage and a twist angle between the first and second opposite substrates is 45° or less; a pair of first and second polarizers having absorption axes perpendicular to each other, with the liquid crystal layer interposed between the pair of first and second polarizers; at least one first retardation layer interposed between the first polarizer and the liquid crystal layer and/or between the second polarizer and the liquid crystal layer; and a pair of second retardation layers interposed between the pair of first and second polarizers and the liquid crystal layer, respectively, and each second retardation layer including at least one kind of compound having a discotic structural unit, wherein the summation of in-plane retardation Re(550) of the at least one first retardation layer for a wavelength of 550 nm and the summation of thickness direction retardation Rth(550) for the same wavelength satisfy the following conditions.

$$0\ nm < Re(550) < 70\ nm$$

$$0\ nm < Rth(550) < 200\ nm.$$

According to the above preferred aspect of the invention, a viewing angle as well as display quality of a homogeneous ECB type liquid crystal display can be significantly improved. That is, the invention can provide a liquid crystal display, particularly a homogeneous ECB type liquid crystal display, with remarkable improvement of display quality and a viewing angle over conventional liquid crystal displays, with no complicated structure and little change of conventional structures.

Hereinafter, a liquid crystal display according to this aspect will be described in detail.

Figure 25:
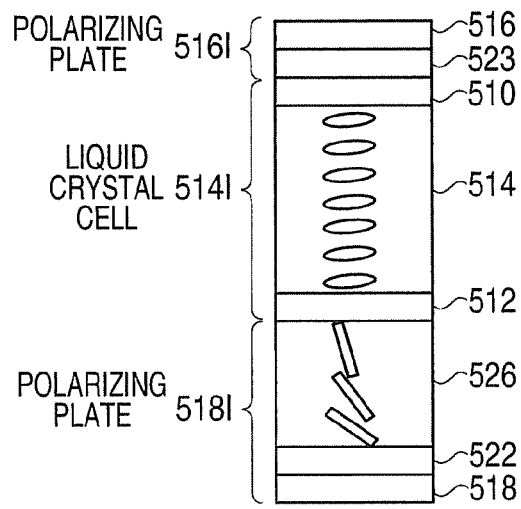
FIG. 25 is a schematic sectional view showing an exemplary configuration of a liquid crystal display according to an exemplary embodiment of the invention.

FIG. 25 is a schematic sectional view showing an exemplary configuration of a liquid crystal display according to a first aspect of the invention. A liquid crystal display shown in FIG. 25 comprises transparent substrates 510 and 512, a homogeneous ECB liquid crystal layer 514 interposed between the transparent substrates 510 and 512, and polarizers 516 and 518 formed of polarizers having absorption axes arranged perpendicular to each other. A retardation plate (first retardation layer) 522 is interposed between the liquid crystal layer 514 and the polarizer 518, and an optical compensation film (second retardation layer) 526 containing a compound of a discotic structural unit is interposed between the retardation plate 522 and the transparent substrate 512.

An alignment film (not shown) and an electrode film (not shown) are formed at inner surfaces of the upper transparent substrate 510 and the lower transparent substrate 512. Liquid crystal molecules in the homogeneous ECB liquid crystal layer 514 are aligned in substantial parallel to a substrate surface under application of no voltage, and a twist angle between the substrates depends on a direction of rubbing treatment to which the alignment film is subjected. The direction of rubbing treatment to which the alignment film formed at the inner surfaces of the substrates 510 and 512 is subjected is, preferably, 45° or less, more preferably, in substantial parallel (±10°). With this range, a substantial parallel alignment (having a twist angle of less than 45°) without a twist structure can be obtained. The electrode film has a function of applying a voltage to the liquid crystal molecules in the liquid crystal layer 514. The electrode film is typically transparent and is made of, for example, indium tin oxide (ITO). Liquid crystals injected and sealed between the upper and lower substrates 510 and 512 have positive dielectric anisotropy $\Delta \in$ and, generally, refractive anisotropy of $\Delta n = 0.06 \sim 0.1$ (589 nm, 20° C.). The thickness d of the liquid crystal layer is 2.5~5 μm. Here, the brightness of white image display is varied depending on the product ($\Delta n \cdot d$) of the thickness d and the refractive index anisotropy $\Delta n$. The effect of the invention is remarkable in a range of 200 nm $\leq \Delta n \cdot d \leq$ 400 nm. It is preferable that the product $\Delta n \cdot d$ is 260 nm~320 nm.

The polarizers 516 and 518 have a perpendicular Nicol arrangement in which an intersection angle between absorption axes of the polarizers 516 and 518 is about 90°. In addition, the absorption axis of the polarizer 516 intersects an alignment direction of liquid crystal molecules (generally, a rubbing direction of the alignment film formed at the inner surface of the transparent substrate 510) positioned near the transparent substrate 510 closer to the polarizer 516 by about 45°, and the absorption axis of the polarizer 518 intersects an alignment direction of liquid crystal molecules (generally, a rubbing direction of the alignment film formed at the inner surface of the transparent substrate 512) positioned near the transparent substrate 512 closer to the polarizer 518 by about 45° (35 to 55°). Although the polarizers 516 and 518 generally include, on their both surfaces, protective films formed of a celluloseacylate film to protect the polarizers, protective films to protect outer surfaces of the polarizers are not shown in FIG. 25.

The retardation plate 522 as the first retardation layer has an optical characteristic satisfying the following relationship.

$$0\ nm < Re(550) < 70\ nm$$

$$0\ nm < Rth(550) < 330\ nm$$

In this aspect, when the retardation plate 522 having the optical characteristic is assembled into the liquid crystal display, a viewing angle characteristic, particularly a vertical viewing angle characteristic, is improved. In this aspect, it is preferable that the retardation plate 522 satisfies a condition of Rth (550 nm)$\geq$−200 nm. In addition, it is preferable that the retardation plate 522 satisfies a condition of 100 nm<Rth (550)$\leq$230 nm from a standpoint of ease manufacture or practical use.

In addition, in FIG. 25, a polarizer protective layer 523 has little effect on retardation of incident light, and is formed of, for example, a low retardation celluloseacylate film, which is disclosed in JP-A-2006-30937.

Figure 26:
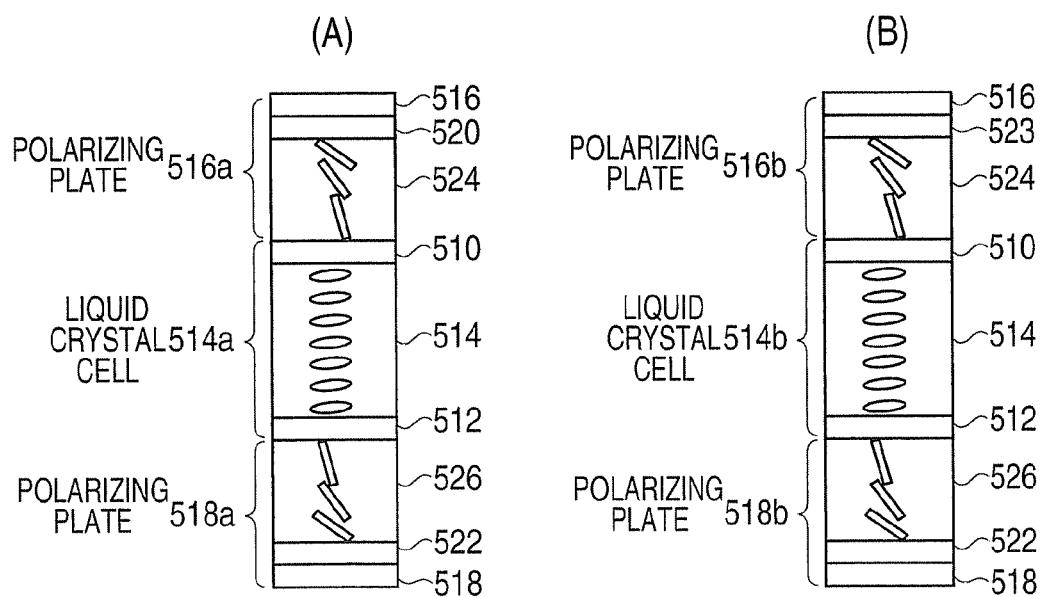
FIG. 26 is a schematic sectional view showing an exemplary configuration of a liquid crystal display according to an exemplary embodiment of the invention.
Figure 27:
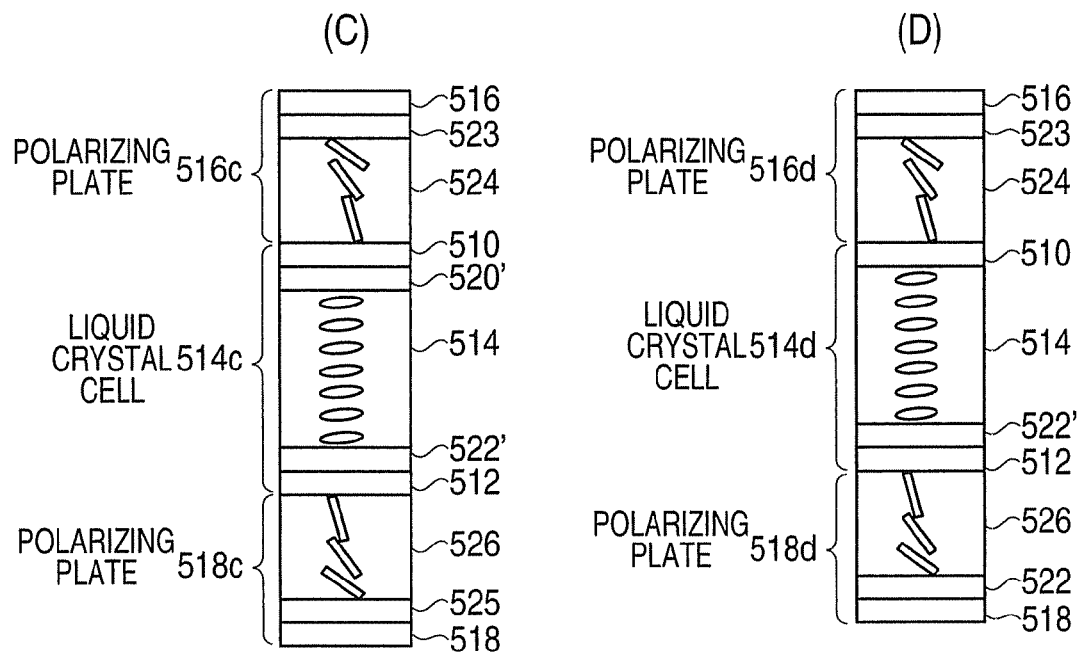
FIG. 27 is a schematic sectional view showing an exemplary configuration of a liquid crystal display according to an exemplary embodiment of the invention.
Figure 28:
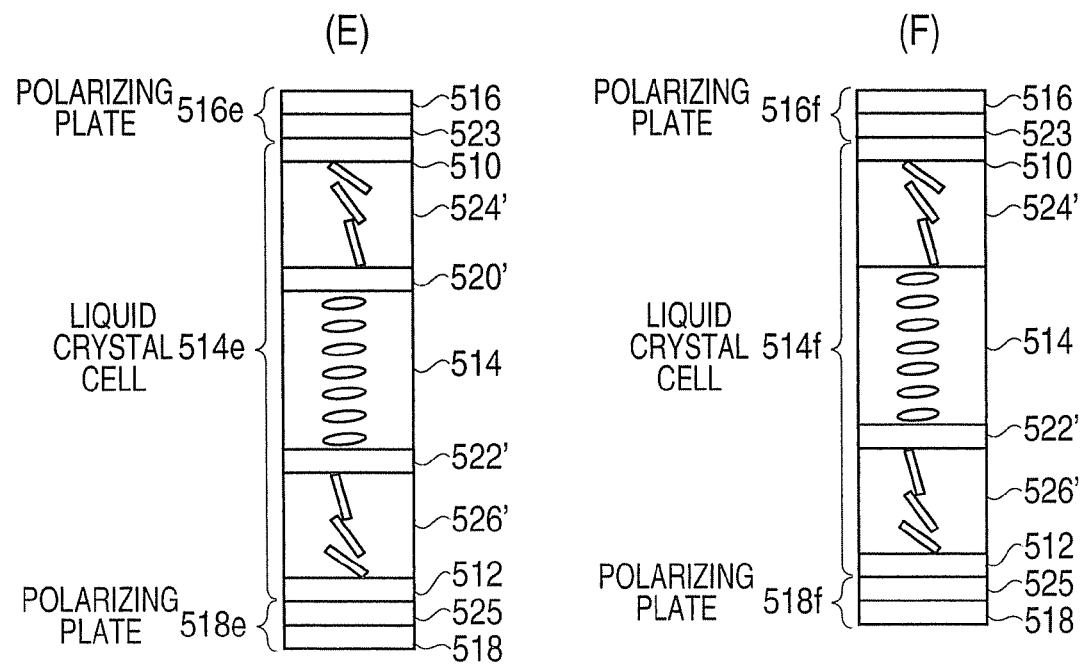
FIG. 28 is a schematic sectional view showing an exemplary configuration of a liquid crystal display according to an exemplary embodiment of the invention.

In the liquid crystal display shown in FIG. 25, the second retardation layer 526 as the optical compensation layer containing a compound having a discotic structural unit is interposed between the polarizer 518 and the liquid crystal layer 514. When the second retardation layer 526 is placed, transmittance in black image display can be further reduced, thereby displaying an image with a wider viewing angle and higher contrast. In an ECB mode liquid crystal cell, in general, retardation remains since rising of liquid crystal molecules located near the cell substrate is not sufficient under application of a voltage (in black image display). The second retardation layer 526 cancels the remaining retardation. Accordingly, for example, when a driving voltage is increased to suppress the remaining retardation, the second retardation layer may be removed or may be an expansible polymer film made of a material other than the compound having the discotic structural unit or an optical compensation film using alignment of bar-like liquid crystal molecules as long as they have the same operation. In addition, when the second retardation layer to cancel the remaining retardation is manufactured using alignment of a compound having a discotic structural unit, it is preferable that an alignment control direction of molecules of the compound having the discotic structural unit is in substantial parallel to an alignment direction of liquid crystal molecules at a boarder of the transparent substrate. In general, the alignment control direction can be controlled by a rubbing treatment direction of an alignment film used to manufacture an optical compensation film or the like. The second retardation layer may be interposed between one of the pair of polarizers and the liquid crystal layer, as shown in FIG. 25 (the optical compensation film 526 in FIG. 25), or may be interposed between both of the pair of polarizers and the liquid crystal layer, respectively, as shown in FIGS. 26 to 28 (the optical compensation films 524 and 526 in FIGS. 26 to 28). In addition, the arrangement of the first and second retardation layers is not particularly limited. For example, the second and first retardation layers may be arranged in order from a side closer to the liquid crystal layer, or the first and second retardation layers may be arranged in order from a side closer to the liquid crystal layer.

In the liquid crystal display of the invention, since the first retardation layer may be also used as a protective film or a transparent support of one of the polarizers, for example, an integrated polarizing plate including a protective film, a polarizer and the first retardation layer (also used as a protective film or a transparent support) in order may be used. In addition, the first retardation layer may be not only used as a protective film or a transparent support of one of the polarizers, but also used as a support of the second retardation layer. For example, an integrated polarizing plate including a protective film, a polarizer, the first retardation layer (also used as a polarizer protective film or a support of the second retardation layer), and the second retardation in order may be used. These integrated polarizing plates not only have a polarizing function but also contribute to extension of a viewing angle and reduction of display spots. In addition, since these integrated polarizing plates have a retardation layer having an optical compensation function, the liquid crystal display can be optically compensated with a simple configuration. When the latter integrated polarizing plate is assembled into the liquid crystal display, it is preferable that a protective film, a polarizer, the first retardation layer (also used as a protective film or a transparent support, and a support of the second retardation layer), and the second retardation are arranged in order from the outside of the device (a side far way from a liquid crystal cell). The liquid crystal display shown in FIG. 25 may be manufactured by, for example, attaching the latter integrated polarizing plate as a lower polarizing plate 518I to a liquid crystal cell 514I).

FIGS. 26A and 26B show an example of a configuration of a liquid crystal display according to a second aspect of the invention. In FIGS. 26A and 26B, the same members as in FIG. 25 are denoted by the same reference numerals, and detailed explanation thereof will be omitted. The liquid crystal display shown in FIGS. 26A and 26B comprises transparent substrates 510 and 512, a homogeneous ECB liquid crystal layer 514 interposed between the transparent substrates 510 and 512, and polarizers 516 and 518 formed of polarizers having absorption axes arranged perpendicular to each other. In the liquid crystal display shown in FIGS. 26A and 26B, a retardation plate (first retardation layer) 522 is interposed between the liquid crystal layer 514 and the polarizer 518, and in the liquid crystal display shown in FIG. 26A, a retardation plate (first retardation layer) 520 is interposed between the liquid crystal layer 514 and the polarizer 516. In addition, in the liquid crystal display shown in FIGS. 26A and 26B, optical compensation films (second retardation layers) 524 and 526 containing a compound of a discotic structural unit is interposed between the retardation plate 520 and the transparent substrate 510 and between the retardation plate 522 and the transparent substrate 512, respectively. The optical compensation films (second retardation layers) 524 and 526 containing a compound of a discotic structural unit have the same function as the optical compensation film 526 shown in FIG. 25.

In the liquid crystal display shown in FIG. 26A, for the retardation plates 522 and 520 as the first retardation layer, the summation of in-plane retardation Re(550) of a wavelength of 550 nm and the summation of thickness direction retardation Rth(550) of the same wavelength satisfy the following condition, and, in the liquid crystal display shown in FIG. 26B, for the retardation plate 522 as the first retardation layer, the in-plane retardation Re(550) of a wavelength of 550 nm and the thickness direction retardation Rth(550) of the same wavelength satisfy the following condition.

0 nm<$Re$(550)<70 nm 0 nm<$Rth$(550)<330 nm

When the retardation plates 520 and 522 whose overall optical characteristic satisfies the above relationship are assembled into in the liquid crystal display shown in FIG. 26A, and when the retardation plate 522 whose optical characteristic satisfies the above relationship is assembled into in the liquid crystal display shown in FIG. 26B, a viewing angle characteristic, particularly a vertical viewing angle characteristic, is improved. In this aspect, it is preferable that the summation of the thickness direction retardation Rth(550) for the wavelength of 550 nm of at least one of the first retardation layers satisfies the condition of 70 nm<$Rth$(550)<130 nm.

As described above, in the liquid crystal display shown in FIGS. 26A and 26B, the support of the optical compensation film 524 or 526 containing the compound having the discotic structural unit may be also used as the polarizer protective layer 523 or the retardation plate 520 or 522. In this case, an integrated polarizing plate including the protective film, the polarizer, the support of the second retardation layer (also used as the protective film of the polarizer or the first retardation layer), and the second retardation layer in order may be used as an upper polarizing plate 516 or 516b and a lower polarizing plate 518a or 518b.

FIGS. 27C and 27D show another example of the liquid crystal display of the invention. In FIGS. 27C and 27D, the same members as in FIGS. 25 and 26 are denoted by the same reference numerals, and detailed explanation thereof will be omitted. In the liquid crystal display shown in FIG. 27C, the retardation plates 520 and 522 arranged at the outside of the liquid crystal cell 514a in the liquid crystal display shown in FIG. 26A are arranged as retardation layers 520' and 522' at an inner side of a liquid crystal cell 514c, and in the liquid crystal display shown in FIG. 27D, the retardation plate 522 arranged at the outside of the liquid crystal cell 514b in the liquid crystal display shown in FIG. 26B is arranged as a retardation layer 522' at an inner side of a liquid crystal cell 514d. The liquid crystal displays shown in FIGS. 27C and 27D have the same effect as the liquid crystal displays shown in FIGS. 26A and 26B. In addition, in the liquid crystal displays shown in FIGS. 27C and 27D, since the first retardation layer having the optical compensation function is disposed at an inner side of the substrate of the liquid crystal, that is, a position closer to the liquid crystal layer, the liquid crystal layer can be optically compensated more precisely, thereby obtaining better image display.

The liquid crystal cells 514a and 514c of the liquid crystal displays shown in FIGS. 27C and 27D may be manufactured by preparing a cell substrate manufactured by forming the first retardation layer on a surface of a transparent substrate made of, for example, glass, as one or both of a pair of substrates, with the first retardation layer arranged at inner sides of the substrates, and injecting and sealing liquid crystal material between the substrates.

FIGS. 27C and 27D show still another example of the liquid crystal display of the invention. In FIGS. 28E and 28F, the same members as in FIGS. 25 to 27 are denoted by the same reference numerals, and detailed explanation thereof will be omitted. In the liquid crystal display shown in FIG. 28E, the retardation plates 524 and 526 that contain the compound having the discotic structural unit and arranged at the outside of the liquid crystal cell 514c in the liquid crystal display shown in FIG. 27C are arranged as retardation layers 524" and 526' at an inner side of a liquid crystal cell 514e, and in the liquid crystal display shown in FIG. 28F, the retardation plates 524 and 526 that contain the compound having the discotic structural unit and arranged at the outside of the liquid crystal cell 514d in the liquid crystal display shown in FIG. 27D is arranged as retardation layers 524' and 526' at an inner side of a liquid crystal cell 514f. The liquid crystal displays shown in FIGS. 28E and 28F have the same effect as the liquid crystal displays shown in FIGS. 27C and 27D. In addition, in the liquid crystal displays shown in FIGS. 28E and 28F, since the second retardation layer that contributes to cancellation of the remaining retardation is disposed at an inner side of the substrate of the liquid crystal, that is, a position closer to the liquid crystal layer, transmittance in black image display of the liquid crystal layer can be further reduced, thereby obtaining image display with higher contrast. In addition, as will be described later, when the liquid crystal layer has two or more picture regions and an optical compensation film containing a compound having a discotic structural unit is arranged in the liquid crystal layer, since the optical compensation film can be partitioned corresponding to the picture regions and an alignment direction of discotic liquid crystal molecules can be optimized corresponding to the picture regions for each of partitions, a liquid crystal display with higher display quality can be realized.

The liquid crystal cell 514e of the liquid crystal displays shown in FIG. 28E may be manufactured by preparing a cell substrate manufactured by forming the second retardation layer containing the compound having the discotic structural unit and the first retardation layer on a surface of a transparent substrate made of, for example, glass, as a pair of substrates, with the first and second retardation layers arranged at inner sides of the substrates, and injecting and sealing liquid crystal material between the substrates. In addition, the liquid crystal cell 514f of the liquid crystal displays shown in FIG. 28F may be manufactured by preparing a cell substrate manufactured by forming the second retardation layer containing the compound having the discotic structural unit on a surface of a transparent substrate made of, for example, glass, and a cell substrate manufactured by forming the second retardation layer containing the compound having the discotic structural unit and the first retardation layer on a surface of a transparent substrate made of, for example, glass, as a pair of substrates, with the first and second retardation layers arranged at inner sides of the substrates, and injecting and sealing liquid crystal material between the substrates.

The liquid crystal display of the invention is not particularly limited in its driving voltage, but may be driven within a general range of driving voltage of an ECB mode liquid crystal display. For example, the liquid crystal display of the invention may be driven in a normally white mode where a white image is displayed under application of no voltage, and a transmittance is decreased and a black image is displayed accordingly under application of a high voltage. The black image is displayed when a Re value of an optical compensation film becomes equal to a retardation value of a liquid crystal layer under application of a voltage. With this configuration, it is advantageous that an image with high contrast can be obtained over a wide range, and there occurs no gray scale inversion in a halftone display region. In the invention, when an application voltage condition indicating transmittance lower than transmittance under application of no voltage is used as the maximum gray scale (white image display), a viewing angle can be further widened.

When the liquid crystal display of the invention employs a multi domain structure in which one pixel is divided into a plurality of regions, the viewing angle characteristic of luminance or color tone is further improved. Specifically, by dividing one pixel into two or more (preferably, 4 or 8) regions having different initial alignment states of liquid crystal molecules and averaging these regions, luminance and color tune depending on the viewing angle can be suppressed from being biased. In addition, the same effect is obtained even when one pixel is divided into two or more different regions where the alignment direction of the liquid crystal molecules is continuously changed under application of a voltage.

A plurality of domains having different alignment directions of liquid crystal molecules may be formed in one pixel by, for example, changing an electric field direction or biasing an electric field intensity using slits provided in an electrode. A viewing angle that is substantially uniform in all directions may be obtained by increasing the number of domains, for example, by dividing one pixel into 4 or 8 or more domains. Particularly, it is preferable that one pixel is divided into 8 domains since a polarizing plate absorption axis can be set at any angles.

Since liquid crystal molecules at borders of domains have poor responsiveness and a white image display state remains in the normally white mode in case of ECB, a front contrast is deteriorated. Accordingly, it is preferable that a light shielding layer such as a black matrix covers the borders of domains.

The liquid crystal display of the invention is not limited to the configuration shown in FIGS. 25 to 28, but may include other members. For example, a color filter may be interposed (an inner side or an outer side of the liquid crystal cell) between the liquid crystal cell and the polarizer. In addition, a separate optical compensation film may be interposed between the liquid crystal cell and the polarizing plate. In addition, in case of a transmission type liquid crystal display, a backlight unit having a light source such as a cold cathode or hot cathode fluorescent tube, a light emitting diode, a field emission device, or an electroluminescence device may be disposed behind the liquid crystal cell. In addition, the liquid crystal display of the invention may be of a reflection type. In this case, only one polarizing plate may be disposed at an observation side, and a reflecting film is disposed behind the liquid crystal cell or at an inner side of the lower substrate of the liquid crystal cell. Of course, a front light unit using the light source may be provided at a liquid crystal cell observation side.

The liquid crystal display of the invention includes image direct-view type, image projection type and light modulation type display devices. The invention is particularly effective for an active matrix liquid crystal display using three or two terminal semiconductor devices such as TFT or MIM. Of course, the invention is also effective for a passive matrix liquid crystal display represented by a STN type which is called a time division driving.

According to another preferred aspect (VI), the invention provides a liquid crystal display comprising a pair of opposite substrates, at least one of which has an electrode; a liquid crystal layer including liquid crystal molecules aligned by alignment axes of opposite surfaces of the pair of opposite substrates; a pair of polarizing plates each having a polarizer and a protective film formed on at least one side of the polarizer, with the liquid crystal layer interposed between the pair of polarizing plates; and at least one optically anisotropic layer aligned by an alignment axis and including a liquid crystal compound fixed with the alignment state between the liquid crystal layer and at least one of the pair of polarizing plates, wherein an absorption of the polarizer is in parallel or perpendicular to a horizontal direction of a screen of the display device, at least one of the alignment axes of the opposite surfaces of the pair of opposite substrates intersects an alignment control direction of the least one optically anisotropic layer by 10~35°, and, assuming that in-plane retardation of the protective film is Re (nm) and thickness direction retardation of the protective film is Rth (nm), Re and Rth satisfy the following equation.

$$Re+2\times Rth \leq 280$$

In the liquid crystal display according to this aspect, by adjusting an arrangement angle relationship between the polarizing plate absorption axis, the alignment control direction of the liquid crystal substrate, and the alignment control direction of the optical compensation sheet, there can be provided a liquid crystal display, particularly a TN mode liquid crystal display, with high reliability and good display quality in upper, lower, left and right inclined directions even under severe use environments, with the same configuration as the conventional liquid crystal display.

Hereinafter, the above aspect of the invention will be described in detail.

According to this aspect, the invention provides a liquid crystal display comprising a pair of opposite substrates, at least one of which has an electrode, a liquid crystal layer containing liquid crystal molecules controlled to be aligned by an alignment axis of each of opposite planes of the pair of substrates, a pair of polarizing plates each having a polarizer and a protective film formed on at least one side of the polarizer, with the liquid crystal layer interposed therebetween, and at least one optically anisotropic layer that is interposed between the liquid crystal layer and at least one of the pair of polarizing plates and contains a liquid crystal compound controlled to be fixedly aligned by an alignment axis, wherein an absorption axis of the polarizer is in substantial parallel or perpendicular to the maximal contraction direction of the polarizing plate, that is, long and short directions of an end portion of the polarizing plate (or a horizontal direction of a screen of the display device). With this configuration, light leakage out of circumferences of the polarizing plates is decreased even under severe use environments (high temperature and high humidity), for example, even under use environments of temperature of 40° C. and humidity of 90% or temperature of 65° C. and humidity of 80%. In addition, a required wide viewing angle characteristic is satisfied by adjusting an arrangement angle relationship between the alignment axis of the liquid crystal substrate and the alignment control direction of the optically anisotropic layer.

The prevent inventors have discovered that light leakage out of circumferences of polarizing plates in conventional TN mode liquid crystal displays is caused by retardation Re and Rth generated in polarizing plate protective films due to a photoelastic effect by contraction of the polarizing plates. Based on this discover, the present inventor have also discovered that the light leakage can be decreased by adjusting an arrangement angle relationship between the alignment axis of the liquid crystal substrate, the alignment control direction of the optically anisotropic layer for optical compensation, and the absorption of the polarizing plates.

The polarizing plates are contracted under severe environments. Particularly, contraction in a direction in parallel to long and short sides of a screen becomes maximal. When an elastic force such as contraction or expansion is applied to a film used in the polarizing plates, retardation is changed. In a configuration where an absorption axis of the polarizing plate intersects a generation direction of the retardation by 45°, light transmission becomes maximal, which is observed as light leakage. In the invention, it has been discovered that light leakage is particularly reduced in a TN mode liquid crystal layer.

In a conventional TN mode liquid crystal layer, an absorption plate absorption axis intersects a horizontal direction of a screen, that is, a long side direction of an end portion of a polarizing plate by 45°. Since a contraction direction of the polarizing plate is in parallel to long and short directions of the end portion of the polarizing plate, such a conventional arrangement gives the maximal light leakage.

Accordingly, in the invention, it has been discovered that light leakage can be decreased in the TN mode by making the polarizing plate absorption axis parallel or perpendicular to the horizontal direction of the screen, that is, the long side direction of the end portion of the polarizing plate.

(The configuration where the polarizing plate absorption axis of the liquid crystal display is in parallel or perpendicular to the horizontal direction of the screen, that is, the long side direction of the end portion of the polarizing plate, is hereinafter sometimes called "0°-90° attachment").

The TN mode liquid crystal display employs a TFT driving in order to display a high quality image having high contrast high precision. For the TFT driving, gate wiring lines and signal (or source) wiring lines are arranged in horizontal and vertical directions of a screen. Since a contraction direction of a polarizing plate is in parallel or perpendicular to these wiring lines, even if a polarizing plate absorption axis is arranged in parallel or perpendicular to these wiring lines, the absorption axis is arranged in substantial parallel or perpendicular to the maximal contraction direction of the polarizing plate, that is, long and short side directions of an end portion of the polarizing plate, thereby decreasing light leakage.

In addition, the TN mode liquid crystal display, in order to obtain a wide viewing angle characteristic, it is preferable that the absorption axis of at least one of the pair of polarizing plates intersects the alignment axis formed at a plane opposite to the liquid crystal cell substrate arranged at a side of at least one of the polarizing plates by about 45°.

Light leakage out of circumferences of the polarizing plate can be decreased by making the polarizing plate absorption axis parallel or perpendicular to the long side direction of the end portion of the polarizing plate. At this time, by inclining an alignment control direction of the TN mode liquid crystal display, that is, an alignment axis of a substrate of a liquid crystal cell, by 45° with respect to the horizontal direction of the screen, a substantially bilateral symmetrical viewing angle characteristic can be obtained.

In the conventional TN mode, the alignment control direction of the liquid crystal cell is inclined by 45° with respect to the horizontal direction of the screen, and a vertical viewing angle characteristic is asymmetrical while the horizontal viewing angle characteristic is symmetrical. However, since the polarizing plate absorption axis and a retardation axis of a protective film of the polarizing plate are also inclined by 45° with respect to the horizontal direction of the screen, light is leaked out of the circumference of the polarizing plate under severe use environments.

Next, an embodiment where the invention is applied to a TN mode liquid crystal display will be described with reference to the drawings.

Prior to description of the invention, an operation of the conventional liquid crystal display shown in FIG. 31 will be described by way of example of a general TN mode. Here, using nematic liquid crystals having positive dielectric anisotropy as field effect liquid crystals, a TFT (active) driving will be described by way of an example.

A liquid crystal cell 609 to 613 comprises an upper substrate 609, a lower substrate 613, and a liquid crystal layer having liquid crystal molecules 611 interposed between these substrates 609 and 613. Alignment films (not shown) are formed on surfaces of the substrates 609 and 613 contacting the liquid crystal molecules 611 (hereinafter, these surfaces are sometimes referred to as "inner surfaces"), and alignment of the liquid crystal molecules 611 under application of no voltage or application of a low voltage is controlled by a rubbing treatment to which the alignment films are subjected. In addition, transparent electrodes (not shown) that apply a voltage to the liquid crystal layer having the liquid crystal molecules 611 are formed on the inner surfaces of the substrates 609 and 613.

In the TN type liquid crystal display, under a non-driving state where a driving voltage is not applied to the electrodes, the liquid crystal molecules 611 in the liquid crystal cell are aligned in substantial parallel to substrate planes and alignment direction is twisted by 90° between the upper and lower substrates. In case of a transmission type display device, light emitted from a backlight unit has linear polarization after passing through a lower polarizing plate. The linearly polarized light propagates along the twisted structure of the liquid crystal layer, rotates a polarizing plane by 90°, and then passes through the upper polarizing plate. Accordingly, the display device displays a white image.

On the other hand, when an application voltage is increased, the liquid crystal molecules get stand perpendicularly to the substrate planes while being untwisted. In the TN type liquid crystal display under application of an ideal high voltage, the liquid crystal molecules are nearly completely untwisted, and, accordingly, have a state of alignment nearly perpendicular to the substrate planes. At this time, since there is no twisted structure in the liquid crystal layer, the linearly polarized light that passed through the lower polarizing plate propagates without rotating the polarizing plane and is perpendicularly incident into an absorption axis of the upper polarizing plate. Accordingly, the light is shielded and the display device displays a black image.

In this manner, the TN type liquid crystal display achieves a function as a display device by shielding or transmitting the polarized light. In general, a contrast ratio (CR) as a numerical value to indicate display quality is defined by a ratio of white display luminance to black display luminance. A higher CR value gives a higher quality display device. In order to increase a contrast ratio, it is important to maintain a polarization state in a liquid crystal display.

Hereinafter, an example of a configuration of the TN mode liquid crystal cell is described. A liquid crystal cell is manufactured by rubbing and aligning the liquid crystals having positive dielectric anisotropy, anisotropic refractive index, $\Delta n=0.0854$ (589 nm, 20° C.) and $\Delta \in =+8.5$, and is disposed between the upper and lower substrates 609 and 613. The alignment of the liquid crystal layer is controlled by the alignment film and the rubbing treatment. A director, a so-called tilt angle, indicating the alignment direction of the liquid crystal molecules is set to falls within a range of, preferably, about 0.1° to 10°. In this embodiment, the director is set to be 3°. The rubbing treatment is performed in a direction perpendicular to the upper and lower substrates, and the size of the tilt angle can be controlled by rubbing strength and number. The alignment films are formed by applying and firing a polyimide film. The size of a twist angle of the liquid crystal layer is defined by an intersection angle in a rubbing direction between the upper and lower substrates and a chiral agent added to liquid crystal material. In this embodiment, a chiral agent having a pitch of 60 μm or so is added so that the twist angle is about 90°. The thickness d of the liquid crystal layer is set to be 5 μm.

In addition, liquid crystal material LC is not particularly limited as long as it is nematic liquid crystal. As dielectric anisotropy $\Delta \in$ increases, the driving voltage can be further reduced. As refractive index anisotropy $\Delta n$ decreases, the thickness (gap) of the liquid crystal layer can be further thickened, thereby shortening time taken to inject and seal liquid crystals and reducing unbalance of the gap. In addition, as $\Delta n$ increases, a cell gap can be further decreased, thereby allowing a higher speed response. In general, $\Delta n$ is set to fall within a range of 0.04 to 0.28, the cell gap is set to fall within a range of 1 to 10 μm, and the product of $\Delta n$ and d is set to fall within a range of 0.25 to 0.55 μm.

An absorption axis 604 of the upper polarizing plate and an absorption axis 619 of the lower polarizing plate are stacked substantially perpendicularly to each other, the absorption axis 604 of the upper polarizing plate and the rubbing direction (alignment axis) 610 of the upper substrate 609 of the liquid crystal cell are stacked in parallel to each other, and the absorption axis 619 of the lower polarizing plate and the rubbing direction (alignment axis) 612 of the lower substrate 613 of the liquid crystal cell are stacked in parallel to each other. Although the transparent electrodes (not shown) are formed at the inner sides of the alignment films of the upper and lower substrates 609 and 613, the liquid crystal molecules 611 in the liquid crystal cell are aligned in substantial parallel to the substrate planes under a non-driving state where the driving voltage is not applied to the electrodes, and as a result, the polarized light that passes through the liquid crystal panel propagates along the twist structure of the liquid crystal molecules 6 and rotates the polarizing plane by 90°. That is, the liquid crystal display realizes the white image display under the non-driving state. On the other hand, the liquid crystal molecules are aligned in a direction inclined by an angle with respect to the substrate planes under a driving state, and the light that passed through the lower polarizing plate has no retardation in the liquid crystal layer by optically anisotropic layers 614 and 607, passes through the liquid crystal layer 611 with its polarization state unchanged, and then is shielded by a polarizer 603. In other words, the liquid crystal display realizes the ideal black image display under the driving state.

Protective films 605 and 616 near the liquid crystal cell of the upper and lower polarizing plates may be also used as supports of the optically anisotropic layers 607 and 614, and the upper and lower polarizing plates may be integrally stacked with the optically anisotropic layers 607 and 614, and the stacked structure thereof may be assembled into the liquid crystal display.

In the liquid crystal display of the invention, a transparent support of an optical compensation sheet may be also used as a protective film of one of the polarizers. That is, an integrated elliptical polarizing plate including the transparent protective film, the polarizer, the transparent protective film (also used as the transparent support), and the optically anisotropic layer in order may be used. Since this integrated elliptical polarizing plate has the optically anisotropic layer having an optical compensation function, it is possible to compensate the liquid crystal display precisely with a simple configuration when the integrated elliptical polarizing plate is used. In the liquid crystal display, it is preferable that the transparent protective film, the polarizer, the transparent support, and the optically anisotropic layer are stacked in order from the outside of the device (side far away from the liquid crystal cell).

Figure 31:
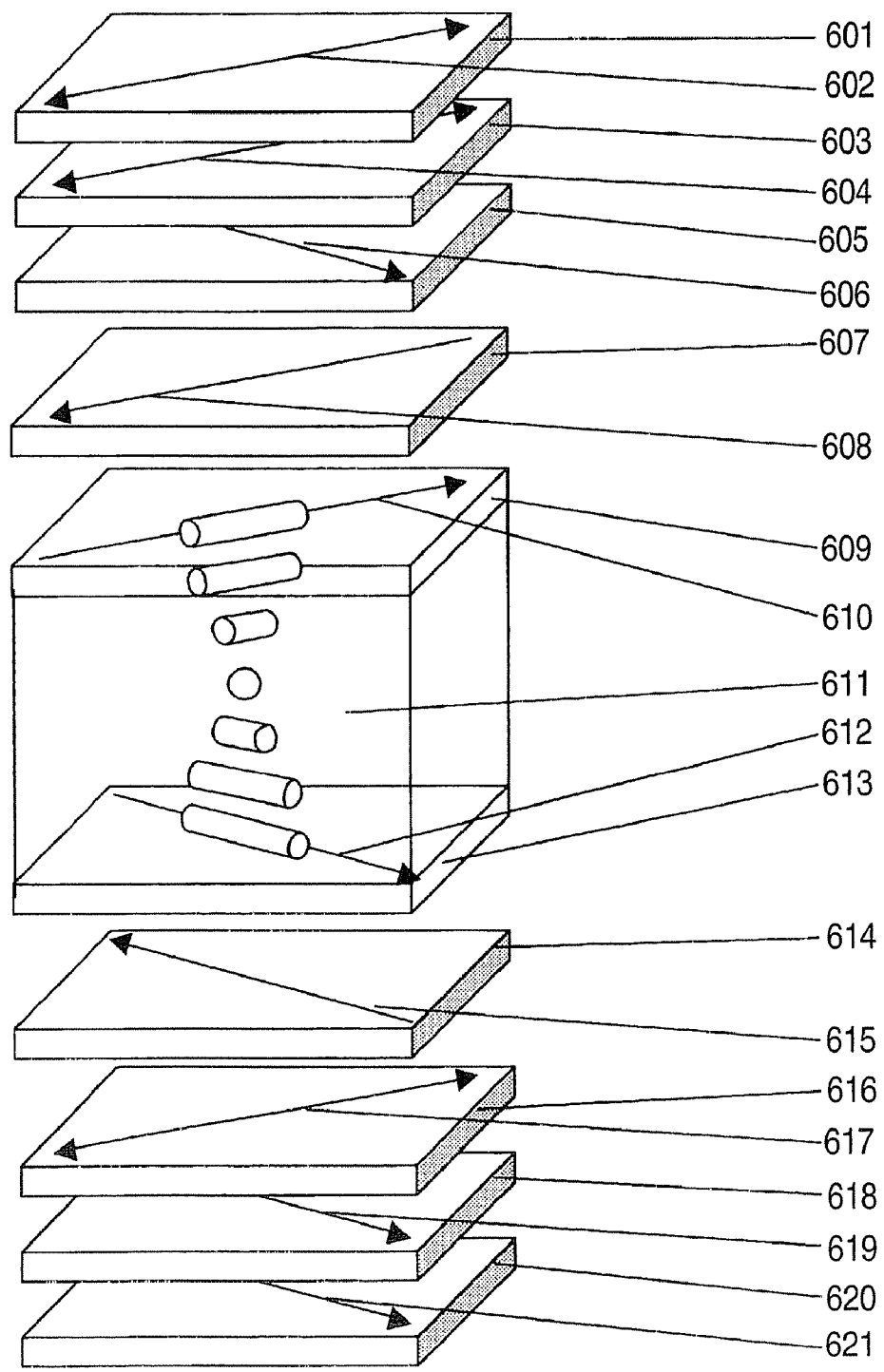
FIG. 31 is a schematic view showing an example of a liquid crystal display in the background art.

Although the TN mode liquid crystal display is shown in FIG. 31, the liquid crystal display of the invention may be any of a VA mode, an IPS mode, an OCB mode and an ECB mode, in addition to the TN mode. In addition, when the liquid crystal display employs a multi domain structure in which one pixel is divided into a plurality of regions, vertical and horizontal viewing angle characteristics are averaged, thereby improving display quality.

The liquid crystal display of the invention is not limited to the configuration shown in FIG. 31, but may include other members. For example, a color filter may be interposed between the liquid crystal cell and the polarizer. In addition, in case of a transmission type liquid crystal display, a backlight unit having a light source such as a cold cathode or hot cathode fluorescent tube, a light emitting diode, a field emission device, or an electroluminescence device may be disposed behind the liquid crystal cell. In addition, the liquid crystal display of the invention may be of a reflection type. In this case, only one polarizing plate may be disposed at an observation side, and a reflecting film is disposed behind the liquid crystal cell or at an inner side of the lower substrate of the liquid crystal cell. Of course, a front light unit using the light source may be provided at a liquid crystal cell observation side. In addition, in order to make transmission and reflection mode of the liquid crystal display compatible with each other, the liquid crystal display may be of semi-transmission type including a reflection part and a transmission part in one pixel of the display device.

In addition, in order to increase emission efficiency of the backlight, a prism-shaped or lens-shaped condensation type luminance enhancement sheet (film) is stacked, or a polarization reflection type luminance enhancement sheet (film) to decrease light loss due to absorption by the polarizing plate may be stacked between the backlight and the liquid crystal cell. In addition, a diffusion sheet (film) to make light emitted from the backlight uniform may be stacked, or a sheet (film) formed by printing a reflection and diffusion pattern to obtain a uniform in-plane light distribution may be stacked.

The liquid crystal display of the invention includes image direct-view type, image projection type and light modulation type display devices. The invention is particularly effective for an active matrix liquid crystal display using three or two terminal semiconductor devices such as TFT or MIM. Of course, the invention is also effective for a passive matrix liquid crystal display represented by a STN type which is called a time division driving.

With the arrangement of the polarizing plate as described above, the light leakage can be suppressed by employing the 0°-90° attachment. However, when the optically anisotropic layer of the liquid crystal layer is arranged in the same manner as in the conventional liquid crystal display, there arises a problem of bilateral asymmetry that a CR variation is different in left and right directions when an observing polar angle is changed.

The present inventors have found a configuration of a liquid crystal display to overcome the above problem.

That is, it has been found that this problem can be overcome if an intersection angle of an alignment control direction of an optically anisotropic layer and an alignment control direction of a liquid crystal layer falls within a range of 10 to 35°.

It is preferable that an optically anisotropic layer and an alignment control direction of a liquid crystal layer falls within a range of 15 to 25°.

With this configuration, a CR viewing angle can be extended and bilateral asymmetry can be improved for the 0°-90° attachment.

Figure 32:
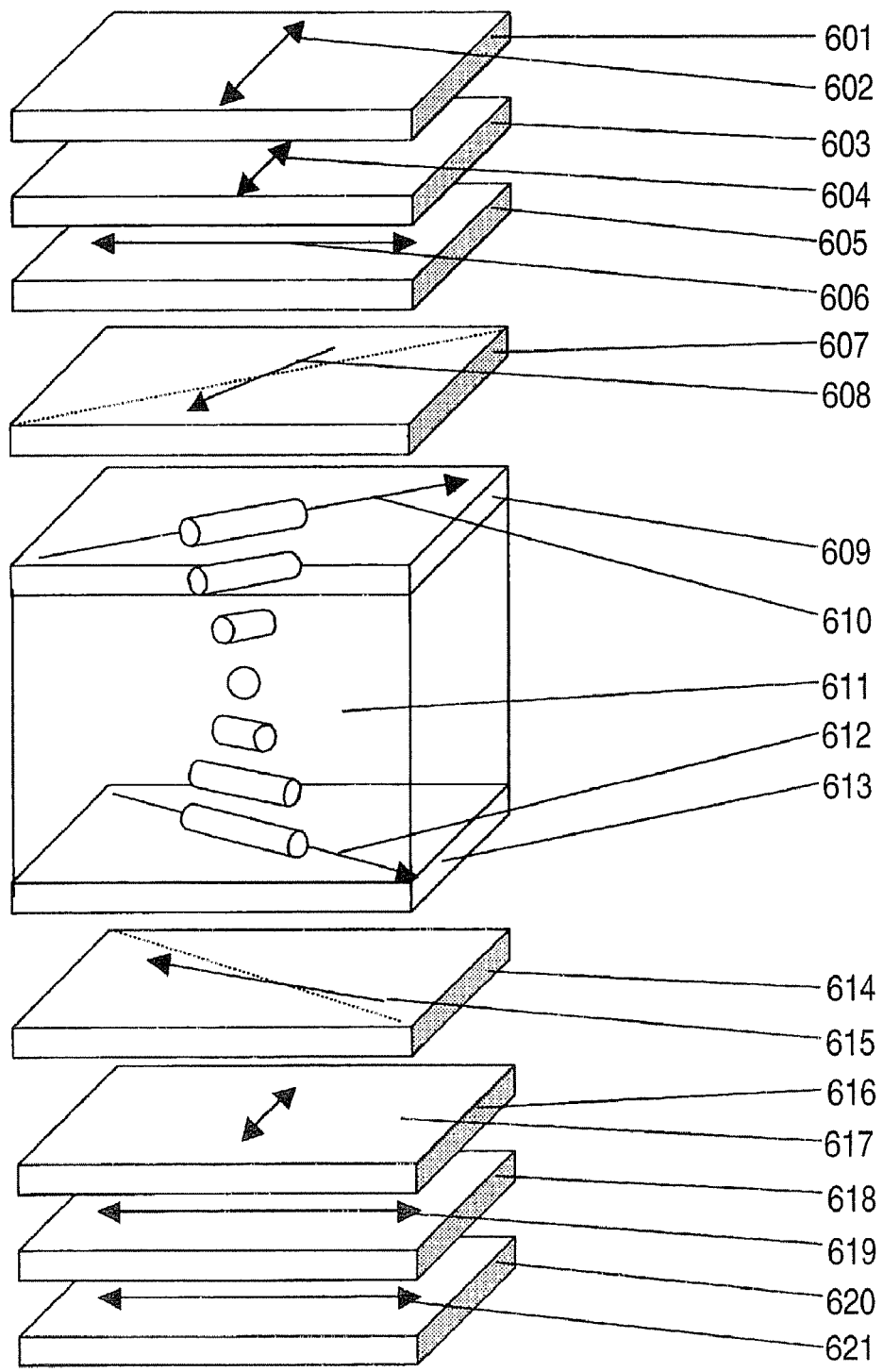
FIG. 32 is a schematic view showing an example of a liquid crystal display according to an exemplary embodiment of the invention.

FIG. 32 shows an example of a liquid crystal display according to an embodiment of the invention. This example is merely used to explain the effect of the invention without any limitation.

In FIG. 32, absorption axes of polarizers have 90° (perpendicular) and 0° (parallel) with respect to a horizontal direction of a screen. Specifically, in FIG. 32, an absorption axis 604 of an upper polarizer 603 has 90° (perpendicular) and an absorption axis 619 of a lower polarizer 618 has 0° (parallel) with respect to a horizontal direction of a screen.

In addition, in this embodiment, the alignment control direction of the optically anisotropic layer intersects the alignment control direction of the liquid crystal layer. That is, rubbing directions 608 and 615 for alignment of support sides of the optically anisotropic layers 607 and 614 intersect rubbing directions 610 and 612 for liquid crystal alignment of upper and lower substrates of a liquid crystal layer 611.

With this configuration, circumferential light leakage can be reduced and bilateral asymmetry of a CR viewing angle can be improved for the 0°-90° attachment.

Figure 33:
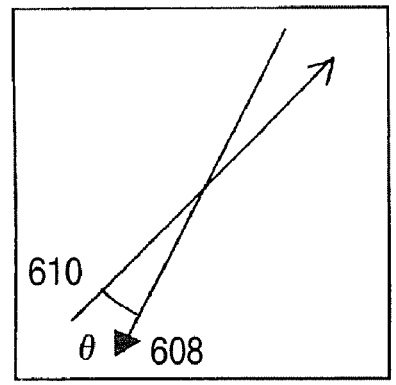
FIGS. 33A to 33C are views showing alignment control directions of a liquid crystal layer 611 and upper and lower optically anisotropic layers 607 and 614 of a liquid crystal display according to an exemplary embodiment of the invention when viewed from a display plane side.
Figure 33:
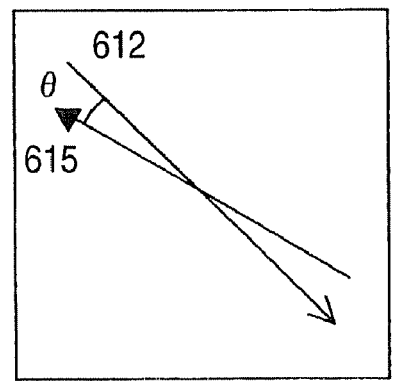
Figure 33:
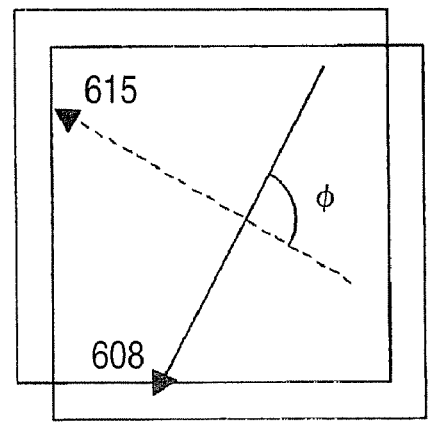

FIGS. 33A to 33C shows alignment control directions of the liquid crystal layer 611 and the upper and lower optically anisotropic layers 607 and 614 when viewed from a display plane side.

The alignment control direction 608 of the upper optically anisotropic layer 607 and the liquid crystal side upper alignment control direction 610 are arranged as shown in FIG. 33A.

Similarly, the alignment control direction 615 of the lower optically anisotropic layer 614 and the liquid crystal side lower alignment control direction 612 are arranged as shown in FIG. 33B.

At this time, an intersection angle between the optically anisotropic layer alignment control directions and the liquid layer alignment control directions is $\theta(°)$. In FIG. 33A, an intersection angle of the alignment control directions 608 and 610 or an intersection angle of the alignment control directions 615 and 612 is $\theta$. $\theta$ is, preferably, 10 to 35°, more preferably, 13 to 32°, particularly preferably, 15 to 30°.

In addition, FIG. 33C shows overlap of upper and lower sides of the liquid crystal layer. An intersection angle between the alignment control directions 608 and 615 of the pair of upper and lower optically anisotropic layers 607 and 614 is $\phi(°)$. $\phi$ is, preferably, 80 to 100°, more preferably, 85 to 95°, particularly preferably, about 90°.

Although the above configuration reduces the circumferential light leakage and improves the bilateral asymmetry of the CR viewing angle, it is not sufficient for a CR viewing angle in all directions, particularly an incline direction.

Accordingly, it has been assumed that a CR viewing angle in all directions, particularly an inclined direction, is widened by adjusting in-plane retardation (Re(nm)) and thickness direction retardation (Rth(nm)) of polarizing plate protective films 601, 605, 616 and 620 to be proper values.

As a result, it has proved that optimal values of Re and Rth can be derived from the following relationship.

Preferably, $Re+2\times Rth \leq 280$, more preferably, $Re+Rth \leq 140$, and particularly preferably, $0 \leq Re \leq 50$ or $50 \leq Rth \leq 80$.

Next, members used in the liquid crystal display of the invention will be described.

In the invention, an optically anisotropic layer containing a liquid crystal compound with a fixed alignment state is used for optical compensation of a liquid crystal cell. In the invention, the optically anisotropic layer is formed on a support and is assembled as an optical compensation sheet into the liquid crystal display. Alternatively, an integrated elliptical polarizing plate including the optical compensation sheet and a linear polarizer may be assembled into the liquid crystal display. An example of methods of manufacturing the optical compensation sheet and the polarizing plate having the intersection angle set as described above may include a method of adjusting an alignment control direction or an expansion direction of an optical compensation sheet and a polarizing plate with respect to a roll conveyance direction, a method of preparing an optical compensation sheet and a polarizing plate in a roll-to-roll manner and punching the optical compensation sheet and the polarizing plate at a preset angle, etc, without being limited thereto.

(Optical Compensation Sheet)

An example of the optical compensation sheet usable for the invention includes an optically transparent support and an optically anisotropic layer formed of a liquid crystal compound on the support. When the optical compensation sheet is used in the liquid crystal device, the liquid crystal cell can be optically compensated without deteriorating other characteristics.

Hereinafter, material used for various members usable for the liquid crystal display of the invention and a method of manufacturing the members will be described in detail.

(Polarizing Plate)

In the invention, a polarizing plate for a liquid crystal display may includes a first protective film, a polarizer, and a light diffusion layer in order. The polarizer is obtained by dyeing a polyvinylalcohol film or the like with iodine and expanding it. The polarizing plate is obtained by stacking the protective layers on both sides of the polarizer and forming the light diffusion layer or stacking a light diffusion film having a pre-formed light diffusion layer on at least one of the protective films. The polarizing plate is arranged at an outer side of the liquid crystal cell. It is preferable that a pair of polarizing plates each having a polarizer and a pair of protective films with the polarizer interposed therebetween is arranged with a liquid crystal cell interposed between the pair of polarizing plates.

(Protective Film)

The polarizing plate of the invention comprises a polarizer and a pair of protective films stacked on both sides of the polarizer. A protective film is not particularly limited, but may include, for example, celluloseacetates such as celluloseacetate, celluloseacetatebutylate, cellulosepropionate and the like, polycarbonate, polyolefin, polystyrene, polyester, etc. Available polymers (norbornene polymers, ARTON available from JSR Corporation, ZEONOR available from ZEON Corporation, etc.) may be used for the protective film. The optical compensation film may be used as one of the pair of protective films. In addition, it is preferable that the protective films of the invention are transparent protective films.

(Light Diffusion Layer)

The light diffusion layer is made of translucent particles and translucent resin. The light diffusion layer is preferably formed on a protective film closest to an observer, but may be arranged on a protective film at an outer side close to a light source. Of course, the light diffusion layer may be arranged within the protective film (for example, between the polarizer and the protective film), within an optical compensation film (for example, between the optical compensation film and the protective film), or within the liquid crystal cell. Haze values and a scattering light profile are adjusted by the translucent particles and the translucent resin. In the invention, it is preferable to use translucent particles having one or two or more kinds of diameters or materials.

(Translucent Particles)

It is preferable that a difference between a refractive index of the translucent particles and a refractive index of the translucent resin forming the overall light diffusion layer (an optical average refractive index when inorganic particles are added to the translucent resin to adjust a refractive index of the light diffusion layer) is 0.03 to 0.30. When the difference is 0.03 or more, a good light diffusion effect is obtained without having a too small refractive index difference. When the difference is 0.30 or less, there occurs no problem such as whitening of the light diffusion layer due to excessive increase of light diffusion. The refractive index difference is preferably 0.06 to 0.25, more preferably, 0.09 to 0.20.

(First Translucent Particles)

The diameter of translucent particles (first translucent particles) to improve display quality (or a viewing angle characteristic) of the liquid crystal display of the invention is preferably 0.5 to 3.5 µm, more preferably 0.5 to 2.0 µm. When the diameter is 0.5 µm or more, a scattering effect is large, a viewing angle characteristic is improved, and brightness is little changed without increase of back scattering. When the diameter is 2.0 µm or less, there arises no problem such as insufficient improvement of a viewing angle characteristic due to a small scattering effect. The diameter is particularly preferably 0.6 to 1.8 µm, most preferably 0.7 to 1.6 µm. An angle distribution of light scattering can be obtained by adjusting the diameter properly.

In the light diffusion layer suitable for the invention, for compatibility of the viewing angle characteristic with the whitening, it is particularly preferable to adjust haze values and a scattering light profile through proper combination of the refractive index difference between the translucent particles and the translucent resin forming the overall light diffusion layer and the diameter of translucent particles.

A larger light diffusion effect of the light diffusion layer gives a higher improved viewing angle characteristic. However, there is a need to increase transmittance as much as possible in order to maintain front brightness for display quality of the liquid crystal display.

(Second Translucent Particles)

In the invention, it is preferable that translucent particles (second translucent particles) with no main purpose of diffusion effect are further added to the light diffusion layer. The second translucent particles are used to form unevenness on a surface of the light diffusion layer to provide an image intrusion prevention function. The diameter of the second translucent particles is preferably more than the diameter of the first translucent particles, more preferably 2.5 to 10.0 µm. With this diameter, a proper surface scattering effect can be obtained. When the diameter is 2.5 µm or more, high film hardness is preferably obtained since a layer thickness need not be large when a desired surface unevenness is formed on the light diffusion layer. When the diameter is 10 µm or less, good particle precipitation stability is preferably obtained since weight of particles is not too large. The diameter of the second translucent particles is particularly preferably 2.7 to 9 µm, most preferably 3 to 8 µm.

In order to achieve good display quality for the liquid crystal display of the invention, it is important to prevent image intrusion of external light. A smaller surface haze value gives a smaller discoloration by external light, thereby obtaining higher display quality. However, since the image intrusion becomes large if a surface haze value is too small, there is a need to provide low reflectivity by forming a low refractive index layer having a refractive index lower than the refractive index of the light diffusion layer on the outermost layer. In order to control the surface haze value, it is preferable that a proper unevenness is formed on a resin layer surface by means of the second translucent particles, without being limited thereto.

It is preferable that a difference between the refractive index of the second translucent particles and the refractive index of the translucent resin forming the overall light diffusion layer is smaller than a difference between the refractive index of the first translucent particles and the refractive index of the translucent resin.

Surface roughness Ra of the surface unevenness of the light diffusion layer is preferably 0.5 μm or less, particularly preferably 0.3 μm or less, most preferably 0.2 μm or less. The surface roughness Ra (center line average roughness) may be measured based on JIS-0601.

A haze value of the light diffusion layer, particularly an internal scattering haze (internal haze) that makes a significant contribution to diffusion of transmission light, has a closed interrelationship with a viewing angle characteristic improvement effect. A viewing angle characteristic is improved when light emitted from a backlight is diffused in the light diffusion layer disposed at a surface of the polarizing plate at a viewing side. However, if the light is excessively diffused, front luminance is decreased, and accordingly, in the invention, there is a need to set the internal haze of the light diffusion layer to be 45% to 80%. The internal haze is more preferably 45% to 70%, particularly preferably 45% to 60%. An example of methods of increasing the internal scattering haze may include a method of increasing particle concentration of translucent particles with the purpose of providing diffusivity or increasing thickness of a coated film, a method of making a refractive index difference between particles and resin large, etc.

In the invention, in order to improve display quality (or viewing angle characteristic) of the liquid crystal display, it is particularly preferable that scattering light intensity of an emission angle 30° with respect to light intensity of an emission angle 0° of a scattering light profile of a goniophotometer falls within a particular range. The scattering light intensity of an emission angle 30° with respect to light intensity of an emission angle 0° of a scattering light profile of a goniophotometer is preferably 0.05% or more from a standpoint of a viewing angle characteristic, and preferably 0.03% or less from a standpoint of front luminance. Accordingly, in the invention, the scattering light intensity of the light diffusion layer is preferably 0.05 to 0.3%, more preferably 0.05 to 0.2%, particularly preferably 0.05 to 0.15%. In the invention, it is particularly preferable that the light diffusion layer satisfies the preferred range of the scattering light intensity and the preferred range of the internal haze simultaneously.

In the invention, from a standpoint of compatibility of reduction of image intrusion with discoloration, the haze due to the surface scattering of the polarizing plate (surface haze) is preferably 0.1 to 30%, more preferably 10% or less, particularly preferably 5% or less. With stress laid on preventing deterioration of contrast by external light, the surface haze is preferably 4% or less, more preferably 2% or less. Since the image intrusion is increased as the surface haze is reduced, an average value of integral reflectivity for 5° incident light in a wavelength range of 450 nm to 650 nm is set to be preferably 3.0% or less, more preferably 2.0% or less, most preferably 1.0% or less by providing a low refractive index layer. In the invention, in order to improve the display quality (viewing angle characteristic) of the liquid crystal display, it is necessary to adjust the internal haze, preferably adjust the internal scattering, more preferably set the surface haze and/or the reflectivity to fall within a proper range simultaneously, thereby improving the contrast even in a bright place as the most preferred effect.

The translucent particles may be monodisperse organic particles or inorganic particles. As unbalance of the diameter of the translucent particles becomes reduced, since unbalance of a scattering characteristic becomes reduced it is easier to design a clouding value (haze). Plastic beads are suitable for the translucent particles. It is particularly preferable that material used for the translucent particles has high transparency and the above-mentioned refractive index difference from the translucent resin.

An example of organic particles may include polymethylmethacrylate beads (refractive index 1.49), acryl-styrene copolymer beads (refractive index 1.54), melamine beads (refractive index 1.57), polycarbonate beads (refractive index 1.57), styrene beads (refractive index 1.60), cross-linking polystyrene beads (refractive index 1.61), polyvinyl chloride beads (refractive index 1.60), benzoguanaminemelamine-formaldehyde beads (refractive index 1.68), etc. An example of inorganic particles may include silica beads (refractive index 1.44 to 1.46), alumina beads (refractive index 1.63).

The translucent particles are preferably 3 to 30 wt %, more preferably 5 to 20 wt % for the translucent resin of 100 wt %. If the translucent particles are less than 3 wt %, scattering ability is not sufficient. If the translucent particles are more than 30 wt %, image quality is likely to be deteriorated or surface turbid is apt to occur.

However, since the above translucent particles are apt to be precipitated in the resin composition (translucent resin), an inorganic filler such as silica may be added to the translucent particles to prevent the precipitation. In addition, as the addition amount of the inorganic filler is increased, transparency of a coated film is adversely affected although it is effective in preventing the precipitation of the translucent particles. Accordingly, it is preferable that an inorganic filler having the diameter of 0.5 μm or less is so less than 0.1 wt % for the translucent resin that transparency of the coated film is not deteriorated.

(Translucent Resin)

An example of the translucent resin may include a resin curable by an ultraviolet ray or an electron beam, for example, an ionizing radiation curing resin, a mixture of an ionizing radiation curing resin with a thermoplastic resin and a solvent, and a thermosetting resin. In order to grant hardness to the light diffusion layer, it is preferable that the ionizing radiation curing resin is mainly used.

The thickness of the light diffusion layer may be typically 1.5 μm to 30 μm, preferably 3 μm to 20 μm. In general, when the thickness of the light diffusion layer is 1.5 μm or more, the hardness is sufficient. When the thickness of the light diffusion layer is 30 μm or less, there occurs no problem of curl or brittleness.

A refractive index of the translucent resin is preferably 1.46 to 2.00, more preferably 1.48 to 1.90, particularly preferably 1.50 to 1.80 if a low refractive index layer is further provided. The refractive index of the translucent resin is a light diffusion layer average value measured without including translucent particles. If the refractive index of the translucent resin is not too small, anti-reflectivity is not deteriorated. If the refractive index of the translucent resin is not too large, coloration of reflected light is not strengthened. From this point, the above range is preferable. The refractive index of the light diffusion layer is set to a desired value in consideration of the anti-reflectivity and the coloration of reflected light.

A resin used as the translucent resin is preferably a polymer having saturated hydrocarbon or polyether as a main chain, more preferably a polymer having the saturated hydrocarbon as the main chain. In addition, the translucent resin is preferably cross-linked. The polymer having the saturated hydrocarbon as the main chain is preferably obtained by polymerization of an ethylene unsaturated monomer. In order to obtain a cross-linking resin, it is preferable that a monomer having two or more ethylene unsaturated groups is used.

An example of monomers having two or more ethylene unsaturated groups may include ester of polyhydric alcohol and methacrylic acid {for example, ethyleneglycoldimethacrylate, 1,4-cyclohexanediacrylate, pentaerythritoltetra(meth)acrylate, pentaerythritoltri(meth)acrylate, trimethylolpropanetri(meth)acrylate, trimethylolethanetri(meth) acrylate, dipentaerythritoltetra(meth)acrylate, dipentaerythritolpenta(meth)acrylate, dipentaerythritolhexa (meth)acrylate, dipentaerythritolhexa(meth)acrylate, 1,3,5-cyclohexanetrioltrimethacrylate, polyurethanepolyacrylate, polyesterpolyacrylate, etc.}, derivatives of vinylbenzene (for example, 1,4-divinylbenzene, 4-vinylbenzoic acid-2-acryloylethylester, 1,4-divinylcyclohexanone, etc.), vinylsulfone (for example, divinylsulfone), acrylamide (for example, methylenebisacrylamide), and methacrylamide. Among these, an acrylate or methacrylate monomer having at least 3 functional groups or an acrylate monomer having at least 5 functional groups is preferable from a standpoint of film hardness, that is, scratch resistance. A mixture of dipentaerythritolpentaacrylate and dipentaerythritolhexaacrylate available is particularly preferably used.

The monomer having these ethylene unsaturated groups may be dissolved in a solvent, along with various polymerization initiators and additives, coated, dried, and then cured by polymerization by ionizing radiation or heat.

Instead of or in addition to the monomer having two or more ethylene unsaturated groups, a cross-linking structure by reaction of a cross-linking group may be introduced into the translucent resin. An example of the cross-linking group may include an isocyanate group, an epoxy group, an aziridine group, an oxazoline group, an aldehyde group, a carbonyl group, a hydrazine group, a carboxyl group, a methylol group, and an active methylene group. Metal alkoxide such as vinyl sulfonic acid, acid anhydride, cyanoacrylate derivatives, melamine, etheric methylol, ester, urethane, tetramethoxysilane and the like may be used as a monomer to introduce the cross-linking structure. A functional group showing cross-linkage as a result of decomposition reaction, such as block isocyanate group, may be used. That is, in the invention, a cross-linking group may show a reaction as a result of decomposition although it can not show a reaction directly. A binder having these cross-linking groups can form a cross-linking structure when being applied and heated.

It is preferable that the translucent resin contains a high refractive index monomer and/or high refractive index metal oxide ultrafine particles in addition to the polymer.

An example of the high refractive index monomer may include bis(4-methacryloylthiophenyl)sulfide, vinylnaphthalene, vinylphenylsulfide, 4-methacryloxyphenyl-4'-methoxyphenylthioether, etc.

An example of the high refractive index metal oxide ultrafine particles may preferably include particles that are formed of at least one selected from oxides of zirconium, titanium, aluminum, indium, zinc, tin and antimony and have a diameter of 100 nm or less, preferably 50 nm or less. The high refractive index metal oxide ultrafine particles are preferably oxide ultrafine particles of at least one selected from aluminum, zirconium, zinc, titanium, indium, and tin, for example, $ZrO_2$, $TiO_2$, $Al_2O_3$, $In_2O_3$, $ZnO$, $SnO_2$, $Sb_2O_3$, ITO. Among these metal oxides, $ZrO_2$ is particularly preferable.

The addition amount of the high refractive index monomer or the metal oxide ultrafine particles is preferably 10 to 90 wt %, more preferably 20 to 80 wt % for the total weight of the translucent resin.

It is preferable that the light diffusion layer is applied on a transparent base film, which is also used as a protective film of a polarizer, preferably on a celluloseacetate film. A solvent of an application solution to form the light diffusion layer comprises at least one kind of solvent to dissolve the transparent base film (for example, a triacetyl cellulose film) and at least one kind of solvent not to dissolve the transparent base film in order to make excessive penetration of diffusion layer components into the transparent base film compatible with close adhesion between the diffusion layer and the transparent base film. It is more preferable that at least one kind of solvent to dissolve the transparent base film has a higher boiling point than at least one kind of solvent not to dissolve the transparent base film. A boiling point difference between a solvent having the highest boiling point to dissolve the transparent base film and a solvent having the highest boiling point not to dissolve the transparent base film is particularly preferably 30° C. or more, most preferably more than 40° C. or more.

An example of the solvent to dissolve the transparent base film (preferably, triacetylcellulose) may include ethers having 3 to 12 carbons, specifically, dibutylether, dimethoxymethane, dimethoxyethane, diethoxyethane, propyleneoxide, 1,4-dioxane, 1,3-dioxolane, 1,3,5-trioxane, tetrahydrofuran, anisole, phenetole, etc.; ketones having 3 to 12 carbons, specifically, acetone, methylethylketone, diethylketone, dipropylketone, diisobutylketone, cyclopentanone, cyclohexanone, methylcyclohexanone, etc.; esters having 3 to 12 carbons, specifically, formic acid ethyl, formic acid propyl, formic acid n-pentyl, methyl acetate, ethyl acetate, methyl propionate, ethyl propionate, n-pentyl acetate, γ-butyrolactone, etc.; an organic solvent having two or more kinds of functional groups, specifically, 2-methoxymethyl acetate, 2-ethoxymethyl acetate, 2-ethoxyethyl acetate, 2-ethoxyethyl propionate, 2-methoxyethanol, 2-propoxyethanol), 2-butoxyethanol, 1,2-diacetoxyacetone, acetylacetone, diacetonealcohol, acetic acid methyl, acetic acid ethyl, etc. These solvents may be used solely or in combination of two or more kinds. The ketone solvent is preferably used as the solvent to dissolve the transparent base film.

An example of the solvent not to dissolve the transparent base film (preferably, tri-acetyl-cellulose may include methanol, ethanol, 1-propanol, 2-propanol, 1-butanal, 2-butanol, t-butanol, 1-pentanol, 2-methyl-2-butanol, cyclohexanol, isobutyl acetate, methylisobutylketone, 2-octanone, 2-pentanone, 2-hexanone, 2-heptanone, 3-pentanone, 3-heptanone, 4-heptanone, toluene, etc. These solvents may be used solely or in combination of two or more kinds.

A weight ratio (A/B) of the gross weight of the solvent to dissolve the transparent film (A) to the gross weight of the solvent not to dissolve the transparent film (B) is preferably 5/95 to 50/50, more preferably 10/90 to 40/60, particularly preferably 15/85 to 30/70.

The ionizing radiation curable resin composition may be cured by a typical method, for example, electron beam or ultraviolet ray radiation.

For example, in case of electron beam curing, electron beams having energy of 50 to 1000 KeV, preferably 100 to 300 KeV, which are emitted from various electron beam accelerators of Cockroft-Walton type, Vande Graaff type, resonance type, insulated core transformer type, linear type, Dynamitrone type, high frequency type, etc., are used. In case of ultraviolet ray curing, ultraviolet rays emitted from light sources such as an ultrahigh pressure mercury lamp, a high pressure mercury lamp, a low pressure mercury lamp, a carbon-arc, a xenon-arc, a metal halide lamp and so on are used.

(Photoinitiator)

An example of a photo-radical polymerization initiator may include acetophenones, benzoins, benzophenones, phosphine oxides, ketals, anthraquinones, thioxanthones, azo compound, peroxides (JP-A-2001-139663, etc.), 2,3-dialkyldione compounds, disulfide compounds, fluoroamine compounds, aromatic sulfoniums, lophine dimmers, onium salts, borate salts, active esters, active halogens, inorganic complexes, coumalins, etc.

An example of the acetophenones may include 2,2-dimethoxyacetophenone, 2,2-diethoxyacetophenone, p-dimethylacetophenone, 1-hydroxy-dimethylphenylketone, 1-hydroxy-dimethyl-p-isopropylphenylketone, 1-hydroxycyclohexylphenylketone, 2-methyl-4-methylthio-2-morpholinopropiophenone, 2-benzyl-2-dimethylamino-1-(4-morpholinophenyl)-butanone, 4-phenoxydichloroacetophenone, 4-t-butyl-dichloroacetophenone, etc.

An example of active halogens may include compounds disclosed in "K. Wakabayashi et al, "Bull chem. Soc Japan", Volume 42, p. 2924 (1969)", U.S. Pat. No. 3,905,815, JP-A-5-27830, "M. P. Hutt, "Journal of Hetero cyclic Chemistry", Volume 1 (No. 3) (1970)", particularly an oxazole compound or a s-triazine compound substituted with a trihalomethyl group, more preferably s-triazine derivatives in which at least one mono-, di-, or trihalogen substituted methyl group is combined to a s-triazine ring.

An example of the s-triazine derivatives may include S-triazine or oxathiazole compounds, particularly, 2-(p-methoxyphenyl)-4,6-bis(tricrolmethyl)-s-triazine, 2-(p-styrylphenyl)-4,6-bis(tricrolmethyl)-s-triazine, 2-(3-Br-4-di(ethylacetateester)amino)phenyl)-4,6-bis(tricrolmethyl)-s-triazine, 2-trihalomethyl-5-(p-methoxyphenyl)-1,3,4-oxadiazole, etc.

Specifically, compounds disclosed in JP-A-58-15503 (p. 14 to 30), JP-A-55-77742 (p. 6 to 10), JP-A-60-27673 (Nos. 1 to 8 of p. 287), JP-A-60-239736 (Nos. 1 to 17 of p. 443 and 444), U.S. Pat. No. 4,701,399 (Nos. 1 to 19), etc. are particularly preferable.

An example of the active halogens is as follows.

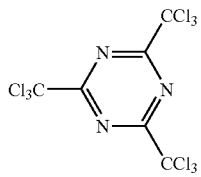
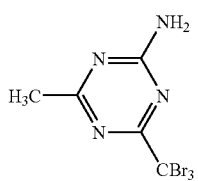
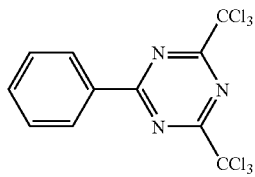
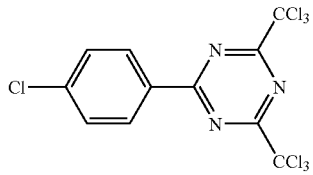
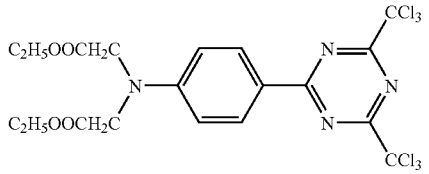
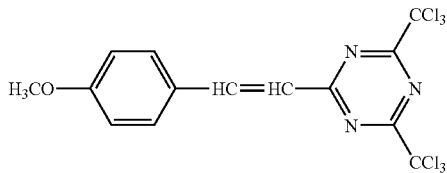
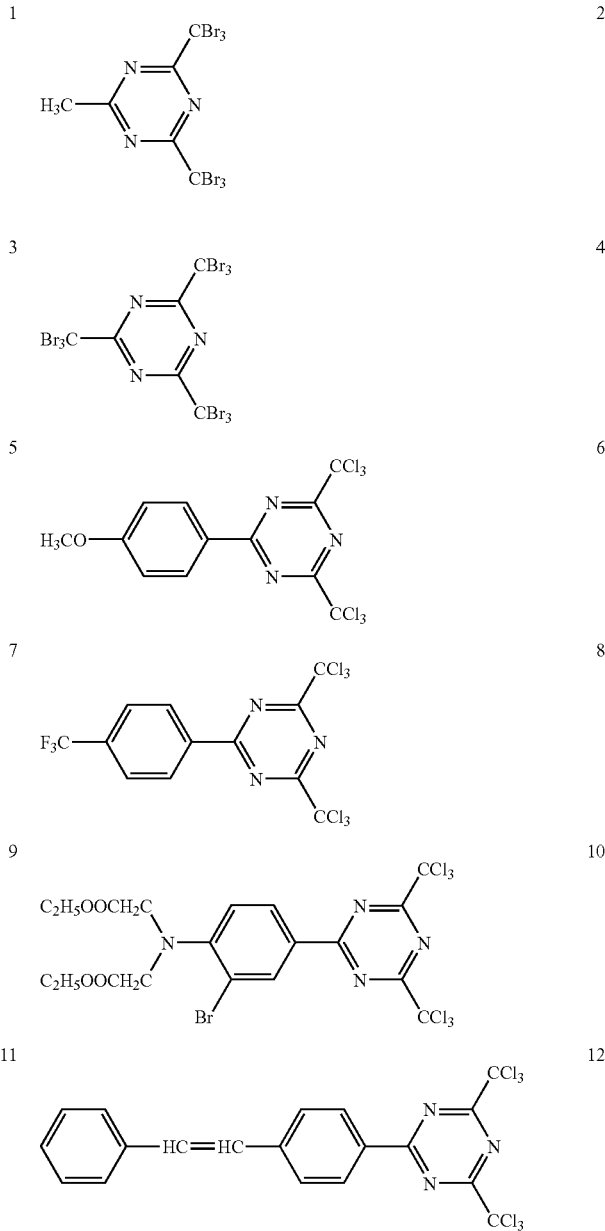

-continued
13
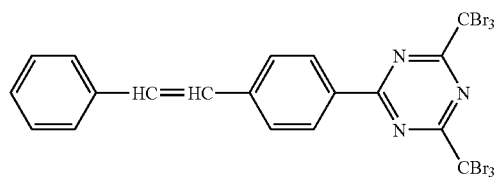
14
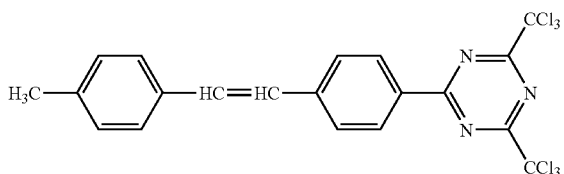
15
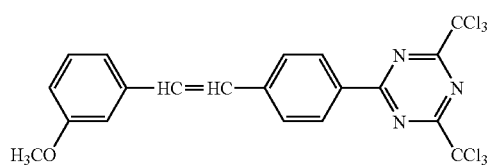
16
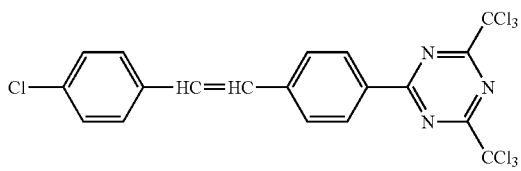
17
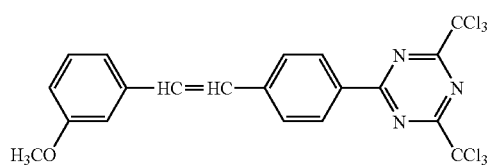
18
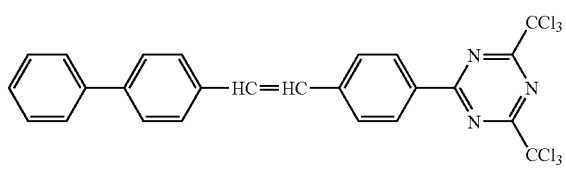
19
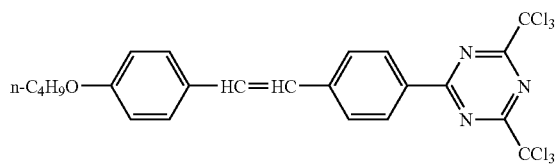
20
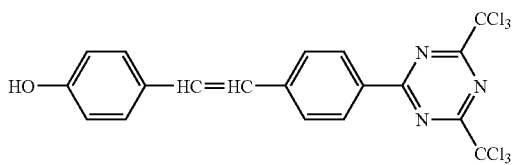
21
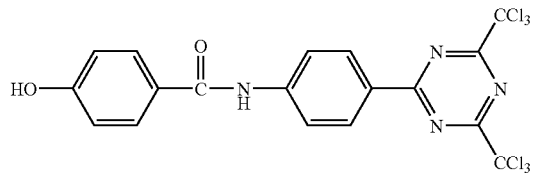
22
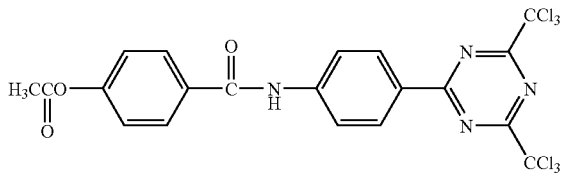
23
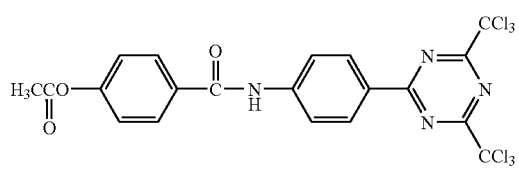
24
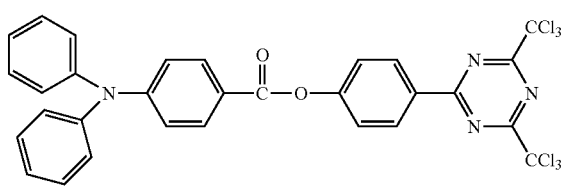
24-1
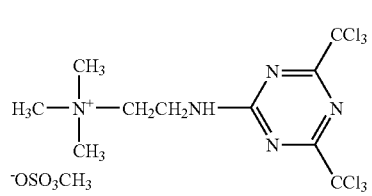
24-2
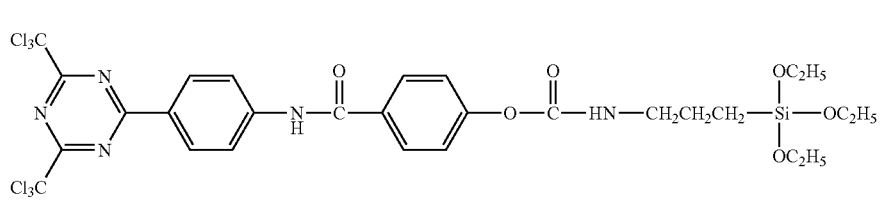

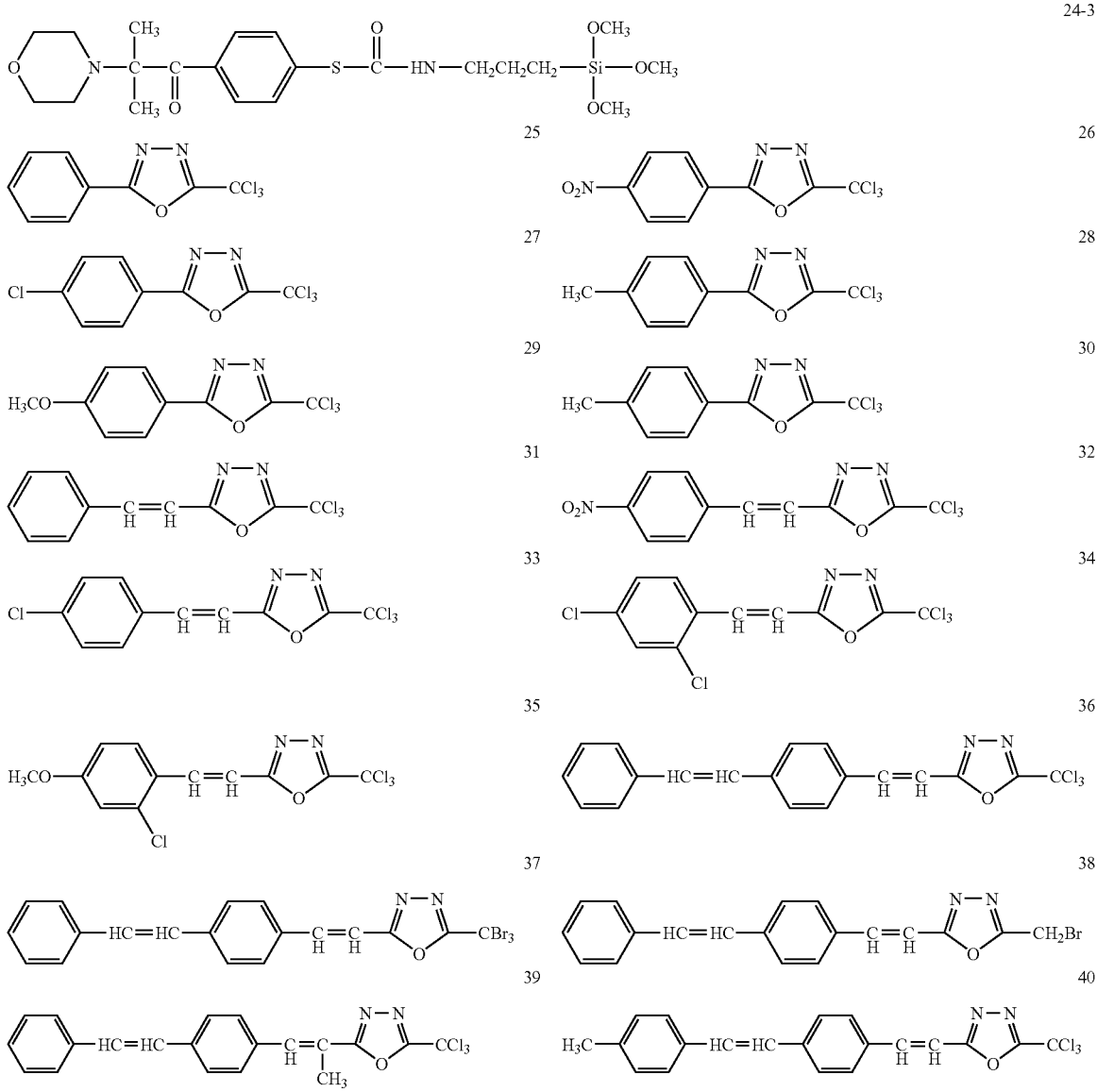

These initiators may be used solely or in combination.

Various examples of the initiators useful for the invention are described in "The newest UV curing technology", "Technology and information association Co., Ltd., p 159, 1991", and "'UV curing system' authored by K. Kato (published by General technology center, p 65-148, 1989."

An example of the photo-radical polymer initiator may include KAYACURE (DETX-S, BP-100, BDMK, CTX, BMS, 2-EAQ, ABQ, CPTX, EPD, ITX, QTX, BTC, MCA, etc.) which is available from Nippon Kayaku Co., Ltd., IRGACURE (651, 184, 500, 907, 369, 1173, 2959, 4265, 4263, etc.) which is available from Ciba Specialty Chemicals Co., Ltd., ESACURE (KIP100F, KB1, EB3, BP, X33, KT046, KT37, KIP150, TZT, etc.) which is available from Sartomer Company Inc., and a combination thereof.

The photo-radical polymer initiator is used within a range of, preferably 0.1 to 15 wt %, more preferably 1 to 10 wt %, of multifunctional monomer of 100 wt %.

(Low Refractive Index Layer)

In the invention, although the object of the invention can be achieved by at least one light diffusion layer having the photo-radical polymer initiator of the above-mentioned range, an anti-reflection function is obtained by forming a layer, which has a refractive layer lower than a refractive index of a layer adjacent to the outermost layer, on the outermost layer. Accordingly, since the image intrusion of external light can be suppressed and a high contrast can be obtained even in a bright place, a image forming apparatus having higher image quality can be obtained.

Next, material used for the low refractive index layer will be described.

(Curable Composition)

The low refractive index layer of the invention is formed by applying and curing a curable composition having a fluorine-containing compound as a main component or a curable composition containing a monomer having a plurality of linkable groups in a molecule and low refractive index particles and adjusting a refractive index to falls within a range of 1.20 to 1.50, preferably a range of 1.25 to 1.45, more preferably a range of 1.30 to 1.40.

The curable composition may preferably include:

(1) composition containing a fluorine-containing polymer having a cross-linked or polymeric functional group, (2) composition having a hydrolysis condensate of a fluorine-containing organosilane compound as a main component, and (3) composition containing a monomer having two or more ethylene unsaturated groups and inorganic particles having a hollow structure.

With this curable composition, an optical film having good scratch resistance is obtained even when used as the outermost layer as compared to a low refractive index layer using magnesium fluoride or calcium fluoride. A dynamic friction coefficient of a surface of the cured low refractive index layer is preferably 0.03 to 0.05, and a contact angle of the cured low refractive index layer with water is preferably 90 to 120°.

(1) Composition Containing a Fluorine-Containing Polymer Having a Cross-Linked or Polymeric Functional Group An example of the fluorine-containing polymer having a cross-linked or polymeric functional group may include a copolymer with a monomer having a cross-linked or polymeric functional group. For example, a fluorine-containing monomer may include fluoroolefins (for example, fluoroethylene, vinylidenefluoride, tetrafluoroethylene, hexafluoropropylene, hexafluoroethylene, hexafluoropropylene, perfluoro-2,2-dimethyl-1,3-dioxole, etc.), partially or completely fluorinated alkylester derivatives of (meta)acryl acid (for example, Biscoat6FM (available from Osaka Organic Chemical Industry., Ltd.) or M-2020 (available from Daikin Industries., Ltd.), etc.), partially or completely fluorinated vinylethers, etc.

An example of the monomer to grant cross-linkage property to the low refractive index layer may include a (meth)acrylate monomer having a cross-linkable functional group in a molecule, such as glycidyl methacrylate, and a monomer having a cross-linkable or polymeric functional group, which is made by composing a fluorine-containing copolymer of a monomer having a functional group such as hydroxyl group and modifying substituents of the fluorine-containing copolymer, etc. Specifically, the monomer may be a (meth)acrylate monomer having a carboxyl group, a hydroxyl group, an amino group, a sulfonic acid group, etc (for example, (meth)acrylic acid, methylol(meth)acrylate, hydroxyalkyl(meth)acrylate, arylacrylate, etc). The latter monomer is disclosed in JP-A-10-25388 and JP-A-10-147739.

The fluorine-containing polymer may contain copolymerizable components from a standpoint of solubility, dispersibility, applicability, anti-smudge, antistatic property, etc. It is particularly preferable that the fluorine-containing polymer contains a silicon component to provide anti-smudge and lubrication property in its main chain or a side chain.

An example of methods of partially introducing polysiloxane into the main chain of the fluorine-containing polymer may include a method of using a polymeric initiator such as azo group-containing polysiloxane amide (for example, "VPS-0501" or "VPS-1001" available from Wako Purechemical Industries, Ltd.) disclosed in, for example, JP-A-6-93100. In addition, an example of methods of introducing polysiloxane into the side chain of the fluorine-containing polymer may include a method of introducing polysiloxane having a reactive group at its one end (for example, SILAPLANE series available from CHISSO Corporation) by polymeric reaction, as disclosed in "'J. Appl. Polym. Sci.', Volume 2000, p. 78, 1955", JP-A-56-28219, a method of polymerizing a polysiloxane-containing siliconmacromer, etc.

The above-mentioned fluorine-containing polymer may be also used along with a curing agent having a polymerizable unsaturated group, as disclosed in JP-A-2000-17028. In addition, the fluorine-containing polymer may be also used along with a compound having a fluorine-containing multifunctional polymerizable unsaturated group, as disclosed in JP-A-2002-145952. An example of the compound having the multifunctional polymerizable unsaturated group may include a monomer having two or more ethylene unsaturated groups, preferably a hydrolysis condensate of organosilane, particularly preferably a hydrolysis condensate of organosilane containing a (meta)acryloyl group disclosed in JP-A-2004-170901.

Among these compounds, particularly when a compound having a polymerizable unsaturated compound in a fluorine-containing polymer body is used, scratch resistance can be also improved.

If the fluorine-containing polymer does not have sufficient curability solely, required curability can be provided by mixing a cross-linkable compound into the fluorine-containing polymer. For example, if the fluorine-containing polymer body contains a hydroxyl group, it is preferable that various amino compounds are used as curing agents. An example of amino compounds used as cross-linkable compounds may include compounds containing one or both of a hydroxyalkyl amino group and an alkoxyalkyl amino group in total of more than two, specifically, a melamine compound, a urea compound, a benzoguanamine compound, a glycoluril compound, etc. It is preferable that organic acid or its salt is used to cure these compounds.

Examples of these fluorine-containing polymers are disclosed in JP-A-2003-222702 and so on.

(2) Composition Having a Hydrolysis Condensate of a Fluorine-Containing Organosilane Compound as a Main Component The composition having the hydrolysis condensate of the fluorine-containing organosilane compound as the main component is also preferable since it has a low refractive index and high hardness of a surface its coated film, it is preferable that a fluorinated alkyl group is a compound containing hydrolysable silanol in its one end or both ends and a condensate of tetraalkoxysilane. Examples of this composition are disclosed in JP-A-2002-265866 and JP-A-2002-317152.

(3) Composition Containing a Monomer Having Two or More Ethylene Unsaturated Groups and Inorganic Particles Having a Hollow Structure.

Another preferred aspect may include a low refractive index layer formed of low refractive particles and a binder. The low refractive index particles may be either organic or inorganic, and have preferably hollows therein. An example of hollow low refractive index particles may include silica particles disclosed in JP-A-2002-79616. A refractive index of the particles is preferably 1.15 to 1.40, more preferably 1.20 to 1.30. An example of the binder may include a monomer having the above-mentioned two or more ethylene unsaturated groups.

It is preferable that the above-mentioned polymeric initiator is added to the low refractive index layer of the invention. If the low refractive index layer contains a radical polymeric compound, the polymeric initiator may be 1 to 10 wt %, preferably 1 to 5% for the compound.

(Inorganic Particles)

Inorganic particles may be added to the low refractive index layer of the invention. Particles having a diameter corresponding to 15% to 150%, preferably 30% to 100%, more preferably 45% to 60% of the thickness of the low refractive index layer can be used to provide scratch resistance to the low refractive index layer.

(Other Additives)

Known polysiloxane or fluorine anti-smudge agents, lubricant and so on may be properly added to the low refractive index layer of the invention to provide properties such as anti-smudge, waterproofing, chemical resistance, lubricability and the like to the low refractive index layer.

In the invention, a film having the light diffusion layer has vertical separation static charge of, preferably $-200\,\text{pc/cm}^2$ to $+200\,\text{pc/cm}^2$, more preferably $-100\,\text{pc/cm}^2$ to $+100\,\text{pc/cm}^2$, particularly preferably $-50\,\text{pc/cm}^2$ to $+50\,\text{pc/cm}^2$, most preferably $0\,\text{pc/cm}^2$, measured for either triacetylcellulose (TAC) or polyethyleneterephthalate (PET) under a normal temperature and normal humidity condition. Here, pc is $10^{-12}$ coulomb. More specifically, vertical separation static charge measured under a normal temperature and 10% RH condition is preferably $-200\,\text{pc/cm}^2$ to $+200\,\text{pc/cm}^2$, more preferably $-50\,\text{pc/cm}^2$ to $+50\,\text{pc/cm}^2$, most preferably $0\,\text{pc/cm}^2$.

A method of measuring the vertical separation static charge is as follows.

A sample to be measured is left alone for more than 2 hours under a measurement temperature and humidity. A measuring apparatus comprises a mount on which the sample to be measured is placed, a head that holds a counterpart film and is repeatedly compressed/separated to/from the sample, and an electrometer connected to the head for measuring static charge. The film that is to be measured and has anti-glare and anti-reflection property is placed on the mount, and then TAC or PET is placed on the head. Electricity is removed from a portion of the sample to be measured, and the head is repeatedly compressed/separated to/from the sample. Values of charge for first and fifth separations are read and averaged. Thereafter, this process is repeated for three different samples. An average of all values of charge obtained in all of the measured samples is assumed to be vertical separation static charge.

A surface resistance value of the film having the light diffusion layer of the invention is preferably $1\times10^7\,\Omega/\square$ to $1\times10^{15}\,\Omega/\square$, more preferably $1\times10^7\,\Omega/\square$ to $1\times10^{14}\,\Omega/\square$, most preferably $1\times10^7\,\Omega/\square$ to $1\times10^{13}\,\Omega/\square$.

A method of measuring the surface resistance value is a circle electrode method disclosed in JIS. That is, a surface resistance value (SR) is obtained from a current value read when one minute elapses after application of a voltage.

It is preferable that an antistatic prevention layer is provided to decrease the surface resistance value. Preferred layer structures are as follows. In the following structures, a base film is also used as a second protective film.

base film/light diffusion layer/antistatic prevention layer/low refractive index layer base film/antistatic prevention layer/light diffusion layer/low refractive index layer base film/light diffusion layer(antistatic prevention layer)/low refractive index layer base film/light diffusion layer/medium refractive index layer(antistatic prevention layer)/high refractive index layer/low refractive index layer base film/light diffusion layer(antistatic prevention layer)/medium refractive index layer/high refractive index layer/low refractive index layer base film/antistatic prevention layer/light diffusion layer/medium refractive index layer/high refractive index layer/low refractive index layer base film/light diffusion layer/medium refractive index layer/high refractive index layer(antistatic prevention layer)/low refractive index layer The above structures are not limitative. For example, the low refractive index layer may be removed from the above structures. It is preferable that the antistatic prevention layer is a layer containing conductive polymer particles or metal oxide particles (for example, ATO, ITO, etc.). The antistatic prevention layer may be provided by application or atmosphere plasma treatment or the like. An anti-smudge layer may be formed on the uppermost layers of the above structures.

In order to increase film hardness (provide scratch resistance), it is preferable that at least one hard coat layer (without or with light diffusion property) is provided as a separate layer in addition to thickening the light diffusion layer having the hard coat property. For this hard coat layer, preferred layer structures are as follows. In the following structures, a base film is also used as a second protective film.

base film/hard coat layer/light diffusion layer/low refractive index layer base film/light diffusion layer/hard coat layer/low refractive index layer The above structures are not limitative. For example, the low refractive index layer may be removed from the above structures. In addition, it is also preferable that the antistatic prevention layer is added to the above structures.

In the invention, an average value of integral reflectivity of the film having the light diffusion layer for 5° incident light in a wavelength range of 450 nm to 650 nm is preferably 3.0% or less, more preferably 2.0% or less, most preferably 1.0% or less.

(Transparent Base Film)

A translucent resin film, a translucent resin plate, a translucent resin sheet or the like may be used as a material of a transparent base film. A transparent glass base material may be used instead of the transparent base film. An example of the translucent resin film may include a triacetylcellulose (TAC) film (refractive index 1.48), a diacetylenecellulose film, an acetatebutyratecellulose film, a polyethyleneterephthalate (PET) film, a polyethersulfone film, a polyacryl resin film, a polyurethane resin film, a polyester film, a polycarbonate film, a polysulfone film, a polyester film, a polymethylpentene film, a polyetherketone film, a (meth)acrylonitrile film, etc. The thickness of the transparent base film is typically in the range of 25 to 200 μm, preferably in the range of 30 to 100 more preferably in the range of 40 to 80 μm. Since the transparent base film is also used for the outermost of the polarizing plate, it is preferable that a celluloseacetate film generally used as a protective film of the polarizing plate is used as the transparent base film. A transparent base film of the light diffusion layer is preferably a celluloseacetate film having high transparency and a smooth surface.

(Celluloseacetate Film)

In the invention, it is particularly preferable that celluloseacetate having acidity of 59.0 to 61.5% is used for the transparent base film. The acidity means the quantity of combined acetic acid per cellulose unit weight. The acidity is obtained by measuring and calculating acetylation in ASTM: D-817-91 (test method for celluloseester and the like). Viscosity-average degree of polymerization (DP) of celluloseester is preferably 250 or more, more preferably 290 or more.

In addition, it is preferable that cellulosacetate used in the invention has a narrow molecule weight distribution of Mw/Mn (Mw is a weight-average molecule weight and Mn is a number-average molecule weight) by a gel permeation chromatography (GPC). Specifically, a value of Mw/Mn is preferably 1.0 to 1.7, more preferably 1.3 to 1.65, most preferably 1.4 to 1.6.

In general, in celluloseacylate, the degree of substitution of second, third and sixth-position hydroxyl groups of the cellulose unit is not evenly distributed by ⅓, but the degree of substitution of sixth-position hydroxyl group tends to become small. In the invention, it is preferable that the degree of substitution of sixth-position hydroxyl group of the cellulose unit of celluloseacylate is larger than those of second and third-position hydroxyl groups. For the total degree of substitution, the second-position hydroxyl group is substituted with an acyl group by, preferably 32% or more, more preferably 33% or more, particularly preferably 34% or more. In addition, it is preferable that the degree of substitution of sixth-position hydroxyl group of the cellulose unit is 0.88 or more. The sixth-position hydroxyl group of the cellulose unit may be substituted with a propionyl group, a butyroyl group, a valeroyl group, a benzoyl group, an acryloyl group, etc., which are an acyl group having three or more carbons, in addition to an acetyl group. The degree of substitution at each of the positions can be obtained by NMR. In the invention, an example of celluloseacylate may include celluloseacetate obtained by the method disclosed in JP-A-1-5851 ("Example 1" (Synthesis example 1) of paragraphs "0043" to "0044", (Synthesis example 2) of paragraphs "0048" to "0049", and (Synthesis example 3) of paragraphs "0051" to "0052").

(Organic Solvent Used in Solvent Cast Method)

It is preferable that the celluloseacetate film is manufactured by a solvent cast method. In the solvent cast method, the film is manufactured by using a solution (dope) in which celluloseacetate is dissolved in an organic solvent. It is preferable that the organic solvent contains a solvent selected from ether having 3 to 12 carbon atoms, ketone having 3 to 12 carbon atoms, ester having 3 to 12 carbon atoms, and halogenated hydrocarbon having 1 to 6 carbon atoms. Ether, ketone and ester may have a ring-shape structure. Compounds having two or more functional groups (that is, —O—, —CO— and —COO—) of ether, ketone and ester may be used as the organic solvent. The organic solvent may have other functional groups such as an alcoholic hydroxyl group. The number of carbon atoms in the organic solvent having two or more kinds of functional groups may fall within a specified range of a compound having several carbon atoms.

An example of ethers having 3 to 12 carbon atoms may include diisopropylether, dimethoxymethane, dimethoxyethane, 1,4-dioxane, 1,3-dioxolane, tetrahydrofuran, anisole and phenetole. An example of ketones having 3 to 12 carbon atoms may include acetone, methylethylketone, diethyl ketone, diisobutylketone, cyclohexanone and methylcyclohexanone. An example of esters having 3 to 12 carbon atoms may include ethylformate, propylformate, pentylformate, methylacetate, ethylacetate and pentylacetate.

An example of the organic solvent having two or more kinds of functional groups may include 2-ethoxyethylacetate, 2-methoxyethanol and 2-buthoxyethanol. The number of carbon atoms of halogenated hydrocarbon is preferably 1 or 2, more preferably 1. It is preferable that halogen of halogenated hydrocarbon is chlorine. A ratio of substitution of hydrogen atoms of halogenated hydrocarbon with halogen is preferably 25 to 75 mol %, more preferably 30 to 70 mol %, particularly preferably 35 to 65 mol %, most preferably 40 to 60 mol %. Methylenechloride is typical halogenated hydrocarbon. A mixture of two or more kinds of organic solvents may be used.

(Plasticizer)

A plasticizer may be added to the celluloseacetate film in order to improve mechanical properties or increase a drying speed. Phosphate ester or carboxylic acid ester is used as the plasticizer. An example of phosphate ester may include triphenyl phosphate (TPP) and tricresyl phosphate (TCP). A typical example of carboxylic acid ester may include phthalate ester and citric acid ester. An example of phthalate ester may include dimethyl phthalate (DMP), diethyl phthalate (DEP), dibutyl phthalate (DBP), dioctylphthalate (DOP), diphenyl phthalate (DPP) and di-ethylhexyl phthalate (DEHP). An example of citric acid ester may include O-acetyl citrate triethyl (OACTE) and O-acetyl citrate tributyl (OACTB). In addition, an example of carboxylic acid ester may include oleic acid butyl, ricinoleic acid methylacetyl, sebacic acid dibutyl, various trimellitic acid esters. Phthalate ester plasticizers (DMP, DEP, DBP, DOP, DPP, DEHP) are preferably used. DEP and DPP are particularly preferable.

The addition amount of plasticizer is preferably 0.1 to 25 wt %, more preferably 1 to 20 wt %, most preferably 3 to 15 wt % of quantity of celluloseester.

A deterioration preventive agent (for example, an antioxidant, a peroxide decomposer, a radical inhibitor, metal deactivator, an acid capture agent, amine, etc.) may be added to the celluloseacetate film. Examples of the deterioration preventive agent are disclosed in JP-A Nos. 3-199201, 5-1907073, 5-194789, 5-271471, and 6-107854. The addition amount of deterioration preventive agent is preferably 0.01 to 1 wt %, more preferably 0.01 to 0.2 wt % of a solution (dope). When the addition amount of deterioration preventive agent is more than 0.01 wt %, a good effect of deterioration preventive agent is obtained. When the addition amount of deterioration preventive agent is less than 1 wt %, the deterioration preventive agent will not be bled (permeated) out of a film surface. An example of deterioration preventive agent may include, particularly preferably a butylated hydroxytoluene (BHT) and tribenzylamine (TBA).

(Surface Treatment of Celluloseacetate Film)

It is preferable that the celluloseacetate film is subjected to a surface treatment. An example of the surface treatment may include a corona discharging treatment, a glow discharging treatment, a flaming treatment, an acid treatment, an alkali treatment and an ultraviolet treatment. In addition, it is also preferable to provide a base layer, as disclosed in JP-A-7-333433. In these treatments, from a standpoint of flatness of the film, it is preferable that the temperature of the celluloseacetate film is less than Tg, specifically 150°. When the celluloseacetate film is used as a transparent film of a polarizing plate, from a standpoint of adhesion with the polarizing plate, it is particularly preferable that celluloseacetate is subjected to an acid or alkali treatment, that is, a saponification treatment. Surface energy of the obtained celluloseacetate film is preferably 55 mN/m or more, more preferably 60 mN/m to 75 mN/m. In addition, in order to coat a layer (film) on the celluloseacetate film uniformly, it is also preferable that the celluloseacetate film is subjected to a heat treatment to enhance flatness of the celluloseacetate film.

(Saponification Treatment)

When the polarizing plate of the invention is manufactured, it is preferable to hydrophilize an adhesion surface between a protective film and a polarizer to enhance adhesion at the adhesion surface.

a. Method to Digest Film into Alkali Solution

This method refers to a method in which a film is digested into an alkali solution under proper conditions and all planes having responsiveness with alkali of the entire surface of the film are subjected to the saponification treatment. This method is preferable from a standpoint of costs since it does not require special equipments. It is preferable that the alkali solution is a sodium hydroxide aqueous solution. The concentration of the alkali solution is preferably 0.5 to 3 mol/L, particularly preferably 1 to 2 mol/L. The temperature of the alkali solution is preferably 30 to 75° C., particularly preferably 40 to 60° C. It is preferable that combination of these saponification conditions is combination of relatively moderate conditions. The combination of these saponification conditions may be set depending on material or configuration of the film or a target contacting portion. After the film is digested in the alkali solution, it is preferable to neutralize an alkali component by sufficiently washing the film or digesting the film into a dilute acid solution so that the alkali component does not remain in the film.

A surface opposite to a surface of an application layer is hydrophilized by the saponification treatment. The protective film of the polarizing plate is obtained by bonding a hydrophilized surface of a transparent support to the polarizer. The hydrophilized surface is effective in enhancing adhesion with an adhesion layer having polyvinylalcohol as a main component.

The saponification treatment is preferable from a standpoint of adhesion with the polarizing plate as a contact angle with water of the surface of the transparent support opposite to an application layer side becomes small. However, in the digest method, since the surface and the inner side of the application layer are damaged, it is important to apply the required minimal reaction conditions. When the contact angle with water of the surface of the transparent support opposite to the application layer side is used as an indicator of damage to each layer by alkali, particularly if the transparent support is made of triacetylcellulose, the contact angle is preferably 10° to 50°, more preferably 30° to 50°, particularly preferably 40° to 50°. When the contact angle is 50° or less, the adhesion with polarizer has no problem. When the contact angle is 10° or more, physical strength of the film keeps constant without significant increase of damage to the film.

b. Method to Apply Alkali Solution

For the purpose of avoiding the damage to the film in the above-described digest method, an alkali solution application method in which an alkali solution is applied only a surface opposite to a surface of the application layer under proper conditions and then the opposite surface is heated, washed and dried is preferably used. In this case, the application means contact of alkali solution with only a surface that is subjected to the saponification treatment by means of application, spray, contact with a belt containing a solution, etc. This application method requires separate equipments and processes to apply the alkali solution. Accordingly, the above-described digest method (a) is an advantage over this application method from a standpoint of cost. However, the application method has an advantage from a standpoint of saponification treatment in that a layer made of a material sensitive to the alkali solution can be used in the opposite surface since the alkali solution contacts only the surface that is subjected to the saponification treatment. For example, it is not preferable that a deposition film made of aluminum or the like or a sol-gel film is used in the digest method since the film is apt to be corroded, dissolved, peeled out, etc. by the alkali solution However, this film can be used in the application method with no problem since the film does not contact the alkali solution.

Since the saponification treatment of either the digest method (a) or the application method (b) can be performed after forming each layer by unrolling the layer from a roll-shaped base film, the saponification treatment may be performed in a series of operations after manufacturing the film. Similarly, by continuously performing a process of laminating the layer with an unrolled polarizer, a polarizing plate can be more effectively manufactured as compared to when the lamination process is separately performed.

c. Method to Protect Application Layer with Laminate Film and Saponificating the Application Layer Similarly to the application method (b), if an application layer has insufficient resistance to an alkali solution, the application layer is formed up to a final layer, a laminate film is laminated on a surface at which the final layer is formed, the final layer is digested into the alkali solution to hydrophilize only a triacetylcellulose side opposite to the surface at which the final layer is formed, and then the laminate film is peeled out. In this method (c), a hydrophilic process required for a polarizing plate protective film can be performed for the side opposite to the surface at which the final layer of the triacetylcellulose film is formed. In comparison to the application method (b), this method (c) does not require a special apparatus for applying an alkali solution although the laminate film comes in disuse.

d. Method to Digest Application Layer into Alkali Solution After Forming the Application Layer up to Intermediate Layer If an upper layer has insufficient resistance to an alkali solution while a lower layer has sufficient resistance to the alkali solution, the lower layer is digested in the alkali solution to hydrophilize both sides of the lower layer, and then the upper layer is formed on the lower layer. In case of a film having a hard coat layer and a low refractive index layer of a fluorine-containing sol-gel film, this method (d) has an advantage of enhancement of interlayer adhesion between the hard coat layer and the low refractive index layer if the film has a hydrophilic group, although a manufacturing process becomes some complicated.

e. Method to Form Application Layer on Triacetylcellulose Film of Saponification Agent in Advance A triacetylcellulose film may be saponificated in advance by digesting the film in an alkali solution, and an application layer may be formed on one side of the film directly or via a different layer. When the triacetylcellulose film is digested into the alkali solution and accordingly is saponified, an interlayer adhesion with a triacetylcellulose plane hydrophilized by the saponification may be deteriorated In this case, such deterioration of the interlayer adhesion can be avoided when the application layer is formed after removing a hydrophilic plane by performing a corona discharging treatment, a glow discharging treatment or the like for only a surface forming the application layer after saponification. In addition, if the application has a hydrophilic group, the interlayer adhesion may be good.

(Manufacture of Polarizing Plate)

In the invention, a polarizing plate for the liquid crystal display of the invention can be manufactured by arranging transparent base films, such as triacetylcellulose films, as protective films on both sides of a polarizer and then forming a light diffusion layer on at least one protective film or stacking a light diffusion film having a formed light diffusion layer on the polarizer. The transparent base film used may be an available triacetylcellulose film. But, as the transparent base film, it is preferable to use a triacetylcellulose film that is manufactured using the above-described solution film forming methods and is expanded in a width direction in a roll film shape with an expansion magnification of 10 to 100%. In addition, in the polarizing plate of the invention, an optical compensation film having an optically anisotropic layer containing a liquid crystal compound may be stacked on one protective film, or this protective film may be also used as an optical compensation film.

An example of the polarizer may include an iodine polarizer, a dye polarizer using a dichroic dye and a polyene polarizer. In general, the iodine polarizer and the dye polarizer are manufactured using a polyvinylalcohol film.

Moisture permeability of a protective film is important for productivity of the polarizing plate. The polarizer and the protective film are laminated by a water-base adhesive, and this adhesive solvent is diffused into the protective film and is dried. A higher moisture permeability of the protective film gives a faster drying of the adhesive solution, thereby improving productivity. However, if the moisture permeability is too high, moisture permeates into the polarizer under high humidity use environments of the liquid crystal display, thereby deteriorating polarizability. The moisture permeability of the protective film depends on the kind of transparent base film, and its thickness (thickness including a liquid crystal compound if the protective film is an optical compensation film), free volume, hydrophilic and hydrophobic properties, etc.

In the polarizing plate of the invention, the moisture permeability of the protective film is preferably 100 to 1000 g/m$^2$·24 hrs, more preferably 300 to 700 g/m$^2$·24 hrs.

The thickness of the transparent base film may be adjusted by lip flow, line speed, expansion, compression and the like when the film is manufactured. Since the moisture permeability is varied depending on a main material used, it is possible to set the moisture permeability to fall within a preferred range by thickness adjustment. The free volume of the transparent base film may be adjusted by dry temperature and time. In this case, since the moisture permeability is also varied depending on a main material used, it is possible to set the moisture permeability to fall within a preferred range by free volume adjustment. The hydrophilic and hydrophobic properties of the transparent base film may be adjusted by additives. The moisture permeability is increased by adding a hydrophilic additive to the free volume, while the moisture permeability is decreased by adding a hydrophobic additive to the free volume By controlling the moisture permeability independently, it is possible to manufacture the polarizing plate having the optical compensation performance at low costs and with high productivity.

A retardation axis of a transparent base film or a triacetylcellulose film of an optical film and a transmission axis of a polarizer may be arranged in substantial parallel to each other.

An example of the polarizer may include a known polarizer, a polarizer cut from a long polarizer whose absorption axis is neither parallel nor perpendicular in a longitudinal direction, etc.

Typically, it is preferable that the protective film is continuously laminated on a long polarizer that is supplied in the form of a roll, with their longitudinal directions coincident with each other. Here, an alignment axis (retardation axis) of the protective film may be in any direction. For the sake of operational convenience, it is preferable that the alignment of the protective film is either parallel or perpendicular in the longitudinal direction.

When the protective film and the polarizer are laminated each other, although the retardation axis (alignment axis) of at least one protective film (a protective film arranged at a side closer to a liquid crystal cell when the protective film is mounted in the liquid crystal display) may intersect the absorption axis (expansion axis) of the polarizer, mechanical stability of the polarizing plate can be improved to prevent dimensional change and curl of the polarizing plate when the retardation axis of the protective film is in parallel to the absorption axis of the polarizer. The same effect is obtained if at least two axes of three films including the polarizer and the pair of protective films are in substantial parallel to each other, if the retardation axis of one protective film is in substantial parallel to the absorption axis of the polarizer, or if retardation axes of two protective films are in substantial parallel to each other.

(Adhesive Agent)

An adhesive agent between the polarizer and the protective film may include is not particularly limited, but may include, for example, a PVA resin (including modified PVA such as an acetacetyl group, a sulfonic acid group, a carboxyl group, an oxyalkylene group and so on) and a boron compound aqueous solution, preferably the PVA resin. The thickness of the adhesive layer is preferably 0.01 to 10 µm, particularly preferably 0.05 to 5 µm.

(Integrated Manufacturing Process of Polarizer and Protective Film)

It is preferable that the polarizing plate for the liquid crystal display of the invention is manufactured by expanding and contracting a polarizer, lowering its volatility fraction to dry the polarizer, laminating a protective film on at least one side of the polarizer during or after drying, and then post-heating the polarizer and the protective film. When the protective film is also used as an optical compensation film functioning as an optical compensation layer or a base film of a light diffusion layer, it is preferable that the protective film having the light diffusion layer at its one side and the transparent base film having the optical compensation film at a side opposite to the protective film are laminated each other and are post-heated.

An example of the lamination method may include a method of laminating the protective film on the polarizer using an adhesive, with both ends of the polarizer fixed, during drying of the polarizer, and then ear-notching both ends, a method of releasing the polarizer from a state when both ends of the polarizer are fixed after drying of the polarizer, ear-notching both ends and then laminating the protective film on the polarizer, etc. An example of an ear notch method may include a cutter method, a laser method and other known methods. It is preferable to heat the protective film and the polarizer after the lamination in order to dry the adhesive agent and improve polarizability. Heating conditions are varied depending on the kind of the adhesive agent. In case of a water-base adhesive agent, heating temperature is preferably 30° C. or more, more preferably 40° C. to 100° C., particularly preferably 50° C. to 90° C. It is particularly preferable from a standpoint of performance and productivity that these processes are performed in an assembly line.

(Performance of Polarizing Plate)

It is preferable that the polarizing plate comprising the protective film, the polarizer and the light diffusion layer related to the invention has optical properties and durability (conservation in short and long terms) which are equivalent or superior to those of available super high contrast products (for example, "HLC2-5618" available from Sanritz Corporation). Specifically, if visible light transmittance is 42.5% or more, a polarization degree $\{(Tp-Tc)/(Tp+Tc)\}^{1/2} \geqq 0.9995$ (where, Tp is parallel transmittance and Tc is perpendicular transmittance), and the polarizing plate are left alone for 500 hours at temperature of 60° C. under an atmosphere of 90% RH and for 500 hours at temperature of 80° C. under a dry atmosphere, an absolute value of a change rate (%) of light transmittance is preferably 3 or less, more preferably 1 or less, and an absolute value of a change rate of polarization degree is preferably 1 or less, more preferably 0.1 or less.

(Optical Compensation Film)

An optical compensation film is used to alleviate image coloration or extend a viewing angle in a liquid crystal display. In the invention, the optical compensation film is not indispensable, as described above. For example, the optical compensation film is unnecessary if one or both of a pair of protective films of the polarizing plate have a birefringence property to function as an optical compensation film.

In-plane retardation (Re) of the entire optical compensation film is preferably 20 to 200 nm. Thickness direction retardation (Rth) of the entire optical compensation film is preferably 50 to 500 nm.

An example of the optical compensation film may include an optical compensation film formed of an expansible polymer film and an optical compensation film formed of a low or high molecule liquid crystal compound on a transparent base film, both of which may be used in the invention. An optical compensation film having a stacked structure including a two-layered optical compensation film may be used. In consideration of thickness of the optical compensation film having the stacked structure, an optical compensation film having a coated-type stacked structure is preferred to an optical compensation film having a high molecule expansible film stacked structure.

A high molecule film used for the optical compensation film may be an expanded high molecule film or combination of a coated-type high molecule layer and a high molecule film. An example of material of the high molecule film may generally include a synthetic polymer (for example, polycarbonate, polysulfone, polyethersulfone, polyacrylate, polymethacrylate, norbornene resin, triacetylcellulose, etc.).

(Optical Compensation Formed of Liquid Crystal Compound)

Next, an optical compensation film formed of a liquid crystal compound will be described in detail.

Since a liquid crystal compound has a variety of alignment states, an optical compensation film formed of a liquid crystal compound exhibits a desired optical property by a single layer or a multi-layered structure. That is, the optical compensation film may comprise a base film and one or more layers formed on the base film. Retardation of the entire optical compensation film may be adjusted by optical anisotropy of the optical compensation film. In addition, either a low molecule type optical compensation film or a high molecule type optical compensation film may be used in the invention.

(Optical Compensation Formed of Discotic Liquid Crystal Compound)

A discotic liquid crystal compound may be used as the liquid crystal compound forming the optical compensation film. It is preferable that the discotic liquid crystal compound is aligned substantially perpendicular (at an average inclined angle of 50 to 90°) to a polymer film plane.

Examples of the discotic liquid crystal compound are disclosed in various documents (for example, C. Destrade et al, "Mol. Crysr. Liq. Cryst.", Volume 71, p. 111(1981); Japanese Chemical Society, "Introduction to Chemistry, published quarterly", No. 22, "Chemistry of liquid crystal", Chapter V, Chapter X Paragraph II (1994); B. Kohne et al, "Angew. Chem. Soc. Chem. Comm", p. 1794 (1985); J. Zhang et al, "J. Am. Chem. Soc.", Volume 116, p. 2655 (1994), etc.). Polymerization of a discotic liquid crystal compound is disclosed in JP-A-8-27284.

It is preferable that the discotic liquid crystal compound has a polymeric group so that the compound can be fixed by polymerization. For example, it may be considered that a polymeric group as a substituent is combined to a discotic core of a discotic liquid crystal compound. However, if the polymeric group is directly combined to the discotic core, it is difficult to maintain an alignment state in a polymerization reaction. In this case, a structure having a linkage group between the discotic core and the polymeric group is preferable. That it is preferable that the discotic liquid crystal compound having the polymeric group is a compound expressed by the following formula (1).

$$D(-L-P)n \quad \text{formula (1)}$$

In the formula (1), D represents a discotic core, L represents a bivalent linkage group, P represents a polymeric group, and n represents an integer of 4 to 12.

Examples of the discotic core (D), the bivalent linkage group (L) and the polymeric group (P) in the general formula (1) may include (D1) to (D15), (L1) to (L25) and (P1) to (P18), respectively, disclosed in JP-A-2001-4837, the disclosure of which is incorporated herein by reference.

Preferably, these liquid crystal compounds are aligned substantially uniformly in the optical compensation film. More preferably, these liquid crystal compounds are fixed with a substantially uniform alignment state in the optical compensation film. Most preferably, these liquid crystal compounds are fixed by a polymerization reaction. It is preferable that the discotic liquid crystal compound having the polymeric group is substantially perpendicularly aligned. The term 'substantially perpendicularly' used herein means that an average angle (average inclined angle) between a disk plane of the discotic liquid crystal compound and a plane of an optical compound film falls within a range of 50° to 90°. The discotic liquid crystal compound may be obliquely aligned, or may have a slowly varying inclined angle (hybrid alignment). In case of the oblique alignment or the hybrid alignment, an average inclined angle is preferably 50° to 90°.

It is preferable that the optical compensation film is formed by applying the liquid crystal compound and the following polymerization initiator or other additives on an alignment film.

It is preferable that a solvent used to make an application solution is an organic solvent. An example of the organic solvent may include amide (for example, N,N-dimethylformamide), sulfoxide (for example, dimethylsulfoxide), a heterocyclic compound (for example, pyridine), hydrocarbon (for example, benzene, hexane, etc.), alkylhalide (for example, chloroform, dichloromethane, etc.), ester (for example, acetic acid methyl, acetic acid butyl, etc.), ketone (for example, acetone, methylethylketone, etc.), ether (for example, tetrahydrofuran, 1,2-dimethoxyethane, etc.), etc., preferably the alkylhalide and the ketone. Two or more kinds of organic solvents may be used in combination. The application solution may be applied by known methods (for example, an extrusion coating method, a direct gravure coating method, a reverse gravure coating method, a die coating method, etc.).

(Fixation of Alignment State of Liquid Crystal Compound)

It is preferable that an aligned liquid crystal compound is fixed while maintaining its alignment state. It is preferable that the aligned liquid crystal compound is fixed by a polymerization reaction of a polymeric group introduced into the liquid crystal compound. The polymerization reaction includes a thermal polymerization reaction using a thermal polymerization initiator and a photopolymerization reaction using a photopolymerization initiator, preferably the photopolymerization reaction. An example of the photopolymerization initiator may include a α-carbonyl compound (for example, ones disclosed in U.S. Pat. Nos. 2,367,661 and 2,367,670), acyloinether (for example, one disclosed in U.S. Pat. No. 2,448,828), a α-hydrocarbon-substituted aromatic acyloin compound (for example, one disclosed in U.S. Pat. No. 2,722,512), a polynuclear quinone compound (for example, ones disclosed in U.S. Pat. Nos. 3,046,127 and 2,951,758), combination of triarylimidazoledimer and p-amino phenylketone (for example, one disclosed in U.S. Pat. No. 3,549,367), an acridine and fenadine compound (for example, ones disclosed in JP-A-60-105667 and U.S. Pat. No. 4,239,850), and an oxadiazole compound (for example, one disclosed in U.S. Pat. No. 4,212,970).

Usage of the photopolymerization initiator is preferably 0.01 to 20 wt %, more preferably 0.5 to 5 wt % of solid of the application. It is preferable that an ultraviolet ray is used for radiation for polymerization of the liquid crystal compound. Radiation energy is preferably 20 mJ/cm$^2$ to 50 J/cm$^2$, more preferably 100 to 800 mJ/cm$^2$. The radiation may be carried out under heating conditions in order to promote the photopolymerization reaction. The thickness of the optical compensation film is preferably 0.1 to 10 μm, more preferably 0.5 to 5 μm.

(Alignment Film)

When the optical compensation film is formed, it is preferable to use an alignment film in order to align the liquid crystal compound. The alignment layer may be prepared by means of a rubbing treatment of an organic compound (preferably a polymer), oblique deposition of an inorganic compound, formation of a layer having a micro group, or accumulation of an organic compound (for example, m-tricosane, dioctadecyldimethylammoniumchloride, stearyl acid methyl, etc.) by an Langmuir-Blodgett method (BL film). In addition, alignment films having an alignment function by application of an electric field or a magnetic field, or light radiation. An alignment film formed by a rubbing treatment of a polymer is particularly preferable.

The rubbing treatment is performed by rubbing a surface of a polymer layer several times in a constant direction with paper or fabric. The kind of the polymer used in the alignment film depends on alignment (particularly an average inclined angle) of the liquid crystal compound. For example, a polymer not to lower surface energy of the alignment film (an ordinary polymer for alignment) is used to align the liquid crystal compound horizontally. Examples of kinds of the polymer for a liquid crystal cell or an optical compensation film are disclosed in various documents. It is preferable that any alignment film has a polymeric group to enhance adhesion between the liquid crystal compound and a transparent support. It is preferable to use an alignment film forming a chemical bond with the liquid crystal compound at an interface therebetween, as disclosed in JP-A-9-152509.

The thickness of the alignment film is preferably 0.01 to 5 μm, more is preferably 0.01 to 1 μm.

In addition, after the liquid crystal compound is aligned using the alignment film, an optical compensation film may be formed by fixing the liquid crystal compound while maintaining the alignment state, and transferred into the transparent base film.

A base film to support the optical compensation film is not particularly limited, but may be one of various polymer films, for example, triacetylcellulose, norbornene resin, etc. In addition, as described above, the protective film of the polarizing plate may be also used as a support of the optical compensation film. Examples of material of the base film in this aspect are the same as the examples of material of the protective film of the polarizing plate, as described above.

EXAMPLES

Example 1

A liquid crystal display shown in FIG. 1 is manufactured. Specifically, the upper polarizing plate 1, the upper optical compensation film 14, the liquid crystal cell (the upper substrate 5, the liquid crystal molecules 6 contained in the liquid crystal layer, the lower substrate 7), the lower optical compensation film 24, and the lower polarizing plate 2 are stacked from an observation direction (top side). In addition, the backlight unit (not shown) using a cold cathode fluorescent lamp or the like is disposed below the lower polarizing plate.

Hereinafter, a method of manufacturing the members used will be described.

(Manufacture of ECB Mode Liquid Crystal Cell)

For the liquid crystal cell, a liquid crystal material having positive dielectric anisotropy is drop-injected and sealed between the substrates, with a cell gap of 3.5 μm, and Δn·d of the liquid crystal layer 7 is set to be 300 nm. As the liquid crystal material, liquid crystals having positive anisotropy and refractive index anisotropy of Δn=0.0854 (589 nm, 20° C.) and Δ∈=+8.5 (for example, MLC-9100 available from Merck, Co., Ltd.) are used. An intersection angle of the liquid crystal cell is 0°, and, when the liquid crystal cell is laminated on the upper and lower polarizing plates later, the rubbing directions (alignment control directions) of the upper and lower substrates of the liquid crystal cell intersect a support retardation axis (in parallel to an expansion direction) by 45°. A polarizing plate absorption axis interests the liquid crystal cell alignment directions (rubbing directions) by about 45°, and an intersection angle between absorption axes of the upper and lower polarizing plates is about 90°, which is cross Nicol.

(Manufacture of Celluloseacetate Film)

A celluloseacetate solution is prepared by heating and agitating the following compositions put into a mixing tank and dissolving components of the compositions.

(Composition of Celluloseacetate Solution)

| | |
|---|---|
| Celluloseacetate having acidity of 60.7 to 61.1% | 100 parts by weight |
| Triphenylphosphate (plasticizer) | 7.8 parts by weight |
| Biphenyldiphenylphosphate (plasticizer) | 3.9 parts by weight |
| Methylenechloride (first solvent) | 336 parts by weight |
| Methanol (second solvent) | 29 parts by weight |
| 1-buthanol (third solvent) | 11 parts by weight |

The obtained dope is expanded using a band expander. A celluloseacetate film (80 μm thick) having remaining solvent of 0.3 wt % is prepared by drying a film on a band with warm wind of 70° C. after the temperature of the film surface reaches 40° C. and then again drying the film with drying wind of 140° C. Re and Rth values for a wavelength of 546 nm are measured for the prepared celluloseacetate film (transparent support and protective film) according to the above-described methods. As a result of the measurement, Re is 3 nm and Rth is 8 nm.

The prepared celluloseacetate film is digested into a potassium hydroxide solution (25° C.) of 2.0 mol/L for two minutes, neutralized with sulfuric acid, washed with pure water, and then dried. Surface energy of the celluloseacetate film is measured by a contact method. As a result of the measurement, the surface energy is 63 mM/m. In this manner, the celluloseacetate film for the protective film is manufactured.

(Manufacture of Alignment Film for Optical Compensation Film)

An application solution having the following compositions is applied on the celluloseacetate film using a #16 wire bar coater. The application solution is dried for 60 seconds with warm wind of 60° C., and then again for 150 seconds with warm wind of 90° C. Next, the formed film is subjected to a rubbing treatment in the same direction as an in-plane retardation axis (in parallel to an expansion direction) of the celluloseacetate film.

(Composition of Alignment Film Application Solution)

| Following modified polyvinylalcohol | 20 parts by weight |
| Water | 360 parts by weight |
| Methanol | 120 parts by weight |
| Glutaraldehyde (plasticizer) | 1.0 parts by weight |

Modified polyvinylalcohol

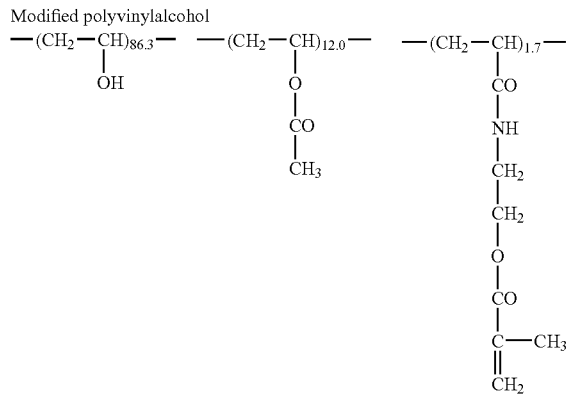

(Manufacture of Optical Compensation Film)

On the alignment film is applied an application solution in which the following discotic liquid crystal compound of 91.0 g, ethyleneoxide modified trimethylolpropanetriacrylate (V#360 available from OSAKA ORGANIC CHEMICAL INDUSTRY LTD.) of 9.0 g, celluloseacetatebutylate (CAB551-0.2 available from Eastman Chemical Company) of 2.0 g, celluloseacetatebutylate (CAB531-1 available from Eastman Chemical Company) of 0.5 g, photopolymerization initiator (IRGACURE 907 available from Nihon Ciba-Geigy K.K.) of 3.0 g, and intensifier (KAYACURE DETX available from Nippon Kayaku Co., Ltd) of 1.0 g are dissolved into methylethylketone of 414 g, at 6.2 ml/m² (6.2 cc/m²) using a #3.6 wire bar. This application solution is heated for two minutes in a constant temperature zone of 130° C. to align the discotic liquid crystal compound. Next, the discotic liquid crystal compound is polymerized by means of UV radiation for one minute at temperature of 60° C. using a high pressure mercury lamp of 120 W/cm. Thereafter, the temperature decreases to a room temperature, and then the optical compensation film is formed.

Discotic Liquid Crystal Compound

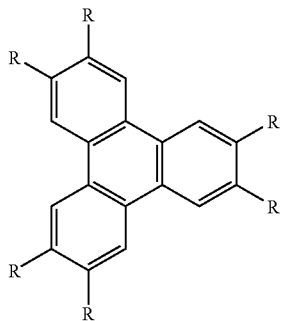

-continued

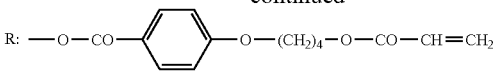

In the formed optical compensation film, the discotic liquid crystal compound is hybrid-aligned with an angle of 11° to 66° (inclined angle) between a disk plane and a protective film, which increases from the protective film to an air interface. The inclined angle is calculated by measuring a retardation value while changing an observation angle using an ellipsometer (M-150 available from JASCO Corporation) according to a method disclosed in "Design Concepts of the Discotic Negative Birefringence Compensation Films SID98 DIGEST" with the assumption of a refractive index ellipsoid.

(Manufacture of Elliptical Polarizing Plate)

A polarizer is manufactured by absorbing iodine into an expanded polyvinylalcohol film, and the formed optical compensation film is laminated on one side of the polarizer at a support plane using a polyvinylalcohol adhesive. In addition, a 80 μm thick cellulosetriacetate film (TD-80U available from FUJIFILM Corporation) is subjected to a saponification treatment, and is laminated on a side opposite to the liquid crystal cell of the polarizer using a polyvinylalcohol adhesive. The absorption axis of the polarizer and the retardation axis (in parallel to the expansion direction) of the support of the optical compensation film are arranged in parallel to each other. In this manner, the polarizing plate is manufactured.

In addition, with respect to a horizontal direction of the display device, an axial angle of the absorption axis of the polarizer of the upper polarizing plate is set to be 45°, the alignment control direction (rubbing direction) of the upper optical compensation film is set to be 45°, the alignment control direction (rubbing direction) of the liquid crystal cell upper substrate is set to be 90°, an axial angle of the lower polarizing plate is set to be 135°, the alignment control direction of the lower optical compensation film is set to be 135°, and the alignment control direction (rubbing direction) of the liquid crystal cell lower substrate is set to be 270°.

(Application of Light Diffusion Layer)

(Light Diffusion Layer HC-01A)

A translucent resin forming a light diffusion layer is obtained by dissolving a mixture of a zirconium oxide ultrafine particle dispersion-containing hard coat application solution (DeSolite Z7404 available from JSR Corporation) of 100 parts by weight and a translucent resin DPHA (available from Nippon Kayaku Corporation; a mixture of dipentaerythritolhexaacrylate and dipentaerythritolpentaacrylate) of 57 parts by weight in a methylethylketone/methylisobutylketone (20/80 weight ratio) solution and applying and UV-curing the mixture. A refractive index of the obtained translucent resin is 1.61. A mixture of cross-linked polymethylmethacrylate beads (MX150 having a diameter of 1.5 μm and a refractive index of 1.49, which is available from Soken Chemical & Engineering Co., Ltd.) of 17 parts by weight and cross-linked polymethylmethacrylate beads (MX300 having a diameter of 3.0 μm and a refractive index of 1.49, which is available from Soken Chemical & Engineering Co., Ltd.) of 7 parts by weight as translucent particles is dissolved into the methylethylketone/methylisobutylketone (20/80 weight ratio) solution to have solid of 50%. This solution having the solid of 50% is applied on a triacetylcellulose film (TD-80U available from FUJIFILM Corporation) at side opposite to the optical compensation film of the elliptical polarizing plate, with the polarizer interposed therebetween, with the application amount of 1.5 μm polymethylmethacrylate beads of 0.42 g/m², dried for 15 seconds at 30° C. and for 20 seconds at 90° C., and then cured by means of radiation of an ultraviolet ray of 50 mJ/cm² using an air cooling metalhalide lamp (available from EYEGRAPHICS CO., LTD.) of 160 W/cm under a nitrogen fuzzy atmosphere (oxygen concentration: 100 ppm). Thus, a polarizing plate having the light diffusion layer HC-01A is manufactured. The thickness of a dried film of the light diffusion layer is 3.0 μm.

(Light Diffusion Layer HC-02A to 11A)

Except that the application amount of 1.5 μm polymethylmethacrylate beads of the light diffusion layer is changed, Light diffusion layers HC-02A~11A are manufactured in a manner similar to the light diffusion layer HC-01A. The application amount of 1.5 μm polymethylmethacrylate beads is as shown in a table which will be described later.

(Light Diffusion Layer HC-01B)

A translucent resin forming a light diffusion layer is obtained by dissolving and diluting a mixture of a DPHA (available from Nippon Kayaku Corporation) of 14.79 parts by weight and a PET-30 (available from Nippon Kayaku Corporation; a mixture of pentaerythritoltriacrylate and pentaerythritoltetraacrylate) of 133.11 parts by weight into a solution and applying and UV-curing the mixture. A refractive index of the obtained translucent resin is 1.53. A beads dispersion solution of 7.7 parts by weight in which highly cross-linked polystyrene beads (SBX-8 having a diameter of 8 μm and a refractive index of 1.62, which is available from SEKISUI PLASTICS Co., Ltd.) as translucent particles are adjusted to have beads solid of 30% with cyclohexanone, a beads dispersion solution of 17.97 parts by weight in which cross-linked polystyrene beads (SX130H having a diameter of 1.3 μm and a refractive index of 1.61, which is available from Soken Chemical & Engineering Co., Ltd.) are adjusted to have beads solid of 30% with cyclohexanone, a polymerization initiator of 6 parts by weight (IRGACURE 184 available from Chiba Specialty Chemicals), a polymerization initiator of 1.06 parts by weight (IRGACURE 907 available from Chiba Specialty Chemicals), a silicon leveling agent of 0.22 parts by weight (FZ2191 available from Nippon Unicar Company Limited), toluene of 133.5 parts by weight, and cyclohexanone of 39.2 parts by weight are mixed in the resin solution to have solid of 46%. This solution having the solid of 46% is applied on a triacetylcellulose film (TD-80U available from FUJIFILM Corporation) at side opposite to the optical compensation film of the elliptical polarizing plate, with the polarizer interposed therebetween, with the layer thickness of 20 μm, dried for 15 seconds at 30° C. and for 20 seconds at 90° C., and then cured by means of radiation of an ultraviolet ray of 50 mJ/cm² using an air cooling metalhalide lamp (available from EYEGRAPHICS CO., LTD.) of 160 W/cm under a nitrogen fuzzy atmosphere (oxygen concentration: 100 ppm). Thus, a polarizing plate having the light diffusion layer HC-01B is manufactured. The application amount of the 1.3 μm cross-linked polystyrene beads is 1.1 g/m².

(Light Diffusion Layer HC-01C)

A translucent resin forming a light diffusion layer is obtained by dissolving a mixture of a silica ultrafine particle dispersion-containing hard coat application solution (DeSolite Z7526 available from JSR Corporation) of 100 parts by weight, cross-linked polystyrene beads (SX130H having a diameter of 1.3 μm and a refractive index of 1.61, which is available from Soken Chemical & Engineering Co., Ltd) of 25 parts by weight as translucent particles, and cross-linked polystyrene beads (SX350H having a diameter of 3.5 μm and a refractive index of 1.61, which is available from Soken Chemical & Engineering Co., Ltd.) of 6 parts by weight into a methylethylketone/methylisobutylketone (20/80 weight ratio) solution to have solid of 45%. This solution having the solid of 45% is applied on a triacetylcellulose film (TD-80U available from FUJIFILM Corporation) at side opposite to the optical compensation film of the elliptical polarizing plate, with the polarizer interposed therebetween, with the application amount of 1.3 μm polystyrene beads of 0.9 g/m², dried for 15 seconds at 30° C. and for 20 seconds at 90° C., and then cured by means of radiation of an ultraviolet ray of 50 mJ/cm² using an air cooling metalhalide lamp (available from EYEGRAPHICS CO., LTD,) of 160 W/cm under a nitrogen fuzzy atmosphere (oxygen concentration: 100 ppm). Thus, a polarizing plate having the light diffusion layer HC-01C is manufactured. The thickness of a dried film of the light diffusion layer is 3.0 μm.

(Light Diffusion Layer HC-01D)

Except that (1) the highly cross-linked polystyrene beads (SBX-8 having a diameter of 8 μm and a refractive index of 1.62, which is available from SEKISUI PLASTICS Co., Ltd.) is replaced with highly cross-linked polystyrene beads (SBX-6 having a diameter of 6 μm and a refractive index of 1.62, which is available from SEKISUI PLASTICS Co., Ltd.) and (2) the thickness of the dried film of the light diffusion layer is changed from 20 μm to 5.5 μm, a light diffusion layer HC-01D is manufactured in the same similar as the light diffusion layer HC-01B.

In addition, (3) the application amount of 1.3 μm polystyrene beads is as shown in a table which will be described later to manufacture light diffusion layers HC-02D to 04D.

(Application of Low Refractive Layer)

(Preparation of Sol Solution (a))

In a reactor having an agitator and a reflux condenser, a sol solution is obtained by mixing methylethylketone of 119 parts by weight, 3-acryloyloxypropyltrimethoxysilane of 101 parts by weight (KBM-5103 available from Shin-Etsu Chemical Co., Ltd.) and diisopropoxyaluminumethylacetacetate of 3 parts by weight, adding ion exchange water of 30 wt % to the mixture, reacting the mixture and the ion exchange water for 4 hours at 60° C., and cooling resultants to the room temperature. A weight-average molecule weight of the sol solution (a) is 1600, components having a molecule weight of 1000 to 20000 of components over oligomer components are 100 wt %. In addition, a gas chromatography analysis shows that there remains no acryloyloxypropyltrimethoxysilane as raw material. Finally, a methylethylketone solution is prepared, and concentration of solid is 29 wt %.

(Preparation of Low Refractive Layer Application Solution)

Low refractive layer application solutions LN-1 to LN-3 are adjusted according to the following table. Numerals in the table have the unit of parts by weight.

TABLE 1

| | | APPLICATION SOLUTION | | |
|---|---|---|---|---|
| | RAW MATERIAL | LN-1 | LN-2 | LN-3 |
| FLUORINE-CONTAINING BINDER | JTA-113 | 56.5 | 56.5 | — |
| | P-3 | — | — | 7.51 |
| BINDER | SOL(a) | 1.88 | 0.95 | 0.95 |
| PARTICLE | MEK-ST-L | 5.57 | — | — |
| | HOLLOW SILICA DISPERSION SOLUTION | — | 7.76 | 7.76 |
| INITIATOR | PM980M SOLUTION | 1.73 | 1.73 | 0.87 |
| | MP-TRIAZZINE | — | — | 0.09 |
| ADDITIVE | RMS-033 | — | — | 2.75 |

TABLE 1-continued

| | | APPLICATION SOLUTION | | |
|---|---|---|---|---|
| RAW MATERIAL | | LN-1 | LN-2 | LN-3 |
| SOLVENT | METHYLETHYL-KETONE | 31.5 | 30.2 | 72.6 |
| | CYCLOHEXANONE | 2.83 | 2.83 | 7.51 |
| TOTAL | | 100 | 100 | 100 |

The application solutions LN-1 to LN-2 are prepared when they are filtered by a polypropylene filter having a hole diameter of 1 μm.

Compounds used to prepare the application solutions are as follows.

"JTA-113": fluorine-containing thermally cross-linkable polymer solution that contains silicon, refractive index 1.44, solid concentration 6 wt %, solvent methylethylketone, made by JSR Corporation "P-3": fluorine-containing copolymer (P-3) disclosed in Japanese Unexamined Patent Application Publication No. 2004-45462, weigh-average molecule weight about 50000, solid concentration 23.8 wt %, solvent methylethylketone "MEK-ST-L": silica particle dispersion solution, average diameter 45 nm, solid concentration 30 wt %, dispersion solvent methylethylketone, made by NISSAN CHEMICAL INDUSTRIES, LTD "PM980M solution": solution in which polymerization initiator PM980M made by Wako Pure Chemical Industries, Ltd. is diluted by solvent methylethylketone to have solid concentration of 2 wt %

"MP-triazine": photopolymerization initiator made by Sanwa Chemical Co., Ltd.

"RMS-033": reactive silicon resin made by Gelest Corporation, methylethylketone 6 wt %

"Hollow silica dispersion solution": CS-60, dispersion solvent isopropylalcohol, made by CATALYSIS & CHEMICALS IND. Co., Ltd., hollow silica particle dispersion solution in which hollow silica particles (surface modification rate: 30 wt % for hollow silica) having a refractive index of 1.31, an average diameter of 60 nm, and a shell thickness of 10 nm are surface-modified by a silane coupling agent (KBM-5103 available from Shin-Etsu Chemical Co., Ltd.), solid concentration 18.2 wt %

(Application of Low Refractive Index Layer-1)

After various kinds of light diffusion layers of the invention are applied, the application solutions LN-1 and 2 are wet-applied using a bar coater such that the thickness of the dried film of the low refractive index layer becomes 95 nm. Subsequently, the low refractive index layer is dried for 150 seconds at 120° C. and again for 8 minutes at 100° C., cured by means of radiation of an ultraviolet ray of 110 mJ/cm$^2$ using an air cooling metalhalide lamp (available from EYEGRAPHICS Co., Ltd.) of 240 W/cm under a nitrogen fuzzy atmosphere (oxygen concentration: 100 ppm), and then rolled. A refractive index of the low refractive index layer is 1.45 for LN-1 and 1.41 for LN-2.

(Application of Low Refractive Index Layer-2)

After various kinds of light diffusion layers of the invention are applied, the application solution LN-3 is wet-applied using a die coater such that the thickness of the dried film of the low refractive index layer becomes 95 nm. Subsequently, the low refractive index layer is dried for 70 seconds at 120° C., cured by means of radiation of an ultraviolet ray of 400 mJ/cm$^2$ using an air cooling metalhalide lamp (available from EYEGRAPHICS Co., Ltd.) of 240 W/cm under a nitrogen fuzzy atmosphere (oxygen concentration: 100 ppm), and then rolled. A refractive index of the low refractive index layer is 1.38.

Samples 1-1 to 1-20 of the invention and samples of comparative examples 1 to 5 are applied based on the following table to prepare light diffusion layer attachment films. The sample 1-19 of the invention is one having no refractive index layer of the sample 1-9 of invention, and the sample 1-20 of the invention is one having no refractive index layer of the sample 1-19 of invention.

(Evaluation of Light Diffusion Film)

The obtained light diffusion films are evaluated for the following items.

(1) Integral Reflectivity

Integral reflectivity is measured for an incident angle of 5° in a wavelength range of 380 nm to 780 nm using a spectrophotometer "V-550" (available from JASCO Corporation) in which an adapter "ILV-471" is mounted. Average integral reflectivity is calculated to be 450 to 650 nm.

(2) Internal Haze

1) A total haze value (H) of the obtained optical film is measured based on JIS-K7136.

2) Several silicon oil drops are added to both sides of the optical film, and then two sheets of 1 mm thick glass plates (micro slider glass code S9111 available from MATSUNAMI Corporation) are closely adhered to both sides of the optical film, respectively. Here, a haze is measured with a surface haze removed, and a haze is measured with only silicon oil inserted between the two sheets of glass plates whose haze is separately measured. An internal haze (Hi) of the film is calculated as a difference between the measured hazes.

3) A surface haze (Hs) is calculated as a difference between the total haze (H) and the internal haze (Hi).

(3) Evaluation of Scattering Light Profile

The light diffusion film is arranged perpendicular to incident light and a scattering light profile is measured over all directions using an auto Gonio-photometer GP-5 type (available from MURAKAMI COLOR RESEARCH LABORATORY Co., Ltd.). Scattering light intensity of 30° is obtained for light intensity of emission angle of 0°.

(4) Viewing Angle

For the manufactured liquid crystal display, a viewing angle in an upper direction is measured in 8 steps from black display (L1) to white display (L8) using a measuring instrument (EZ-Contrast160D available from ELDIM Corporation).

A contrast ratio is more than 10 and a viewing angle has a range with no gray scale inversion.

Evaluation is made in the following four steps.

◯: 76° or more

Δ: 73° or more and less than 76°

Δx: 70° or more and less than 73° x: less than 70°

(5) Blur (5) Blur

An image is displayed on the manufacture liquid crystal display and blur of the displayed image is evaluated in four steps.

◯: No blur was found out.

◯': A very little blur was found out, but was not remarkable.

Δ: A little blur was recognized.

x: Blur was recognized.

TABLE 2

| | LIGHT DIFFUSION LAYER | | | LOW REFRACTIVE LAYER | | | | | DISPLAY CHARACTERISTIC | |
|---|---|---|---|---|---|---|---|---|---|---|
| | SOLUTION | REFRACTIVE INDEX | APPLICATION AMOUNT OF PARTICLES TO GRANT SCATTERING ABILITY (g/ml) | SOLUTION | REFRACTIVE INDEX | INTERNAL HAZE (%) | $I_{30°}/I_{0°}$ (%) | INTEGRAL REFLECTIVITY | VIEWING ANGLE | BLUR |
| SAMPLE 1-1 | HC-01A | 1.61 | 0.42 | LN-1 | 1.45 | 45 | 0.05 | 2.2 | ◯ | ◯ |
| COMPARATIVE SAMPLE 1-1 | HC-02A | 1.61 | 0.20 | LN-1 | 1.45 | 30 | 0.02 | 2.2 | X | ◯ |
| COMPARATIVE SAMPLE 1-2 | HC-03A | 1.61 | 0.36 | LN-1 | 1.45 | 40 | 0.04 | 2.2 | ΔX | ◯ |
| SAMPLE 1-2 | HC-04A | 1.61 | 0.81 | LN-1 | 1.45 | 55 | 0.12 | 2.2 | ◯ | ◯ |
| SAMPLE 1-3 | HC-05A | 1.61 | 1.12 | LN-1 | 1.45 | 60 | 0.15 | 2.2 | ◯ | ◯ |
| SAMPLE 1-4 | HC-06A | 1.61 | 1.9 | LN-1 | 1.45 | 70 | 0.20 | 2.2 | ◯ | ◯ |
| SAMPLE 1-5 | HC-07A | 1.61 | 2.5 | LN-1 | 1.45 | 75 | 0.24 | 2.2 | ◯ | Δ |
| SAMPLE 1-6 | HC-08A | 1.61 | 3.4 | LN-1 | 1.45 | 80 | 0.30 | 2.2 | ◯ | Δ |
| COMPARATIVE SAMPLE 1-3 | HC-09A | 1.61 | 4.5 | LN-1 | 1.45 | 90 | 0.35 | 2.2 | ◯ | X |
| SAMPLE 1-7 | HC-10A | 1.61 | 1.12 | LN-2 | 1.41 | 60 | 0.15 | 1.4 | ◯ | ◯ |
| SAMPLE 1-8 | HC-11A | 1.61 | 1.12 | LN-3 | 1.38 | 60 | 0.15 | 0.9 | ◯ | ◯ |
| SAMPLE 1-9 | HC-01B | 1.53 | 1.10 | LN-1 | 1.45 | 60 | 0.14 | 2.8 | ◯ | ◯ |
| SAMPLE 1-10 | HC-01B | 1.53 | 1.10 | LN-2 | 1.41 | 60 | 0.14 | 2.0 | ◯ | ◯ |
| SAMPLE 1-11 | HC-01B | 1.53 | 1.10 | LN-3 | 1.38 | 60 | 0.14 | 1.4 | ◯ | ◯ |
| SAMPLE 1-12 | HC-01C | 1.51 | 0.90 | LN-1 | 1.45 | 58 | 0.13 | 2.9 | ◯ | ◯ |
| SAMPLE 1-13 | HC-01C | 1.51 | 0.90 | LN-2 | 1.41 | 58 | 0.13 | 2.2 | ◯ | ◯ |
| SAMPLE 1-14 | HC-01C | 1.51 | 0.90 | LN-3 | 1.38 | 58 | 0.13 | 1.6 | ◯ | ◯ |
| SAMPLE 1-15 | HC-01D | 1.53 | 1.10 | LN-1 | 1.45 | 60 | 0.14 | 2.8 | ◯ | ◯ |
| SAMPLE 1-16 | HC-01D | 1.53 | 1.10 | LN-2 | 1.41 | 60 | 0.14 | 2.0 | ◯ | ◯ |
| SAMPLE 1-17 | HC-01D | 1.53 | 1.10 | LN-3 | 1.38 | 60 | 0.14 | 1.4 | ◯ | ◯ |
| SAMPLE 1-18 | HC-01D | 1.53 | 0.83 | LN-1 | 1.45 | 45 | 0.06 | 2.8 | ◯ | ◯ |
| COMPARATIVE SAMPLE 1-4 | HC-01D | 1.53 | 0.73 | LN-1 | 1.45 | 40 | 0.04 | 2.8 | ΔX | ◯ |
| COMPARATIVE SAMPLE 1-5 | HC-01D | 1.53 | 0.55 | LN-1 | 1.45 | 30 | 0.02 | 2.8 | X | ◯ |
| SAMPLE 1-19 | HC-01B | 1.53 | 1.10 | = | = | 60 | 0.14 | 4.5 | ◯ | ◯ |
| SAMPLE 1-20 | HC-01D | 1.53 | 0.83 | = | = | 45 | 0.06 | 4.5 | ◯ | ◯ |

In the samples 1-1 to 20 of the invention, improvement of a viewing angle characteristic is compatible with reduction of blur.

In addition, in comparison to the samples 1-19 and 20 of the invention, the samples 1-1~18 of the invention are particularly preferable since they have integral reflectivity reduced by application of the low refractive index layer, improve the viewing angle characteristic, reduce the blur, suppress image intrusion by external light, and provide a high contrast even in a bright place.

Example 2

Comparative Example 2-1

With the sample 1-1 of the invention in Example 1, without the light diffusion layer HC-01A stacked, a liquid crystal display is manufactured.

Example 2-2

Manufacture of Liquid Crystal Display

With the sample 1-1 of the invention in Example 1, with the liquid crystal cell modified as follows, a liquid crystal display is manufactured. In FIG. 2, the absorption axis 12D of the polarizer 12 of the upper polarizing plate and the retardation axis 11D of the protective film 11 of the upper polarizing plate are set to be 90°, the retardation axis 13D of the protective film 13 of the upper polarizing plate is set to be 0°, the absorption axis 22D of the polarizer 22 of the lower polarizing plate and the retardation axis 21D of the protective film 21 of the lower polarizing plate are set to be 0°, the alignment control direction 14RD of the upper optically anisotropic layer 14 is set to be 45°, and the alignment control direction 24RD of the lower optically anisotropic layer 24 is set to be 225°.

In addition, the rubbing direction (alignment axis) 5RD of the upper (observer side) substrate 5 of the liquid crystal cell is set to be 45°, the rubbing direction (alignment axis) 7RD of the lower (backlight side) substrate 7 is set to be 225°, and a twist angle is set to be 0°. With the changed configuration, a normally white mode ECB type liquid crystal cell is manufactured. The light diffusion layer HC-01A of the sample 1-1 of the invention is stacked on the outermost of this liquid crystal display.

Comparative Example 2-2

With the sample 1-2 of the invention, without the light diffusion layer HC-01A stacked, a liquid crystal display is manufactured.

Example 2-3

With the sample 1-1 of the invention in Example 1, with the TN liquid crystal cell modified as follows, a liquid crystal display is manufactured. In FIG. 3, the absorption axis 12D of the polarizer 12 of the upper polarizing plate and the retardation axes 11D and 13D of the protective films 11 and 13 of the upper polarizing plate are set to be 45°, the absorption axis 22D of the polarizer 22 of the lower polarizing plate and the retardation axes 21D and 23D of the protective films 21 and 23 of the lower polarizing plate are set to be 135°, the alignment control direction 14RD of the upper optically anisotropic layer 14 is set to be 225°, and the alignment control direction 24RD of the lower optically anisotropic layer 24 is set to be 315°.

(Manufacture of Liquid Crystal Cell)

For the liquid crystal cell, a liquid crystal material having positive dielectric anisotropy is drop-injected and sealed between the substrates, with a cell gap d of 4 μm, and Δn·d of the liquid crystal layer 6 is set to be 410 nm (Δn represents refractive index anisotropy of the liquid crystal material). In addition, the rubbing direction (alignment axis) 5RD of the upper (observer side) substrate 5 of the liquid crystal cell is set to be 45°, the rubbing direction (alignment axis) 7RD of the lower (backlight side) substrate 7 is set to be 315°, and a twist angle is set to be 90°. With the changed configuration, a TN type liquid crystal cell is manufactured. The light diffusion layer HC-01A of the sample 1-1 of the invention is stacked on the outermost of this liquid crystal display.

Comparative Example 2-3

For Example 2-3, without the light diffusion layer HC-01A of the sample 1-1 of the invention stacked, a liquid crystal display is manufactured.

Example 2-4

For Example 2-3, with the angle between the alignment of the liquid crystal cell and the absorption axis of the polarizing direction changed, a TN type liquid crystal display is manufactured.

The absorption axis 12D of the polarizer 12 of the upper polarizing plate and the retardation axes 11D and 13D of the protective films 11 and 13 of the upper polarizing plate are set to be 90°, the absorption axis 22D of the polarizer 22 of the lower polarizing plate and the retardation axes 21D and 23D of the protective films 21 and 23 of the lower polarizing plate are set to be 0°, the alignment control direction 14RD of the upper optically anisotropic layer 14 is set to be 270°, and the alignment control direction 24RD of the lower optically anisotropic layer 24 is set to be 180°.

In addition, for the liquid crystal cell, a liquid crystal material having positive dielectric anisotropy is drop-injected and sealed between the substrates, with a cell gap d of 4 μm, and Δn·d of the liquid crystal layer 6 is set to be 410 nm (Δn represents refractive index anisotropy of the liquid crystal material). In addition, the rubbing direction (alignment axis) 5RD of the upper (observer side) substrate 5 of the liquid crystal cell is set to be 45°, the rubbing direction (alignment axis) 7RD of the lower (backlight side) substrate 7 is set to be 315°, and a twist angle is set to be 90°. With the changed configuration, a TN type liquid crystal cell is manufactured. The light diffusion layer HC-01A of the sample 1-1 of the invention is stacked on the outermost of this liquid crystal display.

Comparative Example 2-4

For Example 2-4, without the light diffusion layer HC-01A of the sample 1-1 of the invention stacked, a liquid crystal display is manufactured.

Example 2-5

With the sample 1-1 of the invention in Example 1, with the optically anisotropic layer of the liquid crystal cell replaced with a celluloseacetate film (FUJI TAC TD80UF available from FUJIFILM Corporation) in the following IPS type liquid crystal display, a liquid crystal display is manufactured.

In FIG. 4, the absorption axis 12D of the polarizer 12 of the upper polarizing plate and the retardation axes 11D and 13D of the protective films 11 and 13 of the upper polarizing plate are set to be 0°, the absorption axis 22D of the polarizer 22 of the lower polarizing plate and the retardation axis 21D of the protective film 21 of the lower polarizing plate are set to be 90°, the retardation axis 23D of the protective film 23 of the lower polarizing plate are set to be 0°, and the alignment control direction 14RD of the upper optically anisotropic layer 14 is set to be 0°.

In addition, the optically anisotropic layer typically has the same optical performance as the protective film used in the polarizing plate, which corresponds to no optically anisotropic layer.

In addition, for the liquid crystal cell, a liquid crystal material having positive dielectric anisotropy is drop-injected and sealed between the substrates, with a cell gap d of 4 μm, and Δn·d of the liquid crystal layer 6 is set to be 300 nm (Δn represents refractive index anisotropy of the liquid crystal material). In addition, the rubbing direction (alignment axis) 5RD of the upper (observer side) substrate 5 of the liquid crystal cell is set to be 270°, the rubbing direction (alignment axis) 7RD of the lower (backlight side) substrate 7 is set to be 90°, and a twist angle is set to be 0°. With the changed configuration, an IPS type liquid crystal cell is manufactured. The light diffusion layer HC-01A of the sample 1-1 of the invention is stacked on the outermost of this liquid crystal display.

Comparative Example 2-5

For Example 2-5, without the light diffusion layer HC-01A of the sample 1-1 of the invention stacked, a liquid crystal display is manufactured.

(Optical Measurement of Manufactured Liquid Crystal Display)

A rectangular wave voltage of 60 Hz is applied to the manufactured liquid crystal display. A contrast ratio as a transmittance ratio (white display/black display) and a transmittance viewing angle in equal-spaced 8 gray scales between black display (L1) transmittance and white display (L8) transmittance are measured using an apparatus for measuring an optical performance (EZ-Contrast 160D available from ELDIM Corporation). Table 3 shows an angle range without transmittance inversion of adjacent gray scales in a downward direction and a range angle ratio which is more than a left to right contrast ratio of 10:1.

In addition, Table 3 shows coloration change (color spots) and circumferential luminance spots (light leakage) by a viewing angle of black display by naked eye observation.

Evaluation of color spots is made as follows.

A color difference between a front viewing angle and an azimuth angle 45° polar angle 60° viewing angle is evaluated for panel black display characters. When the color difference is measured using a luminance meter, in a Luv color coordinate system, if a color difference Δu'v' is less than 0.02, color spots are not observed by naked eye observation (○ in two-step evaluation). If the color difference Δu'v' is more than 0.02, color spots are observed (Δ in two-step evaluation).

Evaluation of circumferential luminance spots is made as follows.

After the manufactured liquid crystal display is stored in a test room in 40° 80% RH environments and then is left alone for one hour at a room temperature, a black display luminance difference between a panel center and a center of a long side end portion of a polarizing plate is measured. Light leakage on a circular arc at long and short sides of a circumference of the polarizing plate is observed by naked eyes. If the luminance difference is more than 0.4 cd/m², it is perceived as luminance spots of a screen (Δ in three-step evaluation). If the luminance difference is 0.2 to 0.4 cd/m², it is not perceived as luminance spots of a screen (○ in three-step evaluation) although light leakage is observed. If the luminance difference is less than 0.1 cd/m², neither light leakage nor luminance spots is perceived (⊚ in three-step evaluation). In addition, the same panel has a contrast ratio of 700 to 1 with a luminance difference of 400 cd/m² in white display.

| Methylene chloride (first solvent) | 250 parts by weight |
| Methanol (second solvent) | 20 parts by weight |

A retardation enhancement solution is prepared by inputting the following retardation enhancer of 16 parts by weight, methylene chloride of 80 parts by weight and methanol of 20 parts by weight into a different mixing tank, heating and agitating them. A dope is prepared by mixing a celluloseacetate solution of 477 parts by weight with a retardation enhancement solution of 22 parts by weight and sufficiently agitating them. The addition amount of the retardation enhancer is 3.0 parts by weight for celluloseacetate of 100 parts by weight.

TABLE 3

| | CELL CONFIGURATION | | | DISPLAY PERFORMANCE | | | |
|---|---|---|---|---|---|---|---|
| | DISPLAY MODE | POLARIZING PLATE ANGLE | LIGHT DIFFUSION LAYER | LOWER GRAY SCALE INVERSION ANGLE | BILATERAL ASYMMETRY | COLOR SPOT | LUMINANCE SPOT |
| EXAMPLE 1-1 | ECB | 45°/135° | ○ | 50° | 1:1 | ○ | ○ |
| COMPARATIVE EXAMPLE 2-1 | ECB | 45°/135° | — | 40° | 1:1 | Δ | Δ |
| EXAMPLE 2-2 | ECB | 90°/0° | ○ | 70° | 0.8:1 | ○ | ⊚ |
| COMPARATIVE EXAMPLE 2-2 | ECB | 90°/0° | — | 60° | 0.7:1 | Δ | ○ |
| EXAMPLE 2-3 | TN | 45°/135° | ○ | 40° | 1:1 | ○ | ○ |
| COMPARATIVE EXAMPLE 2-3 | TN | 45°/135° | — | 30° | 1:1 | Δ | Δ |
| EXAMPLE 2-4 | TN | 90°/0° | ○ | 50° | 0.7:1 | ○ | ⊚ |
| COMPARATIVE EXAMPLE 2-4 | TN | 90°/0° | — | 40° | 0.6:1 | Δ | ○ |
| EXAMPLE 2-5 | IPS | 0°/90° | ○ | 80° | 0.9:1 | ○ | ⊚ |
| COMPARATIVE EXAMPLE 2-5 | IPS | 0°/90° | — | 80° | 0.8:1 | Δ | ○ |

Example 3

Hereinafter, an example to show the effect of the preferred aspect (II) will be described.
(Manufacture of Polarizing Plate 1)
(Manufacture of Celluloseacetate Film)
A celluloseacetate solution is prepared by inputting the following compositions into a mixing tank, heating and agitating them to dissolve their components.
<Composition of Celluloseacetate Solution>

| Celluloseacetate of acidity of 60.9% | 100 parts by weight |
| Triphenyl phosphate (plasticizer) | 8.0 parts by weight |
| Biphenyl diphenyl phosphate (plasticizer) | 4.0 parts by weight |

Retardation Enhancer

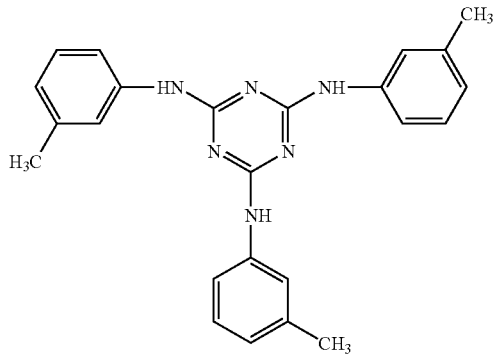

The prepared dope is expanded using a band expander. A film having a remaining solvent of 40 wt % is peeled out of a band, carried while blowing heated wind of 120° C. and drawing it by 101% in a carrying direction, and dried while widening it by 3% in a width direction using a tender. Next, after a tender clip is drawn out, by drying the film for 20 minutes with heated wind of 140° C., a celluloseacetate film (107 μm thick) having a remaining solvent of 0.3 wt % is prepared.

The prepared celluloseacetate film is digested in a potassium hydroxide solution (25° C.) of 2.0 N for 2 minutes, neutralized with sulfuric acid, washed with pure water, dried and saponificated.

(Formation of Alignment)

An application solution having the following compositions is applied on the prepared celluloseacetate film at 24 ml/m² using a #14 wire bar coater. The application solution is dried for 60 seconds with warm wind of 60° C. or for 150 seconds with warm wind of 90° C. Next, the formed film is subjected to a rubbing treatment in a direction in parallel to a longitudinal direction of the celluloseacetate film.

<Composition of Alignment Film Application Solution>

| The following modified polyvinylalcohol | 20 parts by weight |
|---|---|
| Water | 360 parts by weight |
| Methanol | 120 parts by weight |
| Glutaraldehyde (cross-linkage agent) | 1.0 parts by weight |

Modified polyvinylalcohol

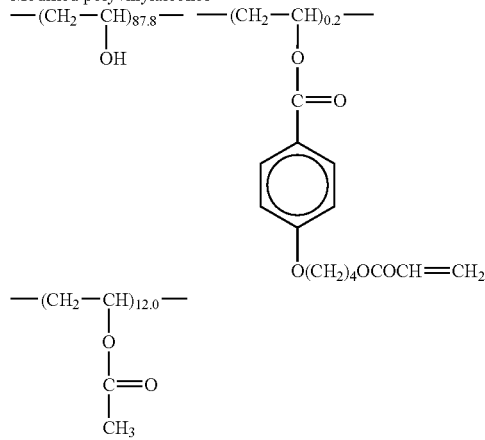

(Formation of Optically Anisotropic Layer and Manufacture of Optical Compensation Sheet)

On the alignment film is applied an application solution in which the following discotic liquid crystal compound of 91.0 g, ethyleneoxide modified trimethylolpropanetriacrylate (V#360 available from OSAKA ORGANIC CHEMICAL INDUSTRY LTD.) of 9.0 g, celluloseacetatebutylate (CAB551-0.2 available from Eastman Chemical Company) of 2.0 g, celluloseacetatebutylate (CAB531-1 available from Eastman Chemical Company) of 0.5 g, photopolymerization initiator (IRGACURE 907 available from Nihon Ciba-Geigy K.K.) of 3.0 g, and intensifier (KAYACURE DETX available from Nippon Kayaku Co., Ltd) of 1.0 g are dissolved into methylethylketone of 207 g, at 6.2 cc/m² using a #3.6 wire bar. This application solution is heated for two minutes in a constant temperature zone of 130° C. to align the discotic liquid crystal compound. Next, the discotic liquid crystal compound is polymerized by means of UV radiation for one minute at temperature of 25° C. using a high pressure mercury lamp of 120 W/cm. Thereafter, the temperature decreases to a room temperature. Thus, the optically anisotropic layer is formed and the optical compensation film is manufactured.

Liquid Crystal Compound

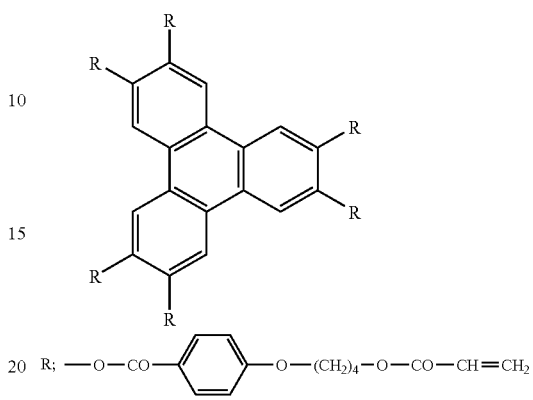

(Manufacture of Polarizing Plate)

A polarizer is manufactured by absorbing iodine into an expanded polyvinylalcohol film, and the manufactured optical compensation sheet is subjected to the saponification treatment and is laminated on one side of the polarizer such that the celluloseacetate film lies on the polarizer. The transmission axis of the polarizer and the retardation axis of the celluloseacetate film are arranged in parallel to each other. In addition, a 80 μm thick cellulosetriacetate film (FUJI TAC TD80UF available from FUJIFILM Corporation) is subjected to a saponification treatment, and is laminated as a transparent protective film on a side opposite to the polarizer using a polyvinylalcohol adhesive. In this manner, the polarizing plate is manufactured.

(Punching of Polarizing Plate)

End lines of two sheets of manufactured polarizing plates having an absorption axis direction of 45°, as in the TN mode, are punched.

In addition, polarizing plates are punched at different angles (for example, 40°, 38°, 35°, 15°, 0°, etc. in long and short side directions).

(Manufacture of Adhesive)

A mixture of monomers including n-butylacrylate (BA) of 49.5 parts by weight, acrylic acid (AA) of 10 parts by weight and 2-hydroxyethyl(meta)acrylate (2-HEMA) of 0.5 parts by weight is injected into a 1000 cc reactor having a cooling apparatus for facilitating adjustment of temperature by reflowing nitrogen gas used to manufacture a copolymer. In addition, ethyl acetate (EA) of 100 parts by weight as a solvent is injected into the reactor. Next, the reactor is purged for 20 minutes with nitrogen gas in order to extrude oxygen gas from the reactor, and while maintaining the reactor at 60° C., azobisisobutyronitrile (AIBN) of 0.03 parts by weight as a reaction initiator diluted with ethyl acetate at a concentration of 50% is injected into the reactor and reacts with the mixture for 10 hours to obtain an acryl polymer finally.

The acryl polymer solution (including about solid of 50%) obtained in the copolymerization process is well blended. Next, a uniform adhesive layer of 30 μm is obtained by diluting tolylenediisocyanate adduct (TDI-1) of 1.2 parts by weight of trimethylolpropane as an isocyanate cross linkage agent with ethyl acetate of 10 wt %, mixing the adduct with the ethyl acetate uniformly at a proper concentration in consideration of coating property, and coating and drying the mixture on a release paper. An absolute value of a photoelastic coefficient of the obtained adhesive layer is $-500 \times 10^{-12}$ (l/Pa).

(Evaluation of Polarizing Plate)

The obtained adhesive is applied on various kinds of polarizing plates obtained as above to obtain adhesive-attached polarizing plates.

Polarizing plates having different absorption axis directions of different angles are laminated on both sides of quartz glass, respectively. At this time, the absorption axes of two sheets of polarizing plates are perpendicular to each other.

The quartz glass on which the polarizing plates are laminated is dried by a drier at 70° C. for 170 hours. The dried quartz glass is mounted on a backlight in a dark room and is observed by naked eyes to evaluate light leakage. As a result of the observation, light leakage is observed at circumferences of the polarizing plates. In addition, the amount of light leakage is measured by measuring a luminance distribution using a luminance meter.

As a result of the measurement, FIG. 4 shows a graph plotting increase of transmittance of the maximal light leakage portion by a thermo treatment, that is, leakage light transmittance (%) obtained in the sample, for different angles (angles between the absorption axis direction of the polarizing plate and the end line of the polarizing plate)

From the above result, it can be seen that light leakage due to thermal distortion is reduced in the polarizing plate punched such that the absorption axis direction of the polarizing plate intersects the end line of the polarizing plate by 45° in case of a TN mode. Accordingly, it is apparent that light leakage due to thermal distortion of a liquid crystal display can be reduced when this polarizing plate is used in a conventional TN mode liquid crystal display that did not employ such a polarizing plate.

In addition, after the polarizing plate is attached to a TN mode liquid crystal panel, symmetry of an actual image is evaluated.

As a result of the evaluation, it can be seen that a polarizing plate having an intersection angle of 5° or more between one side of the polarizing plate and the absorption axis direction of the polarizing plate has better image symmetry than a polarizing plate having an intersection angle of less than 5°.

From the above description, it is apparent that a polarizing plate having an intersection angle of 5° to 40° between the absorption axis of the polarizing plate and one side of the polarizing plate is excellent in practical use from a standpoint of reduction of light leakage and symmetry of a display image.

Example 4

Hereinafter, an example to show the effect of the preferred aspects (III-1) and (III-2) will be described.

Gray scales are evaluated for a normally white mode EBC liquid crystal display (Example 4-1) having the configuration shown in FIG. 10 (where the optical compensation films 307 and 314 are formed of discotic compound-containing liquid crystal compositions and comprise optically anisotropic layers having discotic molecules fixed in a hybrid alignment state) and having the pixel configuration shown in FIG. 11, and a liquid crystal display (comparative example 4) having the same configuration as Example 4, except the pixel configuration shown in FIG. 12. FIG. 13 shows a result of the evaluation.

FIG. 13 shows a graph in which a horizontal axis represents 0~255 gray scales normalized with white luminance in front observation and a vertical axis represents 0~255 gray scales normalized with white luminance in oblique observation (azimuth angle of 270° and polar angle of 45°). In the graph, a solid line represents gray scales expressed by an ideal liquid crystal display with no dependency of a halftone γ characteristic on a viewing angle. From FIG. 13, it can be seen that the liquid crystal display of Example 4 in which one pixel is constituted by a plurality of sub pixels has reduced dependency of a halftone γ characteristic on a viewing angle in comparison to the liquid crystal display of Comparative example 4.

Similarly, gray scales are evaluated for a liquid crystal display (Reference example 4-1) having the same configuration as Example 4, except use of the optical compensation films 307 and 314 in FIG. 10, and a liquid crystal display (Reference example 4-2) having the same configuration as Example 4, except use of uniaxial films as the optical compensation films 307 and 314 in FIG. 10. In FIG. 13, assuming that the vertical axis is y and the horizontal axis is x, for x=0 which shows black display in the front observation, y is about 0.25-0.55 in the oblique observation. From this result, when the optically anisotropic layers which are formed of discotic compound-containing liquid crystal compositions and have discotic molecules fixed in a hybrid alignment state are used as the optical compensation films 307 and 314, it can be seen that light leakage in the inclined direction in black display can be reduced, thereby improving viewing angle contrast.

Example 5

Hereinafter, an example to show the effect of the preferred aspect (IV) will be described.

An optical simulation is performed for the TN mode liquid crystal display shown in FIG. 14 to confirm the effect of the invention. An LCD Master Ver6.08 (available from Shintech Corporation) is used for optical calculation. The liquid crystal cell, the electrodes, the substrates, the polarizing plates and so on may be used as conventional for the liquid crystal display. ZLI-4792 attached to the LCD Master is used as a liquid crystal material. Retardation in the front side of the optical anisotropic layer is set to be 45 nm, the liquid crystal cell has horizontal alignment of parallel alignment with a pretilt angle of 4°, a cell gap of the substrates is set to be 4 μm, and a liquid crystal material having positive dielectric anisotropy has retardation (that is, the product (Δn·d) of the thickness d (μm) of the liquid crystal layer and the refractive index anisotropy Δn) of 395 nm.

The absorption axis 402 of the polarizer 401 is perpendicular (that is, 90° assuming a horizontal direction of a screen is 0°) to the C2 symmetrical axis, and the absorption axis 2 of the polarizer 416 is in parallel (that is, 0° assuming the horizontal direction of the screen is 0°) to the C2 symmetrical axis. In addition, a front Re retardation value of a pair of first optically anisotropic layers 405a and 412a arranged at an inner side of the polarizer is set to be 30 nm, an angle between the alignment control directions 406a and 413a of the first optically anisotropic layers 405a and 412a and the alignment control directions of the liquid crystal layer, respectively, is set to be 0°. That is, in FIG. 14, an angle between the alignment control directions 406a and 408 and an angle between the alignment control directions 413a and 411 are set to be 0°. In addition, a front Re retardation value of a pair of second optically anisotropic layers 405b and 412b arranged at upper and lower sides of the liquid crystal layer is set to be 30 nm, an angle between the alignment control directions 406b and 413b of the second optically anisotropic layers and the alignment control directions of the liquid crystal layer, respectively, is set to be 45°. That is, in FIG. 14, an angle between the alignment control directions 406b and 407 and an angle between the alignment control directions 413b and 411 are set to be 45°. That is, in this example, the alignment control direction 406b of the upper second optically anisotropic layer 405b is set to be 270° and the alignment control direction 413b of the lower second optically anisotropic layer 412b is set to be 90°.

In addition, the transparent layers 403 and 414 comprise a transparent layer having Re of 55 nm and Rth of 120 nm, and an in-plane retardation axis of the transparent film is coincident with a transmission axis of adjacent polarizers 401 and 416. G1220DU attached to the LCD Master is used for the polarizer. Re and Rth values of the transparent film for a wavelength are set as shown in Example 1 of Table 1. A backlight attached to the LCD Master is used as a light source. With this configuration, an optical characteristic of the liquid crystal display shown in FIG. 1 is calculated by the LCD Master.

Comparative Example 5

An optical characteristic of a liquid crystal display having the same configuration as in Example, except the first optically anisotropic layers 405a and 412a, the second optically anisotropic layers 405b and 412b, and the transparent layers 403 and 414, is calculated by the LCD Master.

<Viewing Angle Characteristic (Gray Scale Property) in Horizontal Direction of Liquid Crystal Display>

Figure 23:
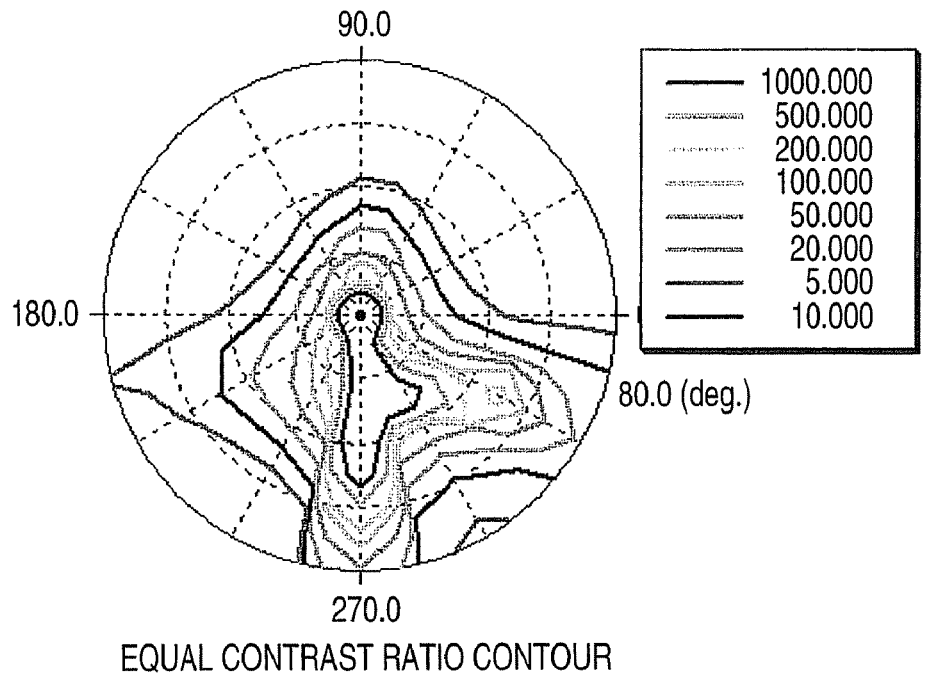
FIG. 23 is a view showing a contrast viewing angle characteristic according to Comparative example 5.
Figure 24:
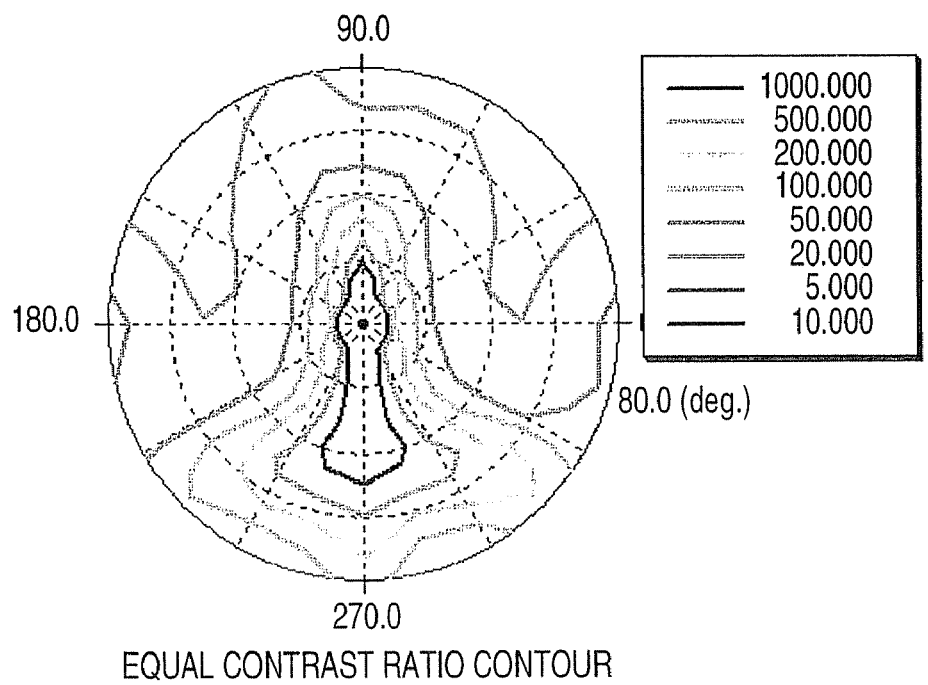
FIG. 24 is a view showing a contrast viewing angle characteristic according to Example 5.

FIGS. 23 and 24 show graphs plotting contrast contours in all viewing angle directions when a black voltage is applied to the liquid crystal displays of Comparative example 5 and Example 5. FIG. 23 shows a contrast contour of Comparative example 5 and FIG. 24 shows a contrast contour of Example 5.

From FIGS. 23 and 24, it can be seen that conventional Comparative example 5 shows poor bilateral symmetry and a generally deteriorated contrast viewing angle characteristic. In contrast to Comparative example 5, Example 5 has remarkably excellent bilateral symmetry and large contrast values over a wide range, thereby greatly improving the contrast viewing angle characteristic.

A TN mode liquid crystal display having the configuration of Example 5 is actually manufactured. In the manufactured liquid crystal display, an image having a high contrast in the front and oblique directions is observed. In addition, this liquid crystal display is stored in a test room in temperature 40° and humidity 80% environments for 24 hours, and then is left alone for one hour at a room temperature. In black display, in this liquid crystal display, light leakage out of a circumference of a polarizing plate is not observed at all by naked eyes.

Example 6-1

Manufacture of ECB Mode Liquid Crystal Cell

Hereinafter, an example to show the effect of the preferred aspect (V) will be described.

A liquid crystal cell manufactured by vacuum-injecting and sealing a liquid crystal material having positive dielectric anisotropy between opposite substrates with a cell gap of 3.5 μm is used as an ECB mode liquid crystal cell. $\Delta n \cdot d$ of this liquid crystal layer is set to be 240~310 nm. As the liquid crystal material, liquid crystals having positive anisotropy and refractive index anisotropy of $\Delta n$=0.0854 (589 nm, 20° C.) and $\Delta \in$=+8.5 (for example, MLC-9100 available from Merck, Co., Ltd.) are used. An intersection angle of the liquid crystal cell is 0°, and, when the liquid crystal cell is laminated on the upper and lower polarizing plates later, the rubbing directions (alignment control directions) of the upper and lower substrates of the liquid crystal cell intersect an in-plane retardation axis (in parallel to an expansion direction) of a biaxial celluloseacylate film by 45°. A polarizing plate absorption axis interests the liquid crystal cell alignment directions (rubbing directions) by about 45°, and an intersection angle between absorption axes of the upper and lower polarizing plates is about 90°, which is cross Nicol.

Two sheets of polarizing plates are manufactured by laminating an available celluloseacylate film on one side of a polarizer and laminating a biaxial celluloseacylate film (Re=35 nm and Rth=175 nm) made by bi-axially expanding a celluloseacetate film on the other side of the polarizer, with an in-plane retardation axis of the biaxial celluloseacylate film perpendicular or in parallel to an absorption axis of the polarizer. A retardation layer is formed by forming an alignment film on a surface of the biaxial celluloseacylate film of one of the polarizing plates, aligning discotic molecules by applying a polymeric composition containing a discotic liquid crystal compound to a surface of the alignment film, and fixing the alignment state by polymerization.

An ECB mode liquid crystal display is manufactured by laminating the biaxial celluloseacylate film of one of the two polarizing plates on one side of the manufactured ECB mode liquid crystal cell and laminating the retardation layer, which is manufactured using the discotic liquid crystal compound, of the other of the two polarizing plates on the other side of the ECB mode liquid crystal cell. It is observed that the manufactured liquid crystal display shows ideal black image display in both of front and oblique directions.

Example 6-2

Manufacture of ECB Mode Liquid Crystal Cell

A liquid crystal cell manufactured by vacuum-injecting and sealing a liquid crystal material having positive dielectric anisotropy between opposite substrates with a cell gap of 3.0 μm is used as an ECB mode liquid crystal cell. $\Delta n \cdot d$ of this liquid crystal layer is set to be 300 nm. As the liquid crystal material, liquid crystals having positive anisotropy and refractive index anisotropy of $\Delta n$=0.098 (589 nm, 20° C.) and $\Delta \in$=+5.2 are used. An intersection angle of the liquid crystal cell is 0°, and, when the liquid crystal cell is laminated on the upper and lower polarizing plates later, the rubbing directions (alignment control directions) of the upper and lower substrates of the liquid crystal cell intersect a polarizing plate absorption axis by about 45°, and an intersection angle between absorption axes of the upper and lower polarizing plates is about 90°, which is cross Nicol.

A cellulosetriacetate film (TD-80U available from FUJIFILM Corporation, Rth≈40 nm, Re≈1.6 nm) is laminated on surfaces of both of polarizers. Two sheets of polarizing plates are manufactured by forming retardation layers by forming an alignment film on a surface of the film, aligning discotic molecules by applying a polymeric composition containing a discotic liquid crystal compound to a surface of the alignment film, and fixing the alignment state by polymerization.

An ECB mode liquid crystal display is manufactured by laminating the retardation layers, which are manufactured using the discotic liquid crystal compound, of the two polarizing plates on both sides of the ECB mode liquid crystal cell, respectively. It is observed that the manufactured liquid crystal display shows ideal black image display in both of front and oblique directions.

Example 6-3

Manufacture of ECB Mode Liquid Crystal Cell

A liquid crystal cell manufactured by vacuum-injecting and sealing a liquid crystal material having positive dielectric anisotropy between opposite substrates with a cell gap of 2.8 μm is used as an ECB mode liquid crystal cell. Δn·d of this liquid crystal layer is set to be 280 nm. As the liquid crystal material, liquid crystals having positive anisotropy and refractive index anisotropy of Δn=0.098 (589 nm, 20° C.) and Δ∈=+5.2 are used. An intersection angle of the liquid crystal cell is 0°, and, when the liquid crystal cell is laminated on the upper and lower polarizing plates later, the rubbing directions (alignment control directions) of the upper and lower substrates of the liquid crystal cell intersect an in-plane retardation axis (in parallel to an expansion direction) of a biaxial celluloseacylate film by 45°. A polarizing plate absorption axis interests the liquid crystal cell alignment directions (rubbing directions) by about 45°, and an intersection angle between absorption axes of the upper and lower polarizing plates is about 90°, which is cross Nicol.

A cellulosetriacetate film (TD-80U available from FUJIFILM Corporation, Rth≈40 nm) is laminated on surfaces of both of polarizers. One sheet of polarizing plate is manufactured by forming a retardation layer by forming an alignment film on a surface of the cellulosetriacetate film, aligning discotic molecules by applying a polymeric composition containing a discotic liquid crystal compound to a surface of the alignment film, and fixing the alignment state by polymerization. In addition, one sheet of polarizing plate is manufactured by laminating an available celluloseacylate film on one side of a polarizer and laminating a biaxial celluloseacylate film (Re=30 nm and Rth=140 nm) made by bi-axially expanding a celluloseacetate film on the other side of the polarizer, with an in-plane retardation axis of the biaxial celluloseacylate film perpendicular or in parallel to an absorption axis of the polarizer.

The two sheets of manufactured polarizing plates are laminated on both surfaces of the manufactured ECB mode liquid crystal cell, respectively. The retardation layer, which is manufactured using the discotic liquid crystal compound, of the polarizing plate is laminated on one side of the liquid crystal cell, and the biaxial celluloseacylate film of the polarizing plate is laminated on the other side of the liquid crystal cell. In this manner, an ECB mode liquid crystal display is manufactured. It is observed that the manufactured liquid crystal display shows ideal black image display in both of front and oblique directions.

Example 6-4

Manufacture of ECB Mode Liquid Crystal Cell

A liquid crystal cell manufactured by vacuum-injecting and sealing a liquid crystal material having positive dielectric anisotropy between opposite substrates with a cell gap of 3 μm is used as an ECB mode liquid crystal cell. Δn·d of this liquid crystal layer is set to be 300 nm. As the liquid crystal material, liquid crystals having positive anisotropy and refractive index anisotropy of Δn=0.098 (589 nm, 20° C.) and Δ∈=+5.2 are used. An intersection angle of the liquid crystal cell is 0°, and, when the liquid crystal cell is laminated on the upper and lower polarizing plates later, the rubbing directions (alignment control directions) of the upper and lower substrates of the liquid crystal cell intersect a support retardation axis (in parallel to an expansion direction) by 45°. A polarizing plate absorption axis interests the liquid crystal cell alignment directions (rubbing directions) by about 45°, and an intersection angle between absorption axes of the upper and lower polarizing plates is about 90°, which is cross Nicol.

One sheet of polarizing plate is manufactured by laminating an available celluloseacylate film on one side of the polarizer and laminating a low retardation celluloseacetate (TAC) film (specifically, Re=1.5 nm (550 nm) and Rth=−6 (550 nm), a film manufactured according to a method disclosed in Japanese Unexamined Patent Application Publication No. 2006-30937) on the other side of the polarizer. In addition, an available celluloseacylate film is laminated on one side of the polarizer and a biaxial cellulosetriacetate film (Re=38 nm and Rth=178 nm) made by bi-axially expanding a cellulosetriacetate film is laminated on the other side of the polarizer. In addition, one sheet of polarizing plate is manufactured by forming a retardation layer by forming an alignment film on a surface of the biaxial TAC film, aligning discotic molecules by applying a polymeric composition containing a discotic liquid crystal compound to a surface of the alignment film, and fixing the alignment state by polymerization.

The two sheets of manufactured polarizing plates are laminated on both surfaces of the manufactured ECB mode liquid crystal cell, respectively. The low retardation TAC film of the polarizing plate is laminated on one side of the liquid crystal cell, and the retardation layer, which is manufactured using the discotic liquid crystal compound, of the polarizing plate is laminated on the other side of the liquid crystal cell. In this manner, an ECB mode liquid crystal display is manufactured. It is observed that the manufactured liquid crystal display shows ideal black image display in both of front and oblique directions.

Example 6-5

Figure 29:
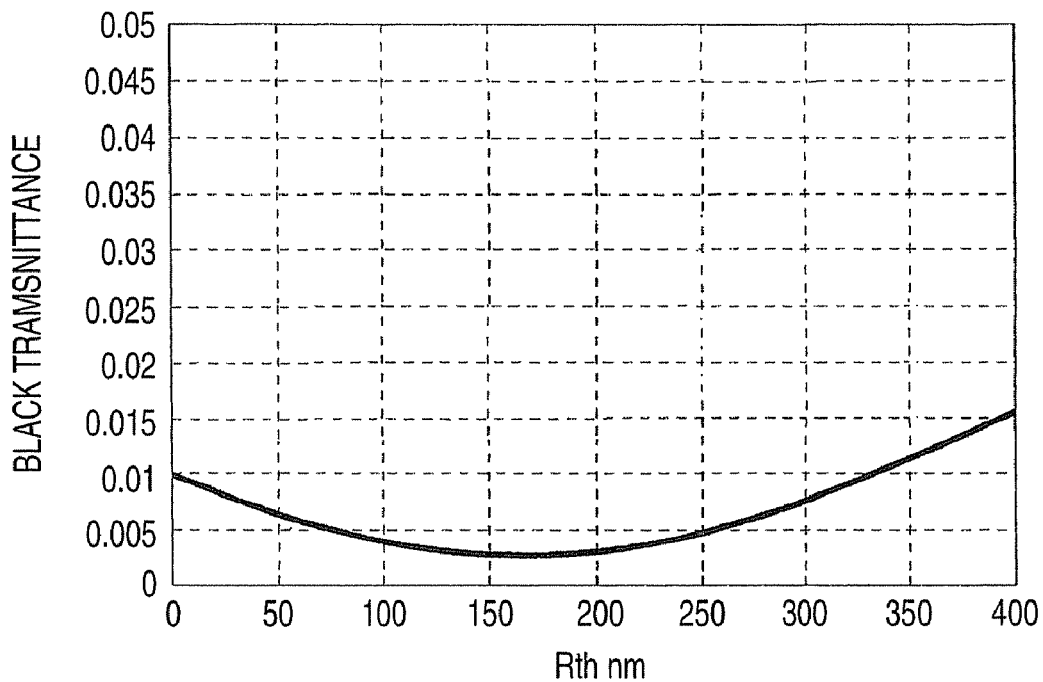
FIG. 29 is a graph showing a relationship between transmittance (in average direction of polar angle 80° vertical and horizontal directions) in black image display of a liquid crystal display having the same configuration as Example 6-1 and Rth of a first retardation layer (where, Re=36.6 nm).

FIG. 29 shows a relationship between average black transmittance in polar 80° upper, lower, left and right directions in black image display and Rth when the second retardation layer manufactured using the discotic liquid crystal compound is laminated on only one polarizing plate (where, the summation Re of the first retardation layer and the protective TAC film=36.6 nm) for the liquid crystal display having the same configuration as in Example 6. From the graph of FIG. 29, it can be seen that black transmittance becomes small, and accordingly, higher contrast is obtained if Rth(550) of the retardation layer satisfies a relationship of 0 nm<Rth(550)<330 nm, in comparison to a case where there is no retardation layer (that is, Rth=0). The same effect as in FIG. 5 is obtained over the entire range of 0 nm<Rth(550)<70 nm.

Example 6-6

Figure 30:
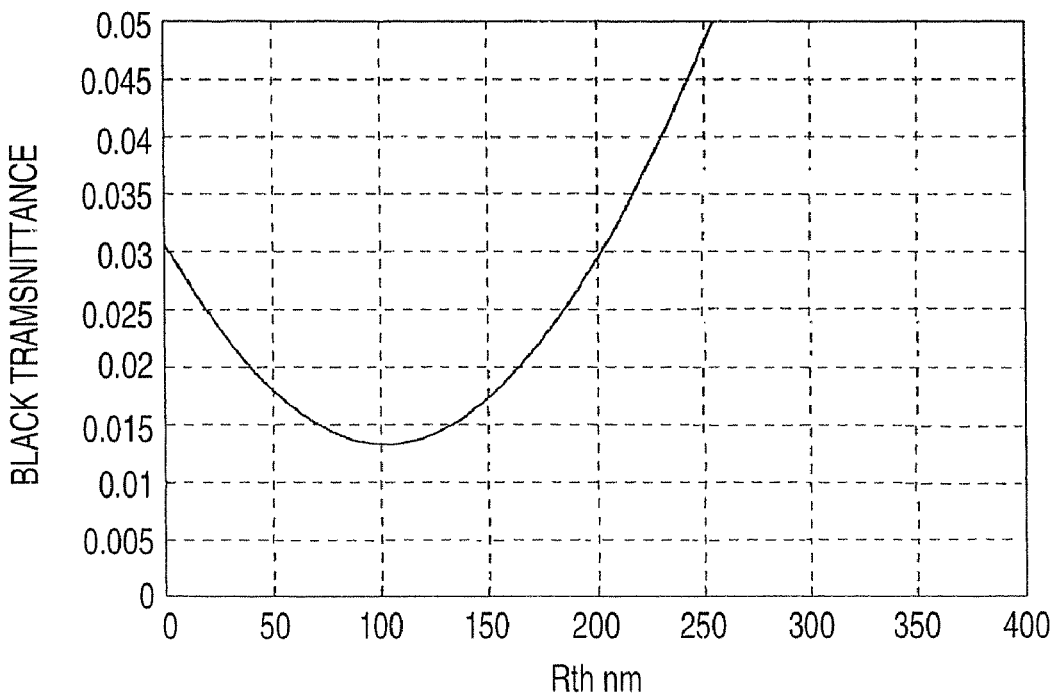
FIG. 30 is a graph showing a relationship between transmittance (in average direction of polar angle 80° vertical and horizontal directions) in black image display of a liquid crystal display having the same configuration as Example 6-2 and Rth of a first retardation layer (where, Re=3.2 nm).

FIG. 30 shows a relationship between average black transmittance in polar 80° upper, lower, left and right directions in black image display and Rth when the second retardation layer manufactured using the discotic liquid crystal compound is laminated on both polarizing plates (where, the summation Re=3.2 nm) for the liquid crystal display having the same configuration as in Example 6-2. From the graph of FIG. 30, it can be seen that black transmittance becomes small if Rth(550) of the retardation layer satisfies a relationship of 0 nm<Rth(550)<200 nm, in comparison to a case where there is no retardation layer (that is, Rth=0). The same effect as in FIG. 30 is obtained over the entire range of 0 nm<Rth(550)<70 nm.

Example 7

Hereinafter, an example to show the effect of the preferred aspect (VI) will be described.

Reference Example 7-1

Figure 34:
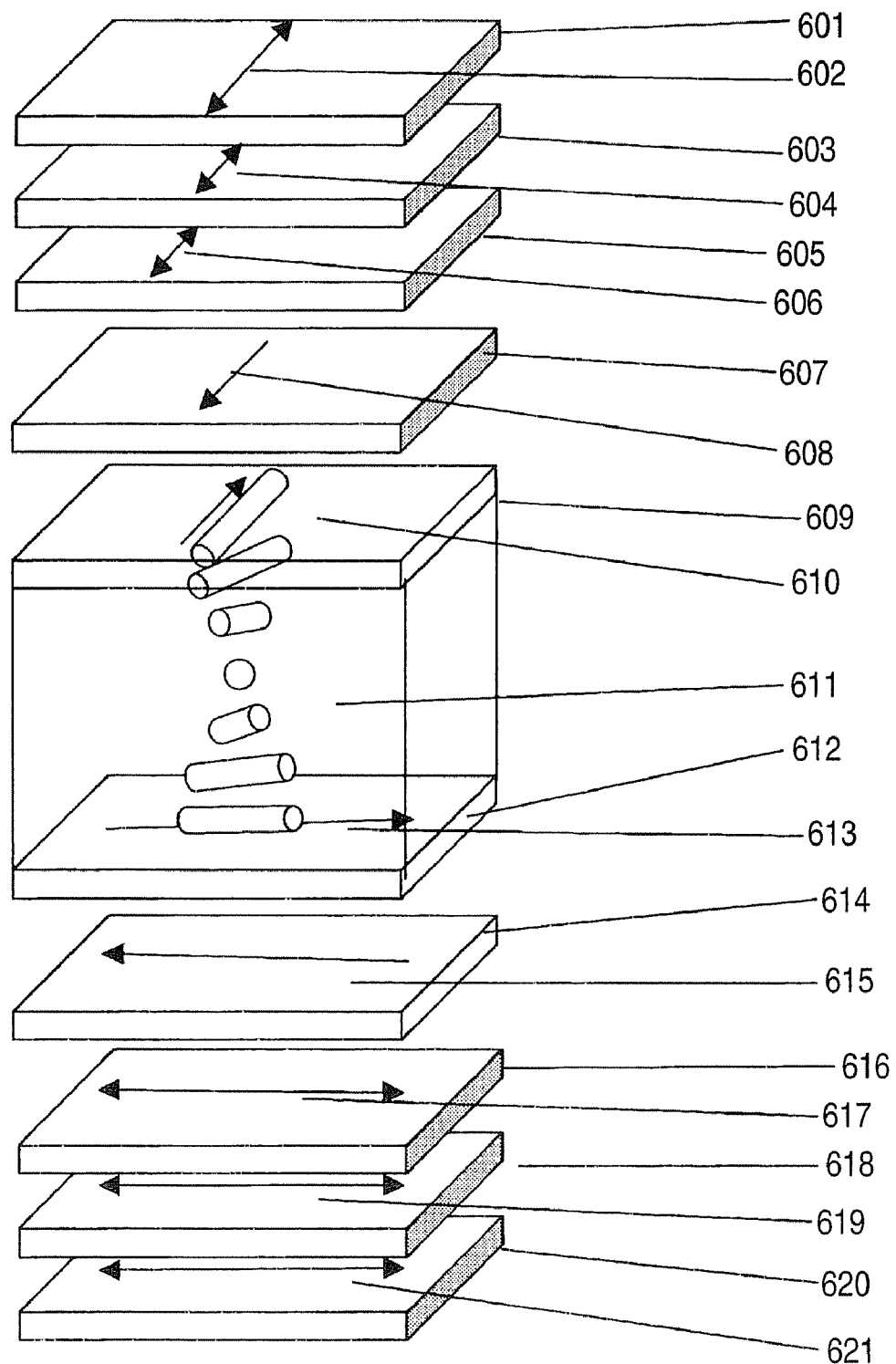
FIG. 34 is a schematic view showing an example of a liquid crystal display according to a reference example by 0°-90° attachment.

A liquid crystal display having the configuration shown in FIG. 34 is manufactured. Specifically, an upper (elliptical) polarizing plate (protective film 601, polarizer 603, protective film 605 (also used as an optical compensation sheet support), and optically anisotropic layer 607), a liquid crystal cell (upper substrate 609, liquid crystal layer 611, lower substrate 612), and a lower (elliptical) polarizing plate (optically anisotropic layer 614, protective 616 (also used as an optically compensation sheet support), polarizer 618, and protective film 620) are stacked from an observation direction (top side). In addition, a backlight unit (not shown) using a cold cathode fluorescent lamp or the like is disposed below the lower polarizing plate.

Hereinafter, a method of manufacturing the members used will be described.

(Manufacture of Liquid Crystal Cell)

For the liquid crystal cell, a liquid crystal material having positive dielectric anisotropy is drop-injected and sealed between the substrates, with a cell gap (d) of 4 μm, and Δn·d of the liquid crystal layer 611 is set to be 410 nm (Δn is refractive index anisotropy of the liquid crystal material). In addition, a rubbing direction 610 of the upper (observer side) substrate 609 of the liquid crystal cell is 90°, a rubbing direction 613 of the lower (backlight side) substrate 612 is 0°, and a twist angle is 90°. In this manner, a TN mode liquid crystal cell is manufactured.

In addition, an absorption axis 604 of the upper polarizing plate polarizer 603 and retardation axes 602 and 606 of the upper polarizing plate protective films 601 and 605 are set to 90°, an absorption axis 619 of the lower polarizing plate polarizer 618 and retardation axes 617 and 621 of the lower polarizing plate protective films 616 and 620 are set to 0°, an alignment control direction 608 of the upper optically anisotropic layer 607 is 270°, and an alignment control direction 615 of the lower optically anisotropic layer 614 is 180° (0°-90° attachment).

(Manufacture of Optical Compensation Sheet)
(Manufacture of Celluloseacetate Film)

A celluloseacetate solution is prepared by heating and agitating the following compositions put into a mixing tank and dissolving components of the compositions.

Composition of Celluloseacetate Solution

| | |
|---|---|
| Celluloseacetate having acidity of 60.7 to 61.1% | 100 parts by weight |
| Triphenylphosphate (plasticizer) | 7.8 parts by weight |
| Biphenyldiphenylphosphate (plasticizer) | 3.9 parts by weight |
| Methylenechloride (first solvent) | 336 parts by weight |
| Methanol (second solvent) | 29 parts by weight |
| 1-buthanol (third solvent) | 11 parts by weight |

A retardation enhancement solution is prepared by inputting the following retardation enhancer of 16 parts by weight, methylene chloride of 92 parts by weight and methanol of 8 parts by weight into a different mixing tank, heating and agitating them. A dope is prepared by mixing a celluloseacetate solution of 474 parts by weight with a retardation enhancement solution of 25 parts by weight and sufficiently agitating them. The addition amount of the retardation enhancer is 6.0 parts by weight for celluloseacetate of 100 parts by weight.

Retardation Enhancer

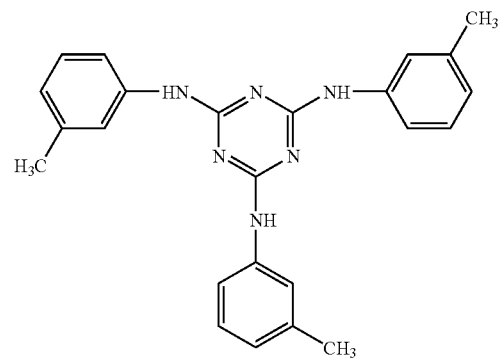

The obtained dope is expanded using a band expander. A celluloseacetate film (80 μm thick) having remaining solvent of 0.3 wt % is prepared by drying a film on a band with warm wind of 70° C. after the temperature of the film surface reaches 40° C. and then again drying the film with drying wind of 140° C. Re and Rth retardation values for a wavelength of 546 nm are measured for the prepared celluloseacetate film (transparent support and transparent protective film) using an ellipsometer (M-150 available from JASCO Corporation). As a result of the measurement, Re is 8 nm and Rth is 78 nm. The prepared celluloseacetate film is digested into a potassium hydroxide solution (25° C.) of 2.0 N for two minutes, neutralized with sulfuric acid, washed with pure water, and then dried. In this manner, the celluloseacetate film for the transparent protective film is manufactured.

(Manufacture of Alignment Film for Optically Anisotropic Film)

An application solution having the following compositions is applied on the celluloseacetate film using a #16 wire bar coater. The application solution is dried for 60 seconds with warm wind of 60° C., and then again for 150 seconds with warm wind of 90° C. Next, the formed film is subjected to a rubbing treatment in the same direction as an in-plane retardation axis (in parallel to an expansion direction) of the celluloseacetate film (accordingly, the alignment control direction (rubbing direction of the optically anisotropic layer is in parallel to the retardation axis of the celluloseacetate film).

Composition of Alignment Film Application Solution

| | |
|---|---|
| Following modified polyvinylalcohol | 20 parts by weight |
| Water | 360 parts by weight |
| Methanol | 120 parts by weight |
| Glutaraldehyde (plasticizer) | 1.0 parts by weight |

Modified polyvinylalcohol

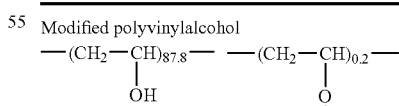

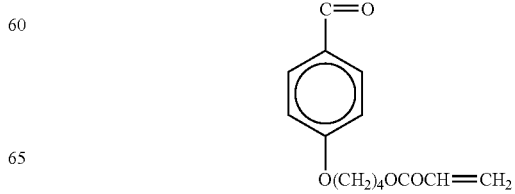

-continued

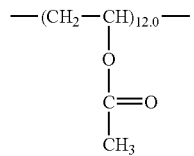

(Manufacture of Optically Anisotropic Film)

On the alignment film is applied an application solution in which the following discotic liquid crystal compound of 91.0 g, ethyleneoxide modified trimethylolpropanetriacrylate (V#360 available from OSAKA ORGANIC CHEMICAL INDUSTRY LTD.) of 9.0 g, celluloseacetatebutylate (CAB551-0.2 available from Eastman Chemical Company) of 2.0 g, celluloseacetatebutylate (CAB531-1 available from Eastman Chemical Company) of 0.5 g, photopolymerization initiator (IRGACURE 907 available from Nihon Ciba-Geigy K.K.) of 3.0 g, intensifier (KAYACURE DETX available from Nippon Kayaku Co., Ltd) of 1.0 g, and fluoroaliphatic-containing copolymer (Megaface F780 Dainippon Ink Corporation) of 1.3 g are dissolved into methylethylketone of 207 g, at 6.2 ml/m² using a #3.6 wire bar. This application solution is heated for two minutes in a constant temperature zone of 130° C. to align the discotic liquid crystal compound. Next, the discotic liquid crystal compound is polymerized by means of UV radiation for one minute at temperature of 60° C. using a high pressure mercury lamp of 120 W/cm. Thereafter, the temperature decreases to a room temperature. Thus, the optically anisotropic layer is formed and the optical compensation sheet is manufactured.

Liquid Crystal Compound

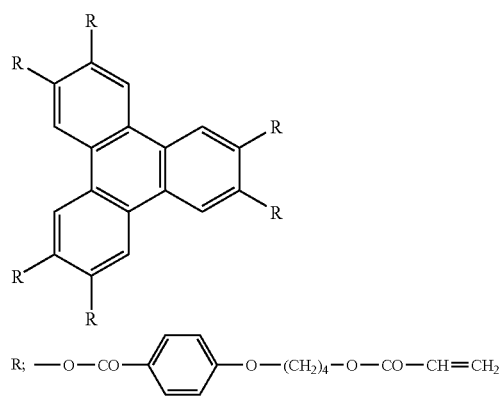

When the polarizing plate is in cross Nicol arrangement, no spot is observed in the obtained optical compensation sheet when viewed in the front and a direction inclined by 60° from a normal.

《Manufacture of (Elliptical) Polarizing Plate》

A polarizer is manufactured by absorbing iodine into an expanded polyvinylalcohol film, and the manufactured optical compensation sheet is laminated on one side of the polarizer at a support plane using a polyvinylalcohol adhesive. In addition, a 80 µm thick cellulosetriacetate film (TD-80U available from FUJIFILM Corporation) is subjected to a saponification treatment, and is laminated on a side opposite to the liquid crystal cell of the polarizer using a polyvinylalcohol adhesive. The absorption axis of the polarizer and the retardation axis (in parallel to the expansion direction) of the support of the optical compensation film are arranged in parallel to each other (accordingly, the absorption axis of the polarizer is in parallel to the alignment control direction of the optically anisotropic layer). The polarizing plate is so cut that its long or short side is in parallel to the retardation axis of the support. In this manner, the elliptical polarizing plate is manufactured.

《Manufacture of Liquid Crystal Display》

The manufactured elliptical polarizing plate is laminated on an observer side surface of the manufactured TN liquid crystal cell and a backlight side surface of the liquid crystal cell, respectively, by means of an adhesive, in such a manner that optical compensation sheets of the polarizing plates face the liquid crystal cell and absorption axes of the polarizers are perpendicular and in parallel to a horizontal direction of a screen of the display device. At this time, with the absorption axis of the polarizer of the polarizing plate and the alignment control direction of the optical compensation sheet adjusted to be in parallel to the alignment control direction (rubbing direction of the substrates) of the liquid crystal cell, the liquid crystal display is manufactured.

(Optical Measurement of Manufactured Liquid Crystal Display)

A rectangular wave voltage of 60 Hz is applied to the manufactured liquid crystal display in a normally white mode with white display of 1.5V and black display of 5V. A transmittance ratio CR (white display/black display) is measured using a measuring instrument (EZ-Contrast 160D available from ELDIM Corporation). A front CR of 1000 (contrast ratio: 1000 vs. 1) is obtained. After the manufactured liquid crystal display is stored in a test room in temperature 40° humidity 80% environments and then is left alone for one hour at a room temperature, a black display luminance difference between a panel center and a center of a long side end portion of the polarizing plate is measured to be 0.1 cd/m². No light leakage out of a circumference of the polarizing plate is observed by naked eyes. In addition, a viewing angle giving a CR of 10 or more is 80° in the left and 90° in the left.

Comparative Reference Example 7-1

The conventional liquid crystal display shown in FIG. 31 is manufactured. The reference example 7-1 has the same configuration as Reference example 7-1, except that every angle is rotated by −45° in a counterclockwise direction.

After the manufactured liquid crystal display is stored in a test room in temperature 40° humidity 80% environments and then is left alone for one hour at a room temperature, a black display luminance difference between a panel center and a center of a long side end portion of the polarizing plate is measured to be 0.5 cd/m². Light leakage on a circular arc at long and short sides of a circumference of the polarizing plate is observed by naked eyes. In addition, a viewing angle giving a CR of more than 10 is 80° in the left and 80° in the left.

Example

Comparative Example

An optical simulation is performed for the liquid crystal display shown in FIG. 32 to confirm the effect of the invention. An LCD Master Ver6.11 (available from Shintech Corporation) is used for optical calculation. The liquid crystal cell, the electrodes, the substrates, the polarizing plates and so on may be used as conventional for the liquid crystal display. ZLI-4792 attached to the LCD Master is used as a liquid crystal material. The liquid crystal cell is set to be a TN mode and a twist angle is set to be 90°. An alignment direction at a backlight side is set to be 315°, and an alignment direction at a display plane side is set to be 45°. A liquid crystal material having positive dielectric anisotropy has retardation (that is, the product ($\Delta n \cdot d_{LC}$) of the thickness $d_{LC}$ (μm) of the liquid crystal layer and the refractive index anisotropy $\Delta n$) of 400 nm. A liquid crystal application voltage is 1.8 V in the white display and 5.6 in the black display. G1220DU attached to the LCD Master is used for the polarizer. A backlight attached to the LCD Master is used as a light source. With this configuration, an optical characteristic of the liquid crystal display shown in FIG. 32 is calculated by the LCD Master.

Example 7-1

Comparative Example 7-1

An optical characteristic of the liquid crystal display shown in FIG. 2 having a configuration and specification that the liquid crystal layer has the same arrangement as in the conventional liquid crystal display (FIG. 31), the polarizer absorption axis is rotated by +45° for 0°-90° attachment, and the alignment control direction of the optically anisotropic layer is rotated by +20° to intersect the alignment axis of the substrate is calculated by the LCD Master.

An absorption axis angle of the polarizing plate is 0° at a backlight side and 90° at a display plane side (0°-90° attachment), and the alignment control direction of the optically anisotropic layer is 155° at a backlight side and 245° at a display plane side (intersection angle $\theta=20°$).

When Re and Rth of the polarizing plate protective film are 10 nm and 90 nm, respectively, a CR viewing angle is 80° in the left and 80° in the right, showing substantially bilateral symmetry, and a luminance difference between left and right sides at a polar angle of 60° in black display is 0.0035 (cd/m$^2$).

Table 4 shows CR values calculated in a polar angle 60° inclined direction while varying Re and Rth of the polarizing plate protective film.

TABLE 4

| | RETARDATION OF PROTECTIVE FILM | | | CR AT POLAR ANGLE OF 60° | | | | | | |
|---|---|---|---|---|---|---|---|---|---|---|
| | Re (nm) | Rth (nm) | Re + 2x Rth ≦ 280 | RIGHT UPPER | | LEFT UPPER | | LEFT LOWER | | RIGHT UPPER |
| EXAMPLE 7-1-1 | 20 | 20 | ○ 60 | X | 3 | X | 10 | ○ | 14 | X | 8 |
| EXAMPLE 7-1-2 | 20 | 50 | ○ 120 | X | 8 | ○ | 42 | ○ | 27 | ○ | 25 |
| EXAMPLE 7-1-3 | 20 | 80 | ○ 180 | ○ | 22 | ○ | 121 | ○ | 17 | ○ | 102 |
| EXAMPLE 7-1-4 | 20 | 100 | ○ 220 | ○ | 28 | ○ | 26 | X | 10 | ○ | 50 |
| EXAMPLE 7-1-5 | 20 | 120 | ○ 260 | ○ | 16 | X | 10 | X | 6 | ○ | 18 |
| EXAMPLE 7-1-6 | 50 | 20 | ○ 90 | X | 4 | ○ | 15 | ○ | 28 | ○ | 13 |
| EXAMPLE 7-1-7 | 50 | 50 | ○ 150 | X | 8 | ○ | 43 | ○ | 52 | ○ | 74 |
| EXAMPLE 7-1-8 | 50 | 80 | ○ 210 | ○ | 11 | ○ | 21 | ○ | 18 | ○ | 257 |
| EXAMPLE 7-1-9 | 80 | 20 | ○ 120 | X | 4 | ○ | 16 | ○ | 82 | ○ | 21 |
| EXAMPLE 7-1-10 | 80 | 50 | ○ 180 | X | 6 | ○ | 17 | ○ | 84 | ○ | 108 |
| EXAMPLE 7-1-11 | 80 | 80 | ○ 240 | X | 5 | X | 7 | ○ | 16 | ○ | 44 |
| EXAMPLE 7-1-12 | 120 | 20 | ○ 160 | X | 4 | X | 9 | ○ | 493 | ○ | 21 |
| EXAMPLE 7-1-13 | 120 | 50 | ○ 220 | X | 3 | X | 6 | ○ | 41 | ○ | 22 |
| EXAMPLE 7-1-14 | 120 | 80 | ○ 280 | X | 3 | X | 3 | ○ | 10 | ○ | 11 |
| EXAMPLE 7-1-15 | 150 | 20 | ○ 190 | X | 3 | X | 5 | ○ | 81 | ○ | 13 |
| EXAMPLE 7-1-16 | 150 | 50 | ○ 250 | X | 2 | X | 3 | ○ | 20 | X | 10 |
| EXAMPLE 7-1-17 | 200 | 20 | ○ 240 | X | 2 | X | 3 | ○ | 16 | X | 5 |
| COMPARATIVE EXAMPLE 7-1-1 | 20 | 150 | X 320 | X | 6 | X | 4 | X | 3 | X | 6 |
| COMPARATIVE EXAMPLE 7-1-2 | 20 | 200 | X 420 | X | 2 | X | 1 | X | 1 | X | 2 |
| COMPARATIVE EXAMPLE 7-1-3 | 80 | 120 | X 320 | X | 3 | X | 2 | X | 4 | X | 9 |
| COMPARATIVE EXAMPLE 7-1-4 | 80 | 150 | X 380 | X | 2 | X | 1 | X | 2 | X | 4 |
| COMPARATIVE EXAMPLE 7-1-5 | 80 | 200 | X 480 | X | 1 | X | 1 | X | 1 | X | 2 |
| COMPARATIVE EXAMPLE 7-1-6 | 120 | 120 | X 360 | X | 2 | X | 1 | X | 3 | X | 5 |
| COMPARATIVE EXAMPLE 7-1-7 | 150 | 80 | X 310 | X | 2 | X | 2 | X | 7 | X | 6 |
| COMPARATIVE EXAMPLE 7-1-8 | 200 | 50 | X 300 | X | 1 | X | 2 | X | 8 | X | 4 |
| COMPARATIVE EXAMPLE 7-1-9 | 200 | 80 | X 360 | X | 1 | X | 1 | X | 5 | X | 3 |
| COMPARATIVE EXAMPLE 7-1-10 | 200 | 120 | X 440 | X | 1 | X | 1 | X | 2 | X | 2 |
| COMPARATIVE EXAMPLE 7-1-11 | 200 | 200 | X 600 | X | 0 | X | 0 | X | 1 | X | 1 |
| COMPARATIVE EXAMPLE 7-1-12 | 250 | 20 | X 290 | X | 1 | X | 2 | X | 8 | X | 3 |
| COMPARATIVE EXAMPLE 7-1-13 | 250 | 50 | X 350 | X | 1 | X | 1 | X | 5 | X | 2 |
| COMPARATIVE EXAMPLE 7-1-14 | 250 | 80 | X 410 | X | 1 | X | 1 | X | 3 | X | 1 |
| COMPARATIVE EXAMPLE 7-1-15 | 250 | 120 | X 490 | X | 1 | X | 1 | X | 2 | X | 1 |
| COMPARATIVE EXAMPLE 7-1-16 | 250 | 200 | X 650 | X | 0 | X | 0 | X | 1 | X | 0 |

Example 7-2

Comparative example 7-2

An optical characteristic of the liquid crystal display shown in FIG. 2 having a configuration and specification that the liquid crystal layer has the same arrangement as in the conventional liquid crystal display (FIG. 31), the polarizer absorption axis is rotated by +45° for 0°-90° attachment, and the alignment control direction of the optically anisotropic layer is rotated by +15° to intersect the alignment axis of the substrate is calculated by the LCD Master.

An absorption axis angle of the polarizing plate is 0° at a backlight side and 90° at a display plane side (0°-90° attachment), and the alignment control direction of the optically anisotropic layer is 150° at a backlight side and 240° at a display plane side (intersection angle θ=15°).

When Re and Rth of the polarizing plate protective film are 10 nm and 90 nm, respectively, a CR viewing angle is 80° in the left and 80° in the right, showing substantially bilateral symmetry, and a luminance difference between left and right sides at a polar angle of 60° in black display is 0.0028 (cd/m$^2$).

Table 5 shows CR values calculated in a polar angle 60° inclined direction while varying Re and Rth of the polarizing plate protective film.

TABLE 5

|  | RETARDATION OF PROTECTIVE FILM | | | CR AT POLAR ANGLE 60° | | | | | | | |
| --- | --- | --- | --- | --- | --- | --- | --- | --- | --- | --- | --- |
|  | Re (nm) | Rth (nm) | Re + 2x Rth ≦ 280 | | RIGHT UPPER | | LEFT UPPER | | LEFT LOWER | | RIGHT UPPER |
| EXAMPLE 7-2-1 | 20 | 20 | ○ | 60 | X | 4 | X | 10 | ○ | 14 | X | 9 |
| EXAMPLE 7-2-2 | 20 | 50 | ○ | 120 | X | 11 | ○ | 48 | ○ | 24 | ○ | 30 |
| EXAMPLE 7-2-3 | 20 | 80 | ○ | 180 | ○ | 85 | ○ | 135 | ○ | 16 | ○ | 62 |
| EXAMPLE 7-2-4 | 20 | 100 | ○ | 220 | ○ | 76 | ○ | 24 | X | 9 | ○ | 28 |
| EXAMPLE 7-2-5 | 20 | 120 | ○ | 260 | ○ | 18 | X | 9 | X | 6 | ○ | 12 |
| EXAMPLE 7-2-6 | 50 | 20 | ○ | 90 | X | 5 | ○ | 16 | ○ | 26 | ○ | 17 |
| EXAMPLE 7-2-7 | 50 | 50 | ○ | 150 | ○ | 15 | ○ | 108 | ○ | 45 | ○ | 121 |
| EXAMPLE 7-2-8 | 50 | 80 | ○ | 210 | ○ | 25 | ○ | 32 | ○ | 17 | ○ | 98 |
| EXAMPLE 7-2-9 | 80 | 20 | ○ | 120 | X | 6 | ○ | 22 | ○ | 72 | ○ | 31 |
| EXAMPLE 7-2-10 | 80 | 50 | ○ | 180 | ○ | 11 | ○ | 32 | ○ | 74 | ○ | 318 |
| EXAMPLE 7-2-11 | 80 | 80 | ○ | 240 | X | 9 | ○ | 10 | ○ | 15 | ○ | 38 |
| EXAMPLE 7-2-12 | 120 | 20 | ○ | 160 | X | 5 | ○ | 13 | ○ | 592 | ○ | 35 |
| EXAMPLE 7-2-13 | 120 | 50 | ○ | 220 | X | 5 | X | 8 | ○ | 43 | ○ | 31 |
| EXAMPLE 7-2-14 | 120 | 80 | ○ | 280 | X | 3 | X | 4 | ○ | 10 | ○ | 12 |
| EXAMPLE 7-2-15 | 150 | 20 | ○ | 190 | X | 4 | X | 7 | ○ | 94 | ○ | 18 |
| EXAMPLE 7-2-16 | 150 | 50 | ○ | 250 | X | 3 | X | 4 | ○ | 21 | X | 12 |
| EXAMPLE 7-2-17 | 200 | 20 | ○ | 240 | X | 2 | X | 3 | ○ | 17 | X | 7 |
| COMPARATIVE EXAMPLE 7-2-1 | 20 | 150 | X | 320 | X | 5 | X | 4 | X | 3 | X | 5 |
| COMPARATIVE EXAMPLE 7-2-2 | 20 | 200 | X | 420 | X | 2 | X | 1 | X | 1 | X | 2 |
| COMPARATIVE EXAMPLE 7-2-3 | 80 | 120 | X | 320 | X | 4 | X | 2 | X | 4 | X | 7 |
| COMPARATIVE EXAMPLE 7-2-4 | 80 | 150 | X | 380 | X | 2 | X | 1 | X | 2 | X | 4 |
| COMPARATIVE EXAMPLE 7-2-5 | 80 | 200 | X | 480 | X | 1 | X | 1 | X | 1 | X | 2 |
| COMPARATIVE EXAMPLE 7-2-6 | 120 | 120 | X | 360 | X | 2 | X | 1 | X | 3 | X | 5 |
| COMPARATIVE EXAMPLE 7-2-7 | 150 | 80 | X | 310 | X | 2 | X | 2 | X | 7 | X | 7 |
| COMPARATIVE EXAMPLE 7-2-8 | 200 | 50 | X | 300 | X | 2 | X | 2 | X | 9 | X | 5 |
| COMPARATIVE EXAMPLE 7-2-9 | 200 | 80 | X | 360 | X | 1 | X | 1 | X | 5 | X | 3 |
| COMPARATIVE EXAMPLE 7-2-10 | 200 | 120 | X | 440 | X | 1 | X | 1 | X | 2 | X | 2 |
| COMPARATIVE EXAMPLE 7-2-11 | 200 | 200 | X | 600 | X | 0 | X | 0 | X | 1 | X | 1 |
| COMPARATIVE EXAMPLE 7-2-12 | 250 | 20 | X | 290 | X | 1 | X | 2 | X | 8 | X | 3 |
| COMPARATIVE EXAMPLE 7-2-13 | 250 | 50 | X | 350 | X | 1 | X | 1 | X | 5 | X | 2 |
| COMPARATIVE EXAMPLE 7-2-14 | 250 | 80 | X | 410 | X | 1 | X | 1 | X | 3 | X | 2 |
| COMPARATIVE EXAMPLE 7-2-15 | 250 | 120 | X | 490 | X | 1 | X | 1 | X | 2 | X | 1 |
| COMPARATIVE EXAMPLE 7-2-16 | 250 | 200 | X | 650 | X | 0 | X | 0 | X | 1 | X | 1 |

Figure 35:
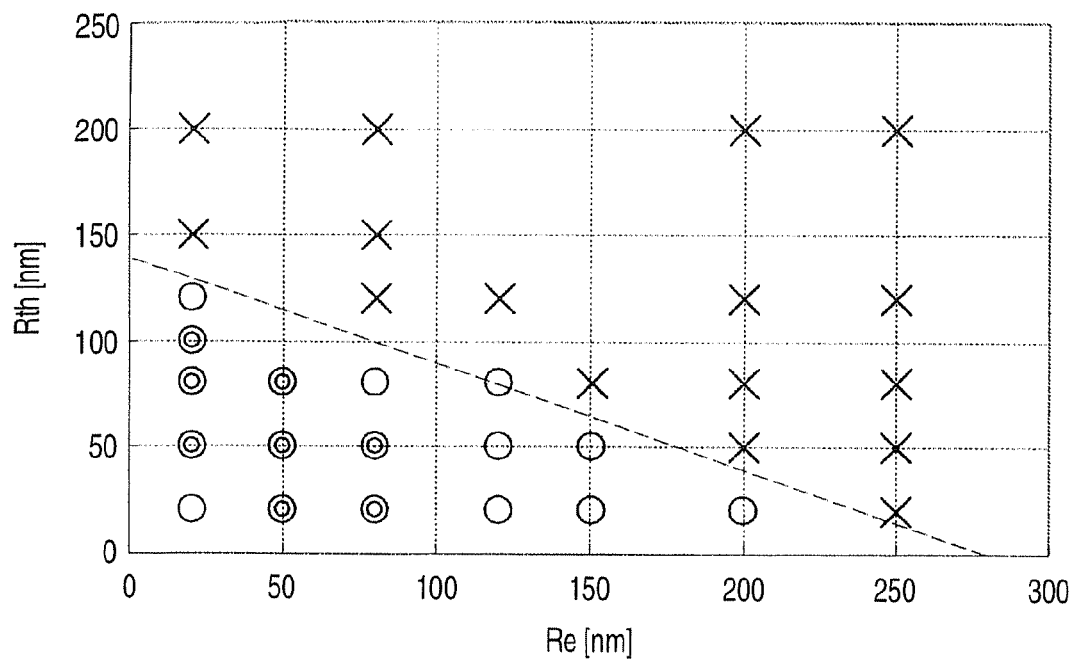
FIG. 35 is a graph showing a relationship between a width of a CR visual field of an inclined direction and an equation of "Re+2×Rth≦280".

FIG. 35 shows a graph 1 plotting for Table 4 of Example 7-1 and Comparative example 7-1. In the graph, ⊚ indicates 3 or 4 directions having a CR ratio of more than 10, ○ indicates 1 or 2 directions having a CR ratio of more than 10, and x indicates no direction having a CR ratio of more than 10. Although Example 7-2 and Comparative example 7-2 are plotted, its graph is omitted since it has the same form as the graph for Example 7-1 and Comparative example 7-1.

Example 7-3

An experiment on an actual film and panel is carried out.

Outline of device configuration is as shown in FIG. 32 showing Example 7-1, and CR values are measured for a panel on which several polarizing plate protective films having different retardations are laminated.

Specifically, a liquid crystal cell is prepared as in Comparative reference example, and 5 kinds of celluloseacetate films having Re and Rth values shown in the following Table 6, which are obtained by adjusting an expansion method or the kind or addition amount of retardation controlling agent, are used instead of the celluloseacetate films used in the reference examples. In addition, elliptical polarizing plates and liquid crystal panels are manufactured in the same way as in the reference examples, except that axes or directions of various films have relationships shown in FIGS. 32 and 33 (intersection angle θ=20°). CR values at a polar angle 60° inclined direction are measured for the manufactured liquid crystal panels by means of EZ-Contrast 160D.

Figure 36:
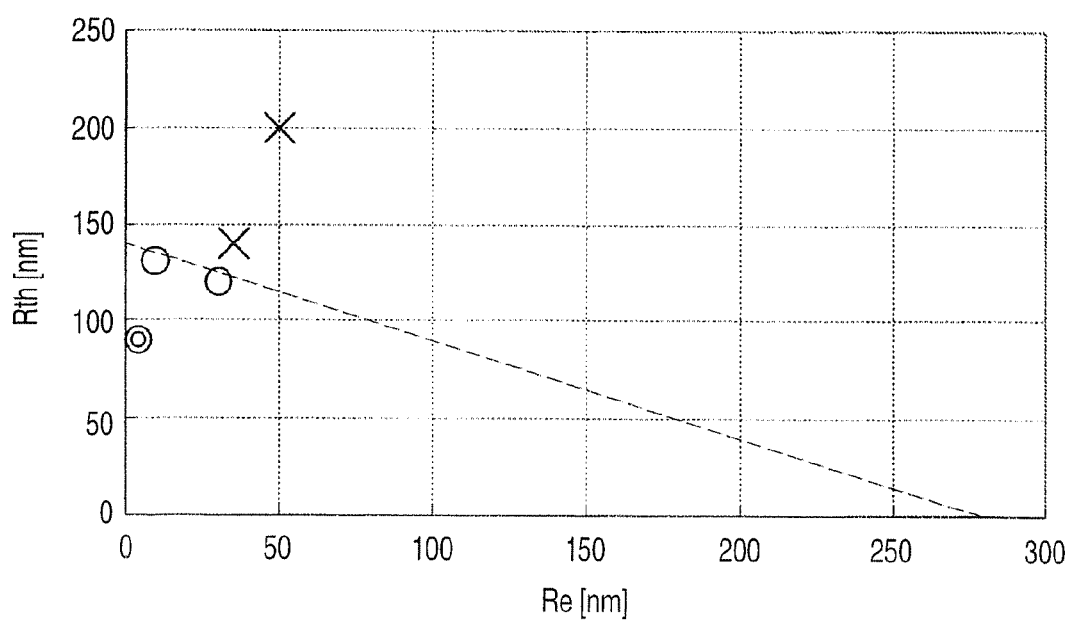
FIG. 36 is a graph showing a relationship between a width of a CR visual field of an inclined direction and an equation of "Re+2×Rth≦280".

Results of the measurement are shown in Table 6 and graph 2 of FIG. 36.

TABLE 6

| | RETARDATION OF PROTECTIVE FILM | | | CR AT POLAR ANGLE 60° | | | | | | | |
|---|---|---|---|---|---|---|---|---|---|---|---|
| | Re (nm) | Rth (nm) | | Re + 2x Rth ≦ 280 | RIGHT UPPER | | LEFT UPPER | | LEFT LOWER | | RIGHT UPPER | |
| EXAMPLE 7-3-1 | 5 | 90 | ○ | 185 | ○ | 39 | ○ | 130 | ○ | 13 | ○ | 51 |
| EXAMPLE 7-3-2 | 10 | 130 | ○ | 270 | ○ | 16 | X | 8 | X | 5 | ○ | 13 |
| EXAMPLE 7-3-3 | 30 | 120 | ○ | 270 | ○ | 11 | X | 8 | X | 6 | ○ | 17 |
| EXAMPLE 7-3-4 | 35 | 140 | X | 315 | X | 5 | X | 4 | X | 3 | X | 8 |
| EXAMPLE 7-3-5 | 50 | 200 | X | 450 | X | 1 | X | 1 | X | 1 | X | 2 |

CONCLUSION

From the above calculation and experiment, it can be seen that a CR viewing angle in an inclined direction is large when Re and Rth of a polarizing plate protective film fall within a proper range represented by a relationship of "Re+2× Rth≦280".

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2006-52473, JP2006-71427, JP2006-76164, JP2006-80397, JP2006-81977, JP2006-88235 and JP2006-318486 filed Feb. 28, Mar. 15, Mar. 20, Mar. 23, Mar. 24, Mar. 28 and Nov. 27, 2006, respectively, the contents of which are incorporated herein by reference.

The invention claimed is:

1. A liquid crystal display comprising:
a pair of polarizing plates, each comprising a polarizer and a transparent layer, transmission axes of the pair of polarizing plates being perpendicular to each other; and
a liquid crystal panel between the pair of polarizing plates, wherein the liquid crystal panel comprises a pair of substrates disposed opposite to each other, one of the pair of substrates having an electrode on one side thereof, a liquid crystal layer including liquid crystal molecules alighted by alignment axes of opposite surfaces of the pair of substrates, and a pair of optically anisotropic layers, the liquid crystal layer being between the pair of optically anisotropic layers
wherein the liquid crystal panel has a double symmetrical axis with respect to a cubic structure defined by: upper and lower alignment control directions of the liquid crystal layer which are defined by the alignment axes of opposite surfaces of the pair of substrates; and alignment control directions of the pair of optically anisotropic layers, the double symmetrical axis being parallel to the surfaces of the pair of substrates, a transmission axis of one of the pair of polarizing plates is parallel to the double symmetrical axis, and a transmission axis of the other of the pair of polarizing plates is perpendicular to the double symmetrical axis, and
wherein the transparent layer between the liquid crystal layer and the polarizer is a biaxial retardation layer, the biaxial retardation layer having: an in-plane retardation of 250 to 300 nm; an NZ value of 0.1 to 0.4 wherein Nz=(nx−nz)/(nx−ny), nx represents a refractive index in a retardation axis direction in plane, ny represents a refractive index in a direction perpendicular to nx in plane, nz represents a refractive index in a direction perpendicular to nx and ny; and an in-plane retardation axis perpendicular to an absorption axis of the polarizer closer to the biaxial retardation layer.

2. The liquid crystal display according to claim 1, wherein at least one of the polarizing plates further comprises a light diffusion layer, wherein the light diffusion layer comprises a translucent resin and translucent particles having a refractive index different from that of the translucent resin, and the light diffusion layer has an internal haze of 45 to 80%.

3. The liquid crystal display according to claim 1, wherein one of the pair of polarizing plates includes a retardation layer, and the retardation layer is disposed between the polarizer of the one of the pair of polarizing plates and the liquid crystal panel.

4. A liquid crystal display comprising:
a pair of substrates disposed opposite to each other, one of the pair of substrates having an electrode on one side thereof;

a liquid crystal layer between the pair of substrates, the liquid crystal layer including liquid crystal molecules alighted by alignment axes of opposite surfaces of the pair of substrates;

a pair of polarizing plates, each comprising a polarizer and a protective film, the liquid crystal layer being between the pair of polarizing plates; and an optically anisotropic layer between the liquid crystal layer and at least one of the pair of polarizing plates, the optically anisotropic layer including a liquid crystal compound aligned by an alignment axis and fixed, wherein an absorption axis of the polarizer is parallel or perpendicular to a horizontal direction of a screen of the liquid crystal display, at least one of the alignment axes of surfaces of the pair of substrates intersects an alignment control direction of the optically anisotropic layer by 10 to 35°, and the protective film satisfies formula:

$$Re+2\times Rth \leq 280$$

wherein Re represents an in-plane retardation, and Rth represents a thickness-direction retardation.

5. The liquid crystal display according to claim 4, wherein at least one of the polarizing plates further comprises a light diffusion layer, wherein the light diffusion layer comprises a translucent resin and translucent particles having a refractive index different from that of the translucent resin, and the light diffusion layer has an internal haze of 45 to 80%.

6. The liquid crystal display according to claim 4, wherein the optically anisotropic layer is disposed on one side of the liquid crystal layer.

* * * * *